(12) United States Patent
Tomita

(10) Patent No.: US 10,536,620 B2
(45) Date of Patent: Jan. 14, 2020

(54) LENS BARREL, CAMERA SYSTEM, AND IMAGING DEVICE

(71) Applicant: NIKON CORPORATION, Tokyo (JP)

(72) Inventor: Hiroyuki Tomita, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/138,711

(22) Filed: Apr. 26, 2016

(65) Prior Publication Data

US 2016/0269617 A1   Sep. 15, 2016

Related U.S. Application Data

(63) Continuation of application No. 14/934,574, filed on Nov. 6, 2015, now abandoned, which is a
(Continued)

(30) Foreign Application Priority Data

May 10, 2013   (JP) .................................. 2013-100770
May 10, 2013   (JP) .................................. 2013-100771
May 10, 2013   (JP) .................................. 2013-100772

(51) Int. Cl.
*H04N 5/232*   (2006.01)
*G02B 7/08*   (2006.01)
(Continued)

(52) U.S. Cl.
CPC ........... *H04N 5/23212* (2013.01); *G02B 7/08* (2013.01); *G02B 7/38* (2013.01); *H04N 5/2254* (2013.01)

(58) Field of Classification Search
CPC ... G02B 7/36; G02B 7/08; G02B 7/38; G03B 13/36; G03B 17/14; G03B 19/12;
(Continued)

(56) References Cited

U.S. PATENT DOCUMENTS 5,079,582 A   1/1992   Hamada et al.
5,206,677 A   4/1993   Onuki et al.
(Continued)

FOREIGN PATENT DOCUMENTS

CN   102819168 A   12/2012
JP   H03-150513 A   6/1991
(Continued)

OTHER PUBLICATIONS

Jun. 14, 2016 Office Action issued in Japanese Patent Application No. 2013-543059.
(Continued)

*Primary Examiner* — Usman A Khan
(74) *Attorney, Agent, or Firm* — Oliff PLC

(57) ABSTRACT

A lens barrel of the invention includes: an imaging optical system including a focus adjustment lens; a driver that drives the focus adjustment lens in a direction of an optical axis; a transceiver that transmits and receives a signal to and from a camera body; and a controller that controls the transceiver to repeatedly transmit a first image plane transfer coefficient which is determined in correspondence with a position of the focus adjustment lens included in the imaging optical system and a second image plane transfer coefficient which does not depend on the position of the focus adjustment lens to the camera body at a predetermined interval, and, when the controller repeatedly transmits the second image plane transfer coefficient to the camera body, the controller varies the second image plane transfer coefficient over time.

10 Claims, 66 Drawing Sheets

Related U.S. Application Data continuation of application No. PCT/JP2014/062529, filed on May 9, 2014.

(51) Int. Cl.
*G02B 7/38* (2006.01)
*H04N 5/225* (2006.01)

(58) Field of Classification Search
CPC .............. G03B 2206/00; H04N 5/2254; H04N 5/23212; H04N 5/23296; H04N 5/3696; H04N 5/23209
USPC .......................................................... 348/352
See application file for complete search history.

(56) References Cited

U.S. PATENT DOCUMENTS

| | | | |
|---|---|---|---|
| 5,227,832 | A | 7/1993 | Kawasaki et al. |
| 6,208,811 | B1 | 3/2001 | Tanaka |
| 8,139,140 | B2 | 3/2012 | Yumiki |
| 9,277,098 | B2 * | 3/2016 | Shirakata ........... G03G 15/5079 |
| 9,635,239 | B2 | 4/2017 | Tomita et al. |
| 2002/0127012 | A1 | 9/2002 | Okawara |
| 2004/0057712 | A1 | 3/2004 | Sato et al. |
| 2006/0232701 | A1 | 10/2006 | Ito et al. |
| 2007/0258710 | A1 | 11/2007 | Yamasaki |
| 2008/0007644 | A1 | 1/2008 | Matsumoto |
| 2009/0115883 | A1 | 5/2009 | Tsuchiya |
| 2009/0251554 | A1 | 10/2009 | Kido et al. |
| 2010/0026821 | A1 | 2/2010 | Sato et al. |
| 2010/0091175 | A1 | 4/2010 | Shintani et al. |
| 2010/0128144 | A1 | 5/2010 | Tay |
| 2010/0157134 | A1 | 6/2010 | Kawarada |
| 2011/0141340 | A1 | 6/2011 | Yumiki et al. |
| 2011/0261251 | A1 | 10/2011 | Okamoto et al. |
| 2012/0026386 | A1 | 2/2012 | Tomita |
| 2012/0038818 | A1 | 2/2012 | Hamada |
| 2012/0307134 | A1 | 12/2012 | Morimoto |
| 2013/0010179 | A1 | 1/2013 | Takahara et al. |
| 2013/0022348 | A1 * | 1/2013 | Hasuda .................. G03B 17/14 396/530 |
| 2014/0320736 | A1 | 10/2014 | Tomita et al. |

FOREIGN PATENT DOCUMENTS

| | | |
|---|---|---|
| JP | H04-315116 A | 11/1992 |
| JP | H05-257055 A | 10/1993 |
| JP | H05313062 A | 11/1993 |
| JP | H08-76001 A | 3/1996 |
| JP | H08-265620 A | 10/1996 |
| JP | H09-211648 A | 8/1997 |
| JP | 2000-019379 A | 1/2000 |
| JP | 2002023041 A | 1/2002 |
| JP | 2002-267924 A | 9/2002 |
| JP | 2003-029135 A | 1/2003 |
| JP | 2006-78660 A | 3/2006 |
| JP | 2007233943 A | 9/2007 |
| JP | 2008-052191 A | 3/2008 |
| JP | 2008-158028 A | 7/2008 |
| JP | 2008-241733 A | 10/2008 |
| JP | 2009-145645 A | 7/2009 |
| JP | 2010-139666 A | 6/2010 |
| JP | 2012-032569 A | 2/2012 |
| JP | 2013-057746 A | 3/2013 |
| JP | 2014-153615 A | 8/2014 |
| JP | 2014219643 A | 11/2014 |
| WO | 2013069795 A1 | 5/2013 |

OTHER PUBLICATIONS

Sep. 16, 2016 Extended Search Report issued in European Patent Application No. 14794746.9.
Sep. 26, 2017 Office Action issued in Japanese Patent Application No. 2016-191382.
Sep. 26, 2017 Office Action issued in Japanese Patent Application No. 2016-190995.
Aug. 12, 2014 International Search Report issued in International Patent Application No. PCT/JP2014/062529.
Jun. 17, 2015 Partial Supplementary Search Report in European Patent Application No. 12847609.0.
Feb. 12, 2013 International Search Report issued in International Patent Application No. PCT/JP2012/079189.
Oct. 2, 2015 International Preliminary Report on Patentability issued in International Patent Application No. PCT/ JP2014/062529.
Iijima, English Language Abstract of Japanese Patent Application Publication No. H04-315116 filed Jun. 11, 1992.
Oct. 8, 2015 Extended European Search Report issued in European Patent Application No. 12847609.0.
U.S. Appl. No. 14/267,348 filed May 1, 2014 in the name of Tomita, et al.
Jan. 19, 2016 International Search Report and Written Opinion issued in International Patent Application No. PCT/ JP2015/081280.
U.S. Appl. No. 14/934,574 filed Nov. 6, 2015 in the name of Tomita, et al.
Apr. 19, 2016 Office Action Issued in U.S Appl. No. 14/267,348.
Jan. 22, 2019 Office Action issued in Chinese Application No. 201480037465.2.
Jan. 19, 2016 International Search Report issued in International Patent Application No. PCT/JP2015/081280.
Jan. 31, 2018 Decision to Grant issued in Russian Patent Application No. 2014123677.
U.S. Appl. No. 15/138,711 filed Apr. 26, 2016 in the name of Tomita.
U.S. Appl. No. 15/461,151 filed on Mar. 16, 2017 in the name of Tomita.
Dec. 16, 2016 Notice of Allowance issued in U.S. Appl. No. 14/267,348.
May 3, 2018 Office Action issued in U.S. Appl. No. 15/522,585.
Jun. 4, 2018 Office Action issued in U.S. Appl. No. 15/461,151.
Mar. 27, 2018 Office Action issued in Japanese Patent Application No. 2017-039743.
Apr. 3, 2018 Office Action issued in Japanese Patent Application No. 2017-099025.
May 15, 2018 Office Action issued in Japanese Patent Application No. 2017-099024.
May 24, 2018 Search Report issued in European Patent Application No. 15857370.9.
Feb. 5, 2019 Office Action issued in U.S. Appl. No. 15/522,585.
U.S. Appl. No. 15/522,585 filed Apr. 27, 2017 in the name of Tomita.
Aug. 28, 2019 Office Action issued in U.S. Appl. No. 15/522,585.

\* cited by examiner

FIG.3

| FOCAL LENGTH \ OBJECT DISTANCE | D1 | D2 | D3 | D4 | D5 | D6 | D7 | D8 | D9 |
|---|---|---|---|---|---|---|---|---|---|
| f1 | K11 | K12 | K13 | K14 | K15 | K16 | K17 | K18 | K19 |
| f2 | K21 | K22 | K23 | K24 | K25 | K26 | K27 | K28 | K29 |
| f3 | K31 | K32 | K33 | K34 | K35 | K36 | K37 | K38 | K39 |
| f4 | K41 | K42 | K43 | K44 | K45 | K46 | K47 | K48 | K49 |
| f5 | K51 | K52 | K53 | K54 | K55 | K56 | K57 | K58 | K59 |
| f6 | K61 | K62 | K63 | K64 | K65 | K66 | K67 | K68 | K69 |
| f7 | K71 | K72 | K73 | K74 | K75 | K76 | K77 | K78 | K79 |
| f8 | K81 | K82 | K83 | K84 | K85 | K86 | K87 | K88 | K89 |
| f9 | K91 | K92 | K93 | K94 | K95 | K96 | K97 | K98 | K99 |

FIG.4

| FOCAL LENGTH | MINIMUM IMAGE PLANE TRANSFER COEFFICIENT Kmin | CORRECTED MINIMUM IMAGE PLANE TRANSFER COEFFICIENT Kmin_x | MAXIMUM IMAGE PLANE TRANSFER COEFFICIENT Kmax | CORRECTED MAXIMUM IMAGE PLANE TRANSFER COEFFICIENT Kmax_x |
|---|---|---|---|---|
| f1 | K11 | K11' | K19 | K19' |
| f2 | K21 | K21' | K29 | K29' |
| f3 | K31 | K31' | K39 | K39' |
| f4 | K41 | K41' | K49 | K49' |
| f5 | K52 | K52' | K59 | K59' |
| f6 | K62 | K62' | K69 | K69' |
| f7 | K72 | K72' | K79 | K79' |
| f8 | K82 | K81' | K89 | K89' |
| f9 | K91 | K91' | K99 | K99' |

FIG.18

| FOCAL LENGTH \ OBJECT DISTANCE | X1 | X2 | D0 | D1 | D2 | D3 | D4 | D5 | D6 | D7 | D8 | D9 | D10 | X3 | X4 |
|---|---|---|---|---|---|---|---|---|---|---|---|---|---|---|---|
| f1 | α11 | α12 | K10 | K11 | K12 | K13 | K14 | K15 | K16 | K17 | K18 | K19 | K110 | α13 | α14 |
| f2 | α21 | α22 | K20 | K21 | K22 | K23 | K24 | K25 | K26 | K27 | K28 | K29 | K210 | α23 | α24 |
| f3 | α31 | α23 | K30 | K31 | K32 | K33 | K34 | K35 | K36 | K37 | K38 | K39 | K310 | α33 | α34 |
| f4 | α41 | α24 | K40 | K41 | K42 | K43 | K44 | K45 | K46 | K47 | K48 | K49 | K410 | α43 | α44 |
| f5 | α51 | α25 | K50 | K51 | K52 | K53 | K54 | K55 | K56 | K57 | K58 | K59 | K510 | α53 | α54 |
| f6 | α61 | α26 | K60 | K61 | K62 | K63 | K64 | K65 | K66 | K67 | K68 | K69 | K610 | α63 | α64 |
| f7 | α71 | α27 | K70 | K71 | K72 | K73 | K74 | K75 | K76 | K77 | K78 | K79 | K710 | α73 | α74 |
| f8 | α81 | α28 | K80 | K81 | K82 | K83 | K84 | K85 | K86 | K87 | K88 | K89 | K810 | α83 | α84 |
| f9 | α91 | α29 | K90 | K91 | K92 | K93 | K94 | K95 | K96 | K97 | K98 | K99 | K910 | α93 | α94 |

FOCUSING RANGE OF FOCUS LENS 33

FIG.20

| TEMPERATURE [°C] | 25 | 50 | 80 | . . . . |
|---|---|---|---|---|
| MINIMUM IMAGE PLANE TRANSFER COEFFICIENT $K_{min}$ | 100 | 102 | 104 | . . . . |

FIG.21

| TIME [h] | 0 | 1 | 2 | · · · · |
|---|---|---|---|---|
| MINIMUM IMAGE PLANE TRANSFER COEFFICIENT $K_{min}$ | 100 | 102 | 104 | · · · · |

FIG.22

| POSITION OF FOCUS LENS | D1 | ← | | | | | | | | → | D9 |
|---|---|---|---|---|---|---|---|---|---|---|---|
| MINIMUM IMAGE PLANE TRANSFER COEFFICIENT $K_{min}$ BEFORE CORRECTION | 100 | 120 | 140 | · · · | · · · | · · · | · · · | · · · | · · · | 960 | 980 | 1000 |
| CORRECTED MINIMUM IMAGE PLANE TRANSFER COEFFICIENT $K_{min}$ | | | | | | | | | | | |
| EXAMPLE A (ADDITION) | 120 | 140 | 160 | · · · | · · · | · · · | · · · | · · · | · · · | 980 | 1000 | 1020 |
| EXAMPLE B (SUBTRACTION) | 80 | 100 | 120 | · · · | · · · | · · · | · · · | · · · | · · · | 940 | 960 | 980 |
| EXAMPLE C -MOVEMENT TO INFINITY SIDE (ADDITION)- -MOVEMENT TO NEAR SIDE (SUBTRACTION)- | — 80 | 140 100 | 160 120 | · · · | · · · | · · · | · · · | · · · | · · · | 980 940 | 1000 960 | 1020 980 |
| EXAMPLE D (MULTIPLICATION) | 110 | 132 | 154 | · · · | · · · | · · · | · · · | · · · | · · · | 1056 | 1078 | 1100 |

FIG.28

| FOCAL LENGTH \ OBJECT DISTANCE | D1 | D2 | D3 | D4 | D5 | D6 | D7 | D8 | D9 |
|---|---|---|---|---|---|---|---|---|---|
| f1 | K11 | K12 | K13 | K14 | K15 | K16 | K17 | K18 | K19 |
| f2 | K21 | K22 | K23 | K24 | K25 | K26 | K27 | K28 | K29 |
| f3 | K31 | K32 | K33 | K34 | K35 | K36 | K37 | K38 | K39 |
| f4 | K41 | K42 | K43 | K44 | K45 | K46 | K47 | K48 | K49 |
| f5 | K51 | K52 | K53 | K54 | K55 | K56 | K57 | K58 | K59 |
| f6 | K61 | K62 | K63 | K64 | K65 | K66 | K67 | K68 | K69 |
| f7 | K71 | K72 | K73 | K74 | K75 | K76 | K77 | K78 | K79 |
| f8 | K81 | K82 | K83 | K84 | K85 | K86 | K87 | K88 | K89 |
| f9 | K91 | K92 | K93 | K94 | K95 | K96 | K97 | K98 | K99 |

FIG.33

| FOCAL LENGTH \ OBJECT DISTANCE | D0 | D1 | D2 | D3 | D4 | D5 | D6 | D7 | D8 | D9 | D10 |
|---|---|---|---|---|---|---|---|---|---|---|---|
| f1 | K10 | K11 | K12 | K13 | K14 | K15 | K16 | K17 | K18 | K19 | K110 |
| f2 | K20 | K21 | K22 | K23 | K24 | K25 | K26 | K27 | K28 | K29 | K210 |
| f3 | K30 | K31 | K32 | K33 | K34 | K35 | K36 | K37 | K38 | K39 | K310 |
| f4 | K40 | K41 | K42 | K43 | K44 | K45 | K46 | K47 | K48 | K49 | K410 |
| f5 | K50 | K51 | K52 | K53 | K54 | K55 | K56 | K57 | K58 | K59 | K510 |
| f6 | K60 | K61 | K62 | K63 | K64 | K65 | K66 | K67 | K68 | K69 | K610 |
| f7 | K70 | K71 | K72 | K73 | K74 | K75 | K76 | K77 | K78 | K79 | K710 |
| f8 | K80 | K81 | K82 | K83 | K84 | K85 | K86 | K87 | K88 | K89 | K810 |
| f9 | K90 | K91 | K92 | K93 | K94 | K95 | K96 | K97 | K98 | K99 | K910 |

FOCUSING RANGE OF FOCUS LENS 33

← NEAR SIDE    600    INFINITY SIDE →

500    AMOUNT OF BACKLASH G

FIG.43

| FOCAL LENGTH \ OBJECT DISTANCE | X1 | X2 | D0 | D1 | D2 | D3 | D4 | D5 | D6 | D7 | D8 | D9 | D10 | X3 | X2 |
|---|---|---|---|---|---|---|---|---|---|---|---|---|---|---|---|
| f1 | α11 | α12 | K10 | K11 | K12 | K13 | K14 | K15 | K16 | K17 | K18 | K19 | K110 | α13 | α14 |
| f2 | α21 | α22 | K20 | K21 | K22 | K23 | K24 | K25 | K26 | K27 | K28 | K29 | K210 | α23 | α24 |
| f3 | α31 | α23 | K30 | K31 | K32 | K33 | K34 | K35 | K36 | K37 | K38 | K39 | K310 | α33 | α34 |
| f4 | α41 | α24 | K40 | K41 | K42 | K43 | K44 | K45 | K46 | K47 | K48 | K49 | K410 | α43 | α44 |
| f5 | α51 | α25 | K50 | K51 | K52 | K53 | K54 | K55 | K56 | K57 | K58 | K59 | K510 | α53 | α54 |
| f6 | α61 | α26 | K60 | K61 | K62 | K63 | K64 | K65 | K66 | K67 | K68 | K69 | K610 | α63 | α64 |
| f7 | α71 | α27 | K70 | K71 | K72 | K73 | K74 | K75 | K76 | K77 | K78 | K79 | K710 | α73 | α74 |
| f8 | α81 | α28 | K80 | K81 | K82 | K83 | K84 | K85 | K86 | K87 | K88 | K89 | K810 | α83 | α84 |
| f9 | α91 | α29 | K90 | K91 | K92 | K93 | K94 | K95 | K96 | K97 | K98 | K99 | K910 | α93 | α94 |

FOCUSING RANGE OF FOCUS LENS 33 (D1 to D9)

FIG.47

| FOCAL LENGTH \ OBJECT DISTANCE | D1 | D2 | D3 | D4 | D5 | D6 | D7 | D8 | D9 |
|---|---|---|---|---|---|---|---|---|---|
| f1 | K11 | K12 | K13 | K14 | K15 | K16 | K17 | K18 | K19 |
| f2 | K21 | K22 | K23 | K24 | K25 | K26 | K27 | K28 | K29 |
| f3 | K31 | K32 | K33 | K34 | K35 | K36 | K37 | K38 | K39 |
| f4 | K41 | K42 | K43 | K44 | K45 | K46 | K47 | K48 | K49 |
| f5 | K51 | K52 | K53 | K54 | K55 | K56 | K57 | K58 | K59 |
| f6 | K61 | K62 | K63 | K64 | K65 | K66 | K67 | K68 | K69 |
| f7 | K71 | K72 | K73 | K74 | K75 | K76 | K77 | K78 | K79 |
| f8 | K81 | K82 | K83 | K84 | K85 | K86 | K87 | K88 | K89 |
| f9 | K91 | K92 | K93 | K94 | K95 | K96 | K97 | K98 | K99 |

FIG.63

| FOCAL LENGTH \ OBJECT DISTANCE | X1 | X2 | D0 | D1 | D2 | D3 | D4 | D5 | D6 | D7 | D8 | D9 | D10 | X3 | X2 |
|---|---|---|---|---|---|---|---|---|---|---|---|---|---|---|---|
| f1 | α11 | α12 | K10 | K11 | K12 | K13 | K14 | K15 | K16 | K17 | K18 | K19 | K110 | α13 | α14 |
| f2 | α21 | α22 | K20 | K21 | K22 | K23 | K24 | K25 | K26 | K27 | K28 | K29 | K210 | α23 | α24 |
| f3 | α31 | α23 | K30 | K31 | K32 | K33 | K34 | K35 | K36 | K37 | K38 | K39 | K310 | α33 | α34 |
| f4 | α41 | α24 | K40 | K41 | K42 | K43 | K44 | K45 | K46 | K47 | K48 | K49 | K410 | α43 | α44 |
| f5 | α51 | α25 | K50 | K51 | K52 | K53 | K54 | K55 | K56 | K57 | K58 | K59 | K510 | α53 | α54 |
| f6 | α61 | α26 | K60 | K61 | K62 | K63 | K64 | K65 | K66 | K67 | K68 | K69 | K610 | α63 | α64 |
| f7 | α71 | α27 | K70 | K71 | K72 | K73 | K74 | K75 | K76 | K77 | K78 | K79 | K710 | α73 | α74 |
| f8 | α81 | α28 | K80 | K81 | K82 | K83 | K84 | K85 | K86 | K87 | K88 | K89 | K810 | α83 | α84 |
| f9 | α91 | α29 | K90 | K91 | K92 | K93 | K94 | K95 | K96 | K97 | K98 | K99 | K910 | α93 | α94 |

FOCUSING RANGE OF FOCUS LENS 33 (D1–D9)

LENS BARREL, CAMERA SYSTEM, AND IMAGING DEVICE

CROSS-REFERENCE TO RELATED APPLICATIONS

This is a Continuation of application Ser. No. 14/934,574 filed Nov. 16, 2015, which is a Continuation of International Application No. PCT/JP2014/62529 filed May 9, 2014, which in turn claims the benefit of Japanese Patent Applications No. 2013-100770 filed May 10, 2013, No. 2013-100771 filed May 10, 2013, and No. 2013-100772 filed May 10, 2013, the entire contents of which are hereby incorporated by reference herein.

TECHNICAL FIELD

The present invention relates to a lens barrel, a camera system, and an imaging device.

BACKGROUND ART

A technique has been known which calculates an evaluation value related to the contrast by an optical system, while a focus adjustment lens is driven at a predetermined driving speed in a direction of an optical axis, thereby detecting the focus state of the optical system (for example, see Patent Literature 1).

CITATION LIST

Patent Literature

Patent Literature 1: JP 2010-139666 A

SUMMARY OF INVENTION

Technical Problem

An object of the invention is to provide a lens barrel which can appropriately detect the focus state of an optical system.

Solution to Problem

The invention solves the above-mentioned problem using the following means.
[1] A lens barrel of the present invention includes: an imaging optical system including a focus adjustment lens; a driver that drives the focus adjustment lens in a direction of an optical axis; a transceiver that transmits and receives a signal to and from a camera body; and a controller that controls the transceiver to repeatedly transmit a first image plane transfer coefficient which is determined in correspondence with a position of the focus adjustment lens included in the imaging optical system and a second image plane transfer coefficient which does not depend on the position of the focus adjustment lens to the camera body at a predetermined interval, and, when the controller repeatedly transmits the second image plane transfer coefficient to the camera body, the controller varies the second image plane transfer coefficient over time.
[2] In the invention related to the above lens barrel, the second image plane transfer coefficient may be configured to be at least one of a maximum value and a minimum value of the first image plane transfer coefficient.
[3] In the invention related to the above lens barrel, the lens barrel may be configured to include: an imaging optical system including a focus adjustment lens; a driver that drives the focus adjustment lens in a direction of an optical axis; a transceiver that transmits and receives a signal to and from a camera body; and a controller that controls the transceiver to repeatedly transmit a first image plane transfer coefficient which is determined in correspondence with a position of the focus adjustment lens included in the imaging optical system and a second image plane transfer coefficient which is at least one of a maximum value and a minimum value of the first image plane transfer coefficient to the camera body at a predetermined interval, and, when the controller repeatedly transmits the second image plane transfer coefficient to the camera body, the controller may vary the second image plane transfer coefficient, depending on a change in a position of the focus adjustment lens.
[4] A camera system of the present invention includes: any of the above lens barrel; and a camera body, and the camera body includes: an acquisition module that acquires the first image plane transfer coefficient and the second image plane transfer coefficient from the lens barrel; a focus detector that calculates an evaluation value related to a contrast of an image by the imaging optical system to detect a focus adjustment state of the imaging optical system; and a driving speed determination module that determines a driving speed of the focus adjustment lens when the focus detector detects the focus adjustment state, using the second image plane transfer coefficient.
[5] A lens barrel according to a first aspect of the present invention includes: an imaging optical system including a focus adjustment lens; a driver that drives the focus adjustment lens; a transceiver that transmits and receives a signal to and from a camera body; and a controller that can control the transceiver to transmit a first image plane transfer coefficient which corresponds to a value of TL/TI and is determined in correspondence with a position of the focus adjustment lens and a second image plane transfer coefficient which is greater than a minimum value of the first image plane transfer coefficient to the camera body, TL being an amount of movement of the focus adjustment lens and TI being an amount of movement of an image plane.
[6] A lens barrel according to a second aspect of the present invention includes: an imaging optical system including a focus adjustment lens; a driver that drives the focus adjustment lens; a transceiver that transmits and receives a signal to and from a camera body; and a controller that can control the transceiver to transmit a first image plane transfer coefficient which corresponds to a value of TI/TL and is determined in correspondence with a position of the focus adjustment lens and a second image plane transfer coefficient which is less than a minimum value of the first image plane transfer coefficient, TL being an amount of movement of the focus adjustment lens and TI being an amount of movement of an image plane.
[7] In the lens barrel according to the first and second aspects of the present invention, the controller may be configured to control the transceiver to transmit the first image plane transfer coefficient and the second image plane transfer coefficient to the camera body when the camera body determines that the lens barrel is a first type of lens on the basis of a result of the transmission and reception of the signal between the lens barrel and the camera body using the transceiver, and the controller may be configured to control the transceiver to transmit the first image plane transfer coefficient to the camera body and not to transmit the second image plane transfer coefficient to the camera body when the camera body determines that the lens barrel is a second type of lens different from the first type of lens on the basis of the result of the transmission and reception of the signal between the lens barrel and the camera body using the transceiver.

[8] A lens barrel according to a third aspect of the present invention includes: an imaging optical system including a focus adjustment lens; a driver that drives the focus adjustment lens; a transceiver that transmits and receives a signal to and from a camera body; and a controller that can control the transceiver to transmit a first image plane transfer coefficient which is determined in correspondence with a position of the focus adjustment lens and a second image plane transfer coefficient which is different from the first image plane transfer coefficient and varies depending on the position of the focus adjustment lens to the camera body.

[9] A lens barrel according to a fourth aspect of the present invention includes: an imaging optical system including a focus adjustment lens; a driver that drives the focus adjustment lens in a direction of an optical axis; a transceiver that transmits and receives a signal to and from a camera body; and a controller that controls the transceiver to transmit a first image plane transfer coefficient which is determined in correspondence with a position of the focus adjustment lens included in the imaging optical system and a second image plane transfer coefficient which does not depend on the position of the focus adjustment lens to the camera body, and the second image plane transfer coefficient is set on the basis of a range where a driving control of the focus adjustment lens is performed.

[10] In the invention related to the above lens barrel, the second image plane transfer coefficient may be configured to be set on the basis of an image plane transfer coefficient when the focus adjustment lens is driven in a vicinity of a near in-focus position including the near in-focus position that corresponds to a position which is closest to a near side and where the imaging optical system can be focused on an image plane, or an image plane transfer coefficient when the focus adjustment lens is driven in a vicinity of an infinite in-focus position including the infinite in-focus position that corresponds to a position which is closest to an infinity side and where the imaging optical system can be focused on the image plane.

[11] In the invention related to the above lens barrel, the second image plane transfer coefficient may be configured to be set on the basis of an image plane transfer coefficient when the focus adjustment lens is driven in a vicinity of a near limit position including the near limit position that corresponds to a near-side limit position during the driving control of the focus adjustment lens, or an image plane transfer coefficient when the focus adjustment lens is driven in a vicinity of an infinite limit position including the infinite limit position that corresponds to an infinity-side limit position during the driving control of the focus adjustment lens.

[12] In the invention related to the above lens barrel, the second image plane transfer coefficient may be configured to be set on the basis of an image plane transfer coefficient when the focus adjustment lens is driven in a vicinity of a near end position including the near end position that corresponds to a near-side end in a range in which the focus adjustment lens is mechanically movable, or an image plane transfer coefficient when the focus adjustment lens is driven in a vicinity of an infinity end position including the infinity end position that corresponds to an infinity-side end in the range in which the focus adjustment lens is mechanically movable.

[13] In the invention related to the above lens barrel, the second image plane transfer coefficient may be configured to be set at least one of a maximum value and a minimum value of the first image plane transfer coefficient.

[14] In the invention related to the above lens barrel, the controller may be configured to control the transceiver to transmit a corrected second image plane transfer coefficient obtained by correcting the second image plane transfer coefficient to the camera body, instead of the second image plane transfer coefficient, when the second image plane transfer coefficient is the minimum value of the first image plane transfer coefficient, the corrected second image plane transfer coefficient may be configured to be an image plane transfer coefficient which has been corrected so as to be less than the second image plane transfer coefficient, and when the second image plane transfer coefficient may be configured to be the maximum value of the first image plane transfer coefficient, the corrected second image plane transfer coefficient is an image plane transfer coefficient which has been corrected so as to be greater than the second image plane transfer coefficient.

[15] A camera system of the present invention includes: any of the above lens barrel; and a camera body, and the camera body includes: an acquisition module that acquires the first image plane transfer coefficient and the second image plane transfer coefficient from the lens barrel; a focus detector that calculates an evaluation value related to a contrast of an image by the imaging optical system to detect a focus adjustment state of the imaging optical system; and a driving speed determination module that determines a driving speed of the focus adjustment lens when the focus detector detects the focus adjustment state, using the second image plane transfer coefficient.

[16] A lens barrel according to a fifth aspect of the present invention includes: an imaging optical system including a focus adjustment lens; a driver that drives the focus adjustment lens; a transceiver that transmits and receives a signal to and from a camera body; and a controller that can control the transceiver to transmit a first image plane transfer coefficient which is determined in correspondence with a position of the focus adjustment lens included in the imaging optical system and a second image plane transfer coefficient which does not depend on the position of the focus adjustment lens to the camera body, and the controller controls the transceiver to transmit the first image plane transfer coefficient and the second image plane transfer coefficient to the camera body when the camera body determines that the lens barrel is a first type of lens on the basis of a result of the transmission and reception of the signal between the lens barrel and the camera body using the transceiver, and the controller controls the transceiver to transmit the first image plane transfer coefficient to the camera body and not to transmit the second image plane transfer coefficient to the camera body when the camera body determines that the lens barrel is a second type of lens different from the first type of lens on the basis of the result of the transmission and reception of the signal between the lens barrel and the camera body using the transceiver.

[17] A lens barrel according to a sixth aspect of the present invention includes: an imaging optical system including a focus adjustment lens; a driver that drives the focus adjustment lens; a transceiver that transmits and receives a signal to and from a camera body; a memory module that stores a first image plane transfer coefficient which is determined in correspondence with a position of the focus adjustment lens in a soft limit range of the focus adjustment lens included in the imaging optical system, a second image plane transfer coefficient which does not depend on the position of the focus adjustment lens, and a third image plane transfer coefficient which is determined in correspondence with the position of the focus adjustment lens beyond the soft limit range of the focus adjustment lens; and a controller that controls the transceiver to transmit the first image plane transfer coefficient and the second image plane transfer coefficient to the camera body and not to transmit the third image plane transfer coefficient to the camera body when the camera body determines that the lens barrel is a first type of lens on the basis of a result of the transmission and reception of the signal between the lens barrel and the camera body using the transceiver, and controls the transceiver to transmit the first image plane transfer coefficient to the camera body and not to transmit the second image plane transfer coefficient and the third image plane transfer coefficient to the camera body when the camera body determines that the lens barrel is a second type of lens different from the first type of lens on the basis of the result of the transmission and reception of the signal between the lens barrel and the camera body using the transceiver.

[18] An imaging device according to a first aspect of the present invention includes: a first acquisition module that repeatedly acquires a first image plane transfer coefficient which is determined in correspondence with a position of a focus adjustment lens included in an optical system from a lens barrel; a second acquisition module that repeatedly acquires a second image plane transfer coefficient which does not depend on the position of the focus adjustment lens from the lens barrel; a third acquisition module that acquires a focal length of a zoom lens included in the optical system; and a controller that performs a predetermined operation when the focal length of the zoom lens does not change and it is determined that the repeatedly acquired second image plane transfer coefficient has changed.

[19] An imaging device according to a second aspect of the present invention includes: a first acquisition module that repeatedly acquires at least one of a maximum value and a minimum value of an image plane transfer coefficient of a focus adjustment lens included in an optical system from a lens barrel; a second acquisition module that acquires a focal length of a zoom lens included in the optical system from the lens barrel; and a controller that performs a predetermined operation when the focal length of the zoom lens does not change and it is determined that the repeatedly acquired maximum value or minimum value of the image plane transfer coefficient has changed.

[20] In the invention related to the above imaging device, the imaging device may be configured to further include: a focus detector that calculates an evaluation value related to a contrast of an image by the optical system to detect a focus state of the optical system.

[21] In the invention related to the above imaging device, the predetermined operation may be configured to be a control to prohibit the detection of the focus adjustment state by the focus detector.

[22] In the invention related to the above imaging device, the predetermined operation may be configured to be a control to search-drive the focus adjustment lens at a second speed that is slower than a first speed which is a search driving speed before the determination.

[23] In the invention related to the above imaging device, the predetermined operation may be configured to be a control to prohibit a notification of an in-focus state to a photographer.

[24] A lens barrel according to a seventh aspect of the present invention includes: an imaging optical system including a focus adjustment lens; a driver that drives the focus adjustment lens; a transceiver that transmits and receives a signal to and from a camera body; and a controller that can control the transceiver to transmit a first image plane transfer coefficient which corresponds to a value of TL/TI and is determined in correspondence with a position of the focus adjustment lens and a second image plane transfer coefficient which is less than a minimum value of the first image plane transfer coefficient to the camera body, TL being an amount of movement of the focus adjustment lens and TI being an amount of movement of an image plane.

[25] A lens barrel according to an eighth aspect of the present invention includes: an imaging optical system including a focus adjustment lens; a driver that drives the focus adjustment lens; a transceiver that transmits and receives a signal to and from a camera body; and a controller that can control the transceiver to transmit a first image plane transfer coefficient which corresponds to a value of TI/TL and is determined in correspondence with a position of the focus adjustment lens and a second image plane transfer coefficient which is greater than a minimum value of the first image plane transfer coefficient to the camera body, and TL is an amount of movement of the focus adjustment lens and TI is an amount of movement of an image plane.

[26] In the lens barrel according to the seventh and eighth aspects of the present invention, the controller may be configured to control the transceiver to transmit the first image plane transfer coefficient and the second image plane transfer coefficient to the camera body when the camera body determines that the lens barrel is a first type of lens on the basis of a result of the transmission and reception of the signal between the lens barrel and the camera body using the transceiver, and the controller may be configured to control the transceiver to transmit the first image plane transfer coefficient to the camera body and not to transmit the second image plane transfer coefficient to the camera body when the camera body determines that the lens barrel is a second type of lens different from the first type of lens on the basis of the result of the transmission and reception of the signal between the lens barrel and the camera body using the transceiver.

[27] In the lens barrel according to the seventh and eighth aspects of the present invention, when a focal length of a zoom lens included in the imaging optical system varies, the second image plane transfer coefficient may vary, and when the focal length of the zoom lens does not vary, the second image plane transfer coefficient may not vary even though the position of the focus adjustment lens varies.

Advantageous Effects of Invention

According to the invention, it is possible to provide a lens barrel which can appropriately detect the focus state of an optical system.

BRIEF DESCRIPTION OF DRAWINGS

FIG. 3 is a diagram illustrating a table indicating the relationship among the position (focal length) of a zoom lens, the position (object distance) of a focus lens, and an image plane transfer coefficient K.

FIG. 4 is a diagram illustrating a table indicating the relationship among the position (focal length) of the zoom lens, a minimum image plane transfer coefficient $K_{min}$, a maximum image plane transfer coefficient $K_{max}$ a corrected minimum image plane transfer coefficient $K_{min\_x}$, and a corrected maximum image plane transfer coefficient $K_{max\_x}$.

FIG. 18 is a diagram illustrating a table indicating the relationship among the position (focal length) of a zoom lens 32, the position (object distance) of a focus lens 33, and an image plane transfer coefficient K in a fifth embodiment.

FIG. 20 is a diagram illustrating a method which corrects a minimum image plane transfer coefficient $K_{min}$ according to the temperature.

FIG. 21 is a diagram illustrating a method which corrects the minimum image plane transfer coefficient $K_{min}$ according to the driving time of a lens barrel 3.

FIG. 22 is a diagram illustrating a maximum predetermined coefficient $K0_{max}$ and a minimum predetermined coefficient $K0_{min}$.

FIG. 28 is a diagram illustrating a table indicating the relationship among the position (focal length) of a zoom lens, the position (object distance) of a focus lens, and an image plane transfer coefficient K in the twelfth embodiment.

FIG. 33 is a diagram illustrating a table indicating the relationship among the position (focal length) of a zoom lens, the position (object distance) of a focus lens, and an image plane transfer coefficient K in a thirteenth embodiment.

FIG. 43 is a diagram illustrating a table indicating the relationship among the position (focal length) of a zoom lens 32, the position (object distance) of a focus lens 33, and an image plane transfer coefficient K in a seventeenth embodiment.

FIG. 47 is a diagram illustrating a table indicating the relationship among the position (focal length) of a zoom lens, the position (object distance) of a focus lens, and an image plane transfer coefficient K.

FIG. 63 is a diagram illustrating a table indicating the relationship among the position (focal length) of a zoom lens 32, the position (object distance) of a focus lens 33, and an image plane transfer coefficient K in a twenty-first embodiment.

DESCRIPTION OF EMBODIMENTS

«First Embodiment»

Figure 1:
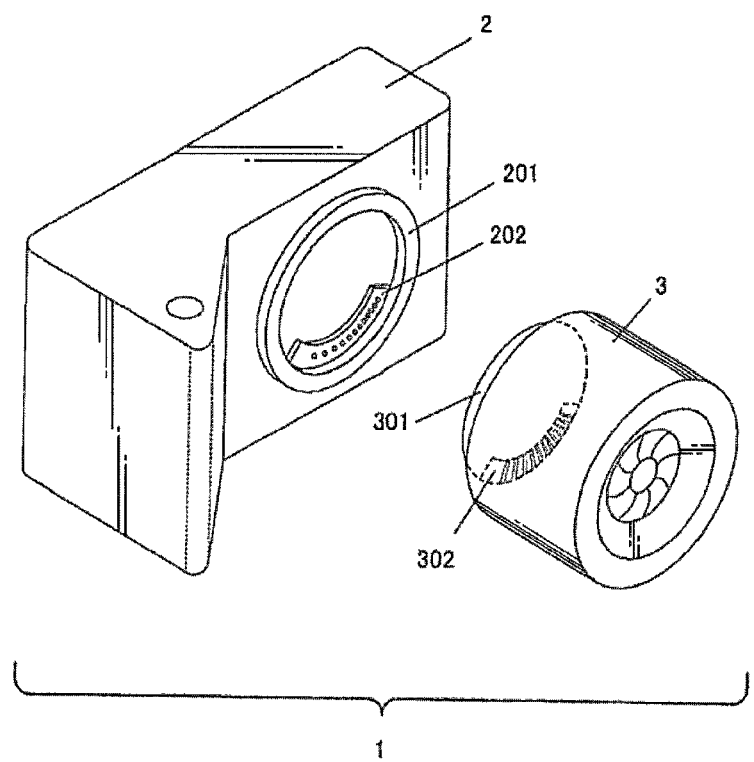
FIG. 1 is a perspective view illustrating a camera according to a first embodiment.
Figure 2:
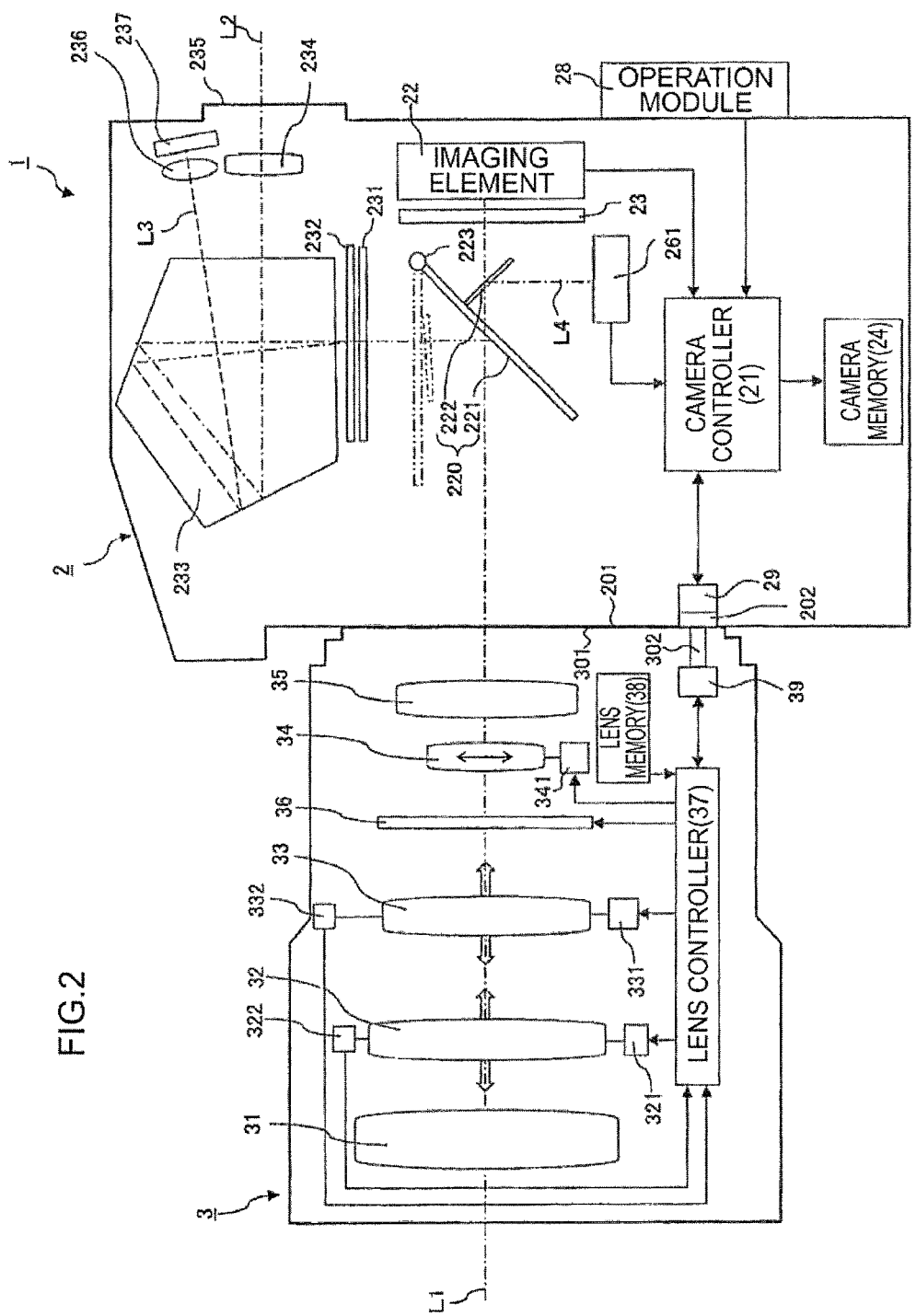
FIG. 2 is a diagram illustrating the main structure illustrating the camera according to the first embodiment.

FIG. 1 is a perspective view illustrating a single-lens reflex digital camera 1 according to this embodiment. FIG. 2 is a diagram illustrating the structure of a main portion of the camera 1 according to this embodiment. The digital camera 1 (hereinafter, simply referred to as a camera 1) according to this embodiment is composed of a camera body 2 and a lens barrel 3. The camera body 2 and the lens barrel 3 are detachably coupled to each other.

The lens barrel 3 is an interchangeable lens which can be attached to and detached from the camera body 2. As illustrated in FIG. 2, the lens barrel 3 is provided with an imaging optical system including lenses 31, 32, 33, 34, and 35 and a diaphragm 36.

The lens 33 is a focus lens and can be moved in the direction of an optical axis L1 to adjust the focal length of the imaging optical system. The focus lens 33 is provided such that it can be moved along the optical axis L1 of the lens barrel 3. The position of the focus lens 33 is detected by a focus lens encoder 332 and is adjusted by a focus lens driving motor 331.

The focus lens driving motor 331 is, for example, an ultrasonic motor and drives the focus lens 33 in response to an electric signal (pulse) output from a lens controller 37. Specifically, the driving speed of the focus lens 33 by the focus lens driving motor 331 is represented by pulse/second. As the number of pulses per unit time increases, the driving speed of the focus lens 33 increases. In this embodiment, a camera controller 21 of the camera body 2 transmits the driving instruction speed (unit: pulse/second) of the focus lens 33 to the lens barrel 3 and the lens controller 37 outputs a pulse signal corresponding to the driving instruction speed (unit: pulse/second) transmitted from the camera body 2 to the focus lens driving motor 331 to drive the focus lens 33 at the driving instruction speed (unit: pulse/second) transmitted from the camera body 2.

The lens 32 is a zoom lens and is moved in the direction of the optical axis L1 to adjust the focal length of the imaging optical system. Similarly to the focus lens 33, the position of the zoom lens 32 is also detected by a zoom lens encoder 322 and is adjusted by a zoom lens driving motor 321. The position of the zoom lens 32 is adjusted by operating a zoom button provided in an operation module 28 or operating a zoom ring (not illustrated) provided in the lens barrel 3.

The lens 34 is a vibration correction lens and is moved in a direction perpendicular to the optical axis L1 to prevent the deterioration of a captured image due to camera shake. The position of the vibration correction lens 34 is adjusted by a vibration correction lens driving means 341 such as a pair of voice coil motors. The vibration correction lens 34 is driven on the basis of the output of the lens controller 37 when camera shake is detected by the lens controller 37 on the basis of the output of, for example, a gyro sensor (not illustrated).

The diaphragm 36 is configured such that the diameter of an aperture having the optical axis L1 as the center can be adjusted, in order to limit the amount of light which reaches the imaging element 22 through the imaging optical system and to adjust the amount of blurring. For example, the appropriate diameter of the aperture which has been calculated in an automatic exposure mode is transmitted from the camera controller 21 through the lens controller 37 to adjust the diameter of the aperture of the diaphragm 36. In addition, the operation module 28 provided in the camera body 2 is manually operated to input the set diameter of the aperture from the camera controller 21 to the lens controller 37. The diameter of the aperture of the diaphragm 36 is detected by a diaphragm aperture sensor (not shown) and the current diameter of the aperture is recognized by the lens controller 37.

A lens memory 38 stores an image plane transfer coefficient K. The image plane transfer coefficient K is a value indicating the correspondence relationship between the amount of driving of the focus lens 33 and the amount of movement of an image plane and is, for example, the proportion of the amount of driving of the focus lens 33 and the amount of movement of the image plane. The image plane transfer coefficient K stored in the lens memory 38 will be described in detail below.

The camera body 2 has a mirror system 220 for guiding beams from an object to the imaging element 22, a finder 235, a photometric sensor 237, and a focus detection module 261. The mirror system 220 has a quick return mirror 221 which is rotated about a rotating shaft 223 by a predetermined angle between the observation position and the imaging position of the object and a sub-mirror 222 which is supported by the quick return mirror 221 and is rotated with the rotation of the quick return mirror 221. In FIG. 2, a state in which the mirror system 220 is at the observation position of the object is represented by a solid line and a state in which the mirror system 220 is at the imaging position of the object is represented by a two-dot chain line.

The mirror system 220 is rotated such that it is inserted into the optical path of the optical axis L1 at the observation position of the object and is evacuated from the optical path of the optical axis L1 at the imaging position of the object.

The quick return mirror 221 is composed of a half mirror. At the observation position of the object, the quick return mirror 221 reflects parts (optical axes L2 and L3) of the beams (optical axis L1) from the object to the finder 235 and the photometric sensor 237 and transmits parts of the beams (optical axis L4) so as to be guided to the sub-mirror 222. In contrast, the sub-mirror 222 is composed of a total reflection mirror and guides the beam (optical axis LA) passing through the quick return mirror 221 to the focus detection module 261.

Therefore, when the mirror system 220 is at the observation position, the beams (optical axis L1) from the object are guided to the finder 235, the photometric sensor 237, and the focus detection module 261 such that the photographer observes the object and an exposure operation or the detection of the focusing state of the focus lens 33 is performed. Then, when the photographer presses a release button fully, the mirror system 220 is rotated to the imaging position and all of the beams (optical axis L1) from the object are guided to the imaging element 22. Captured image data is stored in a memory 24.

The beams (optical axis L2) from the object, which have been reflected by the quick return mirror 221, are focused on a focusing plate 231 which is provided on the plane that is optically equivalent to the imaging element 22 and can be observed through a pentaprism 233 and an eyepiece 234. In this case, a transmissive liquid crystal display 232 displays, for example, a focus detection area mark so as to be superimposed on the object image on the focusing plate 231 and displays imaging-related information, such as a shutter speed, an aperture value, and the number of captured images, on an area other than the object image. In this way, the photographer can observe, for example, the object, the background thereof, and the imaging-related information, through the finder 235 in the preparatory stage of imaging.

The photometric sensor 237 is, for example, composed of a two-dimensional color CCD image sensor. The photometric sensor 237 divides a captured screen into a plurality of areas and outputs a photometric signal corresponding to brightness in each area, in order to calculate an exposure value during imaging. The signal detected by the photometric sensor 237 is output to the camera controller 21 and is used for automatic exposure control.

The imaging element 22 is provided on a scheduled focal plane of the imaging optical system including the lenses 31, 32, 33, and 34 on the optical axis L1 of the beams from the object in the camera body 2. A shutter 23 is provided in front of the imaging element 22. The imaging element 22 is composed of a plurality of photoelectric conversion elements which are two-dimensionally arranged and can be a device such as a two-dimensional CCD image sensor, a MOS sensor, or a CID. The camera controller 21 performs image processing for the image signal photoelectrically converted by the imaging element 22 and the image signal is recorded on the camera memory 24 which is a recording medium. The camera memory 24 can be a detachable card-type memory or an embedded memory.

The camera controller 21 detects the focusing state of the imaging optical system using a contrast detection method (hereinafter, simply referred to as "contrast AF"), on the basis of pixel data read from the imaging element 22. For example, the camera controller 21 reads the output of the imaging element 22 and calculates a focus evaluation value on the basis of the read output. The focus evaluation value can be calculated by, for example, extracting a high frequency component from the output of the imaging element 22 using a high frequency pass filter. In addition, the focus evaluation value can be calculated by extracting the high frequency component using two high frequency pass filters with different cutoff frequencies.

Then, the camera controller 21 detects the focus using a contrast detection method which transmits a driving signal to the lens controller 37 to drive the focus lens 33 at a predetermined sampling interval (distance), calculates the focus evaluation value at each position, and calculates the position of the focus lens 33 where the focus evaluation value is the maximum as an in-focus position. For example, in the case in which the focus evaluation value is calculated while the focus lens 33 is being driven, when the focus evaluation value increases two times and then decreases two times, the in-focus position can be calculated by an interpolation method, using the focus evaluation values.

In the detection of the focus by the contrast detection method, the sampling interval of the focus evaluation value increases as the driving speed of the focus lens 33 increases. When the driving speed of the focus lens 33 is greater than a predetermined value, the sampling interval of the focus evaluation value is too long to appropriately detect the in-focus position. The reason is that, as the sampling interval of the focus evaluation value increases, a variation in the in-focus position increases and the accuracy of focusing is likely to be reduced. For this reason, the camera controller 21 drives the focus lens 33 such that the moving speed of the image plane when the focus lens 33 is driven has a value capable of appropriately detecting the in-focus position. For example, the camera controller 21 drives the focus lens 33 such that the maximum image plane driving speed among the image plane moving speeds at the sampling interval capable of appropriately detecting the in-focus position is obtained in search control for driving the focus lens 33 in order to detect the focus evaluation value. The search control includes, for example, wobbling, neighborhood search (neighborhood scanning) which searches for only a portion in the vicinity of a predetermined position, and full search (full scanning) which searches the entire driving range of the focus lens 33.

The camera controller 21 may drive the focus lens 33 at a high speed when the search control starts, using the half-press of a release switch as a trigger, and may drive the focus lens 33 at a low speed when the search control starts, using conditions other than the half-press of the release switch as a trigger. This control process makes it possible to perform contrast AF at a high speed when the release switch is pressed halfway and to perform contrast AF which is suitable for making a through image look good when the release switch is not pressed halfway.

The camera controller 21 may perform control such that the focus lens 33 is driven at a high speed in search control in a still image mode and the focus lens 33 is driven at a low speed in search control in a movie mode. This control process makes it possible to perform contrast AF at a high speed in the still image mode and to perform contrast AF which is suitable for making a moving image look good in the movie mode.

In at least one of the still image mode and the movie mode, contrast AF may be performed at a high speed in a sports mode and may be performed at a low speed in a landscape mode. In addition, the driving speed of the focus lens 33 in the search control may be changed depending on, for example, the focal length, the object distance, and the aperture value.

In this embodiment, focus detection may be performed by a phase difference detection method. Specifically, the camera body 2 includes the focus detection module 261. The focus detection module 261 includes a pair of line sensors (not illustrated) which include a plurality of pixels each having a microlens that is arranged in the vicinity of the scheduled focal plane of the imaging optical system and a photoelectric conversion element that is provided so as to face the microlens. Each of the pixels in the pair of line sensors receives a pair of beams which pass through a pair of areas with different exit pupils in the focus lens 33 to acquire a pair of image signals. Then, the phase shift between the pair of image signals acquired by the pair of line sensors is calculated by a known correlation calculation method to detect a focusing state. In this way, it is possible to perform focus detection using the phase difference detection method.

The operation module 28 is an input switch, such as a shutter release button or a moving image capture start switch which is used by the photographer to set various operation modes of the camera 1, and is used to switch the modes between the still image mode and the movie mode, between an automatic focus mode and a manual focus mode, and an AF-S mode and an AF-F mode in the automatic focus mode. Various modes set by the operation module 28 are transmitted to the camera controller 21 and the camera controller 21 controls the overall operation of the camera 1. In addition, the shutter release button includes a first switch SW1 which is turned on when the button is pressed halfway and a second switch SW2 which is turned on when the button is fully pressed.

In the AF-S mode, when the shutter release button is pressed halfway, the focus lens 33 is driven on the basis of the detection result of the focus, the position of the focus lens 33 is adjusted and fixed, and imaging is performed at the position of the focus lens. The AF-S mode is suitable for capturing still images and is generally selected to capture still images. In the AF-F mode, the following process is performed: the focus lens 33 is driven on the basis of the detection result of the focus, regardless of whether the shutter release button is operated; the focusing state is repeatedly detected, and when the focusing state is changed, the scan drive of the focus lens 33 is performed. The AF-F mode is suitable for capture moving images and is generally selected to capture moving images.

In this embodiment, a switch for switching between a one-shot mode and a continuous mode may be provided as a switch for switching the automatic focus mode. In this case, when the photographer selects the one-shot mode, the AF-S mode can be set. When the photographer selects the continuous mode, the AF-F mode can be set.

Next, the image plane transfer coefficient K stored in the lens memory 38 of the lens barrel 3 will be described.

The image plane transfer coefficient K is a value indicating the correspondence relationship between the amount of driving of the focus lens 33 and the amount of movement of the image plane and is, for example, the proportion of the amount of driving of the focus lens 33 and the amount of movement of the image plane. In this embodiment, the image plane transfer coefficient is calculated by for example, the following Expression (1):

Image plane transfer coefficient $K$=(Amount of driving of focus lens 33/Amount of movement of image plane)     (1).

As the image plane transfer coefficient K decreases, the amount of movement of the image plane by the driving of the focus lens 33 increases.

In the camera 1 according to this embodiment, even when the amount of driving of the focus lens 33 is the same, the amount of movement of the image plane varies depending on the position of the focus lens 33. Similarly, even when the amount of driving of the focus lens 33 is the same, the amount of movement of the image plane varies depending on the position of the zoom lens 32, that is, the focal length. That is, the image plane transfer coefficient K varies depending on the position of the focus lens 33 in the direction of the optical axis and the position of the zoom lens 32 in the direction of the optical axis. In this embodiment, the lens controller 37 stores the image plane transfer coefficient K for each position of the focus lens 33 and each position of the zoom lens 32.

For example, the image plane transfer coefficient K may be defined as follows: Image plane transfer coefficient K=(Amount of movement of image plane/Amount of driving of focus lens 33). In this case, as the image plane transfer coefficient K increases, the amount of movement of the image plane by the driving of the focus lens 33 increases.

FIG. 3 shows a table indicating the relationship among the position (focal length) of the zoom lens 32, the position (object distance) of the focus lens 33, and the image plane transfer coefficient K. The driving area of the zoom lens 32 is divided into nine areas "f1" to "f9" from a wide end to a telephoto end, the driving area of the focus lens 33 is divided into nine areas "D1" to "D9" from a near end to an infinity end, and the image plane transfer coefficient K corresponding to each lens position is stored in the table illustrated in FIG. 3. For example, when the position (focal length) of the zoom lens 32 is in the area "f1" and the position (object distance) of the focus lens 33 is in the area "D1", the image plane transfer coefficient K is "K11". In the example of the table illustrated in FIG. 3, the driving area of each lens is divided into nine areas. However, the number of divided areas is not limited thereto and may be set to any value.

Next, a minimum image plane transfer coefficient $K_{min}$ and a maximum image plane transfer coefficient $K_{max}$ will be described with reference to FIG. 3.

The minimum image plane transfer coefficient $K_{min}$ is a value corresponding to the minimum value of the image plane transfer coefficient K. For example, in FIG. 3, when "K11"="100", "K12"="200", "K13"="300", "K14"="400", "K15"="500", "K16"="600", "K17"="700", "K18"="800", and "K19"="900" are established, "K11"="100" which is the minimum value is the minimum image plane transfer coefficient $K_{min}$ and "K19"="900" which is the maximum value is the maximum image plane transfer coefficient $K_{max}$.

The minimum image plane transfer coefficient $K_{min}$ generally varies depending on the current position of the zoom lens 32. In general, when the current position of the zoom lens 32 is not changed, the minimum image plane transfer coefficient $K_{min}$ is a constant value (fixed value) even if the current position of the focus lens 33 is changed. That is, in general, the minimum image plane transfer coefficient $K_{min}$ is a fixed value (constant value) which is determined according to the position (focal length) of the zoom lens 32 and does not depend on the position (object distance) of the focus lens 33.

For example, "K11", "K21", "K31", "K41", "K52", "K62", "K72", "K82", and "K91" shown in gray in FIG. 3 are the minimum image plane transfer coefficient $K_{min}$ indicating the minimum value among the image plane transfer coefficients K at each position (focal length) of the zoom lens 32. That is, when the position (focal length) of the zoom lens 32 is in the area "f1", "K11", which is the image plane transfer coefficient K when the position (object distance) of the focus lens 33 is in the area "D1" among the areas "D1" to "D9", is the minimum image plane transfer coefficient $K_{min}$ indicating the minimum value. Therefore, "K11", which is the image plane transfer coefficient K when the position (object distance) of the focus lens 33 is in the area "D1", indicates the minimum value among "K11" to "K19" which are the image plane transfer coefficients K when the position (object distance) of the focus lens 33 is in the areas "D1" to "D9". Similarly, when the position (focal length) of the zoom lens 32 is in the area "f2", "K21", which is the image plane transfer coefficient K when the position (object distance) of the focus lens 33 is in the area "D1", indicates the minimum value among "K21" to "K29" which are the image plane transfer coefficients K when the position (object distance) of the focus lens 33 is in the areas "D1" to "D9". That is, "K21" is the minimum image plane transfer coefficient $K_{min}$. Similarly, when the position (focal length) of the zoom lens 32 is "f3" to "f9", "K31", "K41", "K52", "K62", "K72", "K82", and "K91" shown in gray are the minimum image plane transfer coefficient $K_{min}$.

Similarly, the maximum image plane transfer coefficient $K_{max}$ is a value corresponding to the maximum value of the image plane transfer coefficient K. In general, the maximum image plane transfer coefficient $K_{max}$ varies depending on the current position of the zoom lens 32. When the current position of the zoom lens 32 is not changed, the maximum image plane transfer coefficient $K_{max}$ is a constant value (fixed value) even if the current position of the focus lens 33 is changed. For example, "K19", "K29", "K39", "K49", "K59", "K69", "K79", "K89", and "K99" which are hatched in FIG. 3 are the maximum image plane transfer coefficient $K_{max}$ indicating the maximum value among the image plane transfer coefficients K at each position (focal length) of the zoom lens 32.

As such, as illustrated in FIG. 3, the lens memory 38 stores the image plane transfer coefficients K corresponding to the position (focal length) of the zoom lens 32 and the position (object distance) of the focus lens 33, the minimum image plane transfer coefficient $K_{min}$ indicating the minimum value among the image plane transfer coefficients K for each position (focal length) of the zoom lens 32, and the maximum image plane transfer coefficient $K_{max}$ indicating the maximum value among the image plane transfer coefficients K for each position (focal length) of the zoom lens 32.

In addition, the lens memory 38 may store a minimum image plane transfer coefficient $K_{min}$' which is a value in the vicinity of the minimum image plane transfer coefficient $K_{min}$, instead of the minimum image plane transfer coefficient $K_{min}$ indicating the minimum value among the image plane transfer coefficients K. For example, when the value of the minimum image plane transfer coefficient $K_{min}$ is 102.345 having a large number of digits, 100 which is a value in the vicinity of 102.345 may be stored as the minimum image plane transfer coefficient $K_{min}$'. When the lens memory 38 stores a value of 100 (minimum image plane transfer coefficient $K_{min}$'), it is possible to save the memory size and to reduce the size of transmission data to be transmitted to the camera body 2, as compared to the case in which the lens memory 38 stores a value of 102.345 (minimum image plane transfer coefficient $K_{min}$).

For example, when the minimum image plane transfer coefficient $K_{min}$ is a value of 100, 98 which is a value in the vicinity of 100 can be stored as the minimum image plane transfer coefficient $K_{min}$', considering the stability of control such as backlash reduction control, silent control (clip operation), and lens speed control, which will be described below. For example, when the stability of control is considered, it is preferable to set the minimum image plane transfer coefficient $K_{min}$' in the range of 80% to 120% of the actual value (minimum image plane transfer coefficient $K_{min}$).

In this embodiment, the lens memory 38 stores a corrected minimum image plane transfer coefficient $K_{min\_x}$ and a corrected maximum image plane transfer coefficient $K_{max\_x}$ which are respectively obtained by correcting the minimum image plane transfer coefficient $K_{min}$ and the maximum image plane transfer coefficient $K_{max}$, in addition to the minimum image plane transfer coefficient $K_{min}$ and the maximum image plane transfer coefficient $K_{max}$. FIG. 4 shows a table indicating the relationship among the position (focal length) of the zoom lens 32, the minimum image plane transfer coefficient $K_{min}$, the maximum image plane transfer coefficient $K_{max}$, the corrected minimum image plane transfer coefficient $K_{min\_x}$, and the corrected maximum image plane transfer coefficient $K_{max\_x}$.

That is, as illustrated in FIG. 4, in an example in which the position (focal length) of the zoom lens 32 is in the area "f1", the lens memory 38 stores "K11'" as the corrected minimum image plane transfer coefficient $K_{min\_x}$, in addition to "K11" as the minimum image plane transfer coefficient $K_{min}$. Similarly, the lens memory 38 stores "K91'" as the corrected maximum image plane transfer coefficient $K_{max\_x}$, in addition to "K91" as the maximum image plane transfer coefficient $K_{max}$. When the position (focal length) of the zoom lens 32 is in the areas "f2" to "f9", as illustrated in FIG. 4, "K21'", "K31'", "K41'", "K52'", "K62'", "K72'", "K82'", and "K91'" are stored as the corrected minimum image plane transfer coefficient $K_{min\_x}$ and "K29'", "K39'", "K49'", "K59'", "K69'", "K79'", "K89'", and "K99'" are stored as the corrected maximum image plane transfer coefficient $K_{max\_x}$.

In addition, the corrected minimum image plane transfer coefficient $K_{min\_x}$ is not particularly limited, and any coefficient obtained by correcting the minimum image plane transfer coefficient $K_{min}$ may be used as the corrected minimum image plane transfer coefficient $K_{min\_x}$. For example, a coefficient that is greater than the minimum image plane transfer coefficient $K_{min}$ or a coefficient that is less than the minimum image plane transfer coefficient $K_{min}$ may be used as the corrected minimum image plane transfer coefficient $K_{min\_x}$. In addition, the corrected minimum image plane transfer coefficient $K_{min\_x}$ may be appropriately set according to the purpose. For example, in this embodiment, the minimum image plane transfer coefficient $K_{min}$ can be used to determine a scan drive speed V during the scanning operation of the focus lens 33. However, when the minimum image plane transfer coefficient $K_{min}$ is used, in some cases, an appropriate scan drive speed V is not calculated by the influence of the position of the vibration correction lens 34 or the posture of the camera 1. Therefore, in this embodiment, it is preferable to use the corrected minimum image plane transfer coefficient $K_{min\_x}$ which is calculated considering the influence of the position of the vibration correction lens 34 or the posture of the camera 1. However, the invention is not particularly limited to the above-mentioned aspect. In the above-mentioned example, only one corrected minimum image plane transfer coefficient $K_{min\_x}$ is used. However, a plurality of corrected minimum image plane transfer coefficients $K_{min\_x}$ may be used.

The corrected maximum image plane transfer coefficient $K_{max\_x}$ is not particularly limited, and any coefficient obtained by correcting the maximum image plane transfer coefficient $K_{max}$ may be used as the corrected maximum image plane transfer coefficient $K_{max\_x}$. For example, a coefficient that is greater than the maximum image plane transfer coefficient $K_{max}$ or a coefficient that is less than the maximum image plane transfer coefficient $K_{max}$ may be used as the corrected maximum image plane transfer coefficient $K_{max\_x}$. In addition, the corrected maximum image plane transfer coefficient $K_{max\_x}$ may be appropriately set according to the purpose. In the above-mentioned example, only one corrected maximum image plane transfer coefficient $K_{max\_x}$ is used. However, a plurality of corrected maximum image plane transfer coefficients $K_{max\_x}$ may be used.

Next, a data communication method between the camera body 2 and the lens barrel 3 will be described.

The camera body 2 is provided with a body-side mount portion 201 on which the lens barrel 3 is detachably mounted. As illustrated in FIG. 1, a connector 202 is provided in the vicinity of the body-side mount portion 201 (on the inner surface side of the body-side mount portion 201) so as to protrude toward the inside of the body-side mount portion 201. The connector 202 is provided with a plurality of electric contacts.

The lens barrel 3 is an interchangeable lens which can be attached to and detached from the camera body 2. The lens barrel 3 is provided with a lens-side mount portion 301 which is removably attached to the camera body 2. As illustrated in FIG. 1, a connector 302 is provided in the vicinity of the lens-side mount portion 301 (on the inner surface side of the lens-side mount portion 301) so as to protrude toward the inside of the lens-side mount portion 301. The connector 302 is provided with a plurality of electric contacts.

When the lens barrel 3 is mounted on the camera body 2, the electric contacts of the connector 202 provided in the body-side mount portion 201 and the electric contacts of the connector 302 provided in the lens-side mount portion 301 are electrically and physically connected to each other. Therefore, power can be supplied from the camera body 2 to the lens barrel 3 through the connectors 202 and 302 or data communication between the camera body 2 and the lens barrel 3 can be performed through the connectors 202 and 302.

The camera body 2 is provided with the body-side mount portion 201 on which the lens barrel 3 is detachably mounted. As illustrated in FIG. 1, the connector 202 is provided in the vicinity of the body-side mount portion 201 (on the inner surface side of the body-side mount portion 201) so as to protrude toward the inside of the body-side mount portion 201. The connector 202 is provided with the plurality of electric contacts.

The lens barrel 3 is an interchangeable lens which can be attached to and detached from the camera body 2. The lens barrel 3 is provided with the lens-side mount portion 301 which is removably attached to the camera body 2. As illustrated in FIG. 1, the connector 302 is provided in the vicinity of the lens-side mount portion 301 (on the inner surface side of the lens-side mount portion 301) so as to protrude toward the inside of the lens-side mount portion 301. The connector 302 is provided with the plurality of electric contacts.

When the lens barrel 3 is mounted on the camera body 2, the electric contacts of the connector 202 provided in the body-side mount portion 201 and the electric contacts of the connector 302 provided in the lens-side mount portion 301 are electrically and physically connected to each other. Therefore, power can be supplied from the camera body 2 to the lens barrel 3 through the connectors 202 and 302 or data communication between the camera body 2 and the lens barrel 3 can be performed through the connectors 202 and 302.

Figure 5:
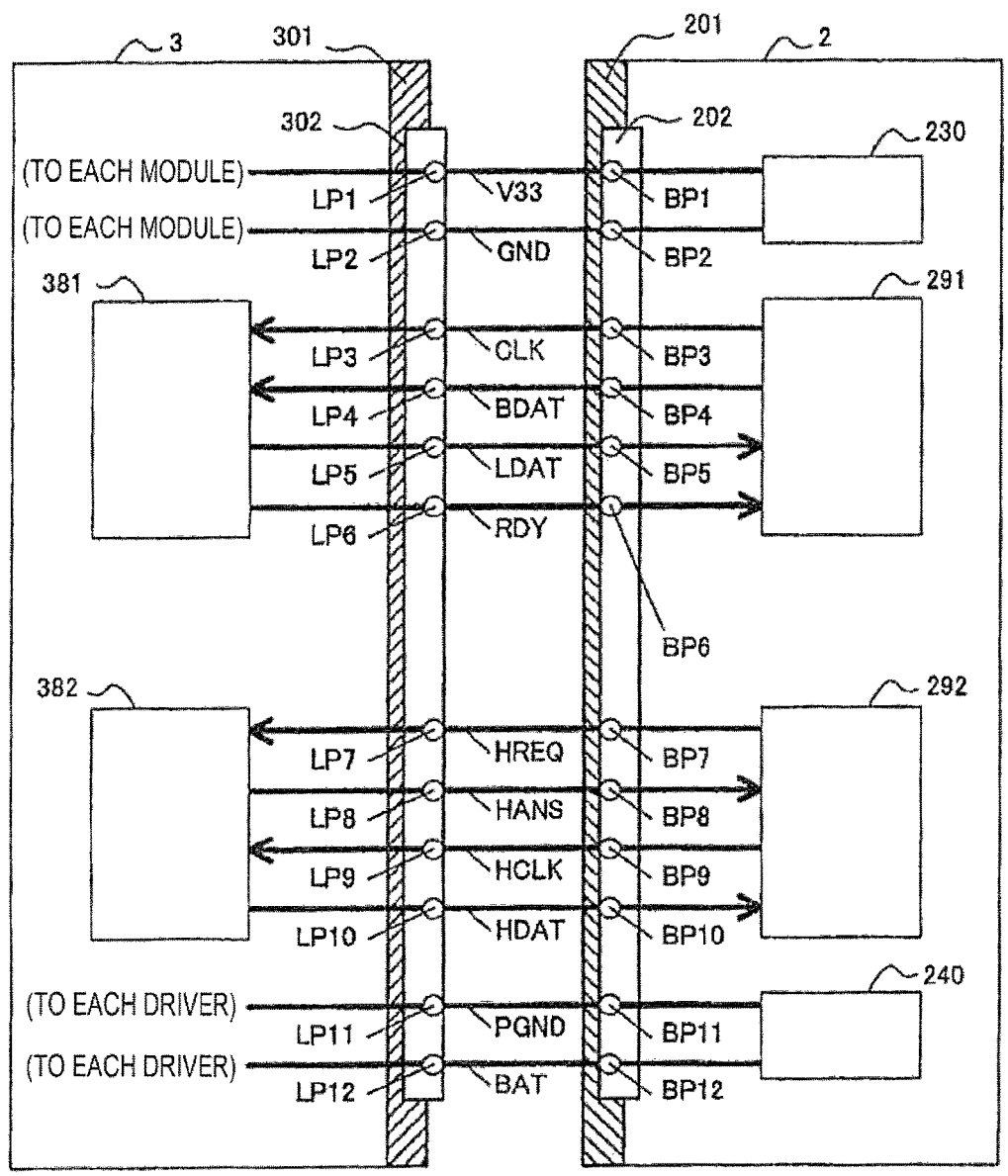
FIG. 5 is a diagram illustrating the details of connectors 202 and 302.

FIG. 5 is a schematic diagram illustrating the details of the connectors 202 and 302. In FIG. 5, the connector 202 is arranged on the right side of the body-side mount portion 201 on the basis of the actual mount structure. That is, in this embodiment, the connector 202 is provided at the position that is deeper than a mount surface of the body-side mount portion 201 (on the right side of the body-side mount portion 201 in FIG. 5). Similarly, the arrangement of the connector 302 on the right side of the lens-side mount portion 301 means that the connector 302 according to this embodiment is arranged at the position that protrudes from a mount surface of the lens-side mount portion 301. According to the above-mentioned arrangement of the connector 202 and the connector 302, when the lens barrel 3 is mounted on the camera body 2 such that the mount surface of the body-side mount portion 201 and the mount surface of the lens-side mount portion 301 come into contact with each other, the connector 202 and the connector 302 are connected to each other. Therefore, the electric contacts of the connectors 202 and 302 are connected to each other.

As illustrated in FIG. 5, the connector 202 includes 12 electric contacts BP1 to BP12. In addition, the connector 302 of the lens 3 includes 12 electric contacts LP1 to LP12 corresponding to 12 electric contacts in the camera body 2.

The electric contact BP1 and the electric contact BP2 are connected to a first power circuit 230 in the camera body 2. The first power circuit 230 supplies an operating voltage to each module in the lens barrel 3 (however, except for circuits having relatively large power consumption such as the lens driving motors 321 and 331) through the electric contact BP1 and the electric contact LP1. The voltage value which is supplied by the first power circuit 230 through the electric contact BP1 and the electric contact LP1 is not particularly limited and can be a voltage value of 3 V to 4 V (normally, a voltage value in the vicinity of 3.5 V which is an intermediate value of the voltage range). In this case, a current value which is supplied from the camera body 2 to the lens barrel 3 is in the range of about several tens of milliamperes to several hundreds of milliamperes when power is turned on. The electric contact BP2 and the electric contact LP2 are ground terminals corresponding to the operating voltage which is supplied through the electric contact BP1 and the electric contact LP1.

The electric contacts BP3 to BP6 are connected to a first camera-side communication module 291. The electric contacts LP3 to LP6 are connected to a first lens-side communication module 381 so as to correspond to the electric contacts BP3 to BP6. The first camera-side communication module 291 and the first lens-side communication module 381 transmit and receive signals therebetween using these electric contacts. The content of the communication between the first camera-side communication module 291 and the first lens-side communication module 381 will be described in detail below.

The electric contacts BP7 to BP10 are connected to a second camera-side communication module 292. The electric contacts LP7 to LP10 are connected to a second lens-side communication module 382 so as to correspond to the electric contacts BP7 to BP10. The second camera-side communication module 292 and the second lens-side communication module 382 transmit and receive signals therebetween using these electric contacts. The content of the communication between the second camera-side communication module 292 and the second lens-side communication module 382 will be described in detail below.

The electric contact BP11 and the electric contact BP12 are connected to a second power circuit 240 in the camera body 2. The second power circuit 240 supplies an operating voltage to circuits with relatively large power consumption, such as the lens driving motors 321 and 331, through the electric contact BP11 and the electric contact LP11. The voltage value supplied by the second power circuit 240 is not particularly limited. The maximum value of the voltage value supplied by the second power circuit 240 can be several times greater than the maximum value of the voltage value supplied by the first power circuit 230. In this case, a current value which is supplied from second power circuit 240 to the lens barrel 3 is in the range of about several tens of milliamperes to several amperes when power is turned on. The electric contact BP12 and the electric contact LP12 are ground terminals corresponding to the operating voltage which is supplied through the electric contact BP11 and the electric contact LP11.

The first communication module 291 and the second communication module 292 in the camera body 2 illustrated in FIG. 5 form a camera transceiver 29 illustrated in FIG. 1 and the first communication module 381 and the second communication module 382 in the lens barrel 3 illustrated in FIG. 5 form a lens transceiver 39 illustrated in FIG. 2.

Next, the communication (hereinafter, referred to as command data communication) between the first camera-side communication module 291 and the first lens-side communication module 381 will be described. The lens controller 37 perform the command data communication which performs the transmission of control data from the first camera-side communication module 291 to the first lens-side communication module 381 and the transmission of response data from the first lens-side communication module 381 to the first camera-side communication module 291 in parallel in a predetermined cycle (for example, an interval of 16 milliseconds) through a signal line CLK formed by the electric contacts BP3 and LP3, a signal line BDAT formed by the electric contacts BP4 and LP4, a signal line LDAT formed by the electric contacts BP5 and LP5, and a signal line RDY formed by the electric contacts BP6 and LP6.

Figure 6:
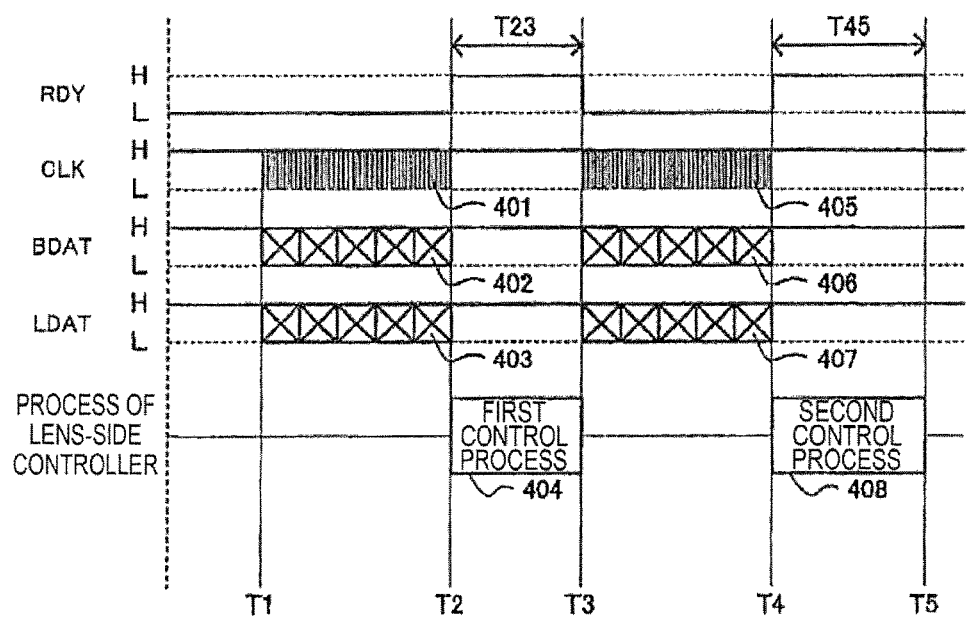
FIG. 6 is a diagram illustrating an example of command data communication.

FIG. 6 is a timing chart illustrating an example of the command data communication. First, the camera controller 21 and the first camera-side communication module 291 check the signal level of the signal line RDY when the command data communication starts (T1). The signal level of the signal line RDY indicates whether the communication of the first lens-side communication module 381 is available. When communication is not available, the lens controller 37 and the first lens-side communication module 381 output an H (High) level signal. When the signal line RDY is at an H level, the first camera-side communication module 291 does not perform communication with the lens barrel 3 or does not perform the next process even during communication.

On the other hand, when the signal line RDY is at an L (LOW) level, the camera controller 21 and the first camera-side communication module 291 transmit a clock signal 401 to the first lens-side communication module 381 using the signal line CLK. In addition, the camera controller 21 and the first camera-side communication module 291 transmit a camera-side command packet signal 402, which is control data, to the first lens-side communication module 381 in synchronization with the clock signal 401, using the signal line BDAT. When the clock signal 401 is output, the lens controller 37 and the first lens-side communication module 381 transmit a lens-side command packet signal 403, which is response data, in synchronization with the clock signal 401, using the signal line LDAT.

When the transmission of the lens-side command packet signal 403 is completed, the lens controller 37 and the first lens-side communication module 381 changes the signal level of the signal line RDY from the L level to the H level (T2). Then, the lens controller 37 starts a first control process 404 according to the content of the camera-side command packet signal 402 received until the time T2.

For example, when the received camera-side command packet signal 402 has content requiring specific data of the lens barrel 3, the lens controller 37 performs a process of analyzing the content of the command packet signal 402 and generating the requested specific data as the first control process 404. In addition, the lens controller 37 performs, as the first control process 404, a communication error check process which easily checks whether there is an error in the communication of the command packet signal 402 from the number of data bytes, using checksum data included in the command packet signal 402. The specific data signal generated by the first control process 404 is output as a lens-side data packet signal 407 to the camera body 2 (T3). In this case, a camera-side data packet signal 406 which is output from the camera body 2 after the command packet signal 402 is dummy data (including checksum data) which is meaningless on the lens side. In this case, the lens controller 37 performs, as a second control process 408, the above-mentioned communication error check process using the checksum data included in the camera-side data packet signal 406 (T4).

For example, when the camera-side command packet signal 402 is an instruction to drive the focus lens 33 and the camera-side data packet signal 406 relates to the driving speed and amount of the focus lens 33, the lens controller 37 performs, as the first control process 404, a process of analyzing the content of the command packet signal 402 and generating an acknowledgement signal indicating that the content has been understood (T2). The acknowledgement signal generated by the first control process 404 is output as the lens-side data packet signal 407 to the camera body 2 (T3). In addition, the lens controller 37 performs, as the second control process 408, a process of analyzing the content of the camera-side data packet signal 406 and a communication error check process using the checksum data included in the camera-side data packet signal 406 (T4). Then, after the second control process 408 is completed, the lens controller 37 drives the focus lens driving motor 331 on the basis of the received camera-side data packet signal 406, that is, the driving speed and amount of the focus lens 33, to drive the focus lens 33 by the received amount of driving at the received driving speed (T5).

When the second control process 408 is completed, the lens controller 37 notifies the first lens-side communication module 381 that the second control process 408 has been completed. Then, the lens controller 37 output an L-level signal to the signal line RDY (T5).

The communication performed for the period from the time T1 to the time T5 is one command data communication process. As described above, in one command data communication process, the camera controller 21 and the first camera-side communication module 291 transmit the camera-side command packet signal 402 and the camera-side data packet signal 406 at a time, respectively. As such, in this embodiment, the control data to be transmitted from the camera body 2 to the lens barrel 3 is divided into two data items and then transmitted for the convenience of processing. The camera-side command packet signal 402 and the camera-side data packet signal 406 are combined with each other to form one control data item.

Similarly, in one command data communication process, the lens controller 37 and the first lens-side communication module 381 transmit the lens-side command packet signal 403 and the lens-side data packet signal 407 at a time, respectively. As such, the response data to be transmitted from the lens barrel 3 to the camera body 2 is divided into two data items and then transmitted. The lens-side command packet signal 403 and the lens-side data packet signal 407 are combined with each other to form one response data item.

Next, the communication (hereinafter, referred to as hot-line communication) between the second camera-side communication module 292 and the second lens-side communication module 382 will be described. Returning to FIG. 5, the lens controller 37 performs hot-line communication having a cycle (for example, 1 milliseconds interval) shorter than the command data communication through a signal line HREQ formed by the electric contacts BP7 and LP7, a signal line HANS formed by the electric contacts BP8 and LP8, a signal line HCLK formed by the electric contacts BP9 and LP9, and a signal line HDAT formed by the electric contacts BP10 and LP10.

For example, in this embodiment, the lens information of the lens barrel 3 is transmitted from the lens barrel 3 to the camera body 2 by the hot-line communication. The lens information transmitted by the hot-line communication includes the position of the focus lens 33, the position of the zoom lens 32, a current position image plane transfer coefficient $K_{cur}$, the minimum image plane transfer coefficient $K_{min}$, and the maximum image plane transfer coefficient $K_{max}$. Here, the current position image plane transfer coefficient $K_{cur}$ is the image plane transfer coefficient K corresponding to the current position (focal length) of the zoom lens 32 and the current position (object distance) of the focus lens 33. In this embodiment, the lens controller 37 can calculate the current position image plane transfer coefficient $K_{cur}$ corresponding to the current position of the zoom lens 32 and the current position of the focus lens 33, with reference to the table indicating the relationship between the positions of the lens (the position of the zoom lens and the position of the focus lens) and the image plane transfer coefficient K which is stored in the lens memory 38. For example, in the example illustrated in FIG. 3, when the position (focal length) of the zoom lens 32 is in the area "f1" and the position (object distance) of the focus lens 33 is in the area "D4", the lens controller 37 transmits "K14", "K11", and "K19" as the current position image plane transfer coefficient $K_{cur}$, the minimum image plane transfer coefficient $K_{min}$, and the maximum image plane transfer coefficient $K_{max}$ to the camera controller 21, respectively, using the hot-line communication. In this embodiment, the lens information may include the corrected minimum image plane transfer coefficient $K_{min\_x}$ and the corrected maximum image plane transfer coefficient $K_{max\_x}$ instead of the minimum image plane transfer coefficient $K_{min}$ and the maximum image plane transfer coefficient $K_{max}$, which will be described below.

Figure 7A:
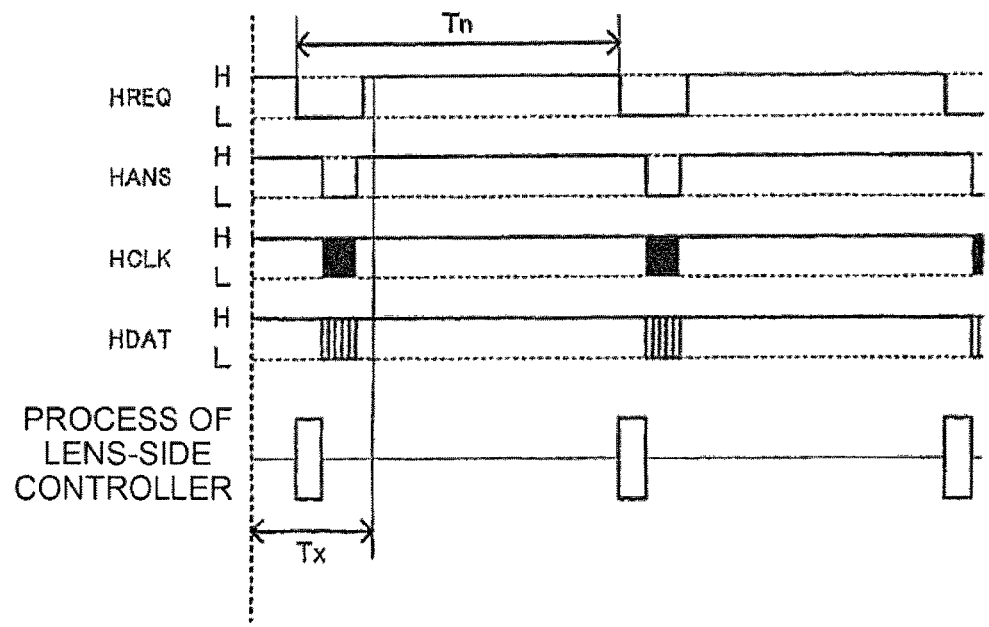
FIGS. 7A and 7B are diagrams illustrating an example of hot-line communication.
Figure 7B:
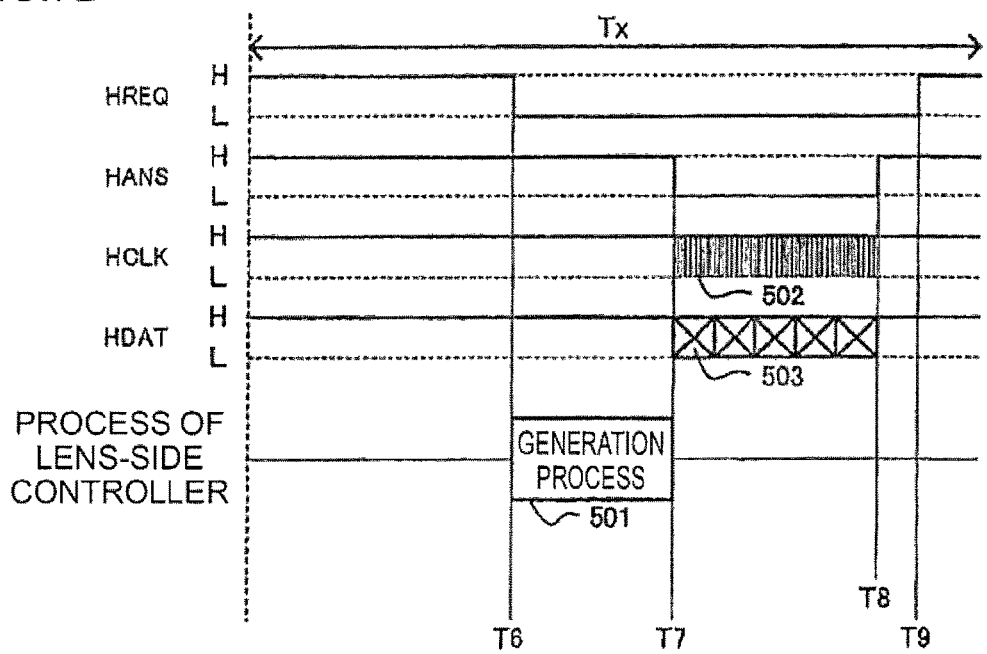

FIGS. 7A and 7B are timing charts illustrating an example of the hot-line communication. FIG. 7A is a diagram illustrating an aspect in which the hot-line communication is repeatedly performed with a predetermined period Tn. FIG. 7B shows an aspect in which the period Tx of one communication process among the hot-line communication processes which are repeatedly performed is enlarged. Next, an aspect in which the position of the focus lens 33 is transmitted by the hot-line communication will be described with reference to the timing chart illustrated in FIG. 7B.

First, the camera controller 21 and the second camera-side communication module 292 output an L-level signal to the signal line HREQ in order to perform the hot-line communication (T6). Then, the second lens-side communication module 382 notifies the lens controller 37 that the signal has been input to the electric contact LP7. The lens controller 37 starts the execution of a generation process 501 for generating lens position data in response to the notice. In the generation process 501, the lens controller 37 directs the focus lens encoder 332 to detect the position of the focus lens 33 and to generate lens position data indicating the detection result.

When the lens controller 37 completes the generation process 501, the lens controller 37 and the second lens-side communication module 382 output an L-level signal to the signal line HANS (T7). When the signal is input to the electric contact BP8, the camera controller 21 and the second camera-side communication module 292 output a clock signal 502 from the electric contact BP9 to the signal line HCLK.

The lens controller 37 and the second lens-side communication module 382 output a lens position data signal 503 indicating lens position data from the electric contact LP10 to the signal line HDAT in synchronization with the clock signal 502. Then, when the transmission of the lens position data signal 503 is completed, the lens controller 37 and the second lens-side communication module 382 output an H-level signal from the electric contact LP8 to the signal line HANS (T8). Then, when the signal is input to the electric contact BP8, the second camera-side communication module 292 outputs an H-level signal from the electric contact LP7 to the signal line HREQ (T9).

The command data communication and the hot-line communication can be performed at the same time or in parallel.

Figure 8:
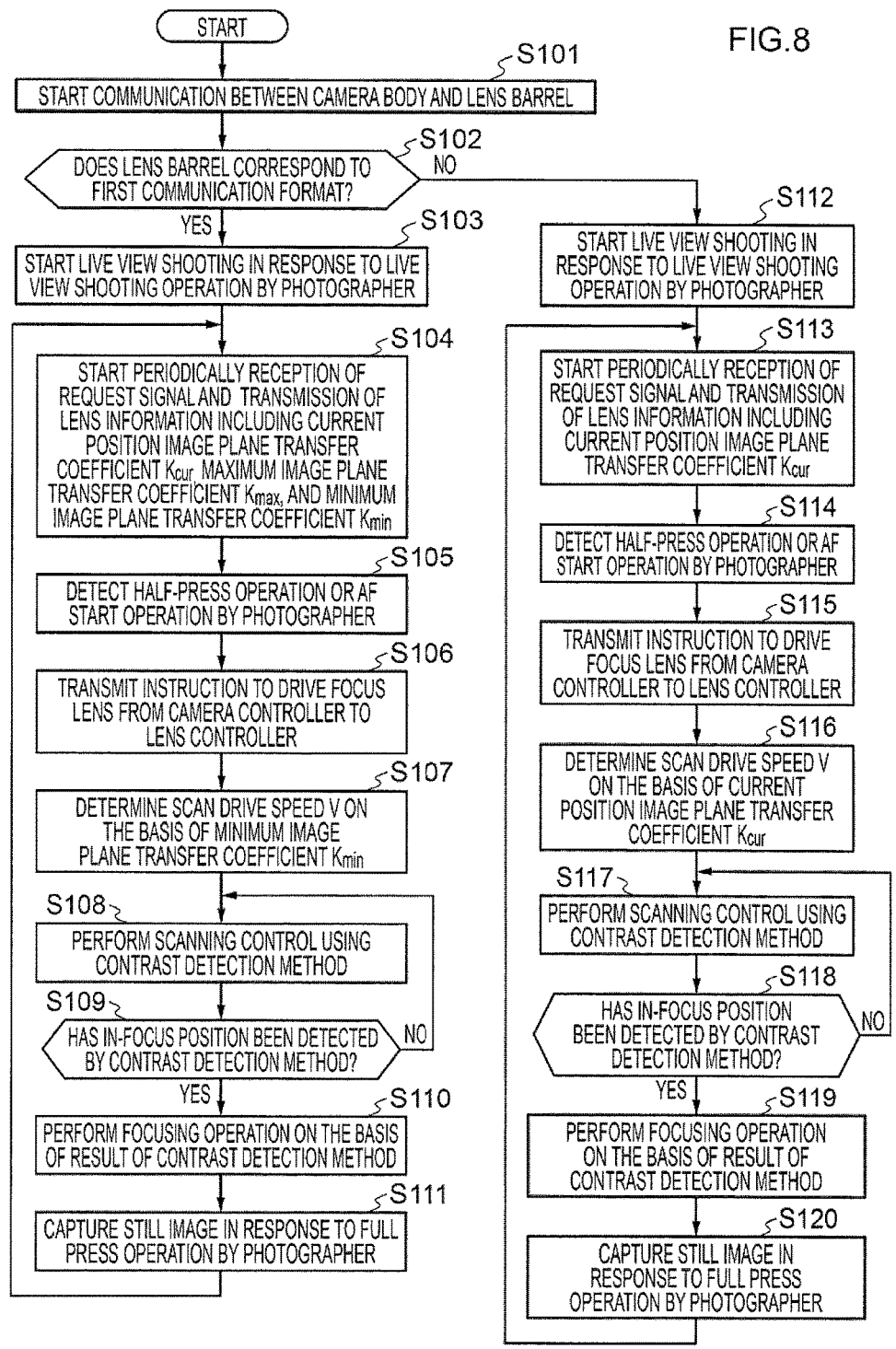
FIG. 8 is a flowchart illustrating an example of an operation according to the first embodiment.

Next, an example of the operation of the camera 1 according to this embodiment will be described with reference to FIG. 8. FIG. 8 is a flowchart illustrating the operation of the camera 1 according to this embodiment. The following operation starts when the camera 1 is turned on.

First, in Step S101, the camera body 2 performs communication for identifying the lens barrel 3. The available communication format varies depending on the type of lens barrel. Then, the process proceeds to Step S102. In Step S102, the camera controller 21 determines whether the lens barrel 3 is a lens corresponding to a predetermined first communication format. When it is determined that the lens barrel 3 is a lens corresponding to the first communication format, the process proceeds to Step S103. On the other hand, when the camera controller 21 determines that the lens barrel 3 is not a lens corresponding to the predetermined first communication format, the proceeds to Step S112. When the camera controller 21 determines that the lens barrel 3 is a lens corresponding to a second communication format different from the first communication format, the process may proceed to Step S112. When the camera controller 21 determines that the lens barrel 3 is a lens corresponding to the first and second communication formats, the process may proceed to Step S103.

Then, in Step S103, it is determined whether the photographer has turned on a live view shooting switch provided in the operation module 28. When the live view shooting switch is turned on, the mirror system 220 is moved to an object image capture position and beams from the object are guided to the imaging element 22.

In Step S104, the hot-line communication between the camera body 2 and the lens barrel 3 starts. In the hot-line communication, as described above, when the lens controller 37 receives the L-level signal (request signal) which has been output to the signal line HREQ by the camera controller 21 and the second camera-side communication module 292, the lens information is transmitted to the camera controller 21. The transmission of the lens information is repeatedly performed. The lens information includes, for example, information about the position of the focus lens 33, the position of the zoom lens 32, the current position image plane transfer coefficient $K_{cur}$, the minimum image plane transfer coefficient $K_{min}$, and the maximum image plane transfer coefficient $K_{max}$. The hot-line communication is repeatedly performed after Step S104. The hot-line communication is repeatedly performed, for example, until the power switch is turned off.

The lens controller 37 may transmit the corrected minimum image plane transfer coefficient $K_{min\_x}$ and the corrected maximum image plane transfer coefficient $K_{max\_x}$ to the camera controller 21, instead of the minimum image plane transfer coefficient $K_{min}$ and the maximum image plane transfer coefficient $K_{max}$.

In this embodiment, when transmitting the lens information to the camera controller 21, the lens controller 37 acquires the current position image plane transfer coefficient $K_{cur}$ corresponding to the current position of the zoom lens 32 and the current position of the focus lens 33, and the minimum image plane transfer coefficient $K_{min}$ and the maximum image plane transfer coefficient $K_{max}$ corresponding to the current position of the zoom lens 32, with reference to the table (see FIG. 3) indicating the relationship between the position of each lens and the image plane transfer coefficient K which is stored in the lens memory 38, and transmits the acquired current position image plane transfer coefficient $K_{cur}$, the acquired minimum image plane transfer coefficient $K_{min}$, and the acquired maximum image plane transfer coefficient $K_{max}$ to the camera controller 21.

In this embodiment, when the minimum image plane transfer coefficient $K_{min}$ is transmitted to the camera controller 21 by the hot-line communication, the minimum image plane transfer coefficient $K_{min}$ and the corrected minimum image plane transfer coefficient $K_{min\_x}$ are alternately transmitted. That is, in this embodiment, for a first processing period, the minimum image plane transfer coefficient $K_{min}$ is transmitted. Then, for a second processing period following the first processing period, the corrected minimum image plane transfer coefficient $K_{min\_x}$ is transmitted. Then, for a third processing period following the second processing period, the minimum image plane transfer coefficient $K_{min}$ is transmitted again. Then, the corrected minimum image plane transfer coefficient $K_{min\_x}$ and the minimum image plane transfer coefficient $K_{min}$ are alternately transmitted.

For example, when the position (focal length) of the zoom lens 32 is in the area "f1", the lens controller 37 alternately transmits "K11", which is the corrected minimum image plane transfer coefficient $K_{min\_x}$, and "K11'", which is the minimum image plane transfer coefficient $K_{min}$, that is, in the order of "K11", "K11'", "K11", "K11'", . . . . In this case, when the zoom lens 32 is driven and the position (focal length) of the zoom lens 32 is changed, for example, when the position (focal length) of the zoom lens 32 is in the area "f2", "K21" and "K21'" corresponding to "f2" are alternately transmitted. However, when the position (focal length) of the zoom lens 32 is not changed, "K11" and "K11'" are alternately transmitted.

Similarly, when transmitting the maximum image plane transfer coefficient $K_{max}$ to the camera controller 21, the lens controller 37 alternately transmits the maximum image plane transfer coefficient $K_{max}$ and the corrected maximum image plane transfer coefficient $K_{max\_x}$.

In Step S105, it is determined whether the photographer performs, for example, an operation of pressing a release button provided in the operation module 28 halfway (an operation of turning on the first switch SW1) or an AF start operation. When such operation is performed, the process proceeds to Step S106 (the case in which the operation of pressing the release button halfway is performed will be described in detail below).

Then, in Step S106, the camera controller 21 transmits a scan drive command (a scan drive start instruction) to the lens controller 37 in order to perform focus detection using the contrast detection method. The scan drive command (a driving speed instruction during scan drive or a driving position instruction) issued to the lens controller 37 may be, for example, the driving speed of the focus lens 33, the moving speed of the image plane, or a target driving position.

In Step S107, the camera controller 21 performs a process of determining a scan drive speed V which is the driving speed of the focus lens 33 in the scanning operation, on the basis of the minimum image plane transfer coefficient $K_{min}$ or the corrected minimum image plane transfer coefficient $K_{min\_x}$ acquired in Step S104.

Next, first, an example in which the scan drive speed V is determined on the basis of the minimum image plane transfer coefficient $K_{min}$ of the minimum image plane transfer coefficient $K_{min}$ and the corrected minimum image plane transfer coefficient $K_{min\_x}$ will be described.

In this embodiment, the scanning operation is an operation which simultaneously performs the driving of the focus lens 33 by the focus lens driving motor 331 at the scan drive speed V determined in this Step S107 and the calculation of the focus evaluation value by the camera controller 21 using the contrast detection method at a predetermined interval to perform the detection of the in-focus position using the contrast detection method at a predetermined interval.

In the scanning operation, when the in-focus position is detected by the contrast detection method, the camera controller 21 calculates the focus evaluation value at a predetermined sampling interval while driving the focus lens 33 to perform scan driving and detects the lens position where the calculated focus evaluation value is a peak value as the in-focus position. Specifically, the camera controller 21 scan-drives the focus lens 33 to move the image plane formed by the optical system in the direction of the optical axis, calculates the focus evaluation values in different image planes, and detects the lens position where the focus evaluation value is a peak value as the in-focus position. However, in some cases, when the moving speed of the image plane is too high, the gap between the image planes for calculating the focus evaluation value is too large to appropriately detect the in-focus position. In particular, the image plane transfer coefficient K indicating the ratio of the amount of movement of the image plane to the amount of driving of the focus lens 33 varies depending on the position of the focus lens 33 in the direction of the optical axis. Therefore, even when the focus lens 33 is driven at a constant speed, the moving speed of the image plane is too high, depending on the position of the focus lens 33. As a result, in some cases, the gap between the image planes for calculating the focus evaluation value is too large to appropriately detect the in-focus position.

For this reason, in this embodiment, the camera controller 21 calculates the scan drive speed V of the focus lens 33 during the scan-driving, on the basis of the minimum image plane transfer coefficient $K_{min}$ acquired in Step S104. The camera controller 21 calculates the scan drive speed V, which is a driving speed capable of appropriately detecting the in-focus position using the contrast detection method and is the maximum driving speed, on the basis of the minimum image plane transfer coefficient $K_{min}$.

In this embodiment, for example, when the scan drive speed V is determined on the basis of the minimum image plane transfer coefficient $K_{min}$, in some cases, an appropriate scan drive speed V is not always calculated according to the position of the vibration correction lens 34 or the posture of the camera 1. Therefore, in this case, the scan drive speed V is determined on the basis of the corrected minimum image plane transfer coefficient $K_{min\_x}$, instead of the minimum image plane transfer coefficient $K_{min}$. In particular, in some cases, the length of the optical path of light incident on the lens barrel 3 to the imaging element 22 varies depending on the position of the vibration correction lens 34, as compared to the case in which the vibration correction lens 34 is at the central position. In this case, the occurrence of an optical error is considered. Alternatively, the following is considered: a slight deviation between the mechanical positions of the lenses 31, 32, 33, 34, and 35 occurs due to their own weights, according to the posture of the camera 1 (particularly, for example, the camera 1 is inclined upward or downward in the vertical), which results in an optical error. In particular, it is considered that the above-mentioned phenomenon occurs due to the lens structure of the lens barrel or when the size of the lens barrel is large. Therefore, in this embodiment, when this phenomenon is detected, the scan drive speed V is determined on the basis of the corrected minimum image plane transfer coefficient $K_{min\_x}$, instead of the minimum image plane transfer coefficient $K_{min}$.

For example, when it is determined whether to use the corrected minimum image plane transfer coefficient $K_{min\_x}$, instead of the minimum image plane transfer coefficient $K_{min}$, according to the position of the vibration correction lens 34, data for the position of the vibration correction lens 34 is acquired from the lens controller 37. When the amount of driving of the vibration correction lens 34 is equal to or greater than a predetermined value on the basis of the acquired data, it can be determined that the corrected minimum image plane transfer coefficient $K_{min\_x}$ is used. Alternatively, when it is determined whether to use the corrected minimum image plane transfer coefficient $K_{min\_x}$, instead of the minimum image plane transfer coefficient $K_{min}$, according to the posture of camera 1, an output from a posture sensor (not illustrated) is acquired. When the angle of the direction of the camera 1 with respect to the horizontal direction is equal to or greater than a predetermined value on the basis of the acquired output of the sensor, it can be determined that the corrected minimum image plane transfer coefficient $K_{min\_x}$ is used. In addition, it may be determined whether to use the corrected minimum image plane transfer coefficient $K_{min\_x}$, instead of the minimum image plane transfer coefficient $K_{min}$, on the basis of both the position data of the vibration correction lens 34 and the output from the posture sensor.

In Step S108, the scanning operation starts at the scan drive speed V determined in Step S107. Specifically, the camera controller 21 transmits a scan drive start command to the lens controller 37, and the lens controller 37 drives the focus lens driving motor 331 to drive the focus lens 33 at the scan drive speed V determined in Step S107, in response to the command from the camera controller 21. Then, the camera controller 21 reads a pixel output from the imaging pixel of the imaging element 22 at a predetermined interval while driving the focus lens 33 at the scan drive speed V, calculates the focus evaluation value on the basis of the pixel output, acquires the focus evaluation values at different positions of the focus lens, to detects the in-focus position using the contrast detection method.

Then, in Step S109, the camera controller 21 determines whether the peak value of the focus evaluation value has been detected (whether the in-focus position has been detected). When the peak value of the focus evaluation value has not been detected, the process returns to Step S108 and the operation in Steps S108 and S109 is repeatedly performed until the peak value of the focus evaluation value is detected or until the focus lens 33 is driven to a predetermined driving end. On the other hand, when the peak value of the focus evaluation value has been detected, the process proceeds to Step S110.

When the peak value of the focus evaluation value has been detected, the process proceeds to Step S110. In Step S110, the camera controller 21 transmits a command to move the focus to the position corresponding to the peak value of the focus evaluation value to the lens controller 37. The lens controller 37 controls the driving of the focus lens 33 in response to the received command.

Then, the process proceeds to Step S111. In Step S111, the camera controller 21 determines that the focus lens 33 reaches the position corresponding to the peak value of the focus evaluation value and controls a still image capture process when the photographer fully presses the shutter release button (turns on the second switch SW2). After the imaging control ends, the process returns to Step S104 again.

On the other hand, when it is determined in Step S102 that the lens barrel 3 is a lens that does not correspond to the predetermined first communication format, the process proceeds to Step S112 and the process from Step S112 to Step S120 is performed. The process from Step S112 to Step S120 is the same as the process from Step S103 to Step S111 except that information which does not include the minimum image plane transfer coefficient $K_{min}$ and the maximum image plane transfer coefficient $K_{max}$ is transmitted as the lens information when the lens information is repeatedly transmitted by the hot-line communication between the camera body 2 and the lens barrel 3 (Step S113) and the current position image plane transfer coefficient $K_{cur}$ included in the lens information is used, instead of the minimum image plane transfer coefficient $K_{min}$ or the corrected minimum image plane transfer coefficient $K_{min\_x}$, when the scan drive speed V, which is the driving speed of the focus lens 33 in the scanning operation, is determined (Step S116).

As described above, in this embodiment, the lens memory 38 of the lens barrel 3 stores the minimum image plane transfer coefficient $K_{min}$, which is the minimum value of the image plane transfer coefficient, and the maximum image plane transfer coefficient $K_{max}$, which is the maximum value of the image plane transfer coefficient, and the scan drive speed V, which is a driving speed capable of appropriately detecting the in-focus position using the contrast detection method and is the maximum driving speed, is calculated on the basis of the minimum image plane transfer coefficient $K_{min}$ among the image plane transfer coefficients K stored in the lens memory 38. Therefore, even when the focus lens 33 is driven to the position where the image plane transfer coefficient K has the minimum value (for example, the same value as the minimum image plane transfer coefficient $K_{min}$), the calculation interval of the focus evaluation value (the interval of the image plane for calculating the focus evaluation value) can be set to a value suitable for detecting the focus. According to this embodiment, when the focus lens 33 is driven in the direction of the optical axis, the image plane transfer coefficient K is changed, and as a result, even when the image plane transfer coefficient K is reduced (for example, when the image plane transfer coefficient K becomes the minimum image plane transfer coefficient $K_{min}$), it is possible to appropriately detect the in-focus position using the contrast detection method.

In addition, according to this embodiment, the lens memory 38 of the lens barrel 3 stores the corrected minimum image plane transfer coefficient $K_{min\_x}$ and the corrected maximum image plane transfer coefficient $K_{max\_x}$, in addition to the minimum image plane transfer coefficient $K_{min}$ and the maximum image plane transfer coefficient $K_{max}$. In some situation (for example, a situation in which the vibration correction lens 34 is at a predetermined position or a situation in which the camera 1 is in a predetermined posture), the scan drive speed V is calculated on the basis of the corrected minimum image plane transfer coefficient $K_{min\_x}$, instead of the minimum image plane transfer coefficient $K_{min}$. Therefore, it is possible to determine the scan drive speed V with high accuracy. As a result, it is possible to appropriately detect the in-focus position using the contrast detection method.

«Second Embodiment»

Next, a second embodiment of the invention will be described. The second embodiment has the same structure, operation, function, and effect as the first embodiment except that, in the camera 1 illustrated in FIG. 1, the minimum image plane transfer coefficient $K_{min}$ and the maximum image plane transfer coefficient $K_{max}$ stored in the lens memory 38 of the lens barrel 3 varies depending on the position of the focus lens 33.

As described above, in the camera 1 according to this embodiment, the length of the optical path of light incident on the lens barrel 3 to the imaging element 22 varies depending on the position of the vibration correction lens 34, as compared to the case in which the vibration correction lens 34 is at the central position. However, this tendency varies depending on the position of the focus lens 33. That is, even when the vibration correction lens 34 is at the same position, the degree of change in the length of the optical path with respect to the case in which the vibration correction lens 34 is at the central position varies depending on the position of the focus lens 33. In contrast, in the second embodiment, the minimum image plane transfer coefficient $K_{min}$ and the maximum image plane transfer coefficient $K_{max}$ varies depending on the position of the focus lens 33. When the scan drive speed V during the scanning operation is determined in Step S107 illustrated in FIG. 8, the scan drive speed V is determined on the basis of such minimum image plane transfer coefficient $K_{min}$ corresponding to the position of the focus lens 33. Therefore, it is possible to appropriately calculate the scan drive speed V.

In the second embodiment, it is possible to calculate the minimum image plane transfer coefficient $K_{min}$ and the maximum image plane transfer coefficient $K_{max}$ corresponding to the position of the focus lens 33, using, for example, the table illustrated in FIG. 3 indicating the relationship between the position (focal length) of the zoom lens 32, the position (object distance) of the focus lens 33, the minimum image plane transfer coefficient $K_{min}$, and the maximum image plane transfer coefficient $K_{max}$. Alternatively, the minimum image plane transfer coefficient $K_{min}$ and the maximum image plane transfer coefficient $K_{max}$ corresponding to the position of the focus lens 33 can be calculated by calculating the current position image plane transfer coefficient $K_{cur}$ using the table illustrated in FIG. 3 and multiplying the current position image plane transfer coefficient $K_{cur}$ by a predetermined constant, adding a predetermined constant to the current position image plane transfer coefficient $K_{cur}$, or subtracting a predetermined constant from the current position image plane transfer coefficient $K_{cur}$.

«Third Embodiment»

Next, a third embodiment of the invention will be described. The third embodiment has the same structure as the first embodiment except that the camera 1 illustrated in FIG. 1 operates as follows.

That is, the third embodiment is the same as the first embodiment in that, in the flowchart illustrated in FIG. 8 in the first embodiment, when it is determined in Step S109 that the in-focus position has been detected by the contrast detection method and the focusing operation is performed on the basis of the result of the contrast detection method in Step S110, it is determined whether to perform a backlash reduction operation and the driving method of the focus lens 33 during the focusing operation varies depending on the determination result.

Figure 9:
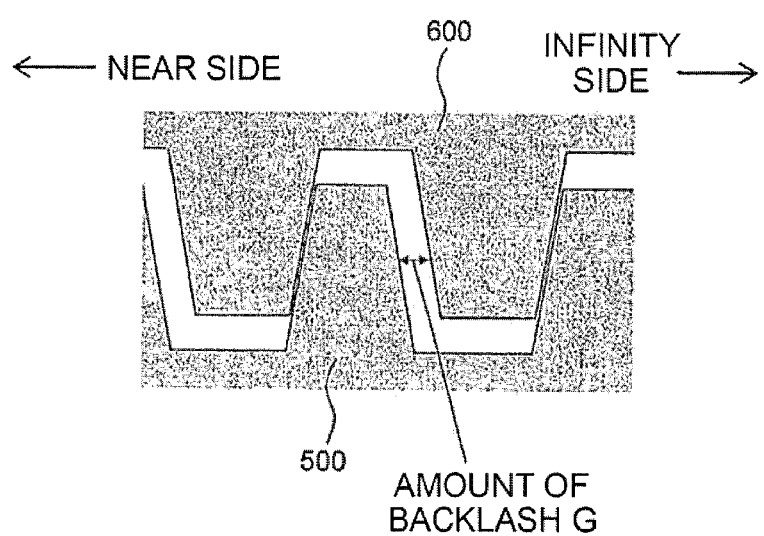
FIG. 9 is a diagram illustrating the amount of backlash G of a driving transfer mechanism of a focus lens 33.
Figure 10:
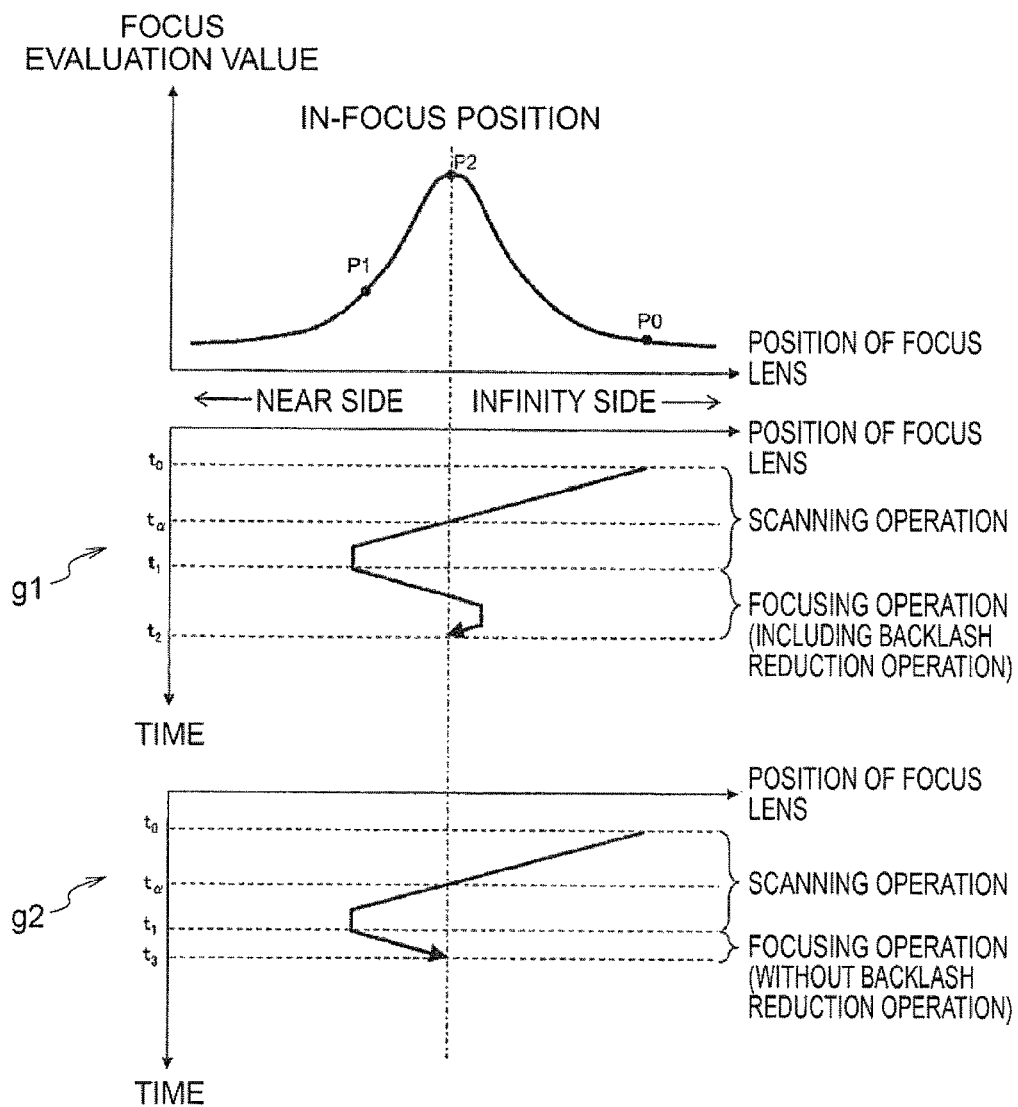
FIG. 10 is a diagram illustrating the relationship between the position of the focus lens and a focus evaluation value and the relationship between the position of the focus lens and time when a scanning operation and a focusing operation based on a contrast detection method according to this embodiment are performed.

That is, the focus lens driving motor 331 for driving the focus lens 33 illustrated in FIG. 2 is generally a mechanical driving transfer mechanism. The driving transfer mechanism includes, for example, a first driving mechanism 500 and a second driving mechanism 600, as illustrated in FIG. 9. When the first driving mechanism 500 is driven, the second driving mechanism 600 of a side of the focus lens 33 is driven to move the focus lens 33 to the near side or to the infinity side. In the driving mechanism, the amount of backlash G is generally provided in order to smoothly operate an engaged portion of a gear. In the contrast detection method, in the mechanism, as illustrated in FIG. 10, after the focus lens 33 passes through the in-focus position once, the driving direction of the focus lens 33 needs to be reversed and the focus lens 33 needs to be driven to the in-focus position by the scanning operation. In this case, when the backlash reduction operation is not performed as illustrated in a graph gn in FIG. 10, the position of the focus lens 33 deviates from the in-focus position by the amount of backlash G. Therefore, during the driving of the focus lens 33 to the in-focus position, after the focus lens 33 passes through the in-focus position once, it is necessary to perform the backlash reduction operation which reverses the driving direction again and drives the focus lens 33 to the in-focus position in order to remove the influence of the amount of backlash G, as illustrated in a graph g1 in FIG. 10.

FIG. 10 is a diagram illustrating the relationship between the position of the focus lens and the focus evaluation value and the relationship between the position of the focus lens and time when the scanning operation and the focusing operation based on the contrast detection method according to this embodiment are performed. The graph g1 in FIG. 10 shows an aspect in which the scanning operation of the focus lens 33 starts from a lens position P0 in a direction from the infinity side to the near side at a time t0; when the peak position (in-focus position) P2 of the focus evaluation value is detected while the focus lens 33 is moved to a lens position P1, the scanning operation is stopped and the focusing operation involving the backlash reduction operation is performed at a time t1; and the focus lens 33 is driven to the in-focus position at a time t2. Similarly, the graph g2 in FIG. 10 shows an aspect in which the scanning operation starts at the time t0; the scanning operation is stopped and the focusing operation without involving the backlash reduction operation is performed at the time t1; and the focus lens 33 is driven to the in-focus position at a time t3.

Next, an example of the operation according to the third embodiment will be described with reference to the flowchart illustrated in FIG. 11. The following operation is performed when the in-focus position is detected by the contrast detection method in Step S109 in the flowchart illustrated in FIG. 8. That is, as illustrated in FIG. 10, the scanning operation starts at the time t0. Then, when the peak position (in-focus position) P2 of the focus evaluation value is detected at the time of when the focus lens 33 is moved to the lens position P1 at the time t1, the operation is performed at the time t1.

That is, when the in-focus position is detected by the contrast detection method, first, the camera controller 21 acquires the minimum image plane transfer coefficient $K_{min}$ at the current position of the zoom lens 32 in Step S201. The minimum image plane transfer coefficient $K_{min}$ can be acquired from the lens controller 37 through the lens transceiver 39 and the camera transceiver 29 by the hot-line communication between the camera controller 21 and the lens controller 37.

In Step S202, the camera controller 21 acquires information about the amount of backlash G (see FIG. 9) of the driving transfer mechanism of the focus lens 33. The amount of backlash G of the driving transfer mechanism of the focus lens 33 can be stored in, for example, the lens memory 38 of the lens barrel 3 in advance and the information about the amount of backlash G can be acquired with reference to the lens memory 38. That is, specifically, the camera controller 21 transmits a request to transmit the amount of backlash G of the driving transfer mechanism of the focus lens 33 to the lens controller 37 through the camera transceiver 29 and the lens transceiver 39 to request the lens controller 37 to transmit information about the amount of backlash G of the driving transfer mechanism of the focus lens 33 stored in the lens memory 38, and acquires the information about the amount of backlash G. Alternatively, the information about the amount of backlash G of the driving transfer mechanism of the focus lens 33 stored in the lens memory 38 may be inserted into the lens information which is transmitted and received by the hot-line communication between the camera controller 21 and the lens controller 37.

Then, in Step S203, the camera controller 21 calculates the amount of movement IG of the image plane corresponding to the amount of backlash G, on the basis of the minimum image plane transfer coefficient $K_{min}$ acquired in Step S201 and the information about the amount of backlash G of the driving transfer mechanism of the focus lens 33 acquired in Step S202. The amount of movement IG of the image plane corresponding to the amount of backlash G is the amount of movement of the image plane when the focus lens is driven by a distance that is equal to the amount of backlash G. In this embodiment, the amount of movement IG of the image plane is calculated by the following expression:

Amount of movement $IG$ of image plane corresponding to amount of backlash $G$=Amount of backlash $G$×Minimum image plane transfer coefficient $K_{min}$.

Then, in Step S204, the camera controller 21 performs a process of comparing the amount of movement IG of the image plane corresponding to the amount of backlash G calculated in Step S203 with a predetermined amount of movement IP of the image plane and determines whether the amount of movement IG of the image plane corresponding to the amount of backlash G is equal to or less than the predetermined amount of movement IP of the image plane, that is, whether "the amount of movement IG of the image plane corresponding to the amount of backlash G"≤"the predetermined amount of movement IP of the image plane" is established, on the basis of the comparison result. The predetermined amount of movement IP of the image plane is set corresponding to the focus depth of the optical system. In general, the amount of movement of the image plane corresponds to the focus depth. In addition, since the predetermined amount of movement IP of the image plane is set to the focus depth of the optical system, the predetermined amount of movement IP of the image plane may be appropriately set according to the F-number, the cell size of the imaging element 22, or the format of the image to be captured. That is, as the F-number increases, the predetermined amount of movement IP of the image plane is set to a large value. Alternatively, as the cell size of the imaging element 22 increases or as the image format becomes smaller, the predetermined amount of movement IP of the image plane is set to a large value. When the amount of movement IG of the image plane corresponding to the amount of backlash G is equal to or less than the predetermined amount of movement IP of the image plane, the process proceeds to Step S205. On the other hand, when the amount of movement IG of the image plane corresponding to the amount of backlash G is more than the predetermined amount of movement IP of the image plane, the process proceeds to Step S206.

Since it has been determined in Step S204 that the amount of movement IG of the image plane corresponding to the amount of backlash G is equal to or less than the predetermined amount of movement IP of the image plane, it is determined that the position of the focus lens 33 after driving can fall within the focus depth of the optical system, even though the backlash reduction operation is not performed. Therefore, in Step S205, it is determined that the backlash reduction operation is not performed during the focusing operation and the focusing operation without involving the backlash reduction operation is performed, on the basis of the determination result. That is, when the focusing operation is performed, it is determined that the focus lens 33 is directly driven to the in-focus position and the focusing operation without involving the backlash reduction operation is performed on the basis of the determination result, as illustrated in graph g2 in FIG. 10.

On the other hand, since it has been determined in Step S204 that the amount of movement IG of the image plane corresponding to the amount of backlash G is more than the predetermined amount of movement IP of the image plane, it is determined that the backlash reduction operation needs to be performed in order to fall the position of the focus lens 33 after driving within the focus depth of the optical system. Therefore, in Step S206, it is determined that the backlash reduction operation is performed during the focusing operation and the focusing operation involving the backlash reduction operation is performed, on the basis of the determination result. That is, when the focus lens 33 is driven to perform the focusing operation, it is determined to perform a process which drives the focus lens 33 to pass through the in-focus position, reverses the driving direction, and drives the focus lens 33 to the in-focus position and the focusing operation involving the backlash reduction operation is performed on the basis of the determination result, as illustrated in graph g1 in FIG. 10.

In the third embodiment, as described above, the amount of movement IG of the image plane corresponding to the amount of backlash G is calculated on the basis of the minimum image plane transfer coefficient $K_{min}$ and the information about the amount of backlash G of the driving transfer mechanism of the focus lens 33 and it is determined whether the calculated amount of movement IG of the image plane corresponding to the amount of backlash G is equal to or less than the predetermined amount of movement IP of the image plane corresponding to the focus depth of the optical system. In this way, backlash reduction control which determines whether to perform the backlash reduction operation during the focusing operation is performed. The backlash reduction operation is not performed when it is determined that the amount of movement IG of the image plane corresponding to the amount of backlash G is equal to or less than the predetermined amount of movement IP of the image plane corresponding to the focus depth of the optical system and the position of the focus lens 33 after driving can fall within the focus depth of the optical system. In contrast, the backlash reduction operation is performed when it is determined that the amount of movement IG of the image plane corresponding to the amount of backlash G is more than the predetermined amount of movement IP of the image plane corresponding to the focus depth of the optical system and the backlash reduction operation needs to be performed in order to fall the position of the focus lens 33 after driving within the focus depth of the optical system. Therefore, according to this embodiment, when the backlash reduction operation is not required, the backlash reduction operation is not performed, thereby reducing the time required to drive the focus lens to the in-focus position. As a result, it is possible to reduce the time required for the focusing operation. On the other hand, when the backlash reduction operation is required, the backlash reduction operation is performed. Therefore, it is possible to improve the accuracy of focusing.

In particular, in the third embodiment, the amount of movement IG of the image plane corresponding to the amount of backlash G of the driving transfer mechanism of the focus lens 33 is calculated using the minimum image plane transfer coefficient $K_{min}$ and is compared with the predetermined amount of movement IP of the image plane corresponding to the focus depth of the optical system. Therefore, it is possible to appropriately determine whether the backlash reduction operation is required during the focusing operation.

In the backlash reduction control according to the third embodiment, the camera controller 21 may determine whether backlash reduction is required, according to the focal length, the diaphragm, and the object distance. In addition, the camera controller 21 may change the amount of backlash reduction, depending on the focal length, the diaphragm, and the object distance. For example, when the aperture value of the diaphragm is less than a predetermined value (the F-number is large), it may be determined that backlash reduction is not required or control may be performed such that the amount of backlash reduction is reduced, as compared to a case in which the aperture value of the diaphragm is not less than the predetermined value (the F-number is small). In addition, for example, on the wide side, it may be determined that backlash reduction is not required or control may be performed such that the amount of backlash reduction is reduced, as compared to the telephoto side.

«Fourth Embodiment»

Next, a fourth embodiment of the present invention will be described. The fourth embodiment has the same structure as the first embodiment except that the camera 1 illustrated in FIG. 1 operates as follows.

That is, in the fourth embodiment, the following clip operation (silent control) is performed. In the fourth embodiment, in search control using the contrast detection method, control is performed such that the moving speed of the image plane of the focus lens 33 is constant. In the search control using the contrast detection method, the clip operation is performed in order to suppress the driving sound of the focus lens 33. The clip operation according to the fourth embodiment clips the speed of the focus lens 33 such that the speed of the focus lens 33 is not less than a silent lens moving speed lower limit when the speed of the focus lens 33 is low and hinders silent movement.

In the fourth embodiment, the camera controller 21 of the camera body 2 compares a predetermined silent lens moving speed lower limit V0b with a driving speed V1a of the focus lens, using a predetermined coefficient (Kc), to determine whether to perform the clip operation, which will be described below.

Figure 12:
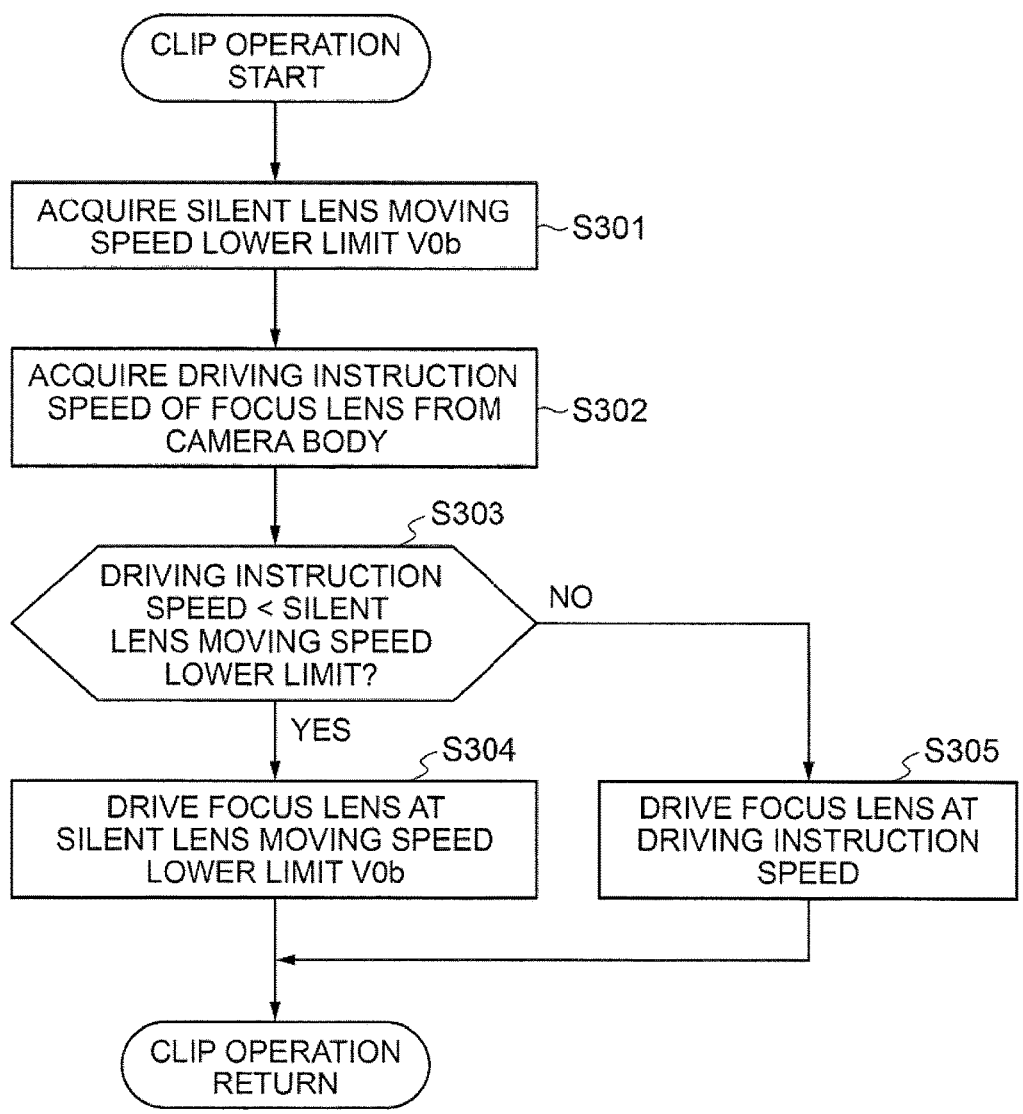
FIG. 12 is a flowchart illustrating a clip operation according to a fourth embodiment.

When the clip operation is permitted by the camera controller 21, the lens controller 37 limits the driving speed of the focus lens 33 to the silent lens moving speed lower limit V0b such that the driving speed V1a of the focus lens 33, which will be described below, is not less than the silent lens moving speed lower limit V0b. Next, the clip operation will be described in detail with reference to the flowchart illustrated in FIG. 12. Here, FIG. 12 is a flowchart illustrating the clip operation (silent control) according to the fourth embodiment.

In Step S301, the lens controller 37 acquires the silent lens moving speed lower limit V0b. The silent lens moving speed lower limit V0b is stored in the lens memory 38 and the lens controller 37 can acquire the silent lens moving speed lower limit V0b from the lens memory 38.

In Step S302, the lens controller 37 acquires the driving instruction speed of the focus lens 33. In this embodiment, the driving instruction speed of the focus lens 33 is transmitted from the camera controller 21 to the lens controller 37 by command data communication. Accordingly, the lens controller 37 can acquire the driving instruction speed of the focus lens 33 from the camera controller 21.

In Step S303, the lens controller 37 compares the silent lens moving speed lower limit V0b acquired in Step S301 with the driving instruction speed of the focus lens 33 acquired in Step S302. Specifically, the lens controller 37 determines whether the driving instruction speed (unit: pulse/second) of the focus lens 33 is less than the silent lens moving speed lower limit V0b (unit: pulse/second). When the driving instruction speed of the focus lens 33 is less than the silent lens moving speed lower limit, the process proceeds to Step S304. On the other hand, when the driving instruction speed of the focus lens 33 is equal to or greater than the silent lens moving speed lower limit V0b, the process proceeds to Step S305.

In Step S304, it has been determined that the driving instruction speed of the focus lens 33 transmitted from the camera body 2 is less than the silent lens moving speed lower limit V0b. In this case, the lens controller 37 drives the focus lens 33 at the silent lens moving speed lower limit V0b in order to suppress the driving sound of the focus lens 33. As such, when the driving instruction speed of the focus lens 33 is less than the silent lens moving speed lower limit V0b, the lens controller 37 limits the lens driving speed V1a of the focus lens 33 to the silent lens moving speed lower limit V0b.

In Step S305, it has been determined that the driving instruction speed of the focus lens 33 transmitted from the camera body 2 is equal to or greater than the silent lens moving speed lower limit V0b. Since a driving sound of the focus lens 33 that is equal to or greater than a predetermined value is not generated (or the driving sound is very small), the lens controller 37 drives the focus lens 33 at the driving instruction speed of the focus lens 33 transmitted from the camera body 2.

Figure 13:
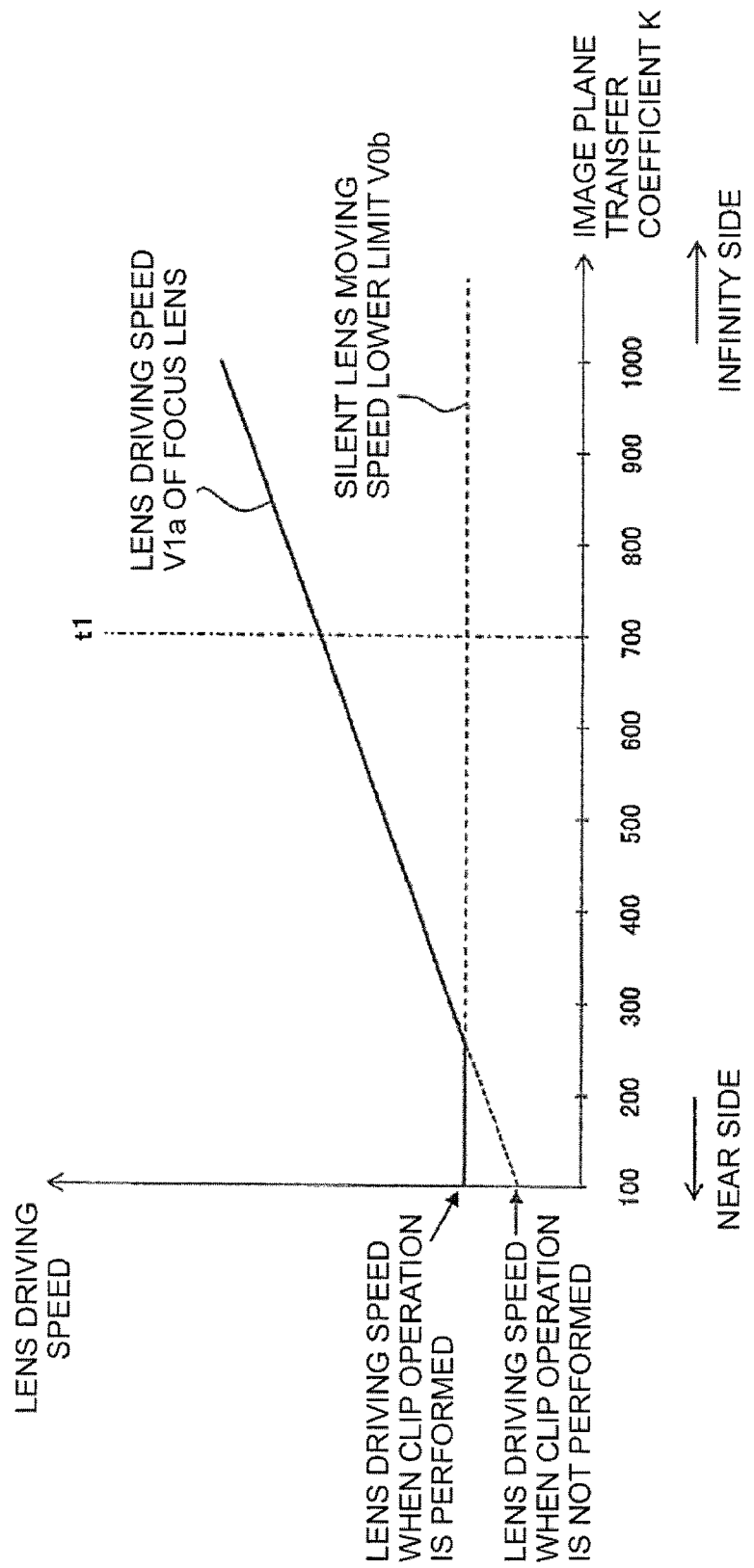
FIG. 13 is a diagram illustrating the relationship between a lens driving speed V1$a$ of the focus lens and a silent lens moving speed lower limit V0$b$.

Here, FIG. 13 is a graph illustrating the relationship between the lens driving speed V1a of the focus lens 33 and the silent lens moving speed lower limit V0b. In the graph, the vertical axis shows the lens driving speed, and the horizontal axis shows the image plane transfer coefficient K. As illustrated on the horizontal axis in FIG. 13, the image plane transfer coefficient K varies depending on the position of the focus lens 33. In the example illustrated in FIG. 13, the image plane transfer coefficient K tends to decrease toward the near side and to increase toward the infinity side. In contrast, in this embodiment, when a focus detection operation is performed, the focus lens 33 is driven at the speed at which the moving speed of the image plane is constant. Therefore, as illustrated in FIG. 13, the actual driving speed V1a of the focus lens 33 varies depending on the position of the focus lens 33. That is, in the example illustrated in FIG. 13, when the focus lens 33 is driven such that the moving speed of the image plane is constant, the lens moving speed V1a of the focus lens 33 is reduced toward the near side and increases toward the infinity side.

Figure 15:
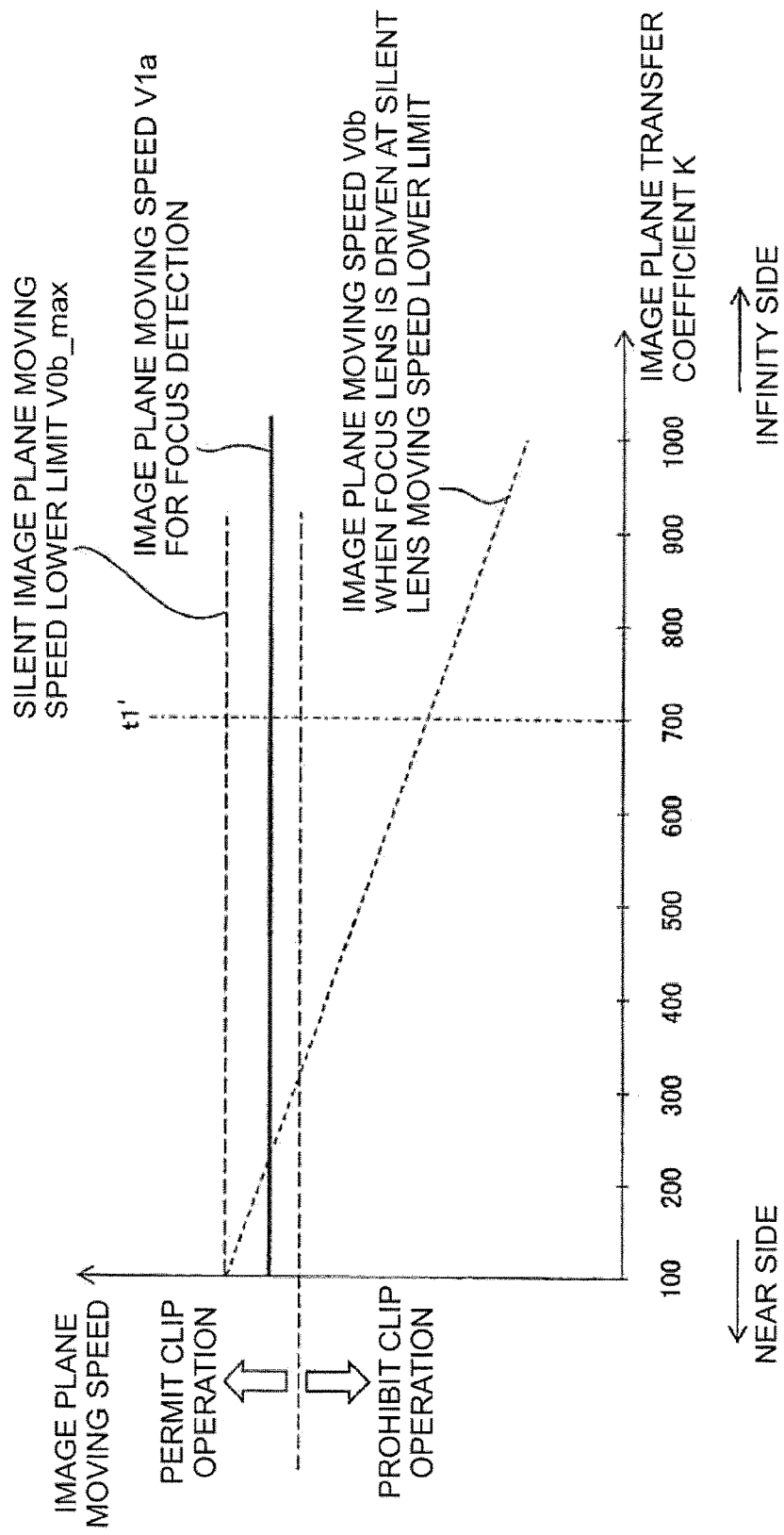
FIG. 15 is a diagram illustrating the relationship between an image plane moving speed V1$a$ of the focus lens and a silent image plane moving speed lower limit V0$b$_max.

On the other hand, when the focus lens 33 is driven as illustrated in FIG. 13, the moving speed of the image plane is constant as illustrated in FIG. 15. FIG. 15 is a graph for illustrating the relationship between the moving speed V1a of the image plane by the driving of the focus lens 33 and a silent image plane moving speed lower limit V0b_max. In the graph, the vertical axis shows the moving speed of the image plane and the horizontal axis shows the image plane transfer coefficient K. In FIGS. 13 and 15, the actual driving speed of the focus lens 33 and the moving speed of the image plane by the driving of the focus lens 33 are both represented by V1a. Therefore, V1a is variable when the vertical axis of the graph is the actual driving speed of the focus lens 33 (not parallel to the horizontal axis), as illustrated in FIG. 13, and is constant (parallel to the horizontal axis) when the vertical axis of the graph is the moving speed of the image plane, as illustrated in FIG. 15.

In the case in which the focus lens 33 is driven such that the moving speed of the image plane is constant, when the clip operation is not performed, in some cases, the lens driving speed V1a of the focus lens 33 can be less than the silent lens moving speed lower limit V0b as in the example illustrated in FIG. 13. For example, the lens moving speed V1a is less than the silent lens moving speed lower limit V0b at the position of the focus lens 33 where the minimum image plane transfer coefficient Kmm is obtained (in FIG. 13, the minimum image plane transfer coefficient $K_{min}$ is 100).

In particular, when the focal length of the lens barrel 3 is long or in a bright light environment, the lens moving speed V1a of the focus lens 33 is likely to be less than the silent lens moving speed lower limit V0b. In this case, the lens controller 37 performs the clip operation to limit the driving speed V1a of the focus lens 33 to the silent lens moving speed lower limit V0b (performs control such that the driving speed V1a is not less than the silent lens moving speed lower limit V0b), as illustrated in FIG. 13 (Step S304). Therefore, it is possible to suppress the driving sound of the focus lens 33.

Figure 14:
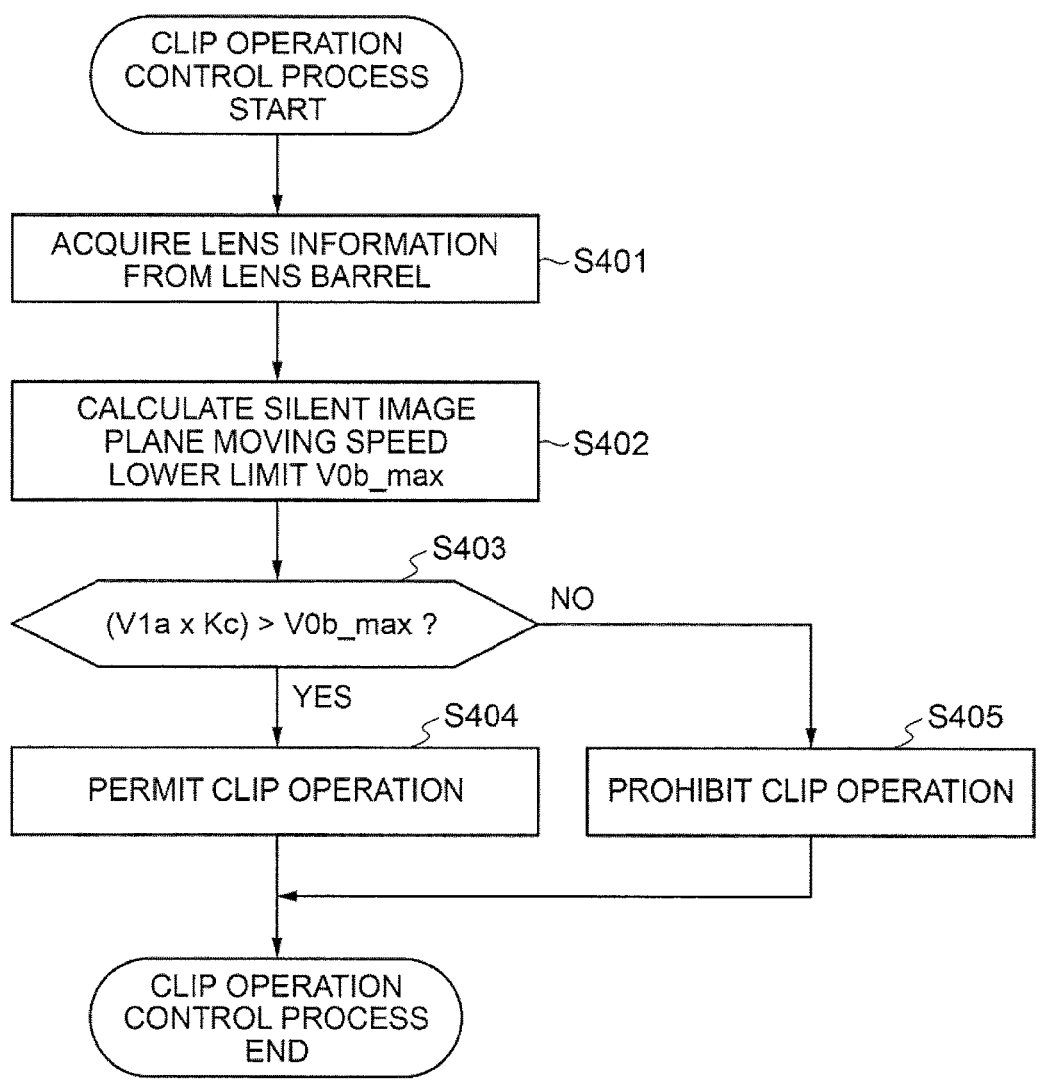
FIG. 14 is a flowchart illustrating a clip operation control process according to the fourth embodiment.

Next, a clip operation control process for determining whether to permit or prohibit the clip operation illustrated in FIG. 12 will be described with reference to FIG. 14. FIG. 14 is a flowchart illustrating the clip operation control process according to this embodiment. The clip operation control process which will be described below is performed by the camera body 2, for example, when the AF-F mode or the movie mode is set.

First, in Step S401, the camera controller 21 acquires the lens information. Specifically, the camera controller 21 acquires the current image plane transfer coefficient $K_{cur}$, the minimum image plane transfer coefficient $K_{min}$, the maximum image plane transfer coefficient $K_{max}$, and the silent lens moving speed lower limit V0b from the lens barrel 3 using hot-line communication.

Then, in Step S402, the camera controller 21 calculates the silent image plane moving speed lower limit V0b_max. The silent image plane moving speed lower limit V0b_max is the moving speed of the image plane when the focus lens 33 is driven at the silent lens moving speed lower limit V0b at the position of the focus lens 33 where the minimum image plane transfer coefficient $K_{min}$ is obtained. The silent image plane moving speed lower limit V0b_max will be described in detail below.

First, as illustrated in FIG. 13, whether a driving sound is generated by the driving of the focus lens 33 is determined by the actual driving speed of the focus lens 33. Therefore, as illustrated in FIG. 13, when the silent lens moving speed lower limit V0b is represented by the lens driving speed, it is constant. On the other hand, when the silent lens moving speed lower limit V0b is represented by the moving speed of the image plane, it is variable as illustrated in FIG. 15 since the image plane transfer coefficient K varies depending on the position of the focus lens 33, as described above. In FIGS. 13 and 15, the silent lens moving speed lower limit (the lower limit of the actual driving speed of the focus lens 33) and the moving speed of the image plane when the focus lens 33 is driven at the silent lens moving speed lower limit are both represented by V0b. Therefore, V0b is constant (parallel to the horizontal axis) when the vertical axis of the graph is the actual driving speed of the focus lens 33, as illustrated in FIG. 13, and is variable (not parallel to the horizontal axis) when the vertical axis of the graph is the moving speed of the image plane, as illustrated in FIG. 15.

In this embodiment, the silent image plane moving speed lower limit V0b_max is set as the moving speed of the image plane at which the moving speed of the focus lens 33 is the silent lens moving speed lower limit V0b at the position of the focus lens 33 (in the example illustrated in FIG. 15, the image plane transfer coefficient K is 100) where the minimum image plane transfer coefficient $K_{min}$ is obtained when the focus lens 33 is driven such that the moving speed of the image plane is constant. That is, in this embodiment, when the focus lens 33 is driven at the silent lens moving speed lower limit, the maximum moving speed of the image plane (in the example illustrated in FIG. 15, the moving speed of the image plane at an image plane transfer coefficient K of 100) is set as the silent image plane moving speed lower limit V0b_max.

As such, in this embodiment, the maximum moving speed of the image plane (the moving speed of the image plane at the lens position where the image plane transfer coefficient is the minimum) among the moving speeds of the image plane corresponding to the silent lens moving speed lower limit V0b which varies depending on the position of the focus lens 33 is calculated as the silent image plane moving speed lower limit V0b_max. For example, in the example illustrated in FIG. 15, since the minimum image plane transfer coefficient $K_{min}$ is "100", the moving speed of the image plane at the position of the focus lens 33 where the image plane transfer coefficient is "100" is calculated as the silent image plane moving speed lower limit V0b_max.

Specifically, the camera controller 21 calculates the silent image plane moving speed lower limit V0b_max (unit: mm/second) on the basis of the silent lens moving speed lower limit V0b (unit: pulse/second) and the minimum image plane transfer coefficient $K_{min}$ (unit: pulse/mm) as illustrated in the following expression:

Silent image plane moving speed lower limit
V0b_max=Silent lens moving speed lower limit
(the actual driving speed of the focus lens) V0b/
Minimum image plane transfer coefficient $K_{min}$.

As such, in this embodiment, the silent image plane moving speed lower limit V0b_max is calculated using the minimum image plane transfer coefficient $K_{min}$. Therefore, it is possible to calculate the silent image plane moving speed lower limit V0b_max at the time when the detection of the focus by AF-F or a moving image capture operation starts. For example, in the example illustrated in FIG. 15, when the detection of the focus by AF-F or the moving image capture operation starts at a time t1', the moving speed of the image plane at the position of the focus lens 33 where the image plane transfer coefficient K is "100" can be calculated as the silent image plane moving speed lower limit V0b_max at the time t1'.

Then, in Step S403, the camera controller 21 compares the image plane moving speed V1a for focus detection which is acquired in Step S401 with the silent image plane moving speed lower limit V0b_max calculated in Step S402. Specifically, the camera controller 21 determines whether the image plane moving speed V1a for focus detection (unit: mm/second) and the silent image plane moving speed lower limit V0b_max (unit: mm/second) satisfy the following expression:

(Image plane moving speed V1a for focus detection×
Kc)>Silent image plane moving speed lower
limit V0b_max.

In the above-mentioned expression, a coefficient Kc is a value equal to or greater than 1 (Kc≥1), which will be described in detail below.

When the above-mentioned expression is satisfied, the process proceeds to Step S404 and the camera controller 21 permits the clip operation illustrated in FIG. 12. That is, the driving speed V1a of the focus lens 33 is limited to the silent lens moving speed lower limit V0b in order to suppress the driving sound of the focus lens 33, as illustrated in FIG. 13 (search control is performed such that the driving speed V1a of the focus lens 33 is not less than the silent lens moving speed lower limit V0b).

On the other hand, when the above-mentioned expression is not satisfied, the process proceeds to Step S405 and the clip operation illustrated in FIG. 12 is prohibited. That is, the focus lens 33 is driven such that the image plane moving speed V1a capable of appropriately detecting the in-focus position is obtained, without limiting the driving speed V1a of the focus lens 33 to the silent lens moving speed lower limit V0b (the driving speed V1a of the focus lens 33 is permitted to be less than the silent lens moving speed lower limit V0b).

As illustrated in FIG. 13, when the clip operation is permitted and the driving speed of the focus lens 33 is limited to the silent lens moving speed lower limit V0b, the moving speed of the image plane increases at the lens position where the image plane transfer coefficient K is small. As a result, in some cases, the moving speed of the image plane is greater than a value capable of appropriately detecting the in-focus position and appropriate focusing accuracy may not be obtained. On the other hand, when the clip operation is prohibited and the focus lens 33 is driven such that the moving speed of the image plane reaches a value capable of appropriately detecting the in-focus position, in some cases, the driving speed V1a of the focus lens 33 is less than the silent lens moving speed lower limit V0b and a driving sound that is equal to or greater than a predetermined value may be generated, as illustrated in FIG. 13.

As such, when the image plane moving speed V1a for focus detection becomes less than the silent image plane moving speed lower limit V0b_max, there is the problem of whether to drive the focus lens 33 at a lens driving speed less than the silent lens moving speed lower limit V0b such that the image plane moving speed V1a capable of appropriately detecting the in-focus position is obtained or to drive the focus lens 33 at a lens driving speed equal to or greater than the silent lens moving speed lower limit V0b in order to suppress the driving sound of the focus lens 33.

In contrast, in this embodiment, when the above-mentioned expression is satisfied even though the focus lens 33 is driven at the silent lens moving speed lower limit V0b, the coefficient Kc of the above-mentioned expression is stored as one or more values capable of ensuring a certain degree of focus detection accuracy. Therefore, as illustrated in FIG. 15, when the above-mentioned expression is satisfied even though the image plane moving speed V1a for focus detection is less than the silent image plane moving speed lower limit V0b_max, the camera controller 21 determines that a certain degree of focus detection accuracy can be ensured, gives priority to the suppression of the driving sound of the focus lens 33, and permits the clip operation which drives the focus lens 33 at a lens driving speed less than the silent lens moving speed lower limit V0b.

In some cases, the clip operation is permitted when the value of the image plane moving speed V1a for focus detection×Kc (where Kc≥1) is equal to or less than the silent image plane moving speed lower limit V0b_max, and the image plane moving speed for focus detection is too high to ensure focus detection accuracy if the driving speed of the focus lens 33 is limited to the silent lens moving speed lower limit V0b. Therefore, when the above-mentioned expression is not satisfied, the camera controller 21 gives priority to focus detection accuracy and prohibits the clip operation illustrated in FIG. 12. Accordingly, when the focus is detected, the moving speed of the image plane can be set as the image plane moving speed V1a capable of appropriately detecting the in-focus position and it is possible to detect the focus with high accuracy.

When the aperture value is large (the diaphragm aperture is small), the depth of field becomes deep. Therefore, the sampling interval capable of appropriately detecting the in-focus position is large. As a result, it is possible to increase the image plane moving speed V1a capable of appropriately detecting the in-focus position. Therefore, when the image plane moving speed V1a capable of appropriately detecting the in-focus position is a fixed value, the camera controller 21 can set the coefficient Kc of the above-mentioned expression larger as the aperture value increases.

Similarly, when the size of an image, such as a live view image, is small (when the compression ratio of the image is high or when the thinning-out ratio of pixel data is high), high focus detection accuracy is not required. Therefore, it is possible to increase the coefficient Kc of the above-mentioned expression. In addition, when the pitch between the pixels of the imaging element 22 is large and so on, it is possible to increase the coefficient Kc of the above-mentioned expression.

Figure 16:
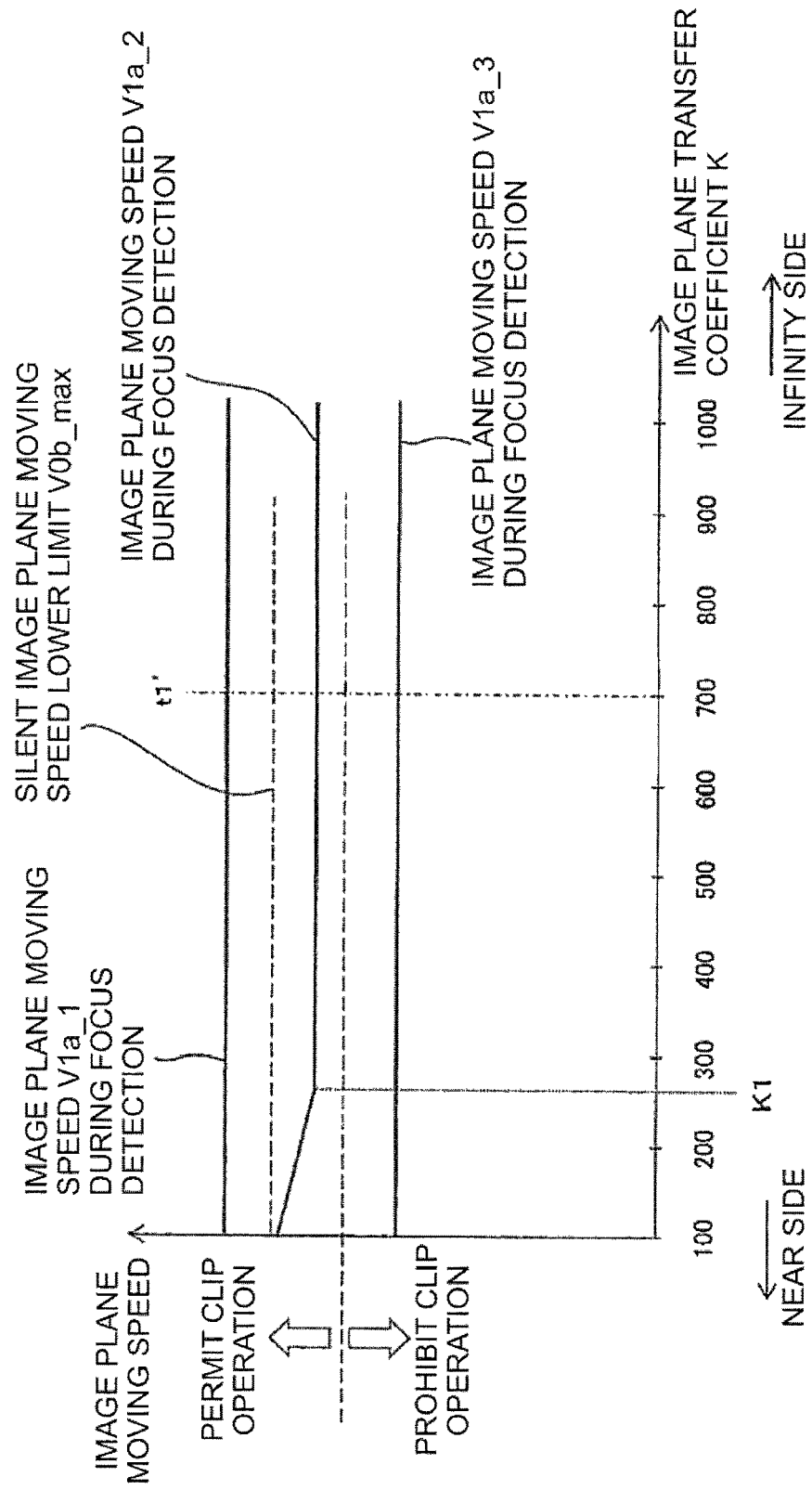
FIG. 16 is a diagram illustrating the relationship between the image plane moving speed V1$a$ during focus detection and the clip operation.
Figure 17:
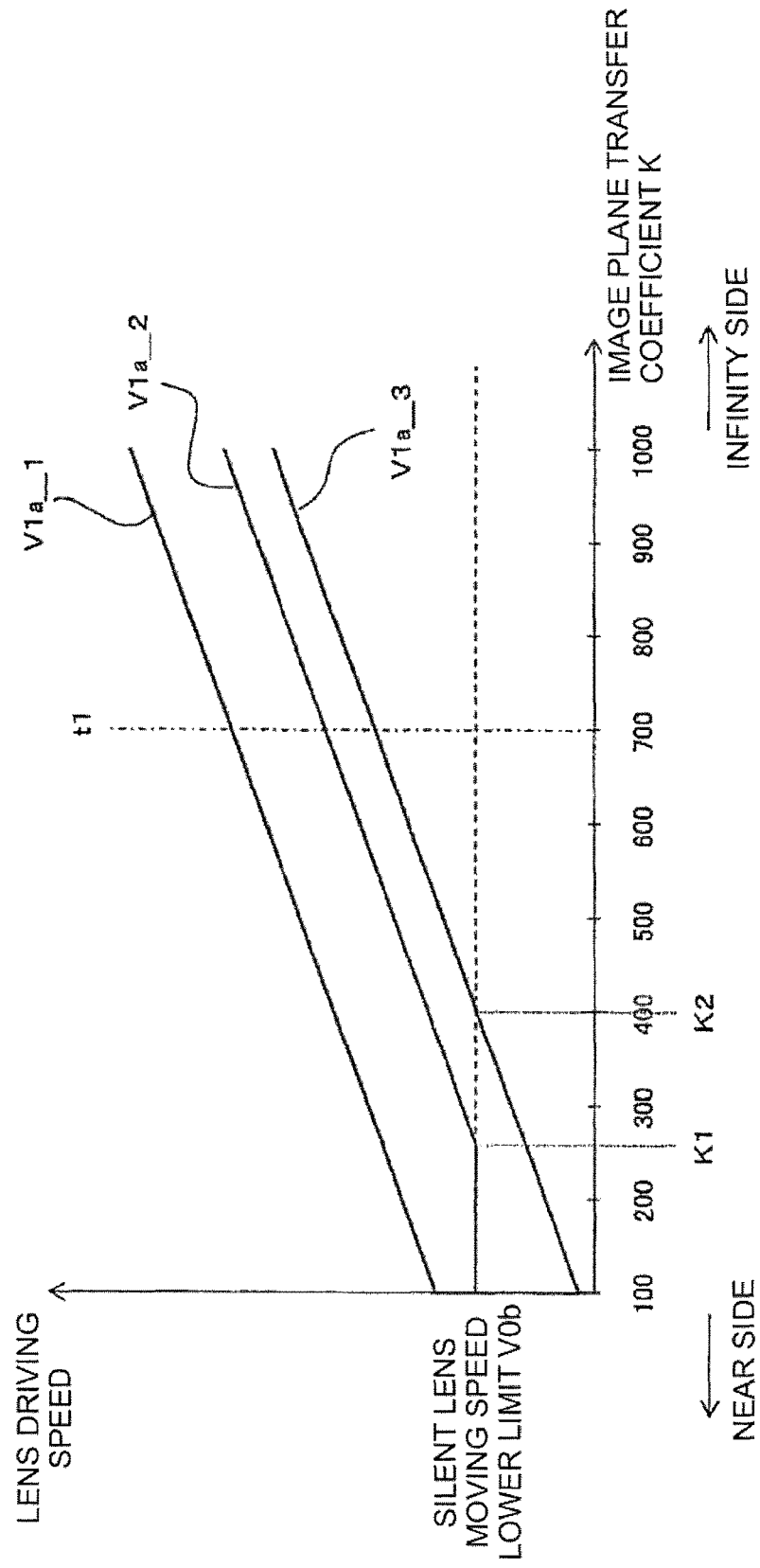
FIG. 17 is a diagram illustrating the relationship between the lens driving speed V1$a$ of the focus lens and the clip operation.

Next, the control of the clip operation will be described in detail with reference to FIGS. 16 and 17. FIG. 16 is a diagram illustrating the relationship between the image plane moving speed V1a during focus detection and the clip operation, and FIG. 17 is a diagram illustrating the relationship between the actual lens driving speed V1a of the focus lens 33 and the clip operation.

For example, as described above, in this embodiment, in some cases, when search control starts using the half-press of the release switch as a trigger and when search control starts using a condition other than the half-press of the release switch as a trigger, the moving speed of the image plane in the search control varies depending on, for example, the still image mode, the movie mode, the sports mode, the landscape mode, the focal length, the object distance, and the aperture value. FIG. 16 illustrates three different image plane moving speeds V1a_1, V1a_2, and V1a_3.

Specifically, the image plane moving speed V1a during focus detection illustrated in FIG. 16 is the maximum moving speed among the moving speeds of the image plane capable of appropriately detecting a focus state and is the moving speed of the image plane satisfying the above-mentioned expression. In addition, the image plane moving speed V1a_2 during focus detection is less than the image plane moving speed V1a_1 and is the moving speed of the image plane satisfying the above-mentioned expression at a time t1'. The image plane moving speed V1a_3 during focus detection is the moving speed of the image plane which does not satisfy the above-mentioned expression.

As such, in the example illustrated in FIG. 16, when the moving speed of the image plane during focus detection is V1a_1 and V1a_2, the clip operation illustrated in FIG. 16 is permitted because the moving speed of the image plane satisfies the above-mentioned expression at a time t1. On the other hand, when the moving speed of the image plane during focus detection is V1a_3, the clip operation illustrated in FIG. 12 is prohibited because the moving speed of the image plane does not satisfy the above-mentioned expression.

This point will be described in detail with reference to FIG. 17. FIG. 17 is a diagram in which the vertical axis of the graph illustrated in FIG. 16 is changed from the moving speed of the image plane to the lens driving speed. As described above, since the lens driving speed V1a_1 of the focus lens 33 satisfies the above-mentioned expression, the clip operation is permitted. However, as illustrated in FIG. 17, the lens driving speed V1a_1 is not less than the silent lens moving speed lower limit V0b even at the lens position where the minimum image plane transfer coefficient (K=100) is obtained. Therefore, actually, the clip operation is not performed.

Since the lens driving speed V1a_2 of the focus lens 33 satisfies the above-mentioned expression at the time t1' which is a focus detection start time, the clip operation is permitted. In the example illustrated in FIG. 17, when the focus lens 33 is driven at the lens driving speed V1a_2, the lens driving speed V1a_2 is less than the silent lens moving speed lower limit V0b at the lens position where the image plane transfer coefficient K is K1. Therefore, the lens driving speed V1a_2 of the focus lens 33 is limited to the silent lens moving speed lower limit V0b at the lens position where the image plane transfer coefficient K is less than K1.

That is, the clip operation is performed at the lens position where the lens driving speed V1a_2 of the focus lens 33 is less than the silent lens moving speed lower limit V0b. Then, the image plane moving speed V1a_2 during focus detection is different from the previous moving speed (search speed) of the image plane and search control for the focus evaluation value is performed at the moving speed of the image plane. That is, as illustrated in FIG. 16, the image plane moving speed V1a_2 during focus detection is different from the previous constant speed at the lens position where the image plane transfer coefficient is less than K1.

Since the lens driving speed V1a_3 of the focus lens 33 does not satisfy the above-mentioned expression, the clip operation is prohibited. Therefore, in the example illustrated in FIG. 17, when the focus lens 33 is driven at the lens driving speed V1a_3, the lens driving speed V1a_3 is less than the silent lens moving speed lower limit V0b at the lens position where the image plane transfer coefficient K is K2. The clip operation is not performed at the lens position where the image plane transfer coefficient K is less than K2. Even when the driving speed V1a_3 of the focus lens 33 is less than the silent lens moving speed lower limit V0b, the clip operation is not performed in order to appropriately detect the focus state.

As described above, in the fourth embodiment, among the moving speeds of the image plane when the focus lens 33 is driven at the silent lens moving speed lower limit V0b, the maximum moving speed of the image plane is calculated as the silent image plane moving speed lower limit V0b_max and the calculated silent image plane moving speed lower limit V0b_max is compared with the image plane moving speed V1a during focus detection. Then, in the case in which the value of the image plane moving speed V1a during focus detection×Kc (where Kc≥1) is greater than the silent image plane moving speed lower limit V0b_max, it is determined that focus detection accuracy that is equal to or greater than a predetermined value is obtained even though the focus lens 33 is driven at the silent lens moving speed lower limit V0b and the clip operation illustrated in FIG. 12 is permitted. Accordingly, in this embodiment, it is possible to suppress the driving sound of the focus lens 33 while ensuring focus detection accuracy.

In the case in which the value of the image plane moving speed V1a during focus detection×Kc (where Kc≥1) is equal to or less than the silent image plane moving speed lower limit V0b_max, when the driving speed V1a of the focus lens 33 is limited to the silent lens moving speed lower limit V0b, in some cases, appropriate focus detection accuracy may not be obtained. Therefore, in this embodiment, in this case, the clip operation illustrated in FIG. 12 is prohibited such that the moving speed of the image plane suitable for focus detection is obtained. As a result, in this embodiment, it is possible to appropriately detect the in-focus position when the focus is detected.

In this embodiment, the minimum image plane transfer coefficient $K_{min}$ is stored in the lens memory 38 of the lens barrel 3 in advance and the silent image plane moving speed lower limit V0b_max is calculated using the minimum image plane transfer coefficient $K_{min}$. Therefore, in this embodiment, for example, as illustrated in FIG. 10, it is possible to determine whether the value of the image plane moving speed V1a during focus detection×Kc (where Kc≥1) is greater than the silent image plane moving speed lower limit V0b_max at the time t1 when the capture of a moving image or the detection of the focus by the AF-F mode starts and thus to determine whether to perform the clip operation. As such, in this embodiment, it is not repeatedly determined whether to perform the clip operation, using the current position image plane transfer coefficient $K_{cur}$, but it is possible to determine whether to perform the clip operation at the initial time when the capture of a moving image or the detection of the focus by the AF-F mode starts, using the minimum image plane transfer coefficient $K_{min}$. Therefore, it is possible to reduce the processing load of the camera body 2.

In the above-described embodiment, the camera body 2 performs the clip operation control process illustrated in FIG. 12. However, the invention is not limited thereto. For example, the lens barrel 3 may perform the clip operation control process illustrated in FIG. 12.

In the above-described embodiment, as illustrated in the above-mentioned expression, the image plane transfer coefficient K is calculated as follows: Image plane transfer coefficient K=(Amount of driving of focus lens 33/Amount of movement of image plane). However, the invention is not limited thereto. For example, the image plane transfer coefficient K may be calculated as illustrated in the following expression:

Image plane transfer coefficient $K$=(Amount of movement of image plane/Amount of driving of focus lens 33).

In this case, the camera controller 21 can calculate the silent image plane moving speed lower limit V0b_max. That is, the camera controller 21 can calculate the silent image plane moving speed lower limit V0b_max (unit: mm/second) on the basis of the silent lens moving speed lower limit V0b (unit: pulse/second) and the maximum image plane transfer coefficient $K_{max}$ (unit: pulse/mm) indicating the maximum value among the image plane transfer coefficients K at each position (focal length) of the zoom lens 32, as illustrated in the following expression:

Silent image plane moving speed lower limit $V0b$_max=Silent lens moving speed lower limit $V0b$/Maximum image plane transfer coefficient $K_{max}$.

For example, when a value which is calculated by "the amount of movement of the image plane/the amount of driving of the focus lens 33" is used as the image plane transfer coefficient K, as the value (absolute value) increases, the amount of movement of the image plane when the focus lens is driven by a predetermined value (for example, 1 mm) increases. When a value which is calculated by "the amount of driving of the focus lens 33/the amount of movement of the image plane" is used as the image plane transfer coefficient K, as the value (absolute value) increases, the amount of movement of the image plane when the focus lens is driven by a predetermined value (for example, 1 mm) decreases.

In addition to the above-described embodiment, the following structure may be used: when a silent mode in which the driving sound of the focus lens 33 is suppressed is set, the clip operation and the clip operation control process mentioned above are performed; and when the silent mode is not set, the clip operation and the clip operation control process mentioned above are not performed. In addition, the following structure may be used: when the silent mode is set, priority is given to the suppression of the driving sound of the focus lens 33, the clip operation control process illustrated in FIG. 14 is not performed, and the clip operation illustrated in FIG. 12 is always performed.

In the above-described embodiment, the image plane transfer coefficient K=(the amount of driving of the focus lens 33/the amount of movement of the image plane) is established. However, the invention is not limited thereto. For example, when the image plane transfer coefficient K is defined as the image plane transfer coefficient K=(the amount of movement of the image plane/the amount of driving of the focus lens 33), it is possible to control, for example, the clip operation, using the maximum image plane transfer coefficient $K_{max}$, similarly to the above-described embodiment.

«Fifth Embodiment»

Next, a fifth embodiment of the invention will be described. The fifth embodiment has the same structure as the first embodiment except for the following points. FIG. 18 shows a table indicating the relationship among the position (focal length) of the zoom lens 32, the position (object distance) of the focus lens 33, and the image plane transfer coefficient K in the fifth embodiment.

That is, in the fifth embodiment, areas "D0", "X1", and "X2" which are closer to the near side than the area "D1" that is closest to the near side in FIG. 3 are provided. Similarly, areas "D10", "X3", and "X4" which are closer to the infinity side than the area "D9" that is closest to the infinity side in FIG. 3 are provided. Next, first, the areas "D0", "X1", and "X2" close to the near side and the areas "D10", "X3", and "X4" close to the infinity side will be described.

Figure 19:
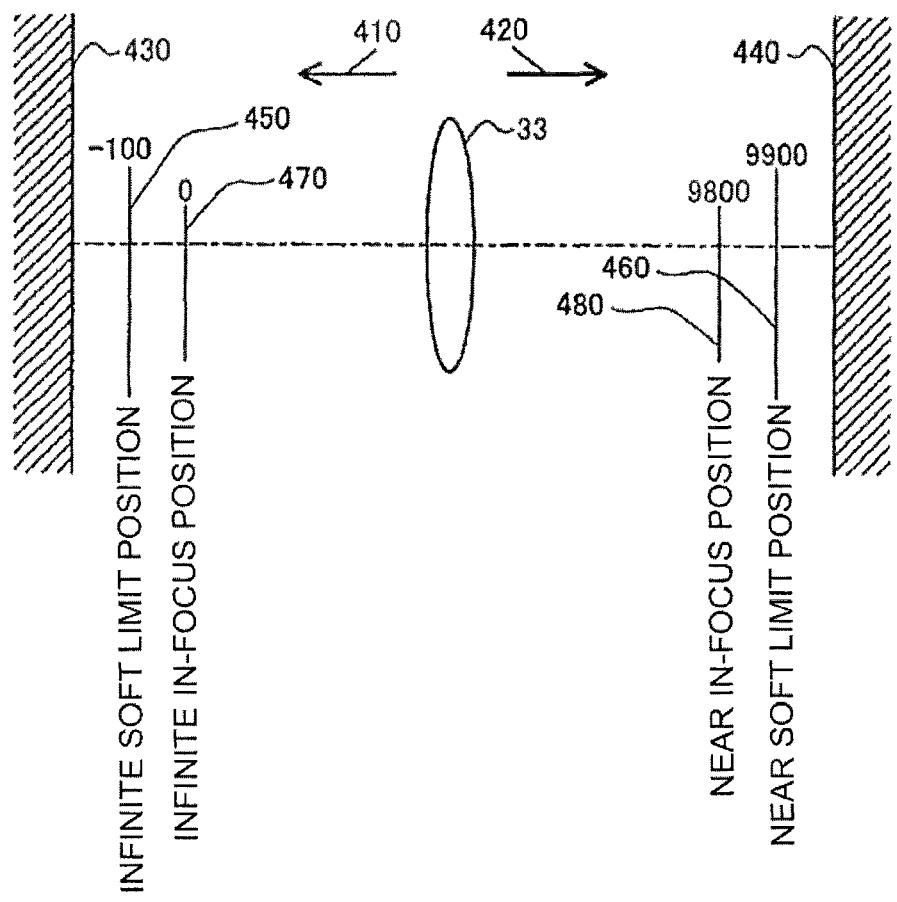
FIG. 19 is a diagram illustrating a driving range of the focus lens 33.

As illustrated in FIG. 19, in this embodiment, the focus lens 33 is configured so as to be movable in an infinity direction 410 and a near direction 420 on an optical axis L1 which is represented by a one-dot chain line in FIG. 18. Stoppers (not illustrated) are provided at a mechanical end point 430 in the infinity direction 410 and a mechanical end point 440 in the near direction 420 and restrict the movement of the focus lens 33. That is, the focus lens 33 is configured so as to be movable from the mechanical end point 430 in the infinity direction 410 to the mechanical end point 440 in the near direction 420.

However, the range in which the lens controller 37 actually drives the focus lens 33 is narrower than the range from the mechanical end point 430 to the mechanical end point 440. The movement range will be described in detail. The lens controller 37 drives the focus lens 33 in the range from an infinite soft limit position 450 which is provided inside the mechanical end point 430 in the infinity direction 410 to a near soft limit position 460 which is provided inside the mechanical end point 440 in the near direction 420. That is, a lens driver 212 drives the focus lens 33 between the near soft limit position 460 corresponding to a near-side driving limit position and the infinite soft limit position 450 corresponding to an infinity-side driving limit position.

The infinite soft limit position 450 is provided outside an infinite in-focus position 470. The infinite in-focus position 470 is the position of the focus lens 33 corresponding to a position which is closest to the infinity side and where the imaging optical system including the lenses 31, 32, 33, 34, and 35 and the diaphragm 36 can be focused. The reason why the infinite soft limit position 450 is provided at that position is that, when the focus is detected by a contrast detection method, the peak of the focus evaluation value may be present at the infinite in-focus position 470. That is, when the infinite in-focus position 470 is aligned with the infinite soft limit position 450, it is difficult to recognize the peak of the focus evaluation value which is present at the infinite in-focus position 470. In order to solve the program, the infinite soft limit position 450 is provided outside the infinite in-focus position 470. Similarly, the near soft limit position 460 is provided outside a near in-focus position 480. The near in-focus position 480 is the position of the focus lens 33 corresponding to a position which is closest to the near side and where the imaging optical system including the lenses 31, 32, 33, 34, and 35 and the diaphragm 36 can be focused.

In FIG. 18, the area "D0" is a position corresponding to the near soft limit position 460, and the areas "X1" and "X2" are areas which are closer to the near side than the near soft limit position, for example, a position corresponding to the mechanical end point 440 in the near direction 420 and a position between the near soft limit position and the end point 440. In FIG. 18, the area "D10" is a position corresponding to the infinite soft limit position 450 and the areas "X3" and "X4" are areas which are closer to the infinity side than the infinite soft limit position, for example, a position corresponding to the mechanical end point 430 of the infinity direction 410 and a position between the infinite soft limit position and the end point 430.

In this embodiment, image plane transfer coefficients "K10", "K20", ..., "K90" in the area "D0" corresponding to the near soft limit position 460 among these areas can be set as the minimum image plane transfer coefficient $K_{min}$. Similarly, image plane transfer coefficients "K110", "K210", ..., "K910" in the area "D10" corresponding to the infinite soft limit position 450 can be set as the maximum image plane transfer coefficient $K_{max}$.

In this embodiment, the values of image plane transfer coefficients "α11", "α21", ..., "α91" in the area "X1" are less than the values of the image plane transfer coefficients "K10", "K20", ..., "K90" in the area "D0". Similarly, the values of image plane transfer coefficients "α12", "α22", ..., "α92" in the area "X2" are less than the values of the image plane transfer coefficients "K10", "K20", ..., "K90" in the area "D0". The values of image plane transfer coefficients "α13", "α23", ..., "α93" in the area "X3" are greater than the values of the image plane transfer coefficients "K110", "K210", ..., "K910" in the area "D10". The values of image plane transfer coefficients "α14", "α24", ..., "α94" in the area "X4" are greater than the values of the image plane transfer coefficients "K110", "K210", ..., "K910" in the area "D10".

In this embodiment, the image plane transfer coefficient K ("K10", "K20", ..., "K90") in the area "D0" is set as the minimum image plane transfer coefficient $K_{min}$ and the image plane transfer coefficient K ("K110", "K210", ..., "K910") in the area "D10" is set as the maximum image plane transfer coefficient $K_{max}$. In particular, the areas "X1", "X2", "X3", and "X4" are areas where the focus lens 33 is not driven or there is little necessity to drive the focus lens 33 due to, for example, aberration or a mechanical mechanism. Therefore, even if the image plane transfer coefficients "α11", "α21", ..., "α94" corresponding to the areas "X1", "X2", "X3", and "X4" are set as the minimum image plane transfer coefficient $K_{min}$ or the maximum image plane transfer coefficient $K_{max}$, they do not contribute to appropriate automatic focus control (for example, the speed control, silent control, backlash reduction control of the focus lens).

In this embodiment, the image plane transfer coefficient in the area "D0" corresponding to the near soft limit position 460 is set as the minimum image plane transfer coefficient $K_{min}$ and the image plane transfer coefficient in the area "D10" corresponding to the infinite soft limit position 450 is set as the maximum image plane transfer coefficient $K_{max}$. However, the invention is not limited thereto.

For example, even when the image plane transfer coefficients corresponding to the areas "X1" and "X2" which are closer to the near side than the near soft limit position and the image plane transfer coefficients corresponding to the areas "X3" and "X4" which are closer to the infinity side than the infinite soft limit position are stored in the lens memory 38, the minimum image plane transfer coefficient among the image plane transfer coefficients corresponding to the position of the focus lens included in a contrast AF search range (scanning range) may be set as the minimum image plane transfer coefficient $K_{min}$ and the maximum image plane transfer coefficient among the image plane transfer coefficients corresponding to the position of the focus lens included in the contrast AF search range (scanning range) may be set as the maximum image plane transfer coefficient $K_{max}$. In addition, the image plane transfer coefficient corresponding to the near in-focus position 480 may be set as the minimum image plane transfer coefficient $K_{min}$ and the image plane transfer coefficient corresponding to the infinite in-focus position 470 may be set as the maximum image plane transfer coefficient $K_{max}$.

Alternatively, in this embodiment, the image plane transfer coefficient K may be set such that the image plane transfer coefficient K is the minimum when the focus lens 33 is driven to the vicinity of the near soft limit position 460. That is, the image plane transfer coefficient K may be set such that the image plane transfer coefficient K is the minimum when the focus lens 33 is driven to the vicinity of the near soft limit position 460 rather than when the focus lens 33 is moved to any position in the range from the near soft limit position 460 to the infinite soft limit position 450.

Similarly, the image plane transfer coefficient K may be set such that the image plane transfer coefficient K is the maximum when the focus lens 33 is driven to the vicinity of the infinite soft limit position 450. That is, the image plane transfer coefficient K may be set such that the image plane transfer coefficient K is the maximum when the focus lens 33 is driven to the vicinity of the near infinite soft limit position 450 rather than when the focus lens 33 is moved to any position in the range from the near soft limit position 460 to the infinite soft limit position 450.

«Sixth Embodiment»

Next, a sixth embodiment of the invention will be described. The sixth embodiment has the same structure as the first embodiment except for the following points. That is, in the first embodiment, in the camera 1 illustrated in FIG. 1, the minimum image plane transfer coefficient $K_{min}$ and the maximum image plane transfer coefficient $K_{max}$ are stored in the lens memory 38 of the lens barrel 3. The minimum image plane transfer coefficient $K_{min}$ and the maximum image plane transfer coefficient $K_{max}$ are transmitted to the camera body 2. In contrast, in the sixth embodiment, the lens controller 37 corrects the minimum image plane transfer coefficient $K_{min}$ and the maximum image plane transfer coefficient $K_{max}$ stored in the lens memory 38 according to the temperature and transmits the corrected minimum image plane transfer coefficient $K_{min}$ and the corrected maximum image plane transfer coefficient $K_{max}$ to the camera body 2.

FIG. 20 is a diagram illustrating a method for correcting the minimum image plane transfer coefficient $K_{min}$ according to the temperature. In this embodiment, the lens barrel 3 includes a temperature sensor (not illustrated) and corrects the minimum image plane transfer coefficient $K_{min}$ according to the temperature detected by the temperature sensor, as illustrated in FIG. 20. That is, in this embodiment, the minimum image plane transfer coefficient $K_{min}$ stored in the lens memory 38 is the minimum image plane transfer coefficient $K_{min}$ at room temperature (25° C.). For example, as illustrated in FIG. 20, when the minimum image plane transfer coefficient $K_{min}$ stored in the lens memory 38 is "100" and the temperature of the lens barrel detected by the temperature sensor is the room temperature (25° C.), the lens controller 37 transmits a minimum image plane transfer coefficient $K_{min}$ of "100" to the camera body 2. On the other hand, when the temperature of the lens barrel detected by the temperature sensor is 50° C., the lens controller 37 corrects a minimum image plane transfer coefficient $K_{min}$ of "100" stored in the lens memory 38 and transmits a minimum image plane transfer coefficient $K_{min}$ of "102" to the camera body 2. Similarly, when the temperature of the lens barrel 3 detected by the temperature sensor is 80° C., the lens controller 37 corrects a minimum image plane transfer coefficient $K_{min}$ of "100" stored in the lens memory 38 and transmits a minimum image plane transfer coefficient $K_{min}$ of "104" to the camera body 2.

The minimum image plane transfer coefficient $K_{min}$ has been described above. The maximum image plane transfer coefficient $K_{max}$ can be corrected according to the temperature of the lens barrel 3, similarly to the minimum image plane transfer coefficient $K_{min}$.

According to the sixth embodiment, the minimum image plane transfer coefficient $K_{min}$ which varies depending on the temperature of the lens barrel 3 is transmitted to the camera body 2. Therefore, even when the temperature of the lens barrel 3 changes, it is possible to obtain the function and effect of achieving appropriate automatic focus control (for example, the speed control, silent control, and backlash reduction control of the focus lens), using the minimum image plane transfer coefficient $K_{min}$ which varies depending on the temperature of the lens barrel 3.

«Seventh Embodiment»

Next, a seventh embodiment of the invention will be described. The seventh embodiment has the same structure as the first embodiment except for the following points. That is, in the seventh embodiment, the lens controller 37 corrects the minimum image plane transfer coefficient $K_{min}$ and the maximum image plane transfer coefficient $K_{max}$ stored in the lens memory 38 according to the driving time of the lens barrel 3 and transmits the corrected minimum image plane transfer coefficient $K_{min}$ and the corrected maximum image plane transfer coefficient $K_{max}$ to the camera body 2.

FIG. 21 is a diagram illustrating a method for correcting the minimum image plane transfer coefficient $K_{min}$ according to the driving time of the lens barrel 3. In this embodiment, the lens barrel 3 includes a timer (not illustrated) and the minimum image plane transfer coefficient $K_{min}$ is corrected according to the driving time of the lens barrel 3 measured by the timer, as illustrated in FIG. 21. In general, when the lens barrel 3 is driven for a long time, the temperature of the lens barrel 3 increases due to heat generated from, for example, a motor for driving the lens barrel 3. As a result, the temperature of the lens barrel increases according to the driving time of the lens barrel 3 (for example, an imaging time or the time for which the camera is turned on). Therefore, in the seventh embodiment, the minimum image plane transfer coefficient $K_{min}$ is corrected according to the driving time of the lens barrel 3.

For example, in FIG. 21, when the minimum image plane transfer coefficient $K_{min}$ stored in the lens memory 38 is "100" and the driving time of the lens barrel 3 measured by the time provided in the lens barrel 3 is less than one hour, the lens controller 37 transmits a minimum image plane transfer coefficient $K_{min}$ of "100" to the camera body 2. On the other hand, when the driving time of the lens barrel 3 measured by the time provided in the lens barrel 3 is equal to or more than one hour and less than two hours, the lens controller 37 corrects a minimum image plane transfer coefficient $K_{min}$ of "100" stored in the lens memory 38 and transmits a minimum image plane transfer coefficient $K_{min}$ of "102" to the camera body 2. Similarly, when the driving time of the lens barrel 3 measured by the time provided in the lens barrel 3 is equal to or more than two hours and less than three hours, the lens controller 37 corrects a minimum image plane transfer coefficient $K_{min}$ of "100" stored in the lens memory 38 and transmits a minimum image plane transfer coefficient $K_{min}$ of "104" to the camera body 2.

The minimum image plane transfer coefficient $K_{min}$ has been described above. The maximum image plane transfer coefficient $K_{max}$ can be corrected according to the driving time of the lens barrel 3, similarly to the minimum image plane transfer coefficient $K_{min}$.

According to the seventh embodiment, the temperature of the lens barrel 3 is detected by the driving time of the lens barrel 3 and the minimum image plane transfer coefficient $K_{min}$ which varies depending on the temperature of the lens barrel 3 is transmitted to the camera body 2.

Therefore, even when the temperature of the lens barrel changes, it is possible to obtain the function and effect of achieving appropriate automatic focus control (for example, the speed control, silent control, and backlash reduction control of the focus lens), using the minimum image plane transfer coefficient $K_{min}$ which varies depending on the temperature of the lens barrel 3.

«Eighth Embodiment»

Next, an eighth embodiment of the invention will be described. The eighth embodiment has the same structure as the first embodiment except for the following points. That is, in the first embodiment, in the camera 1 illustrated in FIG. 1, the minimum image plane transfer coefficient $K_{min}$ and the maximum image plane transfer coefficient $K_{max}$ are stored in the lens memory 38 of the lens barrel 3. The minimum image plane transfer coefficient $K_{min}$ and the maximum image plane transfer coefficient $K_{max}$ are transmitted to the camera body 2. In contrast, in the eighth embodiment, the lens controller 37 performs a predetermined operation for the current position image plane transfer coefficient $K_{cur}$ to calculate a maximum predetermined coefficient $K0_{max}$ and a minimum predetermined coefficient $K0_{min}$ and transmits the maximum predetermined coefficient $K0_{max}$ and the minimum predetermined coefficient $K0_{min}$ to the camera body 2, instead of the maximum image plane transfer coefficient $K_{max}$ and the minimum image plane transfer coefficient $K_{min}$. The reason therefor is that the camera body 2 performs control (for example, the speed control, silent control, and backlash reduction control of the focus lens) that is most suitable for the lens position of the focus lens 33.

FIG. 22 is a diagram illustrating the maximum predetermined coefficient $K0_{max}$ and the minimum predetermined coefficient $K0_{min}$. As illustrated in FIG. 22, when the focus lens 33 is changed from the near side position "D1" to the infinity-side position "D9", the current position image plane transfer coefficient $K_{cur}$ changes to 100, 120, . . . , 600.

In the eighth embodiment, as illustrated in Example A of FIG. 22, a predetermined value can be added to the current position image plane transfer coefficient $K_{cur}$ to calculate the minimum predetermined coefficient $K0_{min}$. In Example A of FIG. 22, the lens controller 37 calculates the minimum predetermined coefficient $K0_{min}$ using, for example, an arithmetic expression (the minimum predetermined coefficient $K0_{min}$=the current position image plane transfer coefficient $K_{cur}$+20), and transmits the minimum predetermined coefficient $K0_{min}$ to the camera body 2. The maximum image plane transfer coefficient $K_{max}$ can be calculated by addition, similarly to the minimum predetermined coefficient $K0_{min}$.

Alternatively, as illustrated in Example B of FIG. 22, a predetermined value can be subtracted from the current position image plane transfer coefficient $K_{cur}$ to calculate the minimum predetermined coefficient $K0_{min}$. In Example B of FIG. 22, the lens controller 37 calculates the minimum predetermined coefficient $K0_{min}$, using, for example, an arithmetic expression (the minimum predetermined coefficient $K0_{min}$=the current position image plane transfer coefficient $K_{cur}$−20) and transmits the minimum predetermined coefficient $K0_{min}$ to the camera body 2. The maximum image plane transfer coefficient $K_{max}$ can be calculated by subtraction, similarly to the minimum predetermined coefficient $K0_{min}$.

As illustrated in Example C of FIG. 22, a predetermined value is added to or subtracted from the current position image plane transfer coefficient $K_{cur}$ according to the movement direction of the focus lens 33 to calculate the minimum predetermined coefficient $K0_{min}$. In Expression C of FIG. 22, when the focus lens 33 is moved to the infinity side, the lens controller 37 calculates the minimum predetermined coefficient $K0_{min}$, using an arithmetic expression (the minimum predetermined coefficient $K0_{min}$=the current position image plane transfer coefficient $K_{cur}$+20), and transmits the minimum predetermined coefficient $K0_{min}$ to the camera body 2. On the other hand, when the focus lens 33 is moved to the near side, the lens controller 37 calculates the minimum predetermined coefficient $K0_{min}$, using an arithmetic expression (the minimum predetermined coefficient $K0_{min}$=the current position image plane transfer coefficient $K_{cur}$−20), and transmits the minimum predetermined coefficient $K0_{min}$ to the camera body 2. The maximum image plane transfer coefficient $K_{max}$ can be calculated by addition or subtraction, similarly to the minimum predetermined coefficient $K0_{min}$.

As illustrated in Example D of FIG. 22, the current position image plane transfer coefficient $K_{cur}$ is multiplied by a predetermined value to calculate the minimum predetermined coefficient $K0_{min}$. In Example D of FIG. 22, the lens controller 37 calculates the minimum predetermined coefficient $K0_{min}$, using an arithmetic expression (the minimum predetermined coefficient $K0_{min}$=the current position image plane transfer coefficient $K_{cur}$×1.1), and transmits the minimum predetermined coefficient $K0_{min}$ to the camera body 2. The maximum image plane transfer coefficient $K_{max}$ can be calculated by multiplication, similarly to the minimum predetermined coefficient $K0_{min}$.

In Examples A to D illustrated in FIG. 22, it is possible to determine whether backlash reduction is required, on the basis of a second coefficient (minimum predetermined coefficient $K0_{min}$) in the vicinity of a first coefficient (minimum predetermined coefficient $K0_{min}$). For example, in Example A, when the position of the focus lens is in the area D9, it is possible to determine whether backlash reduction is required on the basis of a second coefficient (minimum predetermined coefficient $K0_{min}$) "620" in the vicinity of a first coefficient (minimum predetermined coefficient $K0_{min}$) "600". Therefore, for example, in the mode in which only the vicinity of the area D9 is searched (the mode in which the entire range of the soft limit is not searched, but only a portion within the soft limit is searched), it is possible to determine whether backlash reduction is required on the basis of an image plane transfer coefficient that is close to the image plane transfer coefficient at the in-focus position.

«Ninth Embodiment»

Next, a ninth embodiment of the invention will be described. The ninth embodiment has the same structure as the first embodiment except for the following points. That is, in the first embodiment, in the camera 1 illustrated in FIG. 1, the minimum image plane transfer coefficient $K_{min}$ and the maximum image plane transfer coefficient $K_{max}$ are stored in the lens memory 38 of the lens barrel 3. The minimum image plane transfer coefficient $K_{max}$ and the maximum image plane transfer coefficient $K_{max}$ are transmitted to the camera body 2. In contrast, in the ninth embodiment, correction coefficients K6 and K7 are stored in the lens memory 38 of the lens barrel 3 and the lens controller 37 corrects the minimum image plane transfer coefficient $K_{min}$ and the maximum image plane transfer coefficient $K_{max}$ using the correction coefficients K6 and K7 stored in the lens memory 38 and transmits the corrected minimum image plane transfer coefficient $K_{min}$ and the corrected maximum image plane transfer coefficient $K_{max}$ to the camera body 2.

Figure 23:
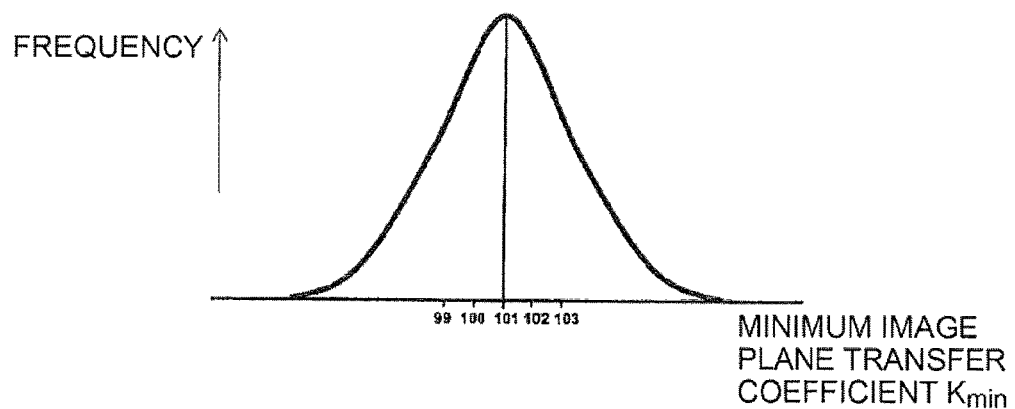
FIG. 23 is a diagram illustrating an example of the manufacturing variation of the lens barrel 3.

FIG. 23 is a diagram illustrating an example of the manufacture variation of the lens barrel 3. For example, in this embodiment, in the lens barrel 3, in the design stage of the optical system and the mechanical mechanism, the minimum image plane transfer coefficient $K_{min}$ is set to "100" and a minimum image plane transfer coefficient $K_{min}$ of "100" is stored in the lens memory 38. However, in the mass production process of the lens barrel 3, a manufacture variation occurs due to, for example, manufacturing errors during mass production and the minimum image plane transfer coefficient $K_{min}$ has the normal distribution illustrated in FIG. 23.

Therefore, in this embodiment, a correction coefficient K6 of "+1" is calculated from the normal distribution of the minimum image plane transfer coefficient $K_{min}$ in the mass production process of the lens barrel 3 and "+1" is stored as the correction coefficient K6 in the lens memory 38 of the lens barrel 3. Then, the lens controller 37 corrects the minimum image plane transfer coefficient $K_{min}$ (100+1=101), using the minimum image plane transfer coefficient $K_{min}$ ("100") and the correction coefficient K6 ("+1") stored in the lens memory 38, and transmits the corrected minimum image plane transfer coefficient $K_{min}$ ("101") to the camera body 2.

For example, in the design stage of the optical system and the mechanical mechanism, the maximum image plane transfer coefficient $K_{max}$ is set to "1000" and a maximum image plane transfer coefficient $K_{max}$ of "1000" is stored in the lens memory 38. The maximum image plane transfer coefficient $K_{max}$ in the mass production process is distributed according to the normal distribution. When the mean of the maximum image plane transfer coefficient $K_{max}$ which is distributed according to the normal distribution is "990", "−10" is stored as the correction coefficient K7 in the lens memory 38 of the lens barrel 3. The lens controller 37 corrects the maximum image plane transfer coefficient $K_{max}$ (1000−10=990), using the maximum image plane transfer coefficient $K_{max}$ ("1000") and the correction coefficient K7 ("−10") stored in the lens memory 38, and transmits the corrected maximum image plane transfer coefficient $K_{max}$ ("990") to the camera body 2.

A minimum image plane transfer coefficient $K_{min}$ of "100", a maximum image plane transfer coefficient $K_{max}$ of "1000", a correction coefficient K6 of "+1", a correction coefficient K7 of "−10" are illustrative and may be set to arbitrary values. Furthermore, the correction of the minimum image plane transfer coefficient $K_{min}$ and the maximum image plane transfer coefficient $K_{max}$ are not limited to addition and subtraction, and a combination of various operations such as multiplication and division can be applied for the correction.

«Tenth Embodiment»

Next, a tenth embodiment of the invention will be described. The tenth embodiment has the same structure as the third embodiment except for the following points. That is, the tenth embodiment has the same structure as the third embodiment except that a correction coefficient K8 is stored in the lens memory 38 of the lens barrel 3 and the lens controller 37 corrects the minimum image plane transfer coefficient $K_{min}$ using the correction coefficient K8 stored in the lens memory 38 and transmits the corrected minimum image plane transfer coefficient $K_{min}$ to the camera body 2. The lens controller 37 and the camera controller 21 perform backlash reduction control using the corrected minimum image plane transfer coefficient $K_{min}$.

Figure 11:
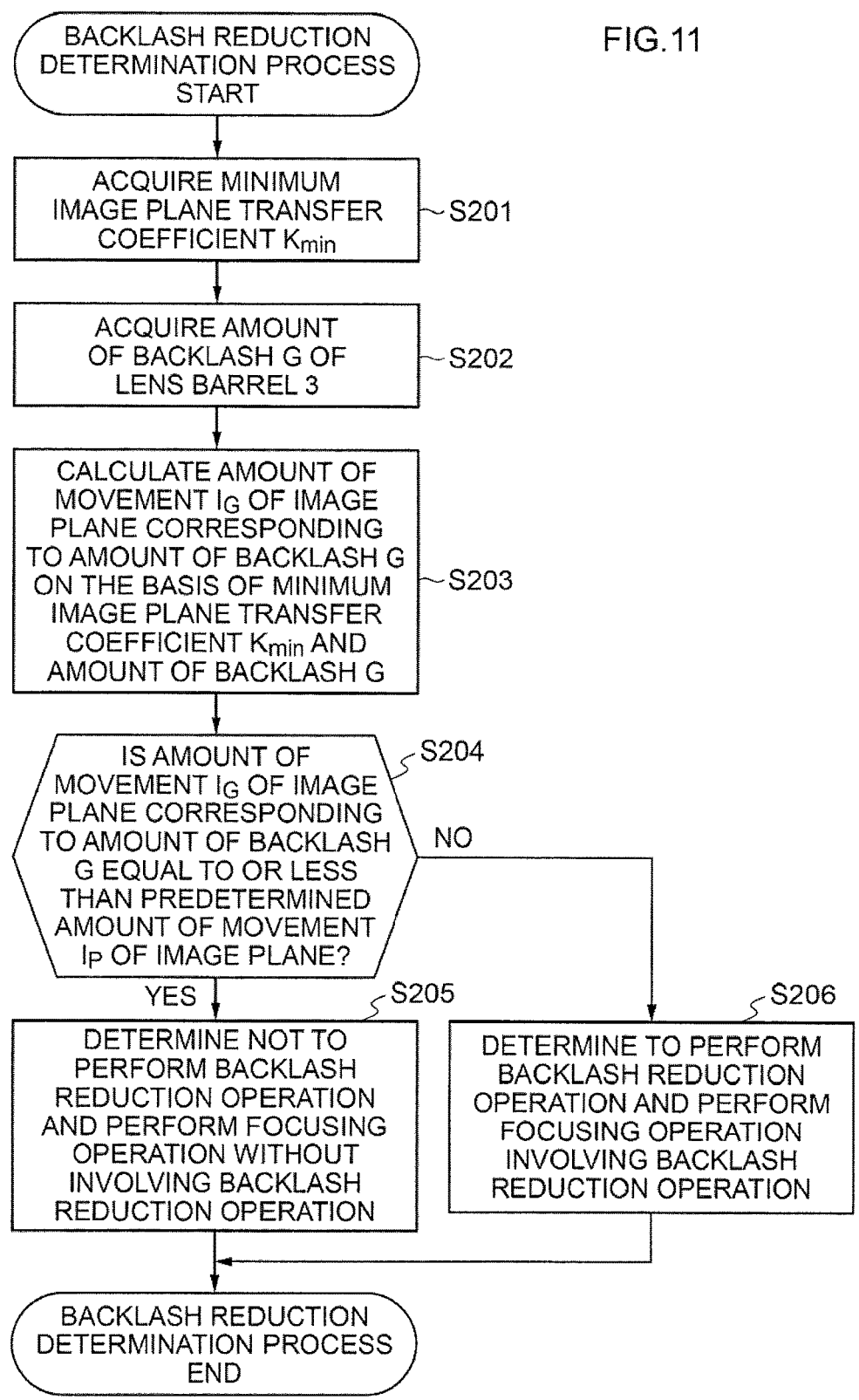
FIG. 11 is a flowchart illustrating an operation according to a third embodiment.

That is, as described above, in the third embodiment, the lens controller 37 transmits the minimum image plane transfer coefficient $K_{min}$ and the amount of backlash G to the camera controller 21 (see Steps S201 and S202 in FIG. 11). The camera controller 21 calculates the amount of movement IG of the image plane, using the minimum image plane transfer coefficient $K_{min}$ and the amount of backlash G. When "the amount of movement IG of the image plane"≤"a predetermined amount of movement IP of the image plane" is established, the camera controller 21 determines that backlash reduction is "not required" and performs control such that backlash reduction is not performed during the focusing operation. When "the amount of movement IG of the image plane">"a predetermined amount of movement IP of the image plane" is established, the camera controller 21 determines that backlash reduction is "required" and performs control such that backlash reduction is performed during the focusing operation.

However, when a variation in the minimum image plane transfer coefficient $K_{min}$ occurs due to, for example, manufacturing errors during the mass production of the lens barrel 3 (see FIG. 23) or when the minimum image plane transfer coefficient $K_{min}$ varies due to a change in the mechanical mechanism of the lens barrel 3 over time (for example, the aberration of a gear for driving the lens or the aberration of a member for holding the lens), there is a concern that an appropriate backlash reduction operation will not be performed. Therefore, in this embodiment, the correction coefficient K8 which is set considering a variation or change in the minimum image plane transfer coefficient $K_{min}$ is stored in the lens memory 38 and the lens controller 37 corrects the minimum image plane transfer coefficient $K_{min}$ using the correction coefficient K8 such that the minimum image plane transfer coefficient $K_{min}$ is greater than that before correction and transmits the corrected minimum image plane transfer coefficient $K_{min}$ to the camera body 2.

For example, in this embodiment, when a minimum image plane transfer coefficient $K_{min}$ of "100" and a correction coefficient K8 of "1.1" are stored in the lens memory 38, the lens controller 37 corrects the minimum image plane transfer coefficient $K_{min}$ (100×1.1=110), using the minimum image plane transfer coefficient $K_{min}$ ("100") and the correction coefficient K8 ("1.1") stored in the lens memory 38, and transmits the corrected minimum image plane transfer coefficient $K_{min}$ ("110") to the camera body 2. Then, the camera controller 21 calculates the amount of movement IG of the image plane, using the corrected minimum image plane transfer coefficient $K_{min}$ ("110") and the amount of backlash G. When "the amount of movement IG of the image plane"≤"a predetermined amount of movement IP of the image plane" is established, the camera controller 21 determines that backlash reduction is "not required" and performs control such that backlash reduction is not performed during the focusing operation. When "the amount of movement IG of the image plane">"a predetermined amount of movement IP of the image plane" is satisfied, the camera controller 21 determines that backlash reduction is "required" and performs control such that backlash reduction is performed during the focusing operation.

As such, in this embodiment, it is determined whether backlash reduction is required, on the basis of the correction coefficient K8 and the minimum image plane transfer coefficient $K_{min}$ ("110") that is greater than the minimum image plane transfer coefficient $K_{min}$ ("100") before correction. Therefore, when the minimum image plane transfer coefficient $K_{min}$ ("110") is used, it is easier to determine that backlash reduction is "not required" than that when the minimum image plane transfer coefficient $K_{min}$ ("100") before the correction. Even when the minimum image plane transfer coefficient $K_{min}$ changes due to, for example, manufacturing errors or a change in the mechanical mechanism of the lens barrel, it is possible to suppress excessive backlash reduction and to increase the speed of contrast AF. In addition, it is possible to improve the quality of a through image.

For example, it is preferable to set the correction coefficient K8 so as to satisfy the following conditional expression, considering, for example, manufacturing errors or variation with time:

Minimum image plane transfer coefficient $K_{min}$ before correction×1.2≥Corrected minimum image plane transfer coefficient $K_{min}$>Minimum image plane transfer coefficient $K_{min}$ before correction.

In addition, the correction coefficient K8 can be set so as to satisfy, for example, the following conditional expression:

1.2≥K8>1.

In this embodiment, similarly to the correction coefficient K8 for correcting the minimum image plane transfer coefficient $K_{min}$, a correction coefficient K9 for correcting the maximum image plane transfer coefficient $K_{max}$ is stored in the lens memory 38 and the lens controller 37 corrects the maximum image plane transfer coefficient $K_{max}$, using the correction coefficient K9, and transmits the corrected maximum image plane transfer coefficient $K_{max}$ to the camera body 2. The detailed description thereof will not be repeated.

«Eleventh Embodiment»

Next, an eleventh embodiment of the invention will be described. The eleventh embodiment has the same structure as the fourth embodiment except for the following points. That is, in the fourth embodiment, the silent control (clip operation) is performed using the minimum image plane transfer coefficient $K_{min}$ stored in the lens memory 38. In contrast, the eleventh embodiment differs from the fourth embodiment in that a correction coefficient K10 is stored in the lens memory 38 of the lens barrel 3, the lens controller 37 corrects the minimum image plane transfer coefficient $K_{min}$, using the correction coefficient K10 stored in the lens memory 38, and transmits the corrected minimum image plane transfer coefficient $K_{min}$ to the camera body 2, and the lens controller 37 and the camera controller 21 perform the silent control using the corrected minimum image plane transfer coefficient $K_{min}$.

As described above, in the fourth embodiment, the lens controller 37 transmits the current image plane transfer coefficient $K_{cur}$, the minimum image plane transfer coefficient $K_{min}$, the maximum image plane transfer coefficient $K_{max}$, and the silent lens moving speed lower limit V0b to the camera controller 21 (see Step S401 in FIG. 14) and the camera controller 21 calculates the silent image plane moving speed lower limit V0b_max (see Step S402 in FIG. 14). Then, when the image plane moving speed V1a for focus detection×Kc>the silent image plane moving speed lower limit V0b_max is satisfied, the camera controller 21 determines that the clip operation is "permitted". When the image plane moving speed V1a for focus detection×Kc<the silent image plane moving speed lower limit V0b_max is established, the camera controller 21 determines that the clip operation is "prohibited".

However, when a variation in the minimum image plane transfer coefficient $K_{min}$ occurs due to, for example, manufacturing errors (see FIG. 23) during the mass production of the lens barrel 3 or when the minimum image plane transfer coefficient $K_{min}$ varies due to a change in the mechanical mechanism of the lens barrel 3 over time (for example, the aberration of a gear for driving the lens or the aberration of a member for holding the lens), there is a concern that appropriate silent control (clip operation) will not be performed. Therefore, in this embodiment, the correction coefficient K10 which is set considering a variation or change in the minimum image plane transfer coefficient $K_{min}$ is stored in the lens memory 38 and the lens controller 37 corrects the minimum image plane transfer coefficient $K_{min}$ using the correction coefficient K10 such that the minimum image plane transfer coefficient $K_{min}$ is less than that before correction and transmits the corrected minimum image plane transfer coefficient $K_{min}$ to the camera body 2.

For example, in this embodiment, when a minimum image plane transfer coefficient $K_{min}$ of "100" and a correction coefficient K10 of "1.1" are stored in the lens memory 38, the lens controller 37 corrects the minimum image plane transfer coefficient $K_{min}$ (100×1.1=110), using the minimum image plane transfer coefficient $K_{min}$ ("100") and the correction coefficient K10 ("1.1") stored in the lens memory 38, and transmits the corrected minimum image plane transfer coefficient $K_{min}$ ("110") to the camera body 2. Then, the camera controller 21 determines whether the image plane moving speed V1a for focus detection×Kc<the silent image plane moving speed lower limit V0b_max is established, on the basis of the corrected minimum image plane transfer coefficient $K_{min}$ ("110").

In this embodiment, it is determined whether the image plane moving speed V1a for focus detection×Kc<the silent image plane moving speed lower limit V0b_max is established, by using the correction coefficient K10 and by using the minimum image plane transfer coefficient $K_{min}$ ("110") that is greater than the minimum image plane transfer coefficient $K_{min}$ ("100") before correction. Therefore, when the minimum image plane transfer coefficient $K_{min}$ ("110") is used, it is more difficult to determine that the clip operation is "prohibited" than that when the minimum image plane transfer coefficient $K_{min}$ ("100") before correction is used. Accordingly, even if the minimum image plane transfer coefficient $K_{min}$ changes due to, for example, manufacturing errors or a change in the mechanical mechanism of the lens barrel, it is possible to reliably suppress the clip operation and to reliably achieve silent control.

For example, it is preferable to set the correction coefficient K10 so as to satisfy the following conditional expression, considering, for example, manufacturing errors or a change in the mechanical mechanism of the lens barrel:

Minimum image plane transfer coefficient $K_{min}$ before correction×1.2≥Corrected minimum image plane transfer coefficient $K_{min}$>Minimum image plane transfer coefficient $K_{min}$ before correction.

In addition, the correction coefficient K10 can be set so as to satisfy, for example, the following conditional expression:

1.2≥K10>1.

In this embodiment, similarly to the correction coefficient K10 for correcting the minimum image plane transfer coefficient $K_{min}$, a correction coefficient K11 for correcting the maximum image plane transfer coefficient $K_{max}$ is stored in the lens memory 38 and the lens controller 37 corrects the maximum image plane transfer coefficient $K_{max}$, using the correction coefficient K11, and transmits the corrected maximum image plane transfer coefficient $K_{max}$ to the camera body 2. However, the detailed description thereof will not be repeated.

The above-described embodiments have been described for easy understanding of the invention and are not intended to limit the invention. Therefore, each component disclosed in the above-described embodiments includes all design changes and equivalents included in the technical range of the invention. In addition, the above-described embodiments may be appropriately combined with each other.

For example, in the first embodiment, the minimum image plane transfer coefficient $K_{min}$ and the corrected minimum image plane transfer coefficient $K_{min\_x}$ are alternately transmitted to the camera controller 21. However, the invention is not particularly limited to this aspect. For example, an operation which transmits the minimum image plane transfer coefficient $K_{min}$ two consecutive times and then transmits the corrected minimum image plane transfer coefficient $K_{min\_x}$ two consecutive times may be repeatedly performed. Alternatively, an operation which transmits the minimum image plane transfer coefficient $K_{min}$ two consecutive times and then transmits the corrected minimum image plane transfer coefficient $K_{min\_x}$ once may be repeatedly performed. In this case, the maximum image plane transfer coefficient $K_{max}$ and the corrected maximum image plane transfer coefficient $K_{max\_x}$ may be transmitted by the same way as described above.

In the first embodiment, for example, in an aspect in which two or more corrected minimum image plane transfer coefficients $K_{min\_x}$ are provided, when the minimum image plane transfer coefficient $K_{min}$ and two or more corrected minimum image plane transfer coefficients $K_{min\_x}$ are transmitted to the camera controller 21, an operation which transmits the minimum image plane transfer coefficient $K_{min}$ and then sequentially transmits two or more corrected minimum image plane transfer coefficients $K_{min\_x}$ may be repeatedly performed.

In the above-described embodiments, the vibration correction lens 34 is provided as a mechanism for correcting camera shake in the lens barrel 3. However, the following structure may be used: the imaging element 22 is movable in a direction perpendicular to the optical axis L1 to correct camera shake.

Figure 24:
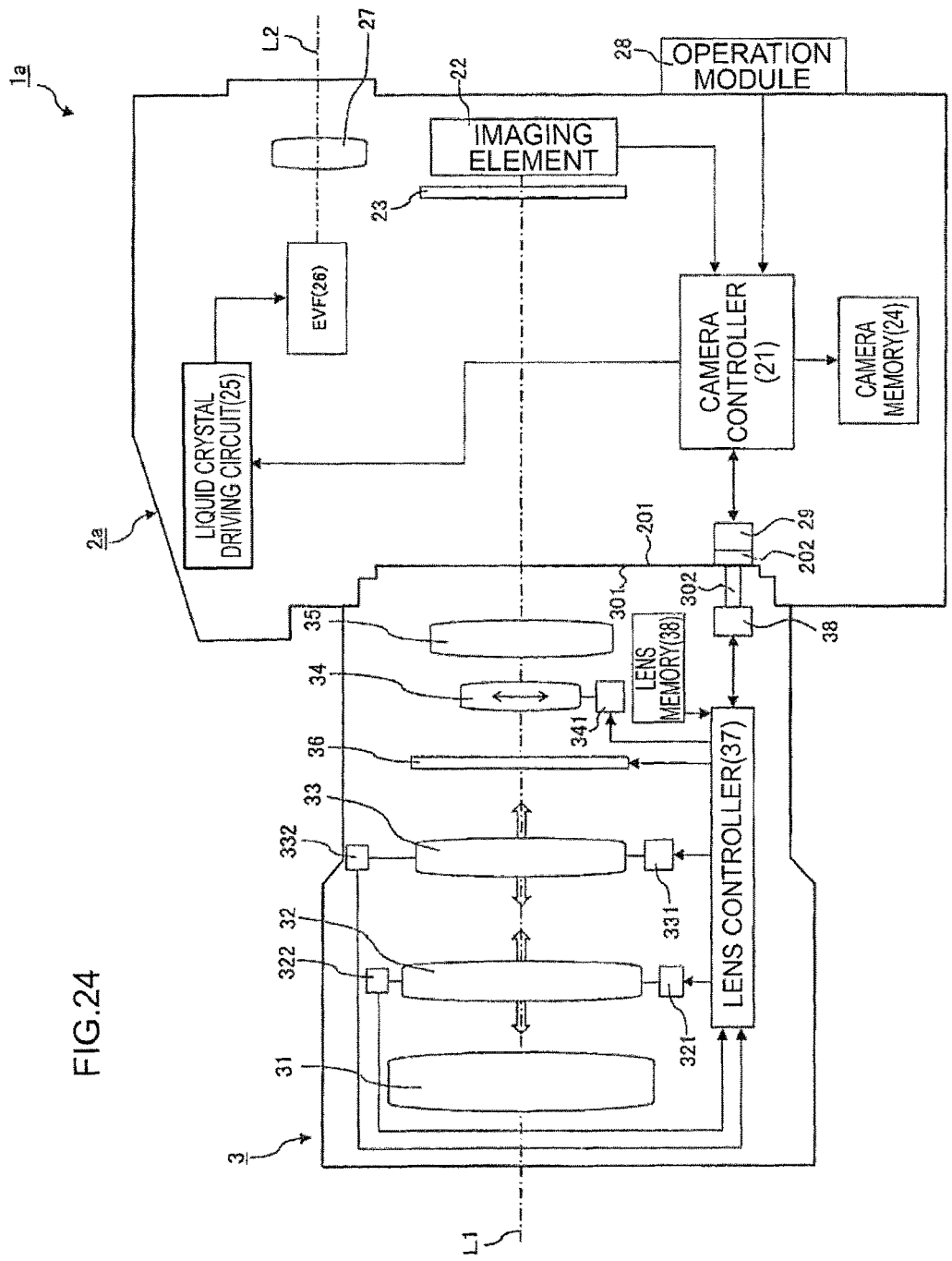
FIG. 24 is a diagram illustrating the main structure illustrating a camera according to another embodiment.

The camera 1 according to the above-described embodiments is not particularly limited. For example, as illustrated in FIG. 24, the invention may be applied to a lens interchangeable mirrorless camera 1a. In the example illustrated in FIG. 24, a camera body 2a sequentially transmits images captured by the imaging element 22 to the camera controller 21 and displays the image on an electronic viewfinder (EVF) 26 of an observation optical system through a liquid crystal driving circuit 25. In this case, the camera controller 21 reads, for example, an output from the imaging element 22 and calculates a focus evaluation value on the basis of the read output to detect the focusing state of the imaging optical system using a contrast detection method. In addition, the invention may be applied to other optical devices, such as a digital video camera, a digital camera with built-in lenses, and a mobile phone camera.

«Twelfth Embodiment»

Figure 25:
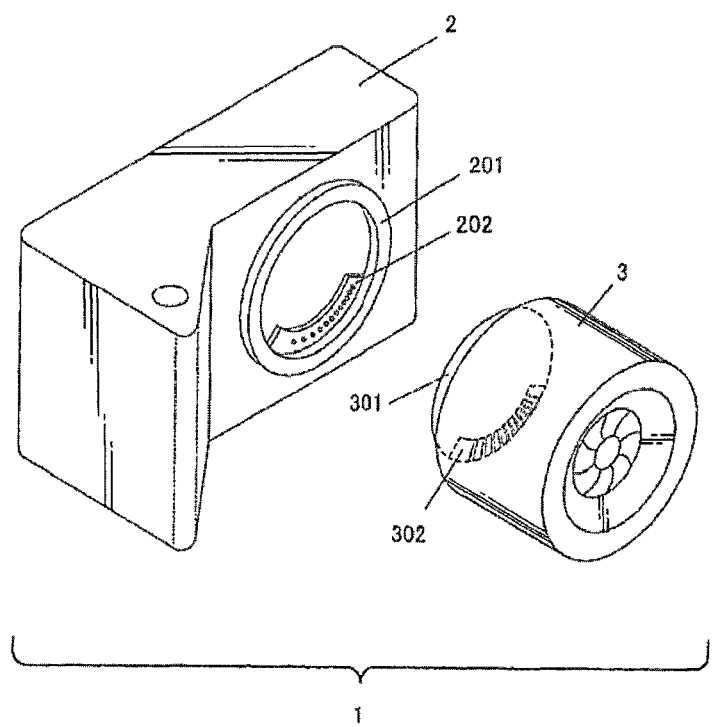
FIG. 25 is a perspective view illustrating a camera according to a twelfth embodiment.
Figure 26:
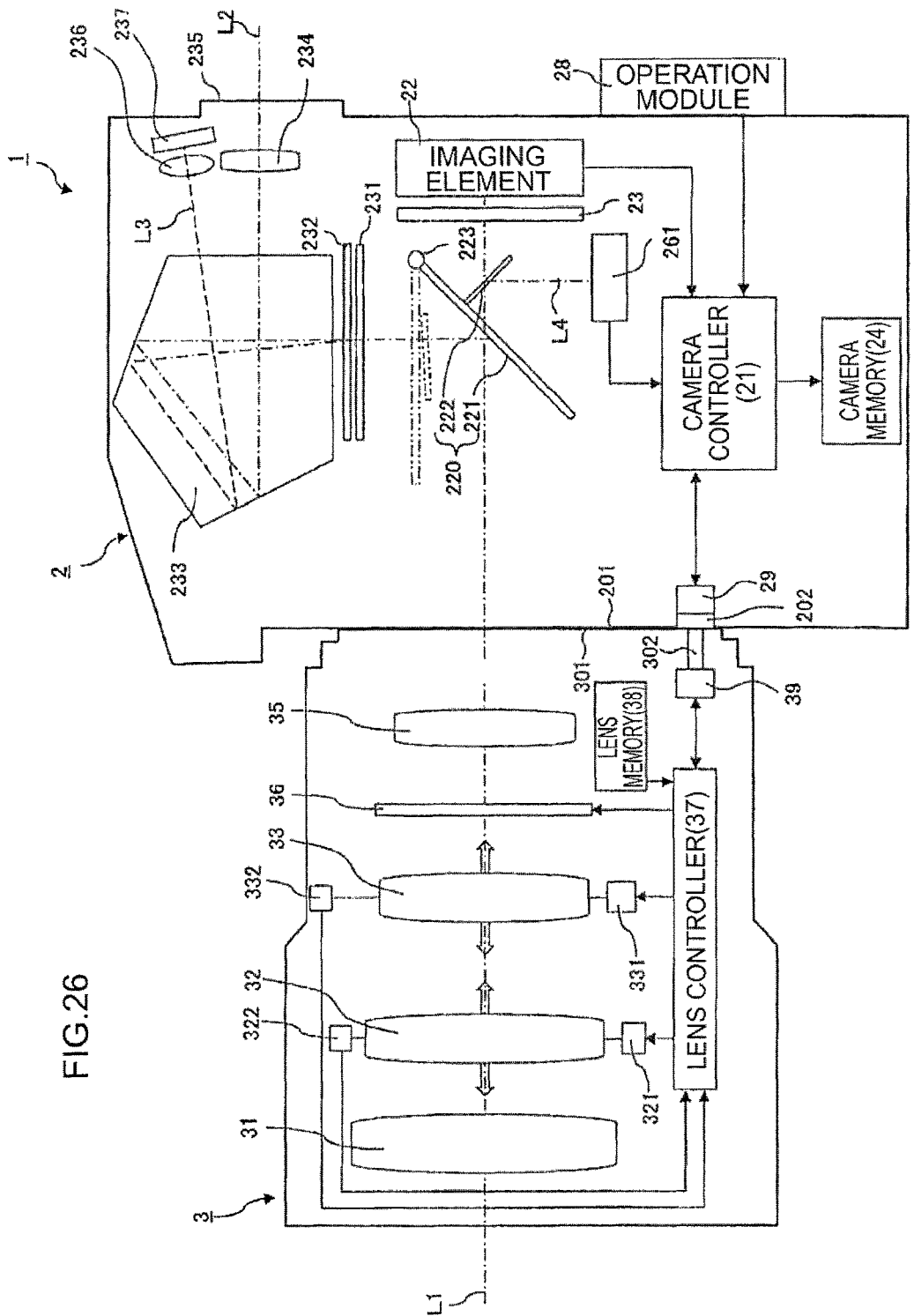
FIG. 26 is a diagram illustrating the main structure illustrating the camera according to the twelfth embodiment.

Next, a twelfth embodiment of the invention will be described. FIG. 25 is a perspective view illustrating a single-lens reflex digital camera 1 according to this embodiment. FIG. 26 is a diagram illustrating the structure of a main portion of the camera 1 according to this embodiment. The digital camera 1 (hereinafter, simply referred to as a camera 1) according to this embodiment is composed of a camera body 2 and a lens barrel 3. The camera body 2 and the lens barrel 3 are detachably coupled to each other.

The lens barrel 3 is an interchangeable lens which can be attached to and detached from the camera body 2. As illustrated in FIG. 26, the lens barrel 3 is provided with an imaging optical system including lenses 31, 32, 33, and 35 and a diaphragm 36.

The lens 33 is a focus lens and can be moved in the direction of an optical axis L1 to adjust the focal length of the imaging optical system. The focus lens 33 is provided such that it can be moved along the optical axis L1 of the lens barrel 3. The position of the focus lens 33 is detected by a focus lens encoder 332 and is adjusted by a focus lens driving motor 331.

The focus lens driving motor 331 is, for example, an ultrasonic motor and drives the focus lens 33 in response to an electric signal (pulse) output from a lens controller 37. Specifically, the driving speed of the focus lens 33 by the focus lens driving motor 331 is represented by pulse/second. As the number of pulses per unit time increases, the driving speed of the focus lens 33 increases. In this embodiment, a camera controller 21 of the camera body 2 transmits the driving instruction speed (unit: pulse/second) of the focus lens 33 to the lens barrel 3 and the lens controller 37 outputs a pulse signal corresponding to the driving instruction speed (unit: pulse/second) transmitted from the camera body 2 to the focus lens driving motor 331 to drive the focus lens 33 at the driving instruction speed (unit: pulse/second) transmitted from the camera body 2.

The lens 32 is a zoom lens and is moved in the direction of the optical axis L1 to adjust the focal length of the imaging optical system. Similarly to the focus lens 33, the position of the zoom lens 32 is also detected by a zoom lens encoder 322 and is adjusted by a zoom lens driving motor 321. The position of the zoom lens 32 is adjusted by operating a zoom button provided in an operation module 28 or operating a zoom ring (not illustrated) provided in the lens barrel 3.

The diaphragm 36 is configured such that the diameter of an aperture having the optical axis L1 as the center can be adjusted, in order to limit the amount of light which reaches the imaging element 22 through the imaging optical system and to adjust the amount of blurring. For example, the appropriate diameter of the aperture which has been calculated in an automatic exposure mode is transmitted from the camera controller 21 through the lens controller 37 to adjust the diameter of the aperture of the diaphragm 36. In addition, the operation module 28 provided in the camera body 2 is manually operated to input the set diameter of the aperture from the camera controller 21 to the lens controller 37. The diameter of the aperture of the diaphragm 36 is detected by a diaphragm aperture sensor (not shown) and the current diameter of the aperture is recognized by the lens controller 37.

A lens memory 38 stores an image plane transfer coefficient K. The image plane transfer coefficient K is a value indicating the correspondence relationship between the amount of driving of the focus lens 33 and the amount of movement of an image plane and is, for example, the proportion of the amount of driving of the focus lens 33 and the amount of movement of the image plane. The image plane transfer coefficient K stored in the lens memory 38 will be described in detail below.

The camera body 2 has a mirror system 220 for guiding beams from an object to the imaging element 22, a finder 235, a photometric sensor 237, and a focus detection module 261. The mirror system 220 has a quick return mirror 221 which is rotated about a rotating shaft 223 by a predetermined angle between the observation position and the imaging position of the object and a sub-mirror 222 which is supported by the quick return mirror 221 and is rotated with the rotation of the quick return mirror 221. In FIG. 26, a state in which the mirror system 220 is at the observation position of the object is represented by a solid line and a state in which the mirror system 220 is at the imaging position of the object is represented by a two-dot chain line.

The mirror system 220 is rotated such that it is inserted into the optical path of the optical axis L1 at the observation position of the object and is evacuated from the optical path of the optical axis L1 at the imaging position of the object.

The quick return mirror 221 is composed of a half mirror. At the observation position of the object, the quick return mirror 221 reflects parts (optical axes L2 and L3) of the beams (optical axis L1) from the object to the finder 235 and the photometric sensor 237 and transmits part of the beams (optical axis L4) so as to be guided to the sub-mirror 222. In contrast, the sub-mirror 222 is composed of a total reflection mirror and guides the beam (optical axis L4) passing through the quick return mirror 221 to the focus detection module 261.

Therefore, when the mirror system 220 is at the observation position, the beams (optical axis L1) from the object are guided to the finder 235, the photometric sensor 237, and the focus detection module 261 such that the photographer observes the object and an exposure operation or the detection of the focusing state of the focus lens 33 is performed. Then, when the photographer presses a release button fully, the mirror system 220 is rotated to the imaging position and all of the beams (optical axis L1) from the object are guided to the imaging element 22. Captured image data is stored in a memory 24.

The beams (optical axis L2) from the object, which have been reflected by the quick return mirror 221, are focused on a focusing plate 231 which is provided on the plane that is optically equivalent to the imaging element 22 and can be observed through a pentaprism 233 and an eyepiece 234. In this case, a transmissive liquid crystal display 232 displays, for example, a focus detection area mark so as to be superimposed on the object image on the focusing plate 231 and displays imaging-related information, such as a shutter speed, an aperture value, and the number of captured images, on an area other than the object image. In this way, the photographer can observe, for example, the object, the background thereof, and the imaging-related information, through the finder 235 in the preparatory stage of imaging.

The photometric sensor 237 is, for example, composed of a two-dimensional color CCD image sensor. The photometric sensor 237 divides a captured screen into a plurality of areas and outputs a photometric signal corresponding to brightness in each area, in order to calculate an exposure value during imaging. The signal detected by the photometric sensor 237 is output to the camera controller 21 and is used for automatic exposure control.

The imaging element 22 is provided on a scheduled focal plane of the imaging optical system including the lenses 31, 32, 33, and 35 on the optical axis L1 of the beams from the object in the camera body 2. A shutter 23 is provided in front of the imaging element 22. The imaging element 22 is composed of a plurality of photoelectric conversion elements which are two-dimensionally arranged and can be a device such as a two-dimensional CCD image sensor, a MOS sensor, or a CID. The camera controller 21 performs image processing for the image signal photoelectrically converted by the imaging element 22 and the image signal is recorded on the camera memory 24 which is a recording medium. The camera memory 24 can be a detachable card-type memory or an embedded memory.

The camera controller 21 detects the focusing state of the imaging optical system using a contrast detection method (hereinafter, simply referred to as "contrast AF"), on the basis of pixel data read from the imaging element 22. For example, the camera controller 21 reads the output of the imaging element 22 and calculates a focus evaluation value on the basis of the read output. The focus evaluation value can be calculated by, for example, extracting a high frequency component from the output of the imaging element 22 using a high frequency pass filter. In addition, the focus evaluation value can be calculated by extracting the high frequency component using two high frequency pass filters with different cutoff frequencies.

Then, the camera controller 21 detects the focus using a contrast detection method which transmits a driving signal to the lens controller 37 to drive the focus lens 33 at a predetermined sampling interval (distance), calculates the focus evaluation value at each position, and calculates the position of the focus lens 33 where the focus evaluation value is the maximum as an in-focus position. For example, in the case in which the focus evaluation value is calculated while the focus lens 33 is being driven, when the focus evaluation value increases two times and then decreases two times, the in-focus position can be calculated by an interpolation method, using the focus evaluation values.

In the detection of the focus by the contrast detection method, the sampling interval of the focus evaluation value increases as the driving speed of the focus lens 33 increases. When the driving speed of the focus lens 33 is greater than a predetermined value, the sampling interval of the focus evaluation value is too long to appropriately detect the in-focus position. The reason is that, as the sampling interval of the focus evaluation value increases, a variation in the in-focus position increases and the accuracy of focusing is likely to be reduced. For this reason, the camera controller 21 drives the focus lens 33 such that the moving speed of the image plane when the focus lens 33 is driven has a value capable of appropriately detecting the in-focus position. For example, the camera controller 21 drives the focus lens 33 such that the maximum image plane driving speed among the image plane moving speeds at the sampling interval capable of appropriately detecting the in-focus position is obtained in search control for driving the focus lens 33 in order to detect the focus evaluation value. The search control includes, for example, wobbling, neighborhood search (neighborhood scanning) which searches for only a portion in the vicinity of a predetermined position, and full search (full scanning) which searches the entire driving range of the focus lens 33.

The camera controller 21 may drive the focus lens 33 at a high speed when the search control starts, using the half-press of a release switch as a trigger, and may drive the focus lens 33 at a low speed when the search control starts, using conditions other than the half-press of the release switch as a trigger. This control process makes it possible to perform contrast AF at a high speed when the release switch is pressed halfway and to perform contrast AF which is suitable for making a through image look good when the release switch is not pressed halfway.

The camera controller 21 may perform control such that the focus lens 33 is driven at a high speed in search control in a still image mode and the focus lens 33 is driven at a low speed in search control in a movie mode. This control process makes it possible to perform contrast AF at a high speed in the still image mode and to perform contrast AF which is suitable for making a moving image look good in the movie mode.

In at least one of the still image mode and the movie mode, contrast AF may be performed at a high speed in a sports mode and may be performed at a low speed in a landscape mode. In addition, the driving speed of the focus lens 33 in the search control may be changed depending on, for example, the focal length, the object distance, and the aperture value.

In this embodiment, focus detection may be performed by a phase difference detection method. Specifically, the camera body 2 includes the focus detection module 261. The focus detection module 261 includes a pair of line sensors (not illustrated) which include a plurality of pixels each having a microlens that is arranged in the vicinity of the scheduled focal plane of the imaging optical system and a photoelectric conversion element that is provided so as to face the microlens. Each of the pixels in the pair of line sensors receives a pair of beams which pass through a pair of areas with different exit pupils in the focus lens 33 to acquire a pair of image signals. Then, the phase shift between the pair of image signals acquired by the pair of line sensors is calculated by a known correlation calculation method to detect a focusing state. In this way, it is possible to perform focus detection using the phase difference detection method.

The operation module 28 is an input switch, such as a shutter release button or a moving image capture start switch which is used by the photographer to set various operation modes of the camera 1, and is used to switch the modes between the still image mode and the movie mode, between an automatic focus mode and a manual focus mode, and an AF-S mode and an AF-F mode in the automatic focus mode. Various modes set by the operation module 28 are transmitted to the camera controller 21 and the camera controller 21 controls the overall operation of the camera 1. In addition, the shutter release button includes a first switch SW1 which is turned on when the button is pressed halfway and a second switch SW2 which is turned on when the button is fully pressed.

In the AF-S mode, when the shutter release button is pressed halfway, the focus lens 33 is driven on the basis of the detection result of the focus, the position of the focus lens 33 is adjusted and fixed, and imaging is performed at the position of the focus lens. The AF-S mode is suitable for capturing still images and is generally selected to capture still images. In the AF-F mode, the following process is performed: the focus lens 33 is driven on the basis of the detection result of the focus, regardless of whether the shutter release button is operated; the focusing state is repeatedly detected; and when the focusing state is changed, the scan drive operation of the focus lens 33 is performed. The AF-F mode is suitable for capture moving images and is generally selected to capture moving images.

In this embodiment, a switch for switching between a one-shot mode and a continuous mode may be provided as a switch for switching the automatic focus mode. In this case, when the photographer selects the one-shot mode, the AF-S mode can be set. When the photographer selects the continuous mode, the AF-F mode can be set.

Next, the driving range of the focus lens 33 will be described with reference to FIG. 27.

Figure 27:
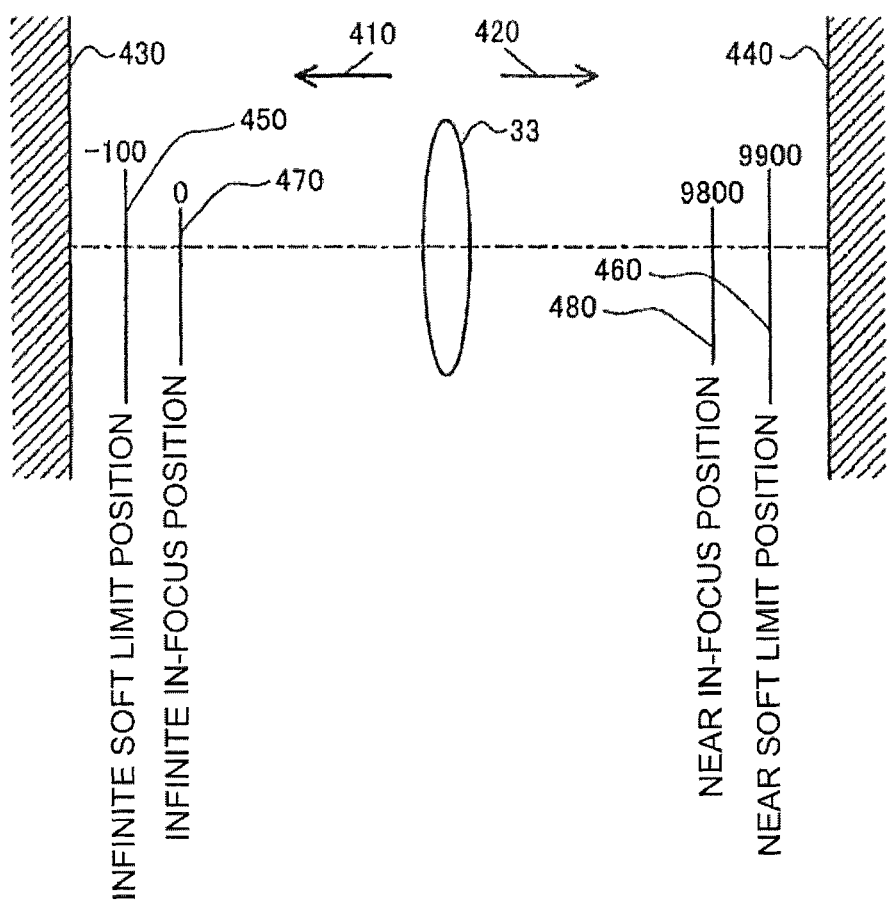
FIG. 27 is a diagram illustrating a driving range of a focus lens 33.

As illustrated in FIG. 27, the focus lens 33 is configured so as to be movable in an infinity direction 410 and a near direction 420 on an optical axis L1 which is represented by a one-dot chain line in FIG. 27. Stoppers (not illustrated) are provided at a mechanical end point 430 in the infinity direction 410 and a mechanical end point 440 in the near direction 420 and restrict the movement of the focus lens 33. That is, the focus lens 33 is configured so as to be movable from the mechanical end point 430 in the infinity direction 410 to the mechanical end point 440 in the near direction 420.

However, the range in which the lens controller 37 actually drives the focus lens 33 is narrower than the range from the mechanical end point 430 to the mechanical end point 440. The movement range will be described in detail. The lens controller 37 drives the focus lens 33 in the range from an infinite soft limit position 450 which is provided inside the mechanical end point 430 in the infinity direction 410 to a near soft limit position 460 which is provided inside the mechanical end point 440 in the near direction 420. That is, a lens driver 212 drives the focus lens 33 between the near soft limit position 460 corresponding to a near-side driving limit position and the infinite soft limit position 450 corresponding to an infinity-side driving limit position.

The infinite soft limit position 450 is provided outside an infinite in-focus position 470. The infinite in-focus position 470 is the position of the focus lens 33 corresponding to a position which is closest to the infinity side and where the imaging optical system including the lenses 31, 32, 33, and 35 and the diaphragm 36 can be focused. The reason why the infinite soft limit position 450 is provided at that position is that, when the focus is detected by the contrast detection method, the peak of the focus evaluation value may be present at the infinite in-focus position 470. That is, when the infinite in-focus position 470 is aligned with the infinite soft limit position 450, it is difficult to recognize the peak of the focus evaluation value which is present at the infinite in-focus position 470. In order to solve the program, the infinite soft limit position 450 is provided outside the infinite in-focus position 470. Similarly, the near soft limit position 460 is provided outside a near in-focus position 480. The near in-focus position 480 is the position of the focus lens 33 corresponding to a position which is closest to the near side and where the imaging optical system including the lenses 31, 32, 33, and 35 and the diaphragm 36 can be focused.

The near in-focus position 480 can be set using, for example, aberration. The reason is that, when aberration gets worse, the range of use of the lens is not appropriate even if the focus lens 33 is driven to a position that is closer to the near side than the set near in-focus position 480 to bring the camera into focus.

In this embodiment, the position of the focus lens 33 can be represented by, for example, the number of pulses of the driving signal given to the zoom lens driving motor 321. In this case, for the number of pulses, the infinite in-focus position 470 can be the origin (reference). For example, in the example illustrated in FIG. 27, the infinite soft limit position 450 is the position of "−100 pulses", the near in-focus position 480 is the position of "9800 pulses", and the near soft limit position 460 is the position of "9900 pulses". In this case, it is necessary to given a driving signal corresponding to 10000 pulses to the zoom lens driving motor 321 in order to move the focus lens 33 from the infinite soft limit position 450 to the near soft limit position 460. However, this embodiment is not particularly limited to the above-mentioned aspect.

Next, the image plane transfer coefficient K stored in the lens memory 38 of the lens barrel 3 will be described.

The image plane transfer coefficient K is a value indicating the correspondence relationship between the amount of driving of the focus lens 33 and the amount of movement of the image plane and is, for example, the proportion of the amount of driving of the focus lens 33 and the amount of movement of the image plane. In this embodiment, the image plane transfer coefficient is calculated by for example, the following Expression (2):

$$\text{Image plane transfer coefficient } K=(\text{Amount of driving of focus lens 33/Amount of movement of image plane}) \quad (2).$$

As the image plane transfer coefficient K increases, the amount of movement of the image plane by the driving of the focus lens 33 increases.

In the camera 1 according to this embodiment, even when the amount of driving of the focus lens 33 is the same, the amount of movement of the image plane varies depending on the position of the focus lens 33. Similarly, even when the amount of driving of the focus lens 33 is the same, the amount of movement of the image plane varies depending on the position of the zoom lens 32, that is, the focal length. That is, the image plane transfer coefficient K varies depending on the position of the focus lens 33 in the direction of the optical axis and the position of the zoom lens 32 in the direction of the optical axis. In this embodiment, the lens controller 37 stores the image plane transfer coefficient K for each position of the focus lens 33 and each position of the zoom lens 32.

For example, the image plane transfer coefficient K may be defined as follows: Image plane transfer coefficient K=(Amount of movement of image plane/Amount of driving of focus lens 33). In this case, as the image plane transfer coefficient K increases, the amount of movement of the image plane by the driving of the focus lens 33 increases.

FIG. 28 shows a table indicating the relationship among the position (focal length) of the zoom lens 32, the position (object distance) of the focus lens 33, and the image plane transfer coefficient K. The driving area of the zoom lens 32 is divided into nine areas "f1" to "f9" from a wide end to a telephoto end, the driving area of the focus lens 33 is divided into nine areas "D1" to "D9" from a near end to an infinity end, and the image plane transfer coefficient K corresponding to each lens position is stored in the table illustrated in FIG. 28. Among the positions of the focus lens 33, "D1" is a predetermined area corresponding to the near in-focus position 480 illustrated in FIG. 27. For example, "D1" is a predetermined area in the vicinity of the near in-focus position 480 illustrated in FIG. 27. "D9" is a predetermined area corresponding to the infinite in-focus position 470 illustrated in FIG. 27. For example, "D9" is a predetermined area in the vicinity of the infinite in-focus position 470 illustrated in FIG. 27. In the table illustrated in FIG. 28, for example, when the position (focal length) of the zoom lens 32 is in the area "f1" and the position (object distance) of the focus lens 33 is in the area "D1", the image plane transfer coefficient K is "K11". In the example of the table illustrated in FIG. 28, the driving area of each lens is divided into nine areas. However, the number of divided areas is not limited thereto and may be set to any value.

Next, a minimum image plane transfer coefficient $K_{min}$ and a maximum image plane transfer coefficient $K_{max}$ will be described with reference to FIG. 28.

The minimum image plane transfer coefficient $K_{min}$ is a value corresponding to the minimum value of the image plane transfer coefficient K. For example, in FIG. 28, when "K11"="100", "K2"="200", "K13"="300", "K14"="400", "K15"="500", "K16" "600", "K17"="700", "K18"="800", and "K19"="900" are established, "K11"="100" which is the minimum value is the minimum image plane transfer coefficient $K_{min}$ and "K19"="900" which is the maximum value is the maximum image plane transfer coefficient $K_{max}$.

The minimum image plane transfer coefficient $K_{min}$ generally varies depending on the current position of the zoom lens 32. In general, when the current position of the zoom lens 32 is not changed, the minimum image plane transfer coefficient $K_{min}$ is a constant value (fixed value) even if the current position of the focus lens 33 is changed. That is, in general, the minimum image plane transfer coefficient $K_{min}$ is a fixed value (constant value) which is determined according to the position (focal length) of the zoom lens 32 and does not depend on the position (object distance) of the focus lens 33.

In this embodiment, the image plane transfer coefficient K in the area "D1" among the positions of the focus lens 33 is set as the minimum image plane transfer coefficient $K_{min}$. That is, in this embodiment, the image plane transfer coefficient K when the focus lens 33 is driven in the vicinity of the near in-focus position 480 including the near in-focus position 480 illustrated in FIG. 27 is set as the minimum image plane transfer coefficient $K_{min}$. For example, "K11", "K21", "K31", "K41", "K51", "K61", "K71", "K81", and "K91" illustrated in gray in FIG. 28 are the minimum image plane transfer coefficient $K_{min}$ indicating the minimum value among the image plane transfer coefficients K at each position (focal length) of the zoom lens 32.

For example, when the position (focal length) of the zoom lens 32 is in the area "f1", "K11", which is the image plane transfer coefficient K when the position (object distance) of the focus lens 33 is in the area "D1" among the areas "D1" to "D9", is the minimum image plane transfer coefficient $K_{min}$ indicating the minimum value. Therefore, "K11", which is the image plane transfer coefficient K when the position (object distance) of the focus lens 33 is in the area "D1", indicates the minimum value among "K11" to "K19" which are the image plane transfer coefficients K when the position (object distance) of the focus lens 33 is in the areas "D1" to "D9". Similarly, when the position (focal length) of the zoom lens 32 is in the area "f2", "K21", which is the image plane transfer coefficient K when the position (object distance) of the focus lens 33 is in the area "D1", indicates the minimum value among "K21" to "K29" which are the image plane transfer coefficients K when the position (object distance) of the focus lens 33 is in the areas "D1" to "D9". That is, "K21" is the minimum image plane transfer coefficient $K_{min}$. Similarly, when the position (focal length) of the zoom lens 32 is "f3" to "f9", "K31", "K41", "K51", "K61", "K71", "K81", and "K91" illustrated in gray are the minimum image plane transfer coefficient $K_{min}$.

As such, in this embodiment, the image plane transfer coefficient K in the area "D1" among the positions of the focus lens 33 is set as the minimum image plane transfer coefficient $K_{min}$. The image plane transfer coefficient K varies depending on the configuration of the lenses 31, 32, 33, and 35 forming the lens barrel 3. In particular, in this embodiment, when the focus lens 33 is driven from the infinity side to the near side, the image plane transfer coefficient K tends to decrease. The image plane transfer coefficient K tends to be the minimum at the near in-focus position 480 illustrated in FIG. 27. Therefore, in this embodiment, the image plane transfer coefficient K in the area "D1" is set as the minimum image plane transfer coefficient $K_{min}$. However, in some cases, the image plane transfer coefficient K is the minimum at the infinite in-focus position 470 illustrated in FIG. 27 according to the configuration of the lenses 31, 32, 33, and 35 forming the lens barrel 3. In this case, the image plane transfer coefficient K in the area "D9" can be set as the minimum image plane transfer coefficient $K_{min}$.

Similarly, the maximum image plane transfer coefficient $K_{max}$ is a value corresponding to the maximum value of the image plane transfer coefficient K. In general, the maximum image plane transfer coefficient $K_{max}$ varies depending on the current position of the zoom lens 32. When the current position of the zoom lens 32 is not changed, the maximum image plane transfer coefficient $K_{max}$ is a constant value (fixed value) even if the current position of the focus lens 33 is changed.

In this embodiment, the image plane transfer coefficient K in the area "D9" among the positions of the focus lens 33 is set as the maximum image plane transfer coefficient $K_{max}$. That is, in this embodiment, the image plane transfer coefficient K when the focus lens 33 is driven in the vicinity of the infinite in-focus position 470 including the infinite in-focus position 470 illustrated in FIG. 27 is set as the maximum image plane transfer coefficient $K_{max}$. For example, "K19", "K29", "K39", "K49", "K59", "K69", "K79", "K89", and "K99" which are hatched in FIG. 28 are the maximum image plane transfer coefficient $K_{max}$ indicating the maximum value among the image plane transfer coefficients K at each position (focal length) of the zoom lens 32.

As described above, in this embodiment, the image plane transfer coefficient K in the area "D9" among the positions of the focus lens 33 is set as the maximum image plane transfer coefficient $K_{max}$. The image plane transfer coefficient K varies depending on the configuration of the lenses 31, 32, 33, and 35 forming the lens barrel 3. In particular, in this embodiment, when the focus lens 33 is driven from the near side to the infinity side, the image plane transfer coefficient K tends to increase. The image plane transfer coefficient K tends to be the maximum at the infinite in-focus position 470 illustrated in FIG. 27. Therefore, in this embodiment, the image plane transfer coefficient K in the area "D9" is set as the maximum image plane transfer coefficient $K_{max}$. However, in some cases, the image plane transfer coefficient K is the maximum at the near in-focus position 480 illustrated in FIG. 27 according to the configuration of the lenses 31, 32, 33, and 35 forming the lens barrel 3. In this case, the image plane transfer coefficient K in the area "D1" can be set as the maximum image plane transfer coefficient $K_{max}$.

As such, as illustrated in FIG. 27, the lens memory 38 stores the image plane transfer coefficients K corresponding to the position (focal length) of the zoom lens 32 and the position (object distance) of the focus lens 33, the minimum image plane transfer coefficient $K_{min}$ indicating the minimum value among the image plane transfer coefficients K for each position (focal length) of the zoom lens 32, and the maximum image plane transfer coefficient $K_{max}$ indicating the maximum value among the image plane transfer coefficients K for each position (focal length) of the zoom lens 32.

In addition, the lens memory 38 may store a minimum image plane transfer coefficient $K_{min}'$ which is a value in the vicinity of the minimum image plane transfer coefficient $K_{min}$, instead of the minimum image plane transfer coefficient $K_{min}$ indicating the minimum value among the image plane transfer coefficients K. For example, when the value of the minimum image plane transfer coefficient $K_{min}$ is 102.345 having a large number of digits, 100 which is a value in the vicinity of 102.345 may be stored as the minimum image plane transfer coefficient $K_{min}'$. When the lens memory 38 stores a value of 100 (minimum image plane transfer coefficient $K_{min}'$), it is possible to save the memory size and to reduce the size of transmission data to be transmitted to the camera body 2, as compared to the case in which the lens memory 38 stores a value of 102.345 (minimum image plane transfer coefficient $K_{min}$).

For example, when the minimum image plane transfer coefficient $K_{min}$ is a value of 100, 98 which is a value in the vicinity of 100 can be stored as the minimum image plane transfer coefficient $K_{min}'$, considering the stability of control such as backlash reduction control, silent control (clip operation), and lens speed control, which will be described below. For example, when the stability of control is considered, it is preferable to set the minimum image plane transfer coefficient $K_{min}'$ in the range of 80% to 120% of the actual value (minimum image plane transfer coefficient $K_{min}$).

Next, a data communication method between the camera body 2 and the lens barrel 3 will be described.

The camera body 2 is provided with a body-side mount portion 201 on which the lens barrel 3 is detachably mounted. As illustrated in FIG. 25, a connector 202 is provided in the vicinity of the body-side mount portion 201 (on the inner surface side of the body-side mount portion 201) so as to protrude toward the inside of the body-side mount portion 201. The connector 202 is provided with a plurality of electric contacts.

The lens barrel 3 is an interchangeable lens which can be attached to and detached from the camera body 2. The lens barrel 3 is provided with a lens-side mount portion 301 which is removably attached to the camera body 2. As illustrated in FIG. 25, a connector 302 is provided in the vicinity of the lens-side mount portion 301 (on the inner surface side of the lens-side mount portion 301) so as to protrude toward the inside of the lens-side mount portion 301. The connector 302 is provided with a plurality of electric contacts.

When the lens barrel 3 is mounted on the camera body 2, the electric contacts of the connector 202 provided in the body-side mount portion 201 and the electric contacts of the connector 302 provided in the lens-side mount portion 301 are electrically and physically connected to each other. Therefore, power can be supplied from the camera body 2 to the lens barrel 3 through the connectors 202 and 302 or data communication between the camera body 2 and the lens barrel 3 can be performed through the connectors 202 and 302.

Figure 29:
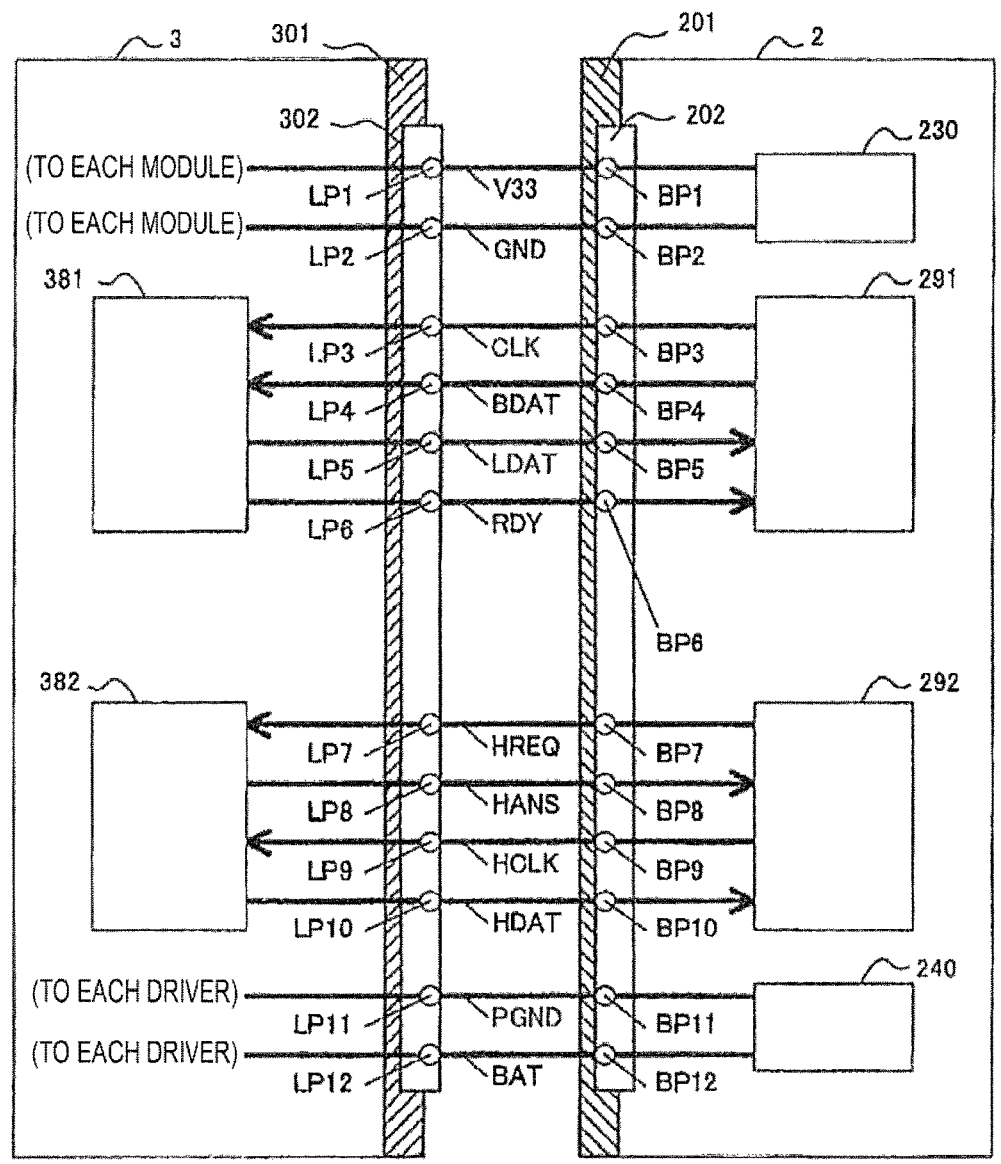
FIG. 29 is a diagram illustrating the details of connectors 202 and 302.

FIG. 29 is a schematic diagram illustrating the details of the connectors 202 and 302. In FIG. 29, the connector 202 is arranged on the right side of the body-side mount portion 201 on the basis of the actual mount structure. That is, in this embodiment, the connector 202 is provided at the position that is deeper than a mount surface of the body-side mount portion 201 (on the right side of the body-side mount portion 201 in FIG. 29). Similarly, the arrangement of the connector 302 on the right side of the lens-side mount portion 301 means that the connector 302 according to this embodiment is arranged at the position that protrudes from a mount surface of the lens-side mount portion 301. According to the above-mentioned arrangement of the connector 202 and the connector 302, when the lens barrel 3 is mounted on the camera body 2 such that the mount surface of the body-side mount portion 201 and the mount surface of the lens-side mount portion 301 come into contact with each other, the connector 202 and the connector 302 are connected to each other. Therefore, the electric contacts of the connectors 202 and 302 are connected to each other.

As illustrated in FIG. 29, the connector 202 includes 12 electric contacts BP1 to BP12. In addition, the connector 302 of the lens 3 includes 12 electric contacts LP1 to LP12 which correspond to 12 electric contacts in the camera body 2.

The electric contact BP1 and the electric contact BP2 are connected to a first power circuit 230 in the camera body 2. The first power circuit 230 supplies an operating voltage to each module in the lens barrel 3 (except for circuits having relatively large power consumption such as the lens driving motors 321 and 331) through the electric contact BP1 and the electric contact LP1. The voltage value which is supplied by the first power circuit 230 through the electric contact BP1 and the electric contact LP1 is not particularly limited and can be a voltage value of 3 V to 4 V (normally, a voltage value in the vicinity of 3.5 V which is an intermediate value of the voltage range). In this case, a current value which is supplied from the camera body 2 to the lens barrel 3 is in the range of about several tens of milliamperes to several hundreds of milliamperes when power is turned on. The electric contact BP2 and the electric contact LP2 are ground terminals corresponding to the operating voltage which is supplied through the electric contact BP1 and the electric contact LP1.

The electric contacts BP3 to BP6 are connected to a first camera-side communication module 291. The electric contacts LP3 to LP6 are connected to a first lens-side communication module 381 so as to correspond to the electric contacts BP3 to BP6. The first camera-side communication module 291 and the first lens-side communication module 381 transmit and receive signals therebetween using these electric contacts. The content of the communication between the first camera-side communication module 291 and the first lens-side communication module 381 will be described in detail below.

The electric contacts BP7 to BP10 are connected to a second camera-side communication module 292. The electric contacts LP7 to LP10 are connected to a second lens-side communication module 382 so as to correspond to the electric contacts BP7 to BP10. The second camera-side communication module 292 and the second lens-side communication module 382 transmit and receive signals therebetween using these electric contacts. The content of the communication between the second camera-side communication module 292 and the second lens-side communication module 382 will be described in detail below.

The electric contact BP11 and the electric contact BP12 are connected to a second power circuit 240 in the camera body 2. The second power circuit 240 supplies an operating voltage to circuits with relatively large power consumption, such as the lens driving motors 321 and 331, through the electric contact BP11 and the electric contact LP11. The voltage value supplied by the second power circuit 240 is not particularly limited. The maximum value of the voltage value supplied by the second power circuit 240 can be several times greater than the maximum value of the voltage value supplied by the first power circuit 230. In this case, a current value which is supplied from second power circuit 240 to the lens barrel 3 is in the range of about several tens of milliamperes to several amperes when power is turned on. The electric contact BP12 and the electric contact LP12 are ground terminals corresponding to the operating voltage which is supplied through the electric contact BP11 and the electric contact LP11.

The first communication module 291 and the second communication module 292 in the camera body 2 illustrated in FIG. 29 form a camera transceiver 29 illustrated in FIG. 26 and the first communication module 381 and the second communication module 382 in the lens barrel 3 illustrated in FIG. 29 form a lens transceiver 39 illustrated in FIG. 26.

Next, the communication (hereinafter, referred to as command data communication) between the first camera-side communication module 291 and the first lens-side communication module 381 will be described. The lens controller 37 performs the command data communication which performs the transmission of control data from the first camera-side communication module 291 to the first lens-side communication module 381 and the transmission of response data from the first lens-side communication module 381 to the first camera-side communication module 291 in parallel in a predetermined cycle (for example, an interval of 16 milliseconds) through a signal line CLK formed by the electric contacts BP3 and LP3, a signal line BDAT formed by the electric contacts BP4 and LP4, a signal line LDAT formed by the electric contacts BP5 and LP5, and a signal line RDY formed by the electric contacts BP6 and LP6 to perform.

Figure 30:
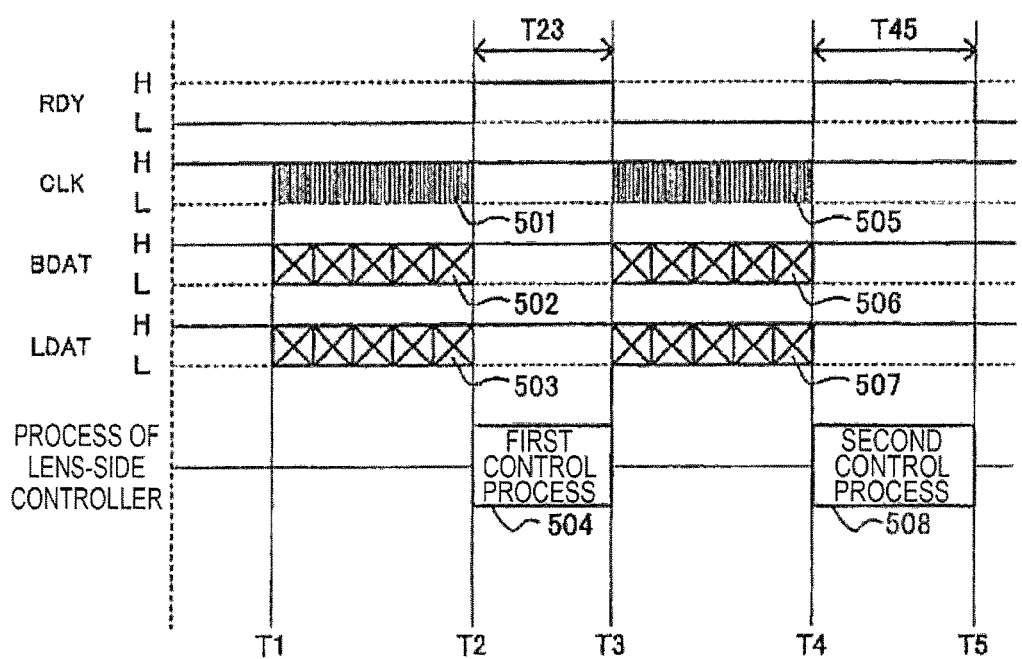
FIG. 30 is a diagram illustrating an example of command data communication.

FIG. 30 is a timing chart illustrating an example of the command data communication. First, the camera controller 21 and the first camera-side communication module 291 check the signal level of the signal line RDY when the command data communication starts (T1). The signal level of the signal line RDY indicates whether the communication of the first lens-side communication module 381 is available. When communication is not available, the lens controller 37 and the first lens-side communication module 381 output a high-level (H-level) signal. When the signal line RDY is at an H level, the first camera-side communication module 291 does not perform communication with the lens barrel 3 or does not perform the next process even during communication.

On the other hand, when the signal line RDY is at a low (L) level, the camera controller 21 and the first camera-side communication module 291 transmit a clock signal 501 to the first lens-side communication module 381 using the signal line CLK. In addition, the camera controller 21 and the first camera-side communication module 291 transmit a camera-side command packet signal 502, which is control data, to the first lens-side communication module 381 in synchronization with the clock signal 501, using the signal line BDAT. When the clock signal 501 is output, the lens controller 37 and the first lens-side communication module 381 transmit a lens-side command packet signal 503, which is response data, in synchronization with the clock signal 501, using the signal line LDAT.

When the transmission of the lens-side command packet signal 503 is completed, the lens controller 37 and the first lens-side communication module 381 changes the signal level of the signal line RDY from the L level to the H level (T2). Then, the lens controller 37 starts a first control process 504 according to the content of the camera-side command packet signal 502 received until the time T2.

For example, when the received camera-side command packet signal 502 has content requiring specific data of the lens barrel 3, the lens controller 37 performs a process of analyzing the content of the command packet signal 502 and generating the requested specific data as the first control process 504. In addition, the lens controller 37 performs, as the first control process 504, a communication error check process which simply checks whether there is an error in the communication of the command packet signal 502 from the number of data bytes, using checksum data included in the command packet signal 502. The specific data signal generated by the first control process 504 is output as a lens-side data packet signal 507 to the camera body 2 (T3). In this case, a camera-side data packet signal 506 which is output from the camera body 2 after the command packet signal 502 is dummy data (including checksum data) which is meaningless on the lens side. In this case, the lens controller 37 performs, as a second control process 508, the above-mentioned communication error check process using the checksum data included in the camera-side data packet signal 506 (T4).

For example, when the camera-side command packet signal 502 is an instruction to drive the focus lens 33 and the camera-side data packet signal 506 indicates the driving speed and amount of the focus lens 33, the lens controller 37 performs, as the first control process 504, a process of analyzing the content of the command packet signal 502 and generating an acknowledgement signal indicating that the content has been understood (T2). The acknowledgement signal generated by the first control process 504 is output as the lens-side data packet signal 507 to the camera body 2 (T3). In addition, the lens controller 37 performs, as the second control process 508, a process of analyzing the content of the camera-side data packet signal 506 and a communication error check process using the checksum data included in the camera-side data packet signal 506 (T4). Then, after the second control process 508 is completed, the lens controller 37 drives the focus lens driving motor 331 on the basis of the received camera-side data packet signal 506, that is, the driving speed and amount of the focus lens 33, to drive the focus lens 33 by the received amount of driving at the received driving speed (T5).

When the second control process 508 is completed, the lens controller 37 notifies the first lens-side communication module 381 that the second control process 508 has been completed. Then, the lens controller 37 output an L-level signal to the signal line RDY (T5).

The communication performed for the period from the time T1 to the time T5 is one command data communication process. As described above, in one command data communication process, the camera controller 21 and the first camera-side communication module 291 transmit the camera-side command packet signal 502 and the camera-side data packet signal 506 at a time, respectively. As such, in this embodiment, the control data to be transmitted from the camera body 2 to the lens barrel 3 is divided into two data items and then transmitted for the convenience of processing. The camera-side command packet signal 502 and the camera-side data packet signal 506 are combined with each other to form one control data item.

Similarly, in one command data communication process, the lens controller 37 and the first lens-side communication module 381 transmit the lens-side command packet signal 503 and the lens-side data packet signal 507 at a time, respectively. As such, the response data to be transmitted from the lens barrel 3 to the camera body 2 is divided into two data items and then transmitted. The lens-side command packet signal 503 and the lens-side data packet signal 507 are combined with each other to form one response data item.

Next, the communication (hereinafter, referred to as hot-line communication) between the second camera-side communication module 292 and the second lens-side communication module 382 will be described. Returning to FIG. 29, the lens controller 37 performs the hot-line communication having a cycle (for example, 1 milliseconds interval) shorter than the command data communication through a signal line HREQ formed by the electric contacts BP7 and LP7, a signal line HANS formed by the electric contacts BP8 and LP8, a signal line HCLK formed by the electric contacts BP9 and LP9, and a signal line HDAT formed by the electric contacts BP10 and LP10.

For example, in this embodiment, the lens information of the lens barrel 3 is transmitted from the lens barrel 3 to the camera body 2 by the hot-line communication. The lens information transmitted by the hot-line communication includes the position of the focus lens 33, the position of the zoom lens 32, a current position image plane transfer coefficient $K_{cur}$, the minimum image plane transfer coefficient $K_{min}$, and the maximum image plane transfer coefficient $K_{max}$. Here, the current position image plane transfer coefficient $K_{cur}$ is the image plane transfer coefficient K corresponding to the current position (focal length) of the zoom lens 32 and the current position (object distance) of the focus lens 33. In this embodiment, the lens controller 37 can calculate the current position image plane transfer coefficient $K_{cur}$ corresponding to the current position of the zoom lens 32 and the current position of the focus lens 33, with reference to the table indicating the relationship between the positions of the lens (the position of the zoom lens and the position of the focus lens) and the image plane transfer coefficient K which is stored in the lens memory 38. For example, in the example illustrated in FIG. 28, when the position (focal length) of the zoom lens 32 is in the area "f1" and the position (object distance) of the focus lens 33 is in the area "D4", the lens controller 37 transmits "K14", "K11", and "K19" as the current position image plane transfer coefficient $K_{cur}$, the minimum image plane transfer coefficient $K_{min}$, and the maximum image plane transfer coefficient $K_{max}$ to the camera controller 21, respectively, using the hot-line communication.

Figure 31A:
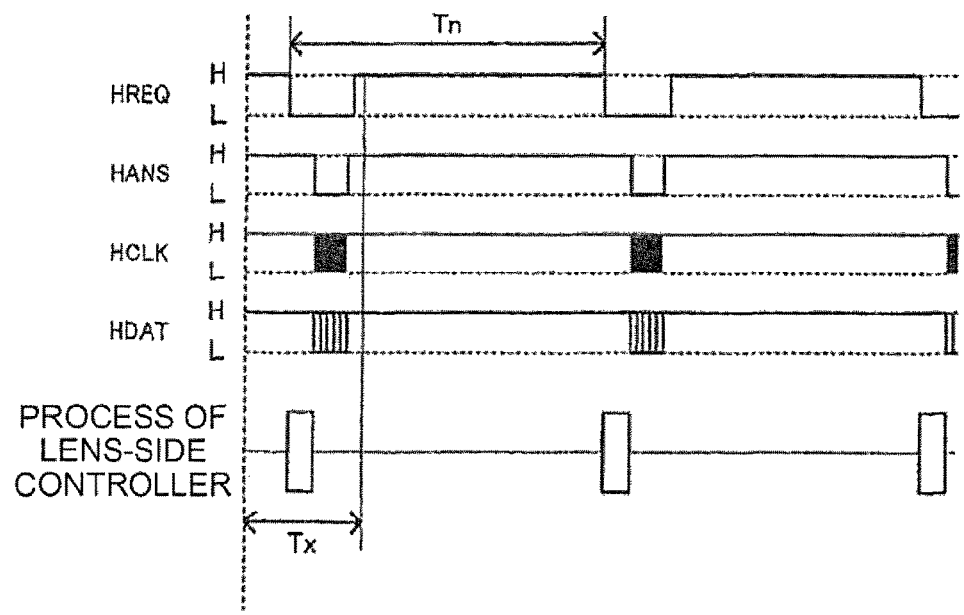
FIGS. 31A and 31B are diagrams illustrating an example of hot-line communication.
Figure 31B:
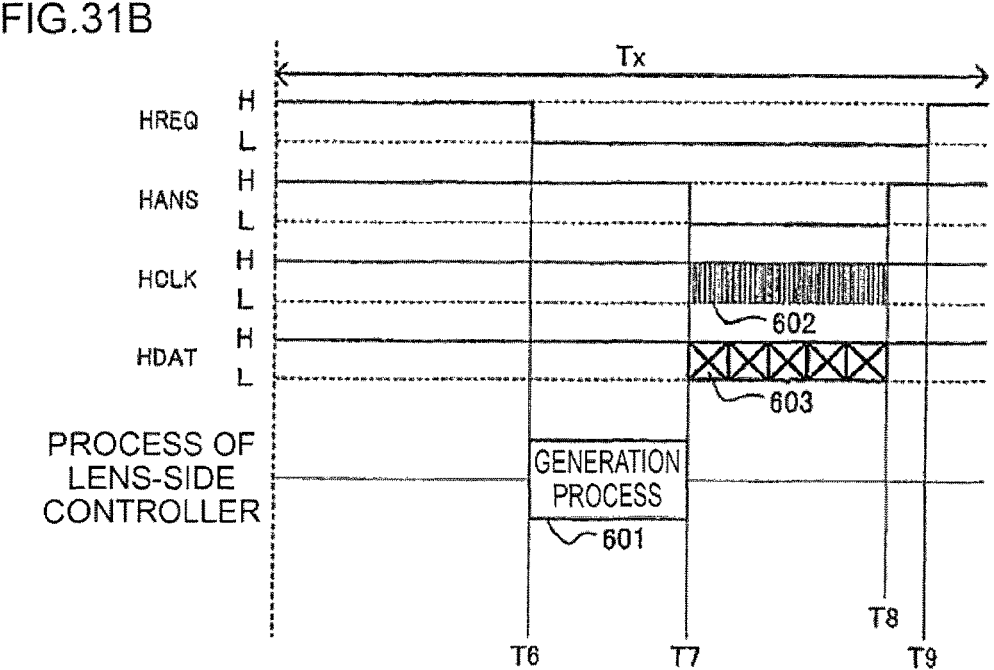

FIGS. 31A and 31B are timing charts illustrating an example of the hot-line communication. FIG. 31A is a diagram illustrating an aspect in which the hot-line communication is repeatedly performed with a predetermined period Tn. FIG. 31B shows an aspect in which the period Tx of one communication process among the hot-line communication processes which are repeatedly performed is enlarged. Next, an aspect in which the position of the focus lens 33 is transmitted by the hot-line communication will be described with reference to the timing chart illustrated in FIG. 31B.

First, the camera controller 21 and the second camera-side communication module 292 output an L-level signal to the signal line HREQ in order to perform the hot-line communication (T6). Then, the second lens-side communication module 382 notifies the lens controller 37 that the signal has been input to the electric contact LP7. The lens controller 37 starts the execution of a generation process 601 for generating lens position data in response to the notice. In the generation process 601, the lens controller 37 directs the focus lens encoder 332 to detect the position of the focus lens 33 and to generate lens position data indicating the detection result.

When the lens controller 37 completes the generation process 601, the lens controller 37 and the second lens-side communication module 382 output an L-level signal to the signal line HANS (T7). When the signal is input to the electric contact BP8, the camera controller 21 and the second camera-side communication module 292 output a clock signal 602 from the electric contact BP9 to the signal line HCLK.

The lens controller 37 and the second lens-side communication module 382 output a lens position data signal 603 indicating the lens position data from the electric contact LP10 to the signal line HDAT in synchronization with the clock signal 602. Then, when the transmission of the lens position data signal 603 is completed, the lens controller 37 and the second lens-side communication module 382 output an H-level signal from the electric contact LP8 to the signal line HANS (T8). Then, when the signal is input to the electric contact BP8, the second camera-side communication module 292 outputs an H-level signal from the electric contact LP7 to the signal line HREQ (T9).

The command data communication and the hot-line communication can be performed at the same time or in parallel.

Figure 32:
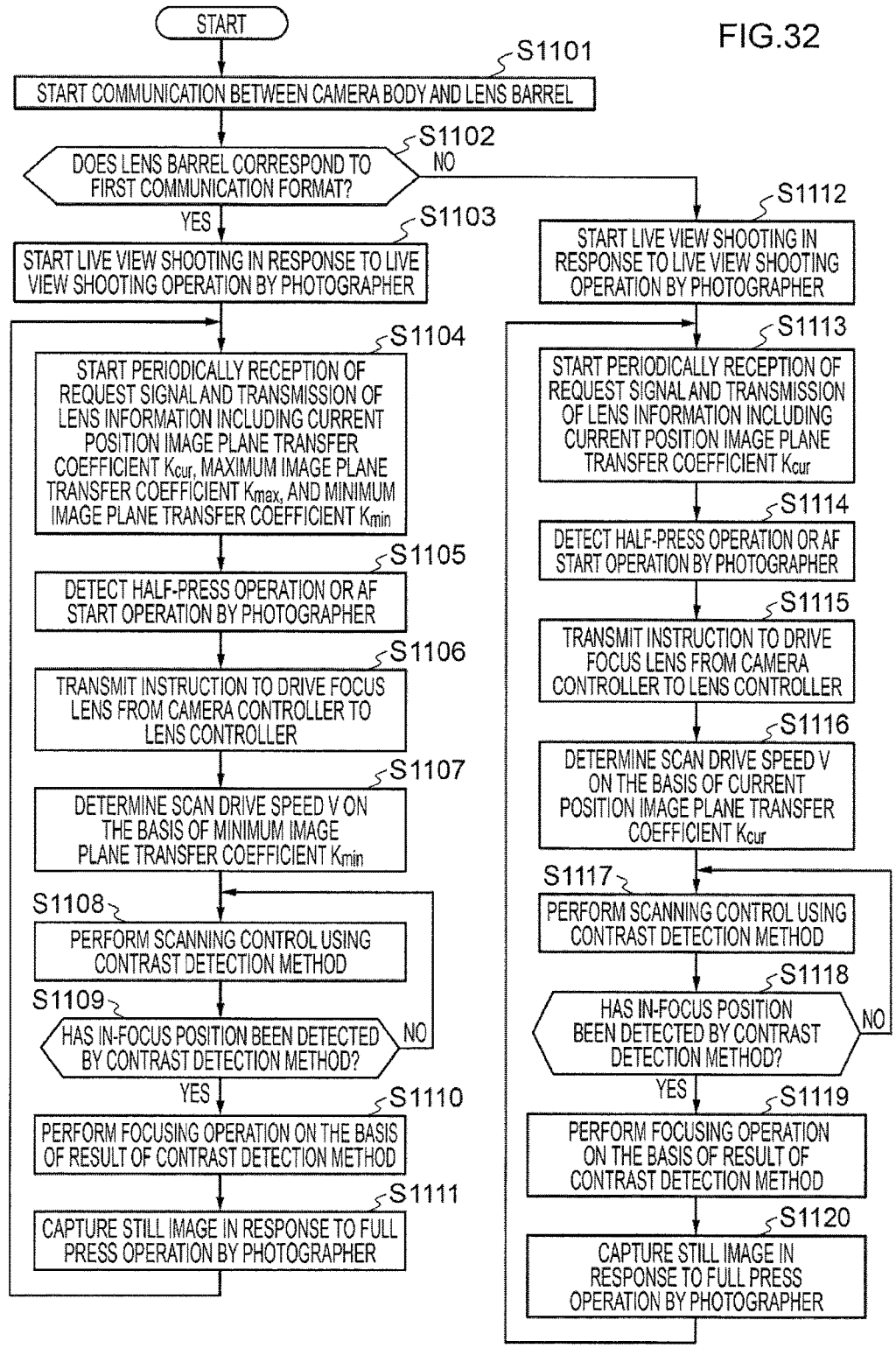
FIG. 32 is a flowchart illustrating an example of an operation according to the twelfth embodiment.

Next, an example of the operation of the camera 1 according to this embodiment will be described with reference to FIG. 32. FIG. 32 is a flowchart illustrating the operation of the camera 1 according to this embodiment. The following operation starts when the camera 1 is turned on.

First, in Step S1101, the camera body 2 performs communication for identifying the lens barrel 3. The available communication format varies depending on the type of lens barrel. Then, the process proceeds to Step S1102. In Step S1102, the camera controller 21 determines whether the lens barrel 3 is a lens corresponding to a predetermined first communication format. When it is determined that the lens barrel 3 is a lens corresponding to the first communication format, the process proceeds to Step S1103. On the other hand, when the camera controller 21 determines that the lens barrel 3 is a lens that does not correspond to the predetermined first communication format, the proceeds to Step S1112. When the camera controller 21 determines that the lens barrel 3 is a lens corresponding to a second communication format different from the first communication format, the process may proceed to Step S1112. When the camera controller 21 determines that the lens barrel 3 is a lens corresponding to the first and second communication formats, the process may proceed to Step S1103.

Then, in Step S1103, it is determined whether the photographer has turned on a live view shooting switch provided in the operation module 28. When the live view shooting switch is turned on, the mirror system 220 is moved to an object image capture position and beams from the object are guided to the imaging element 22.

In Step S1104, the hot-line communication between the camera body 2 and the lens barrel 3 starts. In the hot-line communication, as described above, when the lens controller 37 receives the L-level signal (request signal) which has been output to the signal line HREQ by the camera controller 21 and the second camera-side communication module 292, the lens information is transmitted to the camera controller 21. The transmission of the lens information is repeatedly performed. The lens information includes, for example, information about the position of the focus lens 33, the position of the zoom lens 32, the current position image plane transfer coefficient $K_{cur}$, the minimum image plane transfer coefficient $K_{min}$, and the maximum image plane transfer coefficient $K_{max}$. The hot-line communication is repeatedly performed after Step S1104. The hot-line communication is repeatedly performed, for example, until the power switch is turned off. At that time, for the current position image plane transfer coefficient $K_{cur}$, the minimum image plane transfer coefficient $K_{min}$, and the maximum image plane transfer coefficient $K_{max}$, it is preferable to transmit the current position image plane transfer coefficient $K_{cur}$, the minimum image plane transfer coefficient $K_{min}$, and the maximum image plane transfer coefficient $K_{max}$ in this order.

When transmitting the lens information to the camera controller 21, the lens controller 37 acquires the current position image plane transfer coefficient $K_{cur}$ corresponding to the current position of the zoom lens 32 and the current position of the focus lens 33, and the minimum image plane transfer coefficient $K_{min}$ and the maximum image plane transfer coefficient $K_{max}$ corresponding to the current position of the zoom lens 32, with reference to the table (see FIG. 28) indicating the relationship between the position of each lens and the image plane transfer coefficient K which is stored in the lens memory 38, and transmits the acquired current position image plane transfer coefficient $K_{cur}$, the acquired minimum image plane transfer coefficient $K_{min}$, and the acquired maximum image plane transfer coefficient $K_{max}$ to the camera controller 21.

In Step S1105, it is determined whether the photographer performs, for example, an operation of pressing a release button provided in the operation module 28 halfway (an operation of turning on the first switch SW1) or an AF start operation. When such operation is performed, the process proceeds to Step S1106 (the case in which the operation of pressing the release button halfway is performed will be described in detail below).

Then, in Step S1106, the camera controller 21 transmits a scan drive command (a scan drive start instruction) to the lens controller 37 in order to perform focus detection using the contrast detection method. The scan drive command (a driving speed instruction during scan drive or a driving position instruction) issued to the lens controller 37 may be, for example, the driving speed of the focus lens 33, the moving speed of the image plane, or a target driving position.

In Step S1107, the camera controller 21 performs a process of determining a scan drive speed V which is the driving speed of the focus lens 33 in the scanning operation, on the basis of the minimum image plane transfer coefficient $K_{min}$ acquired in Step S1104. The scanning operation is an operation which simultaneously performs the driving of the focus lens 33 by the focus lens driving motor 331 at the scan drive speed V determined in Step S1107 and the calculation of the focus evaluation value by the camera controller 21 using the contrast detection method at a predetermined interval to perform the detection of the in-focus position using the contrast detection method at a predetermined interval.

In the scanning operation, when the in-focus position is detected by the contrast detection method, the camera controller 21 calculates the focus evaluation value at a predetermined sampling interval while driving the focus lens 33 to perform scan drive and detects the lens position where the calculated focus evaluation value is a peak value as the in-focus position. Specifically, the camera controller 21 scan-drives the focus lens 33 to move the image plane formed by the optical system in the direction of the optical axis, calculates the focus evaluation values in different image planes, and detects the lens position where the focus evaluation value is a peak value as the in-focus position. However, in some cases, when the moving speed of the image plane is too high, the gap between the image planes for calculating the focus evaluation value is too large to appropriately detect the in-focus position. In particular, the image plane transfer coefficient K indicating the ratio of the amount of movement of the image plane to the amount of driving of the focus lens 33 varies depending on the position of the focus lens 33 in the direction of the optical axis. Therefore, even when the focus lens 33 is driven at a constant speed, the moving speed of the image plane is too high, depending on the position of the focus lens 33. As a result, in some cases, the gap between the image planes for calculating the focus evaluation value is too large to appropriately detect the in-focus position.

For this reason, in this embodiment, the camera controller 21 calculates the scan drive speed V of the focus lens 33 during the scan-driving operation, on the basis of the minimum image plane transfer coefficient $K_{min}$ acquired in Step S1104. The camera controller 21 calculates the scan drive speed V, which is a driving speed capable of appropriately detecting the in-focus position using the contrast detection method and is the maximum driving speed, on the basis of the minimum image plane transfer coefficient $K_{min}$.

In Step S1108, the scanning operation starts at the scan drive speed V determined in Step S1107. Specifically, the camera controller 21 transmits a scan drive start command to the lens controller 37, and the lens controller 37 drives the focus lens driving motor 331 to drive the focus lens 33 at the scan drive speed V determined in Step S1107, in response to the command from the camera controller 21. Then, the camera controller 21 reads a pixel output from the imaging pixel of the imaging element 22 at a predetermined interval while driving the focus lens 33 at the scan drive speed V, calculates the focus evaluation value on the basis of the pixel output, acquires the focus evaluation values at different positions of the focus lens, to detects the in-focus position using the contrast detection method.

Then, in Step S1109, the camera controller 21 determines whether the peak value of the focus evaluation value has been detected (whether the in-focus position has been detected). When the peak value of the focus evaluation value has not been detected, the process returns to Step S1108 and the operation in Steps S1108 and S1109 is repeatedly performed until the peak value of the focus evaluation value is detected or until the focus lens 33 is driven to a predetermined driving end. On the other hand, when the peak value of the focus evaluation value has been detected, the process proceeds to Step S1110.

When the peak value of the focus evaluation value has been detected, the process proceeds to Step S1110. In Step S1110, the camera controller 21 transmits a command to move the focus to the position corresponding to the peak value of the focus evaluation value to the lens controller 37. The lens controller 37 controls the driving of the focus lens 33 in response to the received command.

Then, the process proceeds to Step S1111. In Step S1111, the camera controller 21 determines that the focus lens 33 reaches the position corresponding to the peak value of the focus evaluation value and controls a still image capture process when the photographer fully presses the shutter release button (turns on the second switch SW2). After the imaging control ends, the process returns to Step S1104 again.

On the other hand, when it is determined in Step S1102 that the lens barrel 3 is a lens that does not correspond to the predetermined first communication format, the process proceeds to Step S1112 and the process from Step S1112 to Step S1120 is performed. The process from Step S1112 to Step S1120 is the same as the process from Step S1103 to Step S1111 except that information which does not include the minimum image plane transfer coefficient $K_{min}$ and the maximum image plane transfer coefficient $K_{max}$ is transmitted as the lens information when the lens information is repeatedly transmitted by the hot-line communication between the camera body 2 and the lens barrel 3 (Step S1113) and the current position image plane transfer coefficient $K_{cur}$ included in the lens information is used, instead of the minimum image plane transfer coefficient $K_{min}$ or the corrected minimum image plane transfer coefficient $K_{min\_x}$, when the scan drive speed V, which is the driving speed of the focus lens 33 in the scanning operation, is determined (Step S1116).

As described above, in this embodiment, the scan drive speed V, which is a driving speed capable of appropriately detecting the in-focus position using the contrast detection method and is the maximum driving speed, is calculated on the basis of the minimum image plane transfer coefficient $K_{min}$, which is the minimum image plane transfer coefficient, among the image plane transfer coefficients K stored in the lens memory 38 of the lens barrel 3. Therefore, even when the focus lens 33 is driven to the position where the image plane transfer coefficient K has the minimum value (for example, the same value as the minimum image plane transfer coefficient $K_{min}$), the calculation interval of the focus evaluation value (the gap between the image planes for calculating the focus evaluation value) can be set to a value suitable for detecting the focus. According to this embodiment, when the focus lens 33 is driven in the direction of the optical axis, the image plane transfer coefficient K is changed, and as a result, even when the image plane transfer coefficient K is reduced (for example, when the image plane transfer coefficient K becomes the minimum image plane transfer coefficient $K_{min}$), it is possible to appropriately detect the in-focus position using the contrast detection method.

«Thirteenth Embodiment»

Next, a thirteenth embodiment of the invention will be described. The thirteenth embodiment has the same structure as the twelfth embodiment except for a setting method of the minimum image plane transfer coefficient $K_{min}$ and the maximum image plane transfer coefficient $K_{max}$ among the image plane transfer coefficients K stored in the lens memory 38 of the lens barrel 3 in the camera 1 illustrated in FIG. 25 and has the same operation, function, and effect as the twelfth embodiment.

In this embodiment, the image plane transfer coefficient K is set such that the image plane transfer coefficient K becomes the minimum when the focus lens 33 is driven to the vicinity of the near soft limit position 460. That is, the image plane transfer coefficient K is set such that the image plane transfer coefficient K becomes the minimum when the focus lens 33 is driven to the vicinity of the near soft limit position 460 rather than when the focus lens 33 is moved to any position in the range from the near soft limit position 460 to the infinite soft limit position 450.

Similarly, the image plane transfer coefficient K is set such that the image plane transfer coefficient K becomes the maximum when the focus lens 33 is driven to the vicinity of the infinite soft limit position 450. That is, the image plane transfer coefficient K is set such that the image plane transfer coefficient K becomes the maximum when the focus lens 33 is driven to the vicinity of the near infinite soft limit position 450 rather than when the focus lens 33 is moved to any position in the range from the near soft limit position 460 to the infinite soft limit position 450.

That is, for the minimum image plane transfer coefficient $K_{min}$, in the twelfth embodiment, the image plane transfer coefficient K when the focus lens 33 is driven in the vicinity of the near in-focus position 480 including the near in-focus position 480 is set as the minimum image plane transfer coefficient $K_{min}$. However, in the thirteenth embodiment, the image plane transfer coefficient K when the focus lens 33 is driven in the vicinity of the near soft limit position 460 including the near soft limit position 460 is set as the minimum image plane transfer coefficient $K_{min}$.

FIG. 33 illustrates a table indicating the relationship among the position (focal length) of the zoom lens 32, the position (object distance) of the focus lens 33, and the image plane transfer coefficient K in the thirteenth embodiment. That is, in the thirteenth embodiment, the image plane transfer coefficient K in the area "D0" which is closer to the near side than the area "D1" including the near in-focus position 480 illustrated in FIG. 27 is set as the minimum image plane transfer coefficient $K_{min}$. In this embodiment, among the positions of the focus lens 33, "D0" is a predetermined area corresponding to the near soft limit position 460 illustrated in FIG. 27. For example, the area "D0" is a predetermined area in the vicinity of the near soft limit position 460 illustrated in FIG. 27. In addition, "D10" is a predetermined area corresponding to the infinite soft limit position 450 illustrated in FIG. 27. For example, the area "D10" is a predetermined area in the vicinity of the infinite soft limit position 450 illustrated in FIG. 27. In addition, "K10", "K20", "K30", "K40", "K50", "K60", "K70", "K80", and "K90" which are shown in gray in FIG. 33 indicate the minimum image plane transfer coefficient $K_{min}$ indicating the minimum value among the image plane transfer coefficients K at each position (focal length) of the zoom lens 32.

Similarly, for the maximum image plane transfer coefficient $K_{max}$, in the twelfth embodiment, the image plane transfer coefficient K when the focus lens 33 is driven in the vicinity of the infinite in-focus position 470 including the infinite in-focus position 470 is set as the maximum image plane transfer coefficient $K_{max}$. However, in the thirteenth embodiment, the image plane transfer coefficient K when the focus lens 33 is driven in the vicinity of the infinite soft limit position 450 including the infinite soft limit position 450 is set as the maximum image plane transfer coefficient $K_{max}$. That is, in the thirteenth embodiment, the image plane transfer coefficient K in the area "D10" which is closer to the infinity side than the area "D9" including the infinite in-focus position 470 illustrated in FIG. 27 is set as the maximum image plane transfer coefficient $K_{max}$. In addition, "K110", "K210", "K310", "K410", "K510", "K610", "K710", "K810", and "K910" which are hatched in FIG. 33 indicate the maximum image plane transfer coefficient $K_{max}$ indicating the maximum value among the image plane transfer coefficients K at each position (focal length) of the zoom lens 32.

Alternatively, in the thirteenth embodiment, for the minimum image plane transfer coefficient $K_{min}$, instead of the image plane transfer coefficient K when the focus lens 33 is driven in the vicinity of the near soft limit position 460 including the near soft limit position 460, the image plane transfer coefficient K when the focus lens 33 is driven in the vicinity of the mechanical end point 440 including the mechanical end point 440 in the near direction 420 may be set as the minimum image plane transfer coefficient $K_{min}$ and then stored in the lens memory 38.

Furthermore, in the thirteenth embodiment, for the maximum image plane transfer coefficient $K_{max}$, instead of the image plane transfer coefficient K when the focus lens 33 is driven in the vicinity of the infinite soft limit position 450 including the infinite soft limit position 450, the image plane transfer coefficient K when the focus lens 33 is driven in the vicinity of the mechanical end point 430 including the mechanical end point 430 in the infinity direction 410 may be set as the minimum image plane transfer coefficient $K_{max}$ and then stored in the lens memory 38.

«Fourteenth Embodiment»

Next, a fourteenth embodiment of the invention will be described. The fourteenth embodiment has the same structure as the twelfth embodiment except for the following operation in the camera 1 illustrated in FIG. 25.

That is, the fourteenth embodiment is the same as the twelfth embodiment except that, in Step S1103 of the flowchart illustrated in FIG. 32 in the twelfth embodiment, a corrected minimum image plane transfer coefficient $K_{min\_x}$ and a corrected maximum image plane transfer coefficient $K_{max\_x}$ are transmitted as the lens information, instead of the minimum image plane transfer coefficient $K_{min}$ and the maximum image plane transfer coefficient $K_{max}$.

The corrected minimum image plane transfer coefficient $K_{min\_x}$ is an image plane transfer coefficient which is obtained by correcting the minimum image plane transfer coefficient $K_{min}$ and is smaller than the minimum image plane transfer coefficient $K_{min}$. For example, the corrected minimum image plane transfer coefficient $K_{min\_x}$ is calculated by multiplying the minimum image plane transfer coefficient $K_{min}$ by a constant $\alpha 1$ (for example, 0.9) that is less than 1. Similarly, the corrected maximum image plane transfer coefficient $K_{max\_x}$ is an image plane transfer coefficient which is obtained by correcting the maximum image plane transfer coefficient $K_{max}$ and is greater than the maximum image plane transfer coefficient $K_{max}$. For example, the corrected maximum image plane transfer coefficient $K_{max\_x}$ is calculated by multiplying the maximum image plane transfer coefficient $K_{max}$ by a constant $\alpha 2$ (for example, 1.1) that is greater than 1.

In the fourteenth embodiment, in Step S1106 of the flowchart illustrated in FIG. 32, when a process of determining a scan drive speed V which is the driving speed of the focus lens 33 in a scanning operation is performed, the scan drive speed V is determined on the basis of the corrected minimum image plane transfer coefficient $K_{min\_x}$, instead of the minimum image plane transfer coefficient $K_{min}$. In particular, in the fourteenth embodiment, since the corrected minimum image plane transfer coefficient $K_{min\_x}$ that is less than the minimum image plane transfer coefficient $K_{min}$ is used, instead of the minimum image plane transfer coefficient $K_{min}$, it is possible to set a safety margin when the scan drive speed V is determined. Therefore, it is possible to reliably prevent the problem that the moving speed of the image plane is too high to appropriately detect the in-focus position when focus detection is performed by a contrast detection method.

As the corrected minimum image plane transfer coefficient $K_{min\_x}$ and the corrected maximum image plane transfer coefficient $K_{max\_x}$, coefficients which are calculated in advance may be stored in the lens memory 38 and then used. Alternatively, when the corrected minimum image plane transfer coefficient $K_{min\_x}$ and the corrected maximum image plane transfer coefficient $K_{max\_x}$ are calculated, the constants $\alpha 1$ and $\alpha 2$ may be appropriately set according to, for example, imaging condition and the corrected minimum image plane transfer coefficient $K_{min\_x}$ and the corrected maximum image plane transfer coefficient $K_{max\_x}$ may be calculated for each process. In addition, in the fourteenth embodiment, a method which multiplies the minimum image plane transfer coefficient $K_{min}$ and the maximum image plane transfer coefficient $K_{max}$ before correction by predetermined constants $\alpha 1$ and $\alpha 2$, respectively, is given as an example of the method for calculating the corrected minimum image plane transfer coefficient $K_{min\_x}$ and the corrected maximum image plane transfer coefficient $K_{max\_x}$. However, the invention is not particularly limited to the method.

In the fourteenth embodiment, when the corrected minimum image plane transfer coefficient $K_{min\_x}$ and the corrected maximum image plane transfer coefficient $K_{max\_x}$ may be transmitted from the lens barrel 3 to the camera body 2, the same method as that used to transmit the minimum image plane transfer coefficient $K_{min}$ and the maximum image plane transfer coefficient $K_{mzx}$ which have not been corrected can be applied. That is, the following method may be used: the corrected minimum image plane transfer coefficient $K_{min\_x}$ and corrected maximum image plane transfer coefficient $K_{max\_x}$ are transmitted in practice, but the camera body 2 recognizes the corrected minimum image plane transfer coefficient $K_{min\_x}$ and corrected maximum image plane transfer coefficient $K_{max\_x}$ as the minimum image plane transfer coefficient $K_{min}$ and the maximum image plane transfer coefficient $K_{max}$ which have not been corrected. Accordingly, it is possible to simplify the process of the camera body 2.

«Fifteenth Embodiment»

Next, a fifteenth embodiment of the invention will be described. The fifteenth embodiment has the same structure as the twelfth embodiment except for the following operation in the camera 1 illustrated in FIG. 25.

That is, the fifteenth embodiment is characterized in that, in the flowchart illustrated in FIGS. 31A and 31B in the twelfth embodiment, when the in-focus position has been detected by the contrast detection method in Step S1109 and the focusing operation is performed on the basis of the result of the contrast detection method in Step S1110, it is determined whether to perform a backlash reduction operation and a method for driving the focus lens 33 during the focusing operation varies depending on the determination result. The fifteenth embodiment is the same as the twelfth embodiment except for this point.

Figure 34:
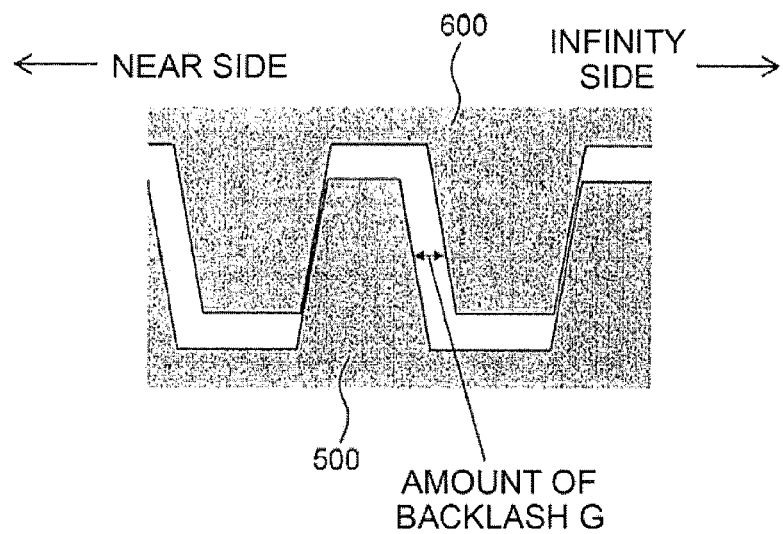
FIG. 34 is a diagram illustrating the amount of backlash G of a driving transfer mechanism of a focus lens 33.
Figure 35:
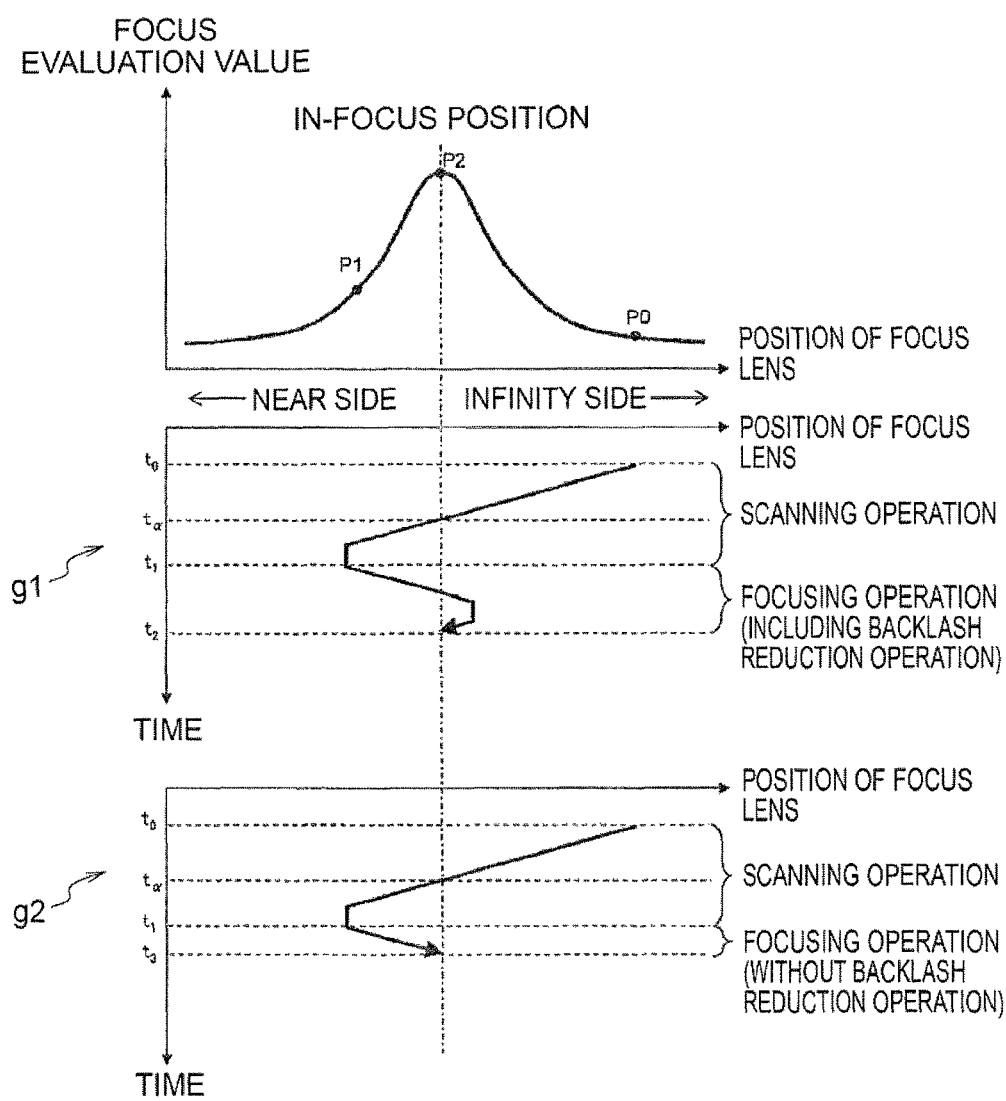
FIG. 35 is a diagram illustrating the relationship between the position of the focus lens and a focus evaluation value and the relationship between the position of the focus lens and time when a scanning operation and a focusing operation based on a contrast detection method according to this embodiment are performed.

That is, the focus lens driving motor 331 for driving the focus lens 33 illustrated in FIG. 25 is generally a mechanical driving transfer mechanism. For example, as illustrated in FIG. 34, the driving transfer mechanism includes a first driving mechanism 500 and a second driving mechanism 600. When the first driving mechanism 500 is driven, the second driving mechanism 600 of a side of the focus lens 33 is driven to move the focus lens 33 to the near side or the infinity side. In the driving mechanism, the amount of backlash G is generally provided in order to smoothly operate an engaged portion of a gear. In the contrast detection method, in the mechanism, as illustrated in FIG. 35, after the focus lens 33 passes through the in-focus position once, the driving direction of the focus lens 33 needs to be reversed and the focus lens 33 needs to be driven to the in-focus position by the scanning operation. In this case, when the backlash reduction operation is not performed as illustrated in Fig. graph g2 in FIG. 35, the position of the focus lens 33 deviates from the in-focus position by the amount of backlash G. Therefore, during the driving of the focus lens 33 to the in-focus position, after the focus lens 33 passes through the in-focus position once, it is necessary to perform the backlash reduction operation which reverses the driving direction again and drives the focus lens 33 to the in-focus position in order to remove the influence of the amount of backlash G, as illustrated in graph g1 in FIG. 35.

FIG. 35 is a diagram illustrating the relationship between the position of the focus lens and a focus evaluation value and the relationship between the position of the focus lens and time when the scanning operation and the focusing operation based on the contrast detection method according to this embodiment. The graph g1 in FIG. 35 shows an aspect in which the scanning operation of the focus lens 33 starts from a lens position P0 in a direction from the infinity side to the near side at a time $t_0$; when the peak position (in-focus position) P2 of the focus evaluation value is detected while the focus lens 33 is moved to a lens position P1, the scanning operation is stopped and the focusing operation involving the backlash reduction operation is performed at a time $t_1$; and the focus lens 33 is driven to the in-focus position at a time $t_2$. Similarly, the graph g2 in FIG. 35 shows an aspect in which the scanning operation starts at the time $t_0$; the scanning operation is stopped and the focusing operation without involving the backlash reduction operation is performed at the time $t_1$; and the focus lens 33 is driven to the in-focus position at a time $t_3$.

Figure 36:
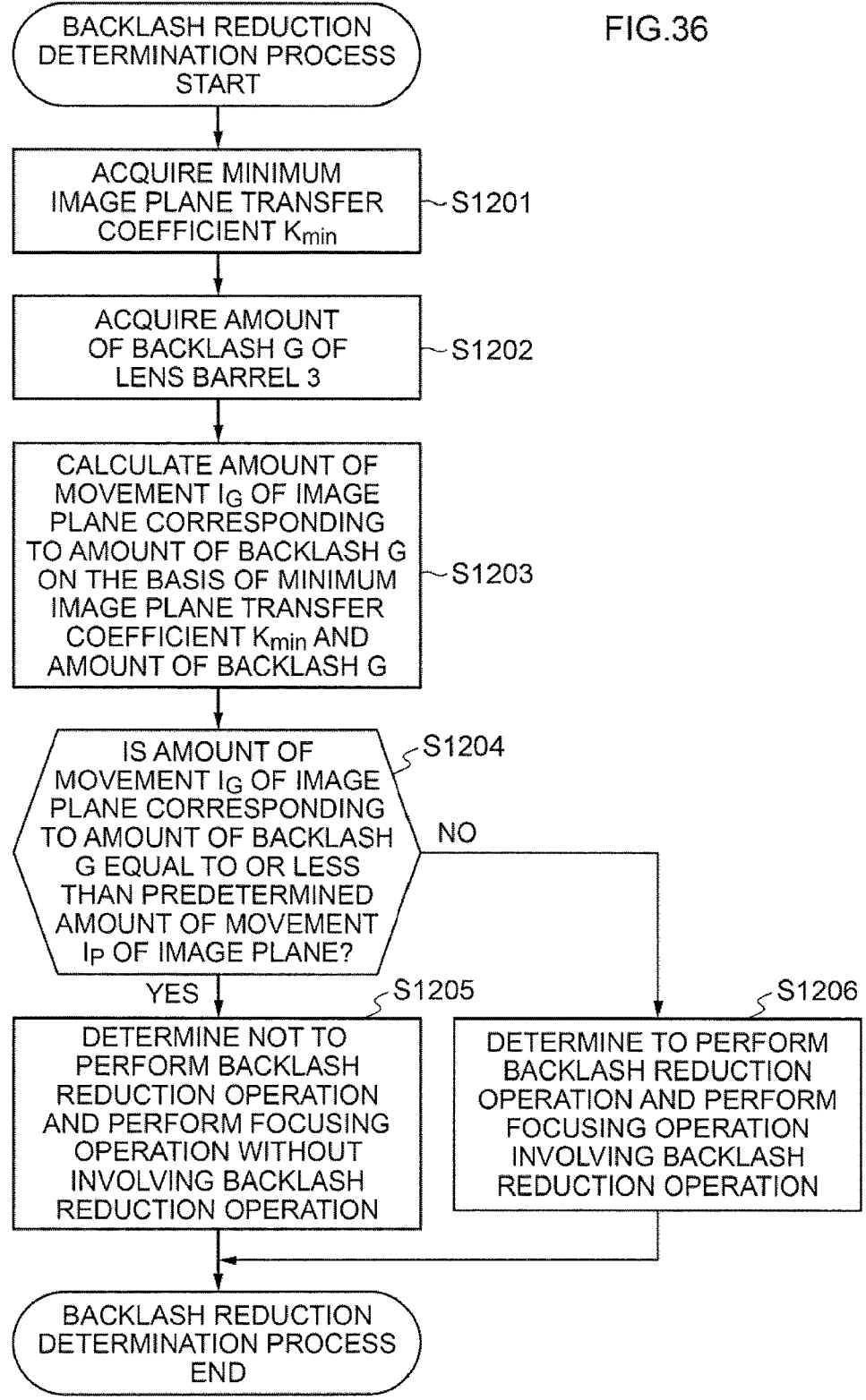
FIG. 36 is a flowchart illustrating an example of an operation according to a fifteenth embodiment.

Next, an example of the operation according to the fifteenth embodiment will be described with reference to the flowchart illustrated in FIG. 36. The following operation is performed when the in-focus position is detected by the contrast detection method in Step S1109 in the flowchart illustrated in FIG. 31. That is, as illustrated in FIG. 35, the scanning operation starts at the time $t_0$. Then, when the peak position (in-focus position) P2 of the focus evaluation value is detected at the time of when the focus lens 33 is moved to the lens position P1 at the time $t_1$, the operation is performed at the time $t_1$.

That is, when the in-focus position is detected by the contrast detection method, first, the camera controller 21 acquires the minimum image plane transfer coefficient $K_{min}$ at the current position of the zoom lens 32 in Step S1201. The minimum image plane transfer coefficient $K_{min}$ can be acquired from the lens controller 37 through the lens transceiver 39 and the camera transceiver 29 by the hot-line communication between the camera controller 21 and the lens controller 37.

In Step S1202, the camera controller 21 acquires information about the amount of backlash G (see FIG. 34) of the driving transfer mechanism of the focus lens 33. The amount of backlash G of the driving transfer mechanism of the focus lens 33 can be stored in, for example, the lens memory 38 of the lens barrel 3 in advance and the information about the amount of backlash G can be acquired with reference to the lens memory 38. That is, specifically, the camera controller 21 transmits a request to transmit the amount of backlash G of the driving transfer mechanism of the focus lens 33 to the lens controller 37 through the camera transceiver 29 and the lens transceiver 39 to request the lens controller 37 to transmit information about the amount of backlash G of the driving transfer mechanism of the focus lens 33 stored in the lens memory 38, and acquires the information about the amount of backlash G. Alternatively, the information about the amount of backlash G of the driving transfer mechanism of the focus lens 33 stored in the lens memory 38 may be inserted into the lens information which is transmitted and received by the hot-line communication between the camera controller 21 and the lens controller 37.

Then, in Step S1203, the camera controller 21 calculates the amount of movement $I_G$ of the image plane corresponding to the amount of backlash G, on the basis of the minimum image plane transfer coefficient $K_{min}$ acquired in Step S1201 and the information about the amount of backlash G of the driving transfer mechanism of the focus lens 33 acquired in Step S1202. The amount of movement $I_G$ of the image plane corresponding to the amount of backlash G is the amount of movement of the image plane when the focus lens is driven by a distance that is equal to the amount of backlash G. In this embodiment, the amount of movement $I_G$ of the image plane is calculated by the following expression:

Amount of movement $I_G$ of image plane corresponding to amount of backlash $G$=Amount of backlash $G$×Minimum image plane transfer coefficient $K_{min}$.

Then, in Step S1204, the camera controller 21 performs a process of comparing the amount of movement $I_G$ of the image plane corresponding to the amount of backlash G calculated in Step S1203 with a predetermined amount of movement $I_P$ of the image plane and determines whether the amount of movement $I_G$ of the image plane corresponding to the amount of backlash G is equal to or less than the predetermined amount of movement $I_P$ of the image plane, that is, whether "the amount of movement $I_G$ of the image plane corresponding to the amount of backlash G"≤"the predetermined amount of movement $I_P$ of the image plane" is established, on the basis of the comparison result. The predetermined amount of movement $I_P$ of the image plane is set corresponding to the focus depth of the optical system. In general, the amount of movement of the image plane corresponds to the focus depth. In addition, since the predetermined amount of movement $I_P$ of the image plane is set to the focus depth of the optical system, the predetermined amount of movement $I_P$ of the image plane may be appropriately set according to the F-number, the cell size of the imaging element 22, or the format of the image to be captured. That is, as the F-number increases, the predetermined amount of movement $I_P$ of the image plane can be set to a larger value. Alternatively, as the cell size of the imaging element 22 increases or as the image format is smaller, the predetermined amount of movement $I_P$ of the image plane can be set to a larger value. When the amount of movement $I_G$ of the image plane corresponding to the amount of backlash G is equal to or less than the predetermined amount of movement $I_P$ of the image plane, the process proceeds to Step S1205. On the other hand, when the amount of movement $I_G$ of the image plane corresponding to the amount of backlash G is more than the predetermined amount of movement $I_P$ of the image plane, the process proceeds to Step S1206.

Since it has been determined in Step S1204 that the amount of movement $I_G$ of the image plane corresponding to the amount of backlash G is equal to or less than the predetermined amount of movement $I_P$ of the image plane, it is determined that the position of the focus lens 33 after driving can fall within the focus depth of the optical system, even though the backlash reduction operation is not performed. Therefore, in Step S1205, it is determined that the backlash reduction operation is not performed during the focusing operation and the focusing operation without involving the backlash reduction operation is performed, on the basis of the determination result. That is, when the focusing operation is performed, it is determined that the focus lens 33 is directly driven to the in-focus position and the focusing operation without involving the backlash reduction operation is performed on the basis of the determination result, as illustrated in graph g2 in FIG. 35.

On the other hand, since it has been determined in Step S1204 that the amount of movement $I_G$ of the image plane corresponding to the amount of backlash G is more than the predetermined amount of movement $I_P$ of the image plane, it is determined that the backlash reduction operation needs to be performed in order to fall the position of the focus lens 33 after driving within the focus depth of the optical system. Therefore, in Step S1206, it is determined that the backlash reduction operation is performed during the focusing operation and the focusing operation involving the backlash reduction operation is performed, on the basis of the determination result. That is, when the focus lens 33 is driven to perform the focusing operation, it is determined to perform a process which drives the focus lens 33 to pass through the in-focus position, reverses the driving direction, and drives the focus lens 33 to the in-focus position, and the focusing operation involving the backlash reduction operation is performed on the basis of the determination result, as illustrated in graph g1 in FIG. 35.

In the fifteenth embodiment, as described above, the amount of movement $I_G$ of the image plane corresponding to the amount of backlash G is calculated on the basis of the minimum image plane transfer coefficient $K_{min}$ and the information about the amount of backlash G of the driving transfer mechanism of the focus lens 33, and it is determined whether the calculated amount of movement $I_G$ of the image plane corresponding to the amount of backlash G is equal to or less than the predetermined amount of movement $I_P$ of the image plane corresponding to the focus depth of the optical system. In this way, backlash reduction control which determines whether to perform the backlash reduction operation during the focusing operation is performed. The backlash reduction operation is not performed when it is determined that the amount of movement $I_G$ of the image plane corresponding to the amount of backlash G is equal to or less than the predetermined amount of movement $I_P$ of the image plane corresponding to the focus depth of the optical system and the position of the focus lens 33 after driving can fall within the focus depth of the optical system. In contrast, the backlash reduction operation is performed when it is determined that the amount of movement $I_G$ of the image plane corresponding to the amount of backlash G is more than the predetermined amount of movement $I_P$ of the image plane corresponding to the focus depth of the optical system and the backlash reduction operation needs to be performed in order to fall the position of the focus lens 33 after driving within the focus depth of the optical system. Therefore, according to this embodiment, when the backlash reduction operation is not required, the backlash reduction operation is not performed, thereby reducing the time required to drive the focus lens to the in-focus position. As a result, it is possible to reduce the time required for the focusing operation. On the other hand, when the backlash reduction operation is required, the backlash reduction operation is performed. Therefore, it is possible to improve the accuracy of focusing.

In particular, in the fifteenth embodiment, the amount of movement $I_G$ of the image plane corresponding to the amount of backlash G of the driving transfer mechanism of the focus lens 33 is calculated using the minimum image plane transfer coefficient $K_{min}$ and is compared with the predetermined amount of movement $I_P$ of the image plane corresponding to the focus depth of the optical system. Therefore, it is possible to appropriately determine whether the backlash reduction operation is required during the focusing operation.

In the backlash reduction control according to the fifteenth embodiment, the camera controller 21 may determine whether backlash reduction is required, according to the focal length, the diaphragm, and the object distance. In addition, the camera controller 21 may change the amount of backlash reduction, depending on the focal length, the diaphragm, and the object distance. For example, when the aperture value of the diaphragm is less than a predetermined value (the F-number is large), it may be determined that backlash reduction is not required or may be controlled such that the amount of backlash reduction is reduced, as compared to a case in which the aperture value of the diaphragm is not less than the predetermined value (the F-number is small). In addition, for example, on the wide side, it may be determined that backlash reduction is not required or control may be performed such that the amount of backlash reduction is reduced, as compared to the telephoto side.

«Sixteenth Embodiment»

Next, a sixteenth embodiment of the invention will be described. The sixteenth embodiment has the same structure as the twelfth embodiment except for the following operation in the camera 1 illustrated in FIG. 25.

That is, in the sixteenth embodiment, the following clip operation (silent control) is performed. In the sixteenth embodiment, in search control using the contrast detection method, the moving speed of the image plane of the focus lens 33 is controlled to be constant. In the search control using the contrast detection method, the clip operation is performed in order to suppress the driving sound of the focus lens 33. The clip operation according to the sixteenth embodiment clips the speed of the focus lens 33 such that the speed of the focus lens 33 is not less than a silent lens moving speed lower limit when the speed of the focus lens 33 is low and hinders silent movement.

In the sixteenth embodiment, the camera controller 21 of the camera body 2 compares a predetermined silent lens moving speed lower limit V0b with a driving speed V1a of the focus lens, using a predetermined coefficient (Kc), to determine whether to perform the clip operation, which will be described below.

Figure 37:
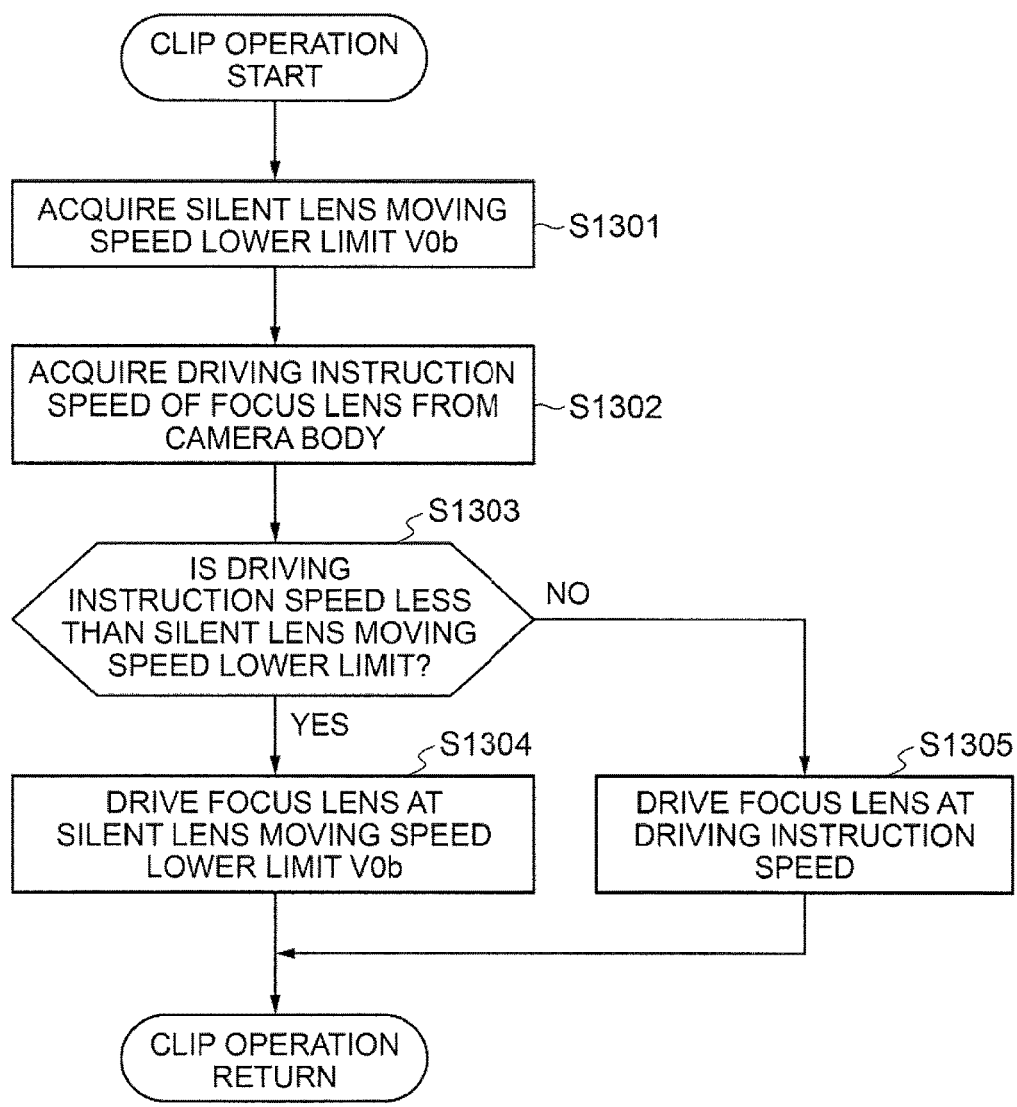
FIG. 37 is a flowchart illustrating a clip operation according to a sixteenth embodiment.

When the clip operation is permitted by the camera controller 21, the lens controller 37 limits the driving speed of the focus lens 33 to the silent lens moving speed lower limit V0b such that the driving speed V1a of the focus lens 33, which will be described below, is not less than the silent lens moving speed lower limit V0b. Next, the clip operation will be described in detail with reference to the flowchart illustrated in FIG. 37. Here, FIG. 37 is a flowchart illustrating the clip operation (silent control) according to the sixteenth embodiment.

In Step S1301, the lens controller 37 acquires the silent lens moving speed lower limit V0b. The silent lens moving speed lower limit V0b is stored in the lens memory 38 and the lens controller 37 can acquire the silent lens moving speed lower limit V0b from the lens memory 38.

In Step S1302, the lens controller 37 acquires the driving instruction speed of the focus lens 33. In this embodiment, the driving instruction speed of the focus lens 33 is transmitted from the camera controller 21 to the lens controller 37 by command data communication. Accordingly, the lens controller 37 can acquire the driving instruction speed of the focus lens 33 from the camera controller 21.

In Step S1303, the lens controller 37 compares the silent lens moving speed lower limit V0b acquired in Step S1301 with the driving instruction speed of the focus lens 33 acquired in Step S1302. Specifically, the lens controller 37 determines whether the driving instruction speed (unit: pulse/second) of the focus lens 33 is less than the silent lens moving speed lower limit V0b (unit: pulse/second). When the driving instruction speed of the focus lens 33 is less than the silent lens moving speed lower limit, the process proceeds to Step S1304. On the other hand, when the driving instruction speed of the focus lens 33 is equal to or greater than the silent lens moving speed lower limit V0b, the process proceeds to Step S1305.

In Step S1304, it has been determined that the driving instruction speed of the focus lens 33 transmitted from the camera body 2 is less than the silent lens moving speed lower limit V0b. In this case, the lens controller 37 drives the focus lens 33 at the silent lens moving speed lower limit V0b in order to suppress the driving sound of the focus lens 33. As such, when the driving instruction speed of the focus lens 33 is less than the silent lens moving speed lower limit V0b, the lens controller 37 limits the lens driving speed V1a of the focus lens 33 to the silent lens moving speed lower limit V0b.

In Step S1305, it has been determined that the driving instruction speed of the focus lens 33 transmitted from the camera body 2 is equal to or greater than the silent lens moving speed lower limit V0b. Since a driving sound of the focus lens 33 that is equal to or greater than a predetermined value is not generated (or the driving sound is very small), the lens controller 37 drives the focus lens 33 at the driving instruction speed of the focus lens 33 transmitted from the camera body 2.

Figure 38:
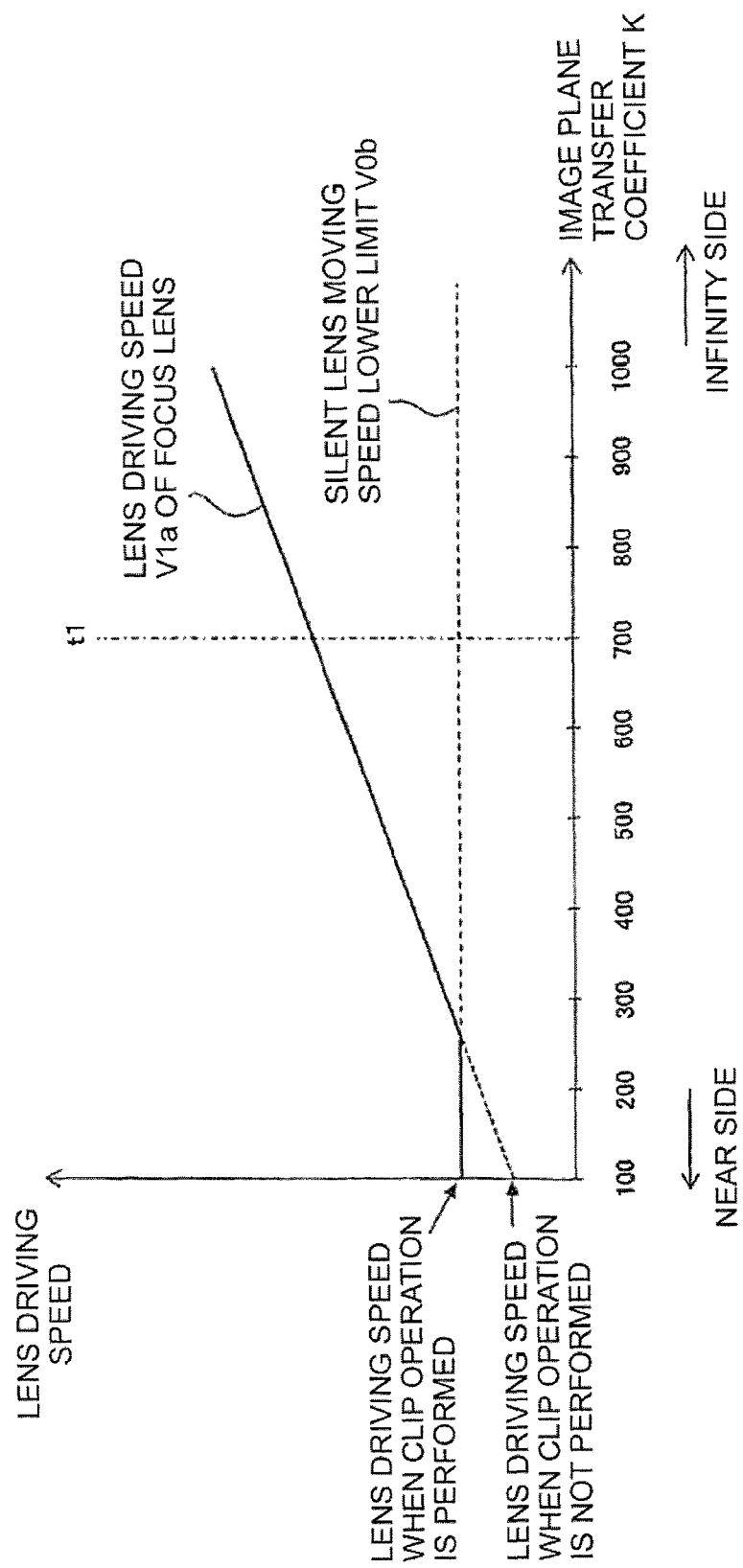
FIG. 38 is a diagram illustrating the relationship between a lens driving speed V1$a$ of the focus lens and a silent lens moving speed lower limit V0$b$.

Here, FIG. 38 is a graph illustrating the relationship between the lens driving speed V1a of the focus lens 33 and the silent lens moving speed lower limit V0b. In the graph, the vertical axis shows the lens driving speed and the horizontal axis shows the image plane transfer coefficient K. As illustrated on the horizontal axis in FIG. 38, the image plane transfer coefficient K varies depending on the position of the focus lens 33. In the example illustrated in FIG. 38, the image plane transfer coefficient K tends to decrease toward the near side and to increase toward the infinity side. In contrast, in this embodiment, when a focus detection operation is performed, the focus lens 33 is driven at the speed at which the moving speed of the image plane is constant. Therefore, as illustrated in FIG. 38, the actual driving speed V1a of the focus lens 33 varies depending on the position of the focus lens 33. That is, in the example illustrated in FIG. 38, when the focus lens 33 is driven such that the moving speed of the image plane is constant, the lens moving speed V1a of the focus lens 33 is reduced toward the near side and increases toward the infinity side.

Figure 40:
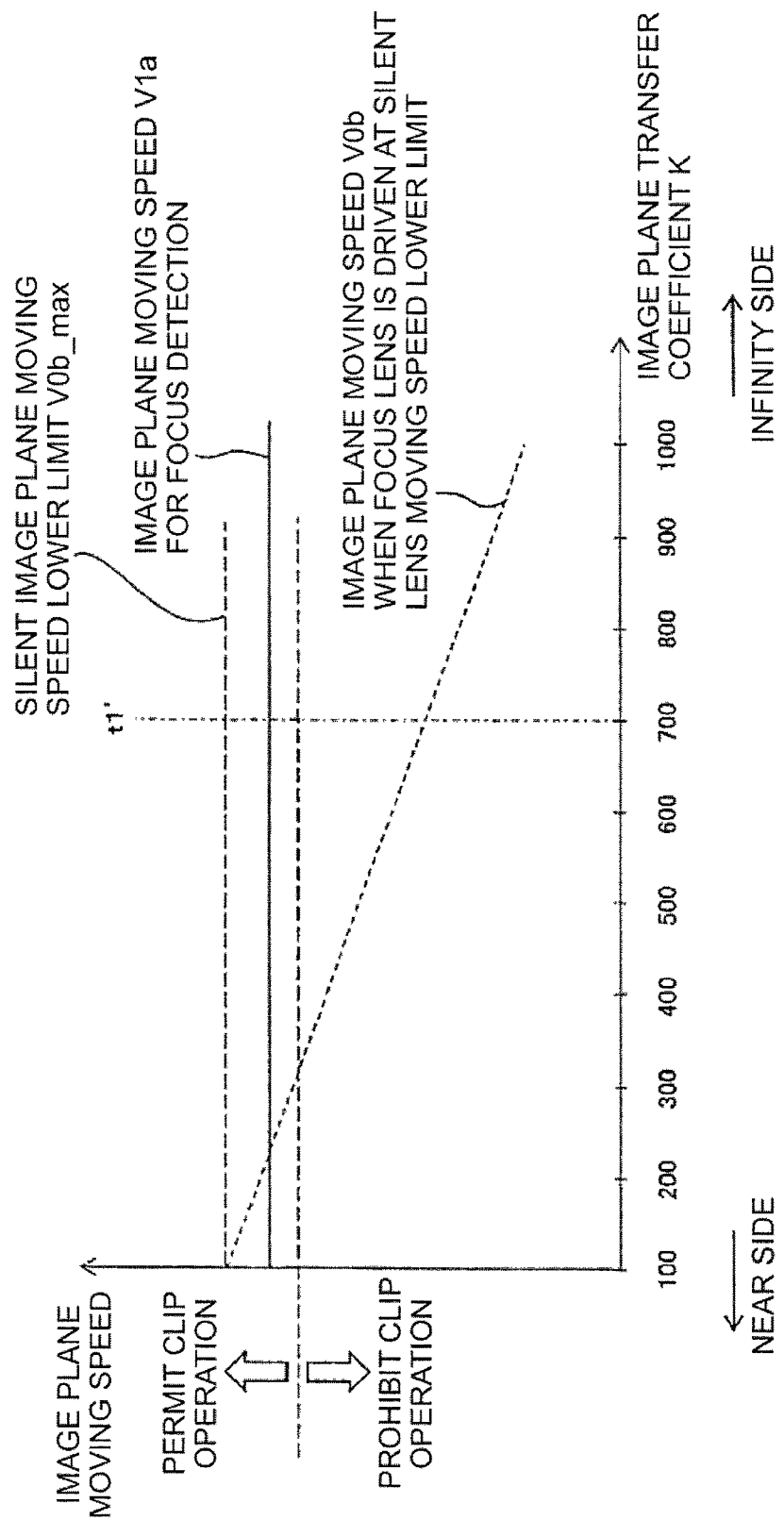
FIG. 40 is a diagram illustrating the relationship between an image plane moving speed V1$a$ of the focus lens and a silent image plane moving speed lower limit V0$b$_max.

On the other hand, when the focus lens 33 is driven as illustrated in FIG. 38, the moving speed of the image plane is constant as illustrated in FIG. 40. FIG. 40 is a graph for illustrating the relationship between the moving speed V1a of the image plane by the driving of the focus lens 33 and a silent image plane moving speed lower limit V0b_max. In the graph, the vertical axis shows the moving speed of the image plane and the horizontal axis shows the image plane transfer coefficient K. In FIGS. 38 and 40, the actual driving speed of the focus lens 33 and the moving speed of the image plane by the driving of the focus lens 33 are both represented by V1a. Therefore, V1a is variable when the vertical axis of the graph is the actual driving speed of the focus lens 33 (not parallel to the horizontal axis), as illustrated in FIG. 38, and is constant (parallel to the horizontal axis) when the vertical axis of the graph is the moving speed of the image plane, as illustrated in FIG. 40.

In the case in which the focus lens 33 is driven such that the moving speed of the image plane is constant, when the clip operation is not performed, in some cases, the lens driving speed V1a of the focus lens 33 can be less than the silent lens moving speed lower limit V0b as in the example illustrated in FIG. 38. For example, the lens moving speed V1a is less than the silent lens moving speed lower limit V0b at the position of the focus lens 33 where the minimum image plane transfer coefficient $K_{min}$ is obtained (in FIG. 38, the minimum image plane transfer coefficient $K_{min}$ is 100).

In particular, when the focal length of the lens barrel 3 is long or in a bright light environment, the lens moving speed V1a of the focus lens 33 is likely to be less than the silent lens moving speed lower limit V0b. In this case, the lens controller 37 performs the clip operation to limit the driving speed V1a of the focus lens 33 to the silent lens moving speed lower limit V0b (performs control such that the driving speed V1a is not less than the silent lens moving speed lower limit V0b), as illustrated in FIG. 38 (Step S1304). Therefore, it is possible to suppress the driving sound of the focus lens 33.

Figure 39:
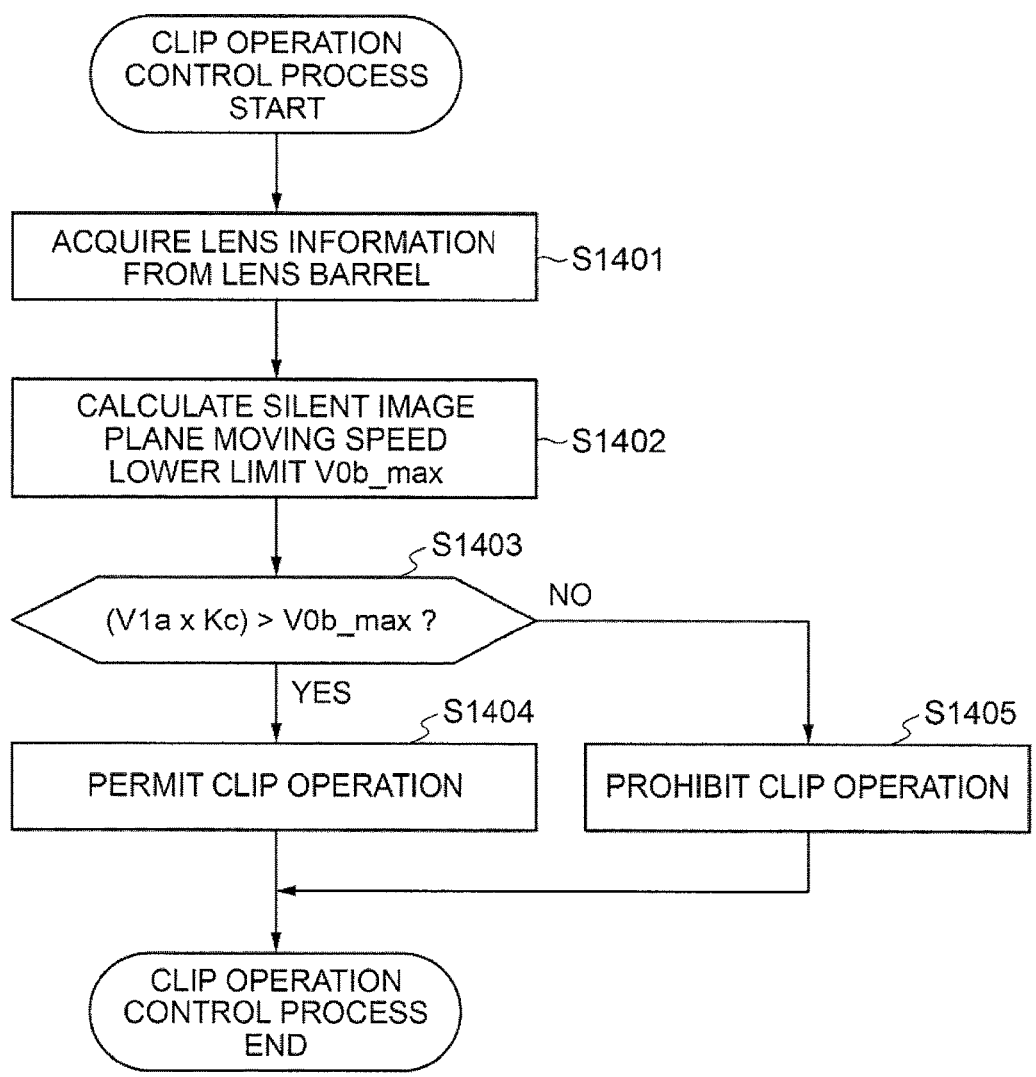
FIG. 39 is a flowchart illustrating a clip operation control process according to the sixteenth embodiment.

Next, a clip operation control process for determining whether to permit or prohibit the clip operation illustrated in FIG. 37 will be described with reference to FIG. 39. FIG. 39 is a flowchart illustrating the clip operation control process according to this embodiment. The clip operation control process which will be described below is performed by the camera body 2, for example, when the AF-F mode or the movie mode is set.

First, in Step S1401, the camera controller 21 acquires the lens information. Specifically, the camera controller 21 acquires the current image plane transfer coefficient $K_{cur}$, the minimum image plane transfer coefficient $K_{min}$, the maximum image plane transfer coefficient $K_{max}$, and the silent lens moving speed lower limit V0b from the lens barrel 3 using hot-line communication.

Then, in Step S1402, the camera controller 21 calculates the silent image plane moving speed lower limit V0b_max. The silent image plane moving speed lower limit V0b_max is the moving speed of the image plane when the focus lens 33 is driven at the silent lens moving speed lower limit V0b at the position of the focus lens 33 where the minimum image plane transfer coefficient $K_{min}$ is obtained. The silent image plane moving speed lower limit V0b_max will be described in detail below.

First, as illustrated in FIG. 38, whether a driving sound is generated by the driving of the focus lens 33 is determined by the actual driving speed of the focus lens 33. Therefore, as illustrated in FIG. 38, when the silent lens moving speed lower limit V0b is represented by the lens driving speed, it is constant. On the other hand, when the silent lens moving speed lower limit V0b is represented by the moving speed of the image plane, it is variable as illustrated in FIG. 40 since the image plane transfer coefficient K varies depending on the position of the focus lens 33, as described above. In FIGS. 38 and 40, the silent lens moving speed lower limit (the lower limit of the actual driving speed of the focus lens 33) and the moving speed of the image plane when the focus lens 33 is driven at the silent lens moving speed lower limit are both represented by V0b. Therefore, V0b is constant (parallel to the horizontal axis) when the vertical axis of the graph is the actual driving speed of the focus lens 33, as illustrated in FIG. 38, and is variable (not parallel to the horizontal axis) when the vertical axis of the graph is the moving speed of the image plane, as illustrated in FIG. 40.

In this embodiment, the silent image plane moving speed lower limit V0b_max is set as the moving speed of the image plane at which the moving speed of the focus lens 33 is the silent lens moving speed lower limit V0b at the position of the focus lens 33 (in the example illustrated in FIG. 40, the image plane transfer coefficient K is 100) where the minimum image plane transfer coefficient $K_{min}$ is obtained when the focus lens 33 is driven such that the moving speed of the image plane is constant. That is, in this embodiment, when the focus lens 33 is driven at the silent lens moving speed lower limit, the maximum moving speed of the image plane (in the example illustrated in FIG. 40, the moving speed of the image plane at an image plane transfer coefficient K of 100) is set as the silent image plane moving speed lower limit V0b_max.

As such, in this embodiment, the maximum moving speed of the image plane (the moving speed of the image plane at the lens position where the image plane transfer coefficient is the minimum) among the moving speeds of the image plane corresponding to the silent lens moving speed lower limit V0b which varies depending on the position of the focus lens 33 is calculated as the silent image plane moving speed lower limit V0b_max. For example, in the example illustrated in FIG. 40, since the minimum image plane transfer coefficient $K_{min}$ is "100", the moving speed of the image plane at the position of the focus lens 33 where the image plane transfer coefficient is "100" is calculated as the silent image plane moving speed lower limit V0b_max.

Specifically, the camera controller 21 calculates the silent image plane moving speed lower limit V0b_max (unit: mm/second) on the basis of the silent lens moving speed lower limit V0b (unit: pulse/second) and the minimum image plane transfer coefficient $K_{min}$ (unit: pulse/mm) as illustrated in the following expression:

Silent image plane moving speed lower limit V0b_max=Silent lens moving speed lower limit (the actual driving speed of the focus lens) V0b/ Minimum image plane transfer coefficient $K_{min}$.

As such, in this embodiment, the silent image plane moving speed lower limit V0b_max is calculated using the minimum image plane transfer coefficient $K_{min}$. Therefore, it is possible to calculate the silent image plane moving speed lower limit V0b_max at the time when the detection of the focus by AF-F or a moving image capture operation starts. For example, in the example illustrated in FIG. 40, when the detection of the focus by AF-F or the moving image capture operation starts at a time t1', the moving speed of the image plane at the position of the focus lens 33 where the image plane transfer coefficient K is "100" can be calculated as the silent image plane moving speed lower limit V0b_max at the time t1'.

Then, in Step S1403, the camera controller 21 compares the image plane moving speed V1a for focus detection which is acquired in Step S1401 with the silent image plane moving speed lower limit V0b_max calculated in Step S1402. Specifically, the camera controller 21 determines whether the image plane moving speed V1a for focus detection (unit: mm/second) and the silent image plane moving speed lower limit V0b_max (unit: mm/second) satisfy the following expression:

(Image plane moving speed V1a for focus detection× Kc)>Silent image plane moving speed lower limit V0b_max.

In the above-mentioned expression, a coefficient Kc is a value equal to or greater than 1 (Kc≥1), which will be described in detail below.

When the above-mentioned expression is satisfied, the process proceeds to Step S1404 and the camera controller 21 permits the clip operation illustrated in FIG. 37. That is, the driving speed V1a of the focus lens 33 is limited to the silent lens moving speed lower limit V0b in order to suppress the driving sound of the focus lens 33, as illustrated in FIG. 38 (search control is performed such that the driving speed V1a of the focus lens 33 is not less than the silent lens moving speed lower limit V0b).

On the other hand, when the above-mentioned expression is not satisfied, the process proceeds to Step S1405 and the clip operation illustrated in FIG. 37 is prohibited. That is, the focus lens 33 is driven such that the image plane moving speed V1a capable of appropriately detecting the in-focus position is obtained, without limiting the driving speed V1a of the focus lens 33 to the silent lens moving speed lower limit V0b (the driving speed V1a of the focus lens 33 is permitted to be less than the silent lens moving speed lower limit V0b).

As illustrated in FIG. 38, when the clip operation is permitted and the driving speed of the focus lens 33 is limited to the silent lens moving speed lower limit V0b, the moving speed of the image plane increases at the lens position where the image plane transfer coefficient K is small. As a result, in some cases, the moving speed of the image plane is greater than a value capable of appropriately detecting the in-focus position and appropriate focusing accuracy may not be obtained. On the other hand, when the clip operation is prohibited and the focus lens 33 is driven such that the moving speed of the image plane reaches a value capable of appropriately detecting the in-focus position, in some cases, the driving speed V1a of the focus lens 33 is less than the silent lens moving speed lower limit V0b and a driving sound that is equal to or greater than a predetermined value may be generated, as illustrated in FIG. 38.

As such, when the image plane moving speed V1a for focus detection becomes less than the silent image plane moving speed lower limit V0b_max, there is the problem of whether to drive the focus lens 33 at a lens driving speed less than the silent lens moving speed lower limit V0b such that the image plane moving speed V1a capable of appropriately detecting the in-focus position is obtained or to drive the focus lens 33 at a lens driving speed equal to or greater than the silent lens moving speed lower limit V0b in order to suppress the driving sound of the focus lens 33.

In contrast, in this embodiment, when the above-mentioned expression is satisfied even though the focus lens 33 is driven at the silent lens moving speed lower limit V0b, the coefficient Kc of the above-mentioned expression is stored as one or more values capable of ensuring a certain degree of focus detection accuracy. Therefore, as illustrated in FIG. 40, when the above-mentioned expression is satisfied even though the image plane moving speed V1a for focus detection is less than the silent image plane moving speed lower limit V0b_max, the camera controller 21 determines that a certain degree of focus detection accuracy can be ensured, gives priority to the suppression of the driving sound of the focus lens 33, and permits the clip operation which drives the focus lens 33 at a lens driving speed less than the silent lens moving speed lower limit V0b.

In some cases, the clip operation is permitted when the value of the image plane moving speed V1a for focus detection×Kc (where Kc≥1) is equal to or less than the silent image plane moving speed lower limit V0b_max, and the image plane moving speed for focus detection is too high to ensure focus detection accuracy if the driving speed of the focus lens 33 is limited to the silent lens moving speed lower limit V0b. Therefore, when the above-mentioned expression is not satisfied, the camera controller 21 gives priority to focus detection accuracy and prohibits the clip operation illustrated in FIG. 37. Accordingly, when the focus is detected, the moving speed of the image plane can be set as the image plane moving speed V a capable of appropriately detecting the in-focus position and it is possible to detect the focus with high accuracy.

When the aperture value is large (the diaphragm aperture is small), the depth of field becomes deep. Therefore, the sampling interval capable of appropriately detecting the in-focus position is large. As a result, it is possible to increase the image plane moving speed V1a capable of appropriately detecting the in-focus position. Therefore, when the image plane moving speed V1a capable of appropriately detecting the in-focus position is a fixed value, the camera controller 21 can set the coefficient Kc of the above-mentioned expression larger as the aperture value increases.

Similarly, when the size of an image, such as a live view image, is small (when the compression ratio of the image is high or when the thinning-out ratio of pixel data is high), high focus detection accuracy is not required. Therefore, it is possible to increase the coefficient Kc of the above-mentioned expression. In addition, when the pitch between the pixels of the imaging element 22 is large and so on, it is possible to increase the coefficient Kc of the above-mentioned expression.

Figure 41:
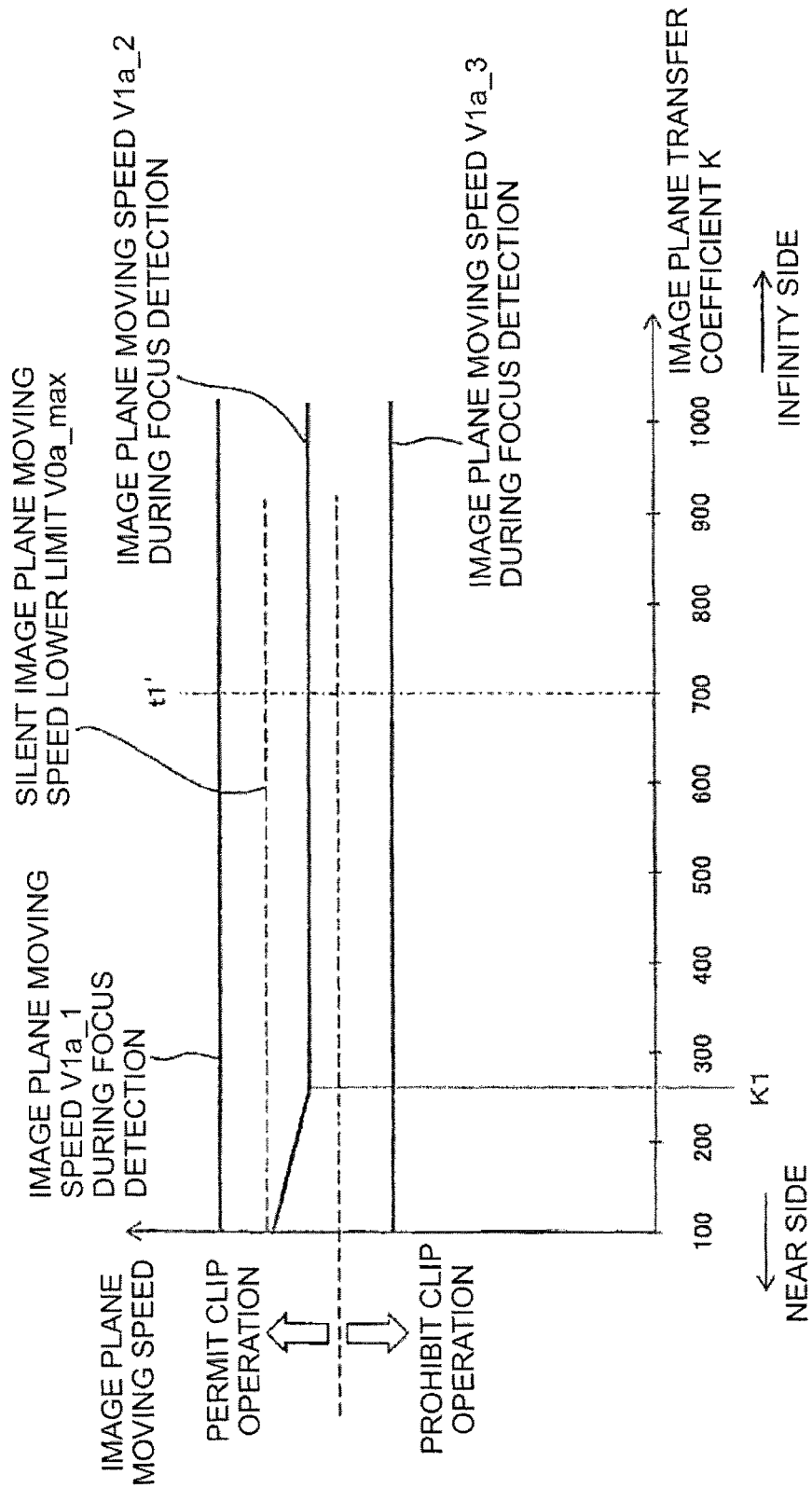
FIG. 41 is a diagram illustrating the relationship between the image plane moving speed V1$a$ during focus detection and the clip operation.
Figure 42:
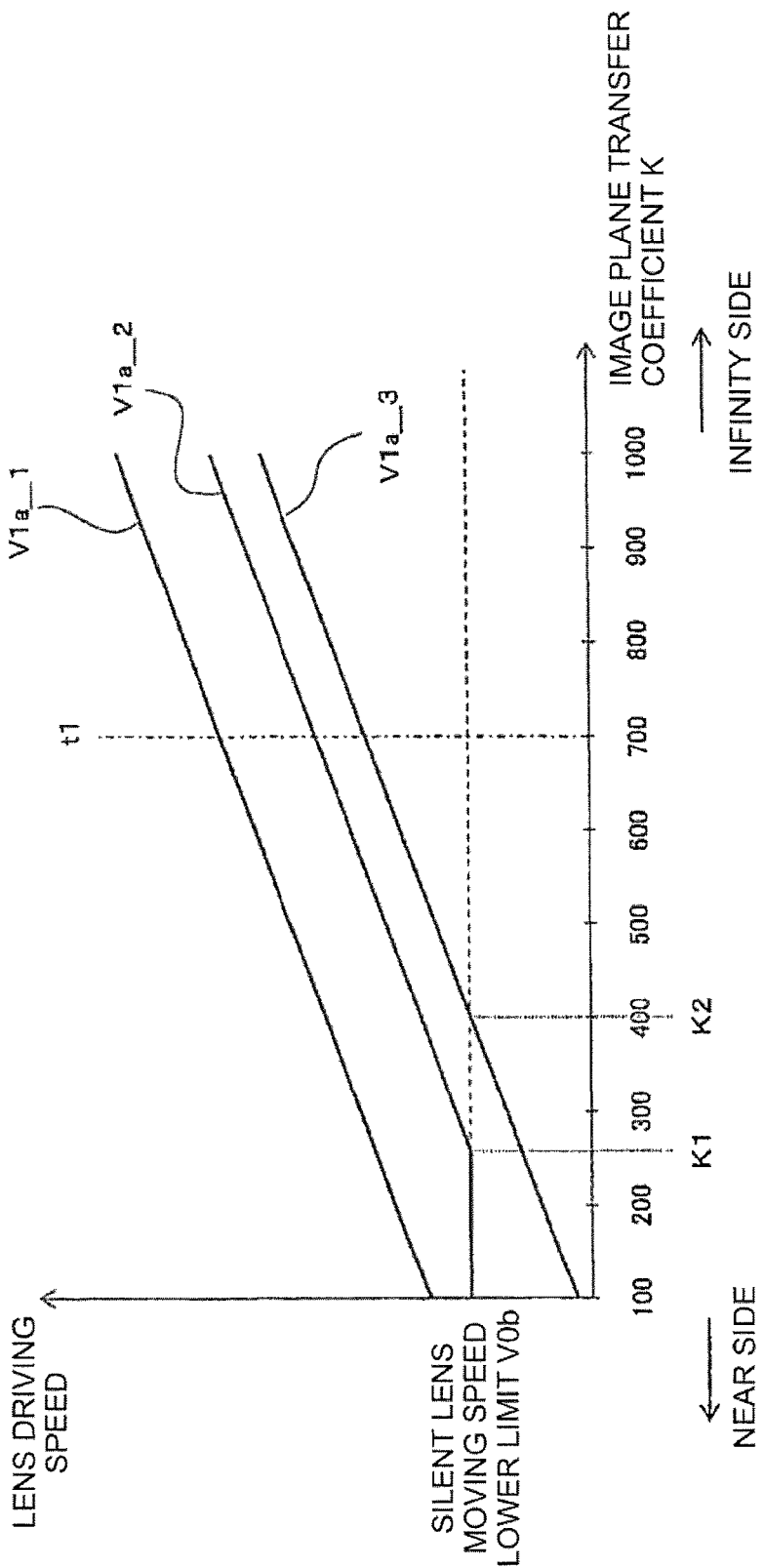
FIG. 42 is a diagram illustrating the relationship between the lens driving speed V1$a$ of the focus lens and the clip operation.

Next, the control of the clip operation will be described in detail with reference to FIGS. 41 and 42. FIG. 41 is a diagram illustrating the relationship between the image plane moving speed V1a during focus detection and the clip operation and FIG. 42 is a diagram illustrating the relationship between the actual lens driving speed V1a of the focus lens 33 and the clip operation.

For example, as described above, in this embodiment, in some cases, when search control starts using the half-press of the release switch as a trigger and when search control starts using a condition other than the half-press of the release switch as a trigger, the moving speed of the image plane in the search control varies depending on, for example, the still image mode, the movie mode, the sports mode, the landscape mode, the focal length, the object distance, and the aperture value. FIG. 41 illustrates three different image plane moving speeds V1a_1, V1a_2, and V1a_3.

Specifically, the image plane moving speed V1a_1 during focus detection illustrated in FIG. 41 is the maximum moving speed among the moving speeds of the image plane capable of appropriately detecting a focus state and is the moving speed of the image plane satisfying the above-mentioned expression. In addition, the image plane moving speed V1a_2 during focus detection is less than the image plane moving speed V1a_1 and is the moving speed of the image plane satisfying the above-mentioned expression at a time t1'. The image plane moving speed V1a_3 during focus detection is the moving speed of the image plane which does not satisfy the above-mentioned expression.

As such, in the example illustrated in FIG. 41, when the moving speed of the image plane during focus detection is V1a_1 and V1a_2, the clip operation illustrated in FIG. 41 is permitted because the moving speed of the image plane satisfies the above-mentioned expression at a time t1. On the other hand, when the moving speed of the image plane during focus detection is V1a_3, the clip operation illustrated in FIG. 37 is prohibited because the moving speed of the image plane does not satisfy the above-mentioned expression.

This point will be described in detail with reference to FIG. 42. FIG. 42 is a diagram in which the vertical axis of the graph illustrated in FIG. 41 is changed from the moving speed of the image plane to the lens driving speed. As described above, since the lens driving speed V1a_1 of the focus lens 33 satisfies the above-mentioned expression, the clip operation is permitted. However, as illustrated in FIG. 42, the lens driving speed V1a_1 is not less than the silent lens moving speed lower limit V0b even at the lens position where the minimum image plane transfer coefficient (K=100) is obtained. Therefore, actually, the clip operation is not performed.

Since the lens driving speed V1a_2 of the focus lens 33 satisfies the above-mentioned expression at the time t1' which is a focus detection start time, the clip operation is permitted. In the example illustrated in FIG. 42, when the focus lens 33 is driven at the lens driving speed V1a_2, the lens driving speed V1a_2 is less than the silent lens moving speed lower limit V0b at the lens position where the image plane transfer coefficient K is K1. Therefore, the lens driving speed V1a_2 of the focus lens 33 is limited to the silent lens moving speed lower limit V0b at the lens position where the image plane transfer coefficient K is less than K1.

That is, the clip operation is performed at the lens position where the lens driving speed V1a_2 of the focus lens 33 is less than the silent lens moving speed lower limit V0b. Then, the image plane moving speed V1a_2 during focus detection is different from the previous moving speed (search speed) of the image plane and search control for the focus evaluation value is performed at the moving speed of the image plane. That is, as illustrated in FIG. 41, the image plane moving speed V1a_2 during focus detection is different from the previous constant speed at the lens position where the image plane transfer coefficient is less than K1.

Since the lens driving speed V1a_3 of the focus lens 33 does not satisfy the above-mentioned expression, the clip operation is prohibited. Therefore, in the example illustrated in FIG. 42, when the focus lens 33 is driven at the lens driving speed V1a_3, the lens driving speed V1a_3 is less than the silent lens moving speed lower limit V0b at the lens position where the image plane transfer coefficient K is K2. The clip operation is not performed at the lens position where the image plane transfer coefficient K is less than K2. Even when the driving speed V1a_3 of the focus lens 33 is less than the silent lens moving speed lower limit V0b, the clip operation is not performed in order to appropriately detect the focus state.

As described above, in the sixteenth embodiment, among the moving speeds of the image plane when the focus lens 33 is driven at the silent lens moving speed lower limit V0b, the maximum moving speed of the image plane is calculated as the silent image plane moving speed lower limit V0b_max and the calculated silent image plane moving speed lower limit V0b_max is compared with the image plane moving speed V1a during focus detection. Then, in the case in which the value of the image plane moving speed V1$a$ during focus detection×Kc (where Kc≥1) is greater than the silent image plane moving speed lower limit V0$b$_max, it is determined that focus detection accuracy that is equal to or greater than a predetermined value is obtained even though the focus lens 33 is driven at the silent lens moving speed lower limit V0$b$ and the clip operation illustrated in FIG. 37 is permitted. Accordingly, in this embodiment, it is possible to suppress the driving sound of the focus lens 33 while ensuring focus detection accuracy.

In the case in which the value of the image plane moving speed V1$a$ during focus detection×Kc (where Kc≥1) is equal to or less than the silent image plane moving speed lower limit V0$b$_max, when the driving speed V1$a$ of the focus lens 33 is limited to the silent lens moving speed lower limit V0$b$, in some cases, appropriate focus detection accuracy may not be obtained. Therefore, in this embodiment, in this case, the clip operation illustrated in FIG. 37 is prohibited such that the moving speed of the image plane suitable for focus detection is obtained. As a result, in this embodiment, it is possible to appropriately detect the in-focus position when the focus is detected.

In this embodiment, the minimum image plane transfer coefficient $K_{min}$ is stored in the lens memory 38 of the lens barrel 3 in advance and the silent image plane moving speed lower limit V0$b$_max is calculated using the minimum image plane transfer coefficient $K_{min}$. Therefore, in this embodiment, for example, as illustrated in FIG. 35, it is possible to determine whether the value of the image plane moving speed V1$a$ during focus detection×Kc (where Kc≥1) is greater than the silent image plane moving speed lower limit V0$b$_max at the time t1 when the capture of a moving image or the detection of the focus by the AF-F mode starts and thus to determine whether to perform the clip operation. As such, in this embodiment, it is not repeatedly determined whether to perform the clip operation, using the current position image plane transfer coefficient $K_{cur}$, but it is possible to determine whether to perform the clip operation at the initial time when the capture of a moving image or the detection of the focus by the AF-F mode starts, using the minimum image plane transfer coefficient $K_{min}$. Therefore, it is possible to reduce the processing load of the camera body 2.

In the above-described embodiment, the camera body 2 performs the clip operation control process illustrated in FIG. 37. However, the invention is not limited thereto. For example, the lens barrel 3 may perform the clip operation control process illustrated in FIG. 37.

In the above-described embodiment, as illustrated in the above-mentioned expression, the image plane transfer coefficient K is calculated as follows: Image plane transfer coefficient K=(Amount of driving of focus lens 33/Amount of movement of image plane). However, the invention is not limited thereto. For example, the image plane transfer coefficient K may be calculated as illustrated in the following expression:

Image plane transfer coefficient $K$=(Amount of movement of image plane/Amount of driving of focus lens 33).

In this case, the camera controller 21 can calculate the silent image plane moving speed lower limit V0$b$_max. That is, the camera controller 21 can calculate the silent image plane moving speed lower limit V0$b$_max (unit: mm/second) on the basis of the silent lens moving speed lower limit V0$b$ (unit: pulse/second) and the maximum image plane transfer coefficient $K_{max}$ (unit: pulse/mm) indicating the maximum value among the image plane transfer coefficients K at each position (focal length) of the zoom lens 32, as illustrated in the following expression:

Silent image plane moving speed lower limit
V0$b$_max=Silent lens moving speed lower limit
V0$b$/Maximum image plane transfer coefficient
$K_m$.

For example, when a value which is calculated by "the amount of movement of the image plane/the amount of driving of the focus lens 33" is used as the image plane transfer coefficient K, as the value (absolute value) increases, the amount of movement of the image plane when the focus lens is driven by a predetermined value (for example, 1 mm) increases. When a value which is calculated by "the amount of driving of the focus lens 33/the amount of movement of the image plane" is used as the image plane transfer coefficient K, as the value (absolute value) increases, the amount of movement of the image plane when the focus lens is driven by a predetermined value (for example, 1 mm) decreases.

In addition to the above-described embodiment, the following structure may be used: when a silent mode in which the driving sound of the focus lens 33 is suppressed is set, the clip operation and the clip operation control process mentioned above are performed; and when the silent mode is not set, the clip operation and the clip operation control process mentioned above are not performed. In addition, the following structure may be used: when the silent mode is set, priority is given to the suppression of the driving sound of the focus lens 33, the clip operation control process illustrated in FIG. 39 is not performed, and the clip operation illustrated in FIG. 37 is always performed.

In the above-described embodiment, the image plane transfer coefficient K=(the amount of driving of the focus lens 33/the amount of movement of the image plane) is established. However, the invention is not limited thereto. For example, when the image plane transfer coefficient K is defined as the image plane transfer coefficient K=(the amount of movement of the image plane/the amount of driving of the focus lens 33), it is possible to control, for example, the clip operation, using the maximum image plane transfer coefficient $K_{max}$, similarly to the above-described embodiment.

«Seventeenth Embodiment»

Next, a seventeenth embodiment of the invention will be described. The seventeenth embodiment has the same structure as the twelfth embodiment except for the following points. FIG. 43 illustrates a table indicating the relationship among the position (focal length) of the zoom lens 32, the position (object distance) of the focus lens 33, and the image plane transfer coefficient K in the seventeenth embodiment. That is, in the seventeenth embodiment, areas "X1" and "X2" which are closer to the near side than the area "D0" including the near soft limit position 460 illustrated in FIG. 33 are provided. In addition, areas "X3" and "X4" which are closer to the near side than the area "D10" including the infinite soft limit position 450 are provided.

The areas "X1" and "X2" are areas which are closer to the near side than the near soft limit position, for example, a position corresponding to the mechanical end point 440 in the near direction 420, or a position between the near soft limit position and the end point 440. The areas "X3" and "X4" are areas which are closer to the infinity side than the infinite soft limit position, for example, a position corresponding to the mechanical end point 430 in the infinity direction 410, or a position between the infinite soft limit position and the end point 430.

In this embodiment, the values of image plane transfer coefficients "α11", "α21", ..., "α91" in the area "X1" are less than the values of image plane transfer coefficients "K10", "K20", ..., "K90" in the area "D0". Similarly, the values of image plane transfer coefficients "α12", "α22", ..., "α92" in the area "X2" are less than the values of image plane transfer coefficients "K10", "K20", ..., "K90" in the area "D0". The values of image plane transfer coefficients "α13", "α23", ..., "α93" in the area "X3" are greater than the values of image plane transfer coefficients "K110", "K210", ..., "K910" in the area "D10". The values of image plane transfer coefficients "α14", "α24", ..., "α94" in the area "X4" are greater than the values of image plane transfer coefficients "K110", "K210", ..., "k910" in the area "D10".

However, in this embodiment, the image plane transfer coefficient K ("K10", "K20", ..., "K90") in the area "D0" is set as the minimum image plane transfer coefficient $K_{min}$ and the image plane transfer coefficient K ("K110", "K210", ..., "K910") in the area "D10" is set as the maximum image plane transfer coefficient $K_{max}$. In particular, in the areas "X1", "X2", "X3", and "X4", the focus lens 33 is not driven or there is little necessity to drive the focus lens 33 due to, for example, aberration or a mechanical mechanism. Therefore, even when the image plane transfer coefficients "α11", "α21", ..., "α94" corresponding to the areas "X1", "X2", "X3", and "X4" are set as the minimum image plane transfer coefficient $K_{min}$ or the maximum image plane transfer coefficient $K_{max}$, they do not contribute to appropriate automatic focus control (for example, the speed control, silent control, backlash reduction control of the focus lens).

In this embodiment, the image plane transfer coefficient in the area "D0" corresponding to the near soft limit position 460 is set as the minimum image plane transfer coefficient $K_{min}$ and the image plane transfer coefficient in the area "D10" corresponding to the infinite soft limit position 450 is set as the maximum image plane transfer coefficient $K_{max}$. However, the invention is not limited thereto.

For example, even when the image plane transfer coefficients corresponding to the areas "X1" and "X2" which are closer to the near side than the near soft limit position and the image plane transfer coefficients corresponding to the areas "X3" and "X4" which are closer to the infinity side than the infinite soft limit position are stored in the lens memory 38, the minimum image plane transfer coefficient among the image plane transfer coefficients corresponding to the position of the focus lens included in a contrast AF search range (scanning range) may be set as the minimum image plane transfer coefficient $K_{min}$ and the maximum image plane transfer coefficient among the image plane transfer coefficients corresponding to the position of the focus lens included in the contrast AF search range (scanning range) may be set as the maximum image plane transfer coefficient $K_{max}$. In addition, the image plane transfer coefficient corresponding to the near in-focus position 480 may be set as the minimum image plane transfer coefficient $K_{min}$ and the image plane transfer coefficient corresponding to the infinite in-focus position 470 may be set as the maximum image plane transfer coefficient $K_{max}$.

The above-described embodiments have been described for ease of understanding of the invention and are not intended to limit the invention. Therefore, each component disclosed in the above-described embodiments includes all design changes or equivalents included in the technical range of the invention. In addition, the above-described embodiments may be appropriately combined with each other.

Figure 44:
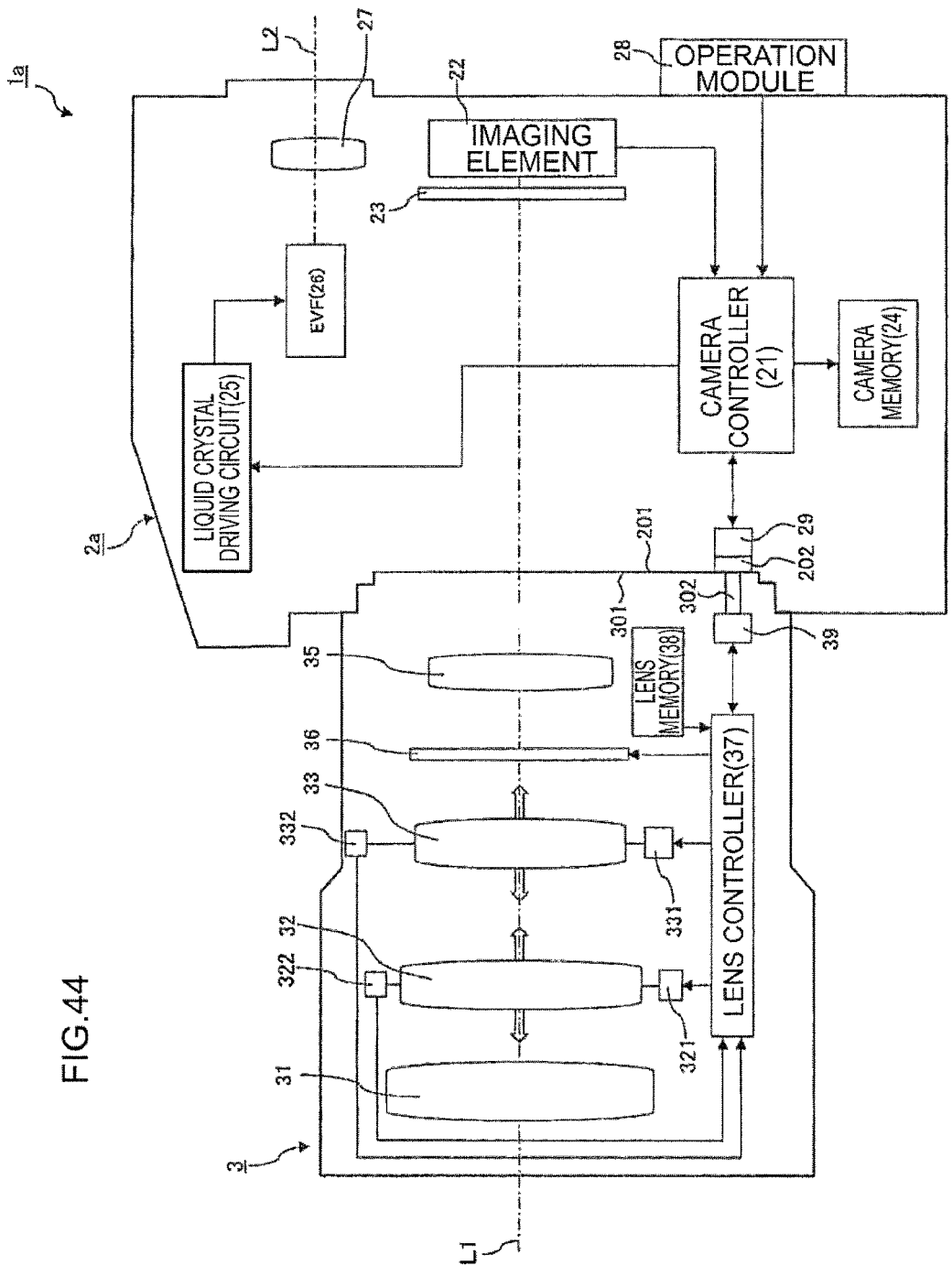
FIG. 44 is a diagram illustrating the main structure illustrating a camera according to another embodiment.

The camera 1 according to the above-described twelfth to seventeenth embodiments is not particularly limited. For example, as illustrated in FIG. 44, the invention may be applied to a lens interchangeable mirrorless camera 1a. In the example illustrated in FIG. 44, a camera body 2a sequentially transmits images captured by the imaging element 22 to the camera controller 21 and displays the image on an electronic viewfinder (EVF) 26 of an observation optical system through a liquid crystal driving circuit 25. In this case, the camera controller 21 reads, for example, an output from the imaging element 22 and calculates a focus evaluation value on the basis of the read output to detect the focusing state of the imaging optical system using a contrast detection method. In addition, the invention may be applied to other optical devices, such as a digital video camera, a digital camera with built-in lenses, and a mobile phone camera.

《Eighteenth Embodiment》

Figure 45:
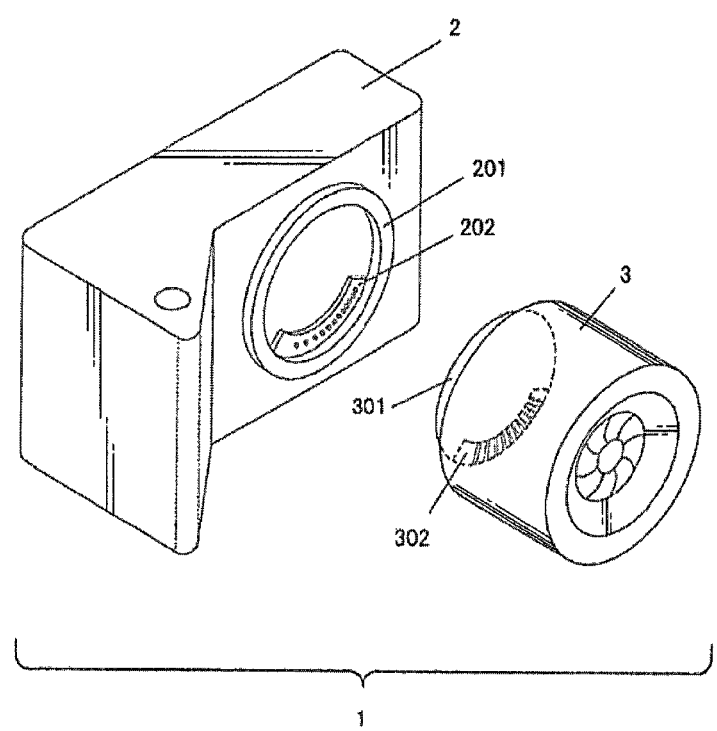
FIG. 45 is a perspective view illustrating a camera according to an eighteenth embodiment.
Figure 46:
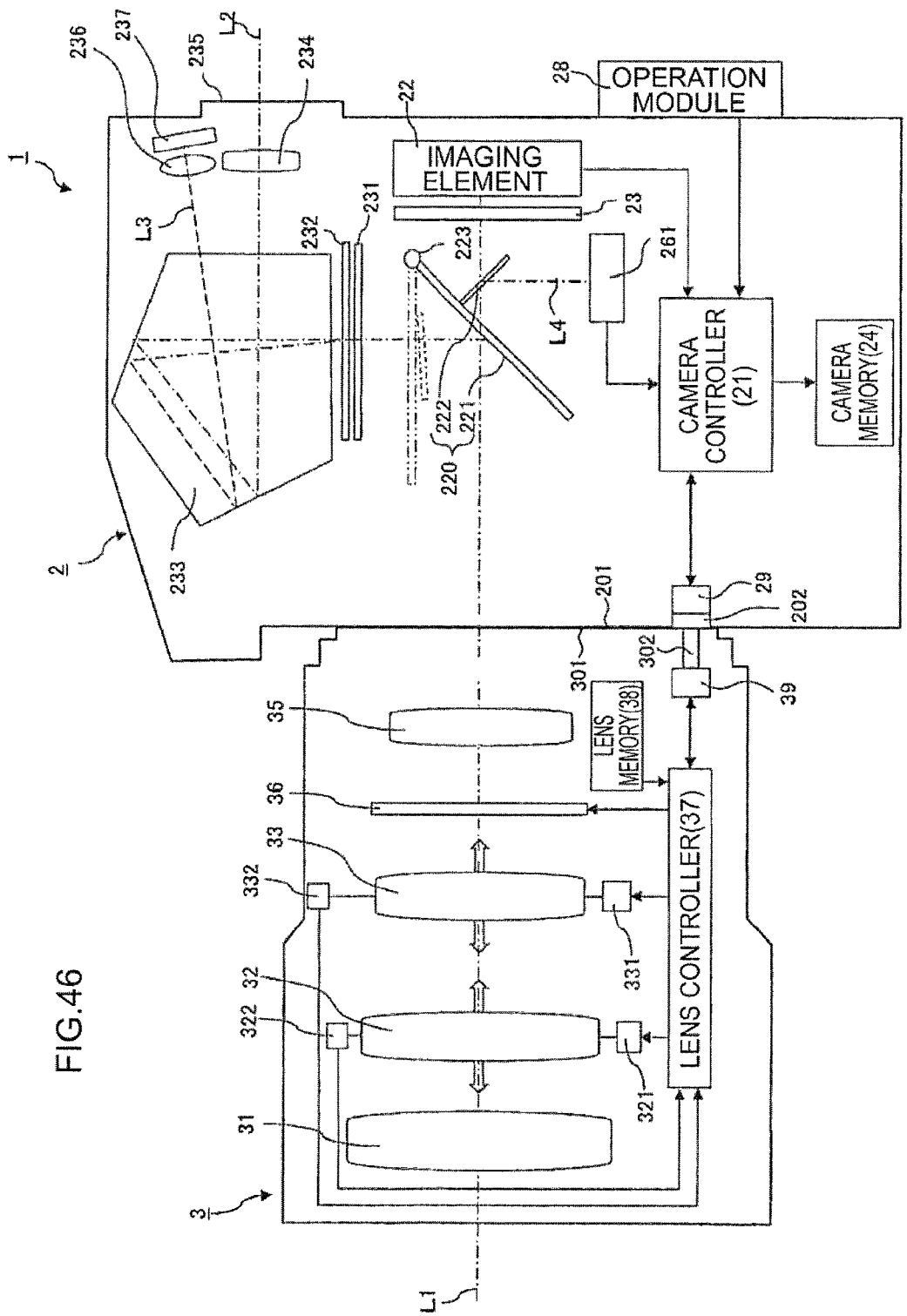
FIG. 46 is a diagram illustrating the main structure illustrating the camera according to the eighteenth embodiment.

Next, an eighteenth embodiment of the invention will be described. FIG. 45 is a perspective view illustrating a single-lens reflex digital camera 1 according to this embodiment. FIG. 46 is a diagram illustrating the structure of a main portion of the camera 1 according to this embodiment. The digital camera 1 (hereinafter, simply referred to as a camera 1) according to this embodiment is composed of a camera body 2 and a lens barrel 3. The camera body 2 and the lens barrel 3 are detachably coupled to each other.

The lens barrel 3 is an interchangeable lens which can be attached to and detached from the camera body 2. As illustrated in FIG. 46, the lens barrel 3 is provided with an imaging optical system including lenses 31, 32, 33, and 35 and a diaphragm 36.

The lens 33 is a focus lens and can be moved in the direction of an optical axis L1 to adjust the focal length of the imaging optical system. The focus lens 33 is provided such that it can be moved along the optical axis L1 of the lens barrel 3. The position of the focus lens 33 is detected by a focus lens encoder 332 and is adjusted by a focus lens driving motor 331.

The focus lens driving motor 331 is, for example, an ultrasonic motor and drives the focus lens 33 in response to an electric signal (pulse) output from a lens controller 37. Specifically, the driving speed of the focus lens 33 by the focus lens driving motor 331 is represented by pulse/second. As the number of pulses per unit time increases, the driving speed of the focus lens 33 increases. In this embodiment, a camera controller 21 of the camera body 2 transmits the driving instruction speed (unit: pulse/second) of the focus lens 33 to the lens barrel 3 and the lens controller 37 outputs a pulse signal corresponding to the driving instruction speed (unit: pulse/second) transmitted from the camera body 2 to the focus lens driving motor 331 to drive the focus lens 33 at the driving instruction speed (unit: pulse/second) transmitted from the camera body 2.

The lens 32 is a zoom lens and is moved in the direction of the optical axis L1 to adjust the focal length of the imaging optical system. Similarly to the focus lens 33, the position of the zoom lens 32 is also detected by a zoom lens encoder 322 and is adjusted by a zoom lens driving motor 321. The position of the zoom lens 32 is adjusted by operating a zoom button provided in an operation module 28 or operating a zoom ring (not illustrated) provided in the lens barrel 3.

The diaphragm 36 is configured such that the diameter of an aperture having the optical axis L1 as the center can be adjusted, in order to limit the amount of light which reaches the imaging element 22 through the imaging optical system and to adjust the amount of blurring. For example, the appropriate diameter of the aperture which has been calculated in an automatic exposure mode is transmitted from the camera controller 21 through the lens controller 37 to adjust the diameter of the aperture of the diaphragm 36. In addition, the operation module 28 provided in the camera body 2 is manually operated to input the set diameter of the aperture from the camera controller 21 to the lens controller 37. The diameter of the aperture of the diaphragm 36 is detected by a diaphragm aperture sensor (not shown) and the current diameter of the aperture is recognized by the lens controller 37.

A lens memory 38 stores an image plane transfer coefficient K. The image plane transfer coefficient K is a value indicating the correspondence relationship between the amount of driving of the focus lens 33 and the amount of movement of an image plane and is, for example, the proportion of the amount of driving of the focus lens 33 and the amount of movement of the image plane. In this embodiment, the image plane transfer coefficient is calculated by, for example, the following Expression (3):

$$\text{Image plane transfer coefficient } K = (\text{Amount of driving of focus lens 33/Amount of movement of image plane}) \quad (3).$$

As the image plane transfer coefficient K decreases, the amount of movement of the image plane by the driving of the focus lens 33 increases.

In the camera 1 according to this embodiment, even when the amount of driving of the focus lens 33 is the same, the amount of movement of the image plane varies depending on the position of the focus lens 33. Similarly, even when the amount of driving of the focus lens 33 is the same, the amount of movement of the image plane varies depending on the position of the zoom lens 32, that is, the focal length. That is, the image plane transfer coefficient K varies depending on the position of the focus lens 33 in the direction of the optical axis and the position of the zoom lens 32 in the direction of the optical axis. In this embodiment, the lens controller 37 stores the image plane transfer coefficient K for each position of the focus lens 33 and each position of the zoom lens 32.

For example, the image plane transfer coefficient K may be defined as follows: Image plane transfer coefficient K=(Amount of movement of image plane/Amount of driving of focus lens 33). In this case, as the image plane transfer coefficient K increases, the amount of movement of the image plane by the driving of the focus lens 33 increases.

FIG. 47 shows a table indicating the relationship among the position (focal length) of the zoom lens 32, the position (object distance) of the focus lens 33, and the image plane transfer coefficient K. The driving area of the zoom lens 32 is divided into nine areas "f1" to "f9" from a wide end to a telephoto end, the driving area of the focus lens 33 is divided into nine areas "D1" to "D9" from a near end to an infinity end, and the image plane transfer coefficient K corresponding to each lens position is stored in the table illustrated in FIG. 47. For example, when the position (focal length) of the zoom lens 32 is in the area "f1" and the position (object distance) of the focus lens 33 is in the area "D1", the image plane transfer coefficient K is "K11". In the example of the table illustrated in FIG. 47, the driving area of each lens is divided into nine areas. However, the number of divided areas is not limited thereto and may be set to any value.

Next, a minimum image plane transfer coefficient $K_{min}$ and a maximum image plane transfer coefficient $K_{max}$ will be described with reference to FIG. 47.

The minimum image plane transfer coefficient $K_{min}$ is a value corresponding to the minimum value of the image plane transfer coefficient K. For example, in FIG. 47, when "K11"="100", "K12"="200", "K13"="300", "K14"="400", "K15"="500", "K16"="600", "K17"="700", "K18"="800", and "K19"="900" are established, "K11"="100" which is the minimum value is the minimum image plane transfer coefficient $K_{min}$ and "K19"="900" which is the maximum value is the maximum image plane transfer coefficient $K_{max}$.

The minimum image plane transfer coefficient $K_{min}$ generally varies depending on the current position of the zoom lens 32. In general, when the current position of the zoom lens 32 is not changed, the minimum image plane transfer coefficient $K_{min}$ is a constant value (fixed value) even if the current position of the focus lens 33 is changed. That is, in general, the minimum image plane transfer coefficient $K_{min}$ is a fixed value (constant value) which is determined according to the position (focal length) of the zoom lens 32 and does not depend on the position (object distance) of the focus lens 33.

For example, "K11", "K21", "K31", "K41", "K52", "K62", "K72", "K82", and "K91" shown in gray in FIG. 47 are the minimum image plane transfer coefficient $K_{min}$ indicating the minimum value among the image plane transfer coefficients K at each position (focal length) of the zoom lens 32. That is, when the position (focal length) of the zoom lens 32 is in the area "f1", "K11", which is the image plane transfer coefficient K when the position (object distance) of the focus lens 33 is in the area "D1" among the areas "D1" to "D9", is the minimum image plane transfer coefficient $K_{min}$ indicating the minimum value. Therefore, "K11", which is the image plane transfer coefficient K when the position (object distance) of the focus lens 33 is in the area "D1", indicates the minimum value among "K11" to "K19" which are the image plane transfer coefficients K when the position (object distance) of the focus lens 33 is in the areas "D1" to "D9". Similarly, when the position (focal length) of the zoom lens 32 is in the area "f2", "K21", which is the image plane transfer coefficient K when the position (object distance) of the focus lens 33 is in the area "D1", indicates the minimum value among "K21" to "K29" which are the image plane transfer coefficients K when the position (object distance) of the focus lens 33 is in the areas "D1" to "D9". That is, "K21" is the minimum image plane transfer coefficient $K_{min}$. Similarly, when the position (focal length) of the zoom lens 32 is "f3" to "f9", "K31", "K41", "K52", "K62", "K72", "K82", and "K91" shown in gray are the minimum image plane transfer coefficient $K_{min}$.

Similarly, the maximum image plane transfer coefficient $K_{max}$ is a value corresponding to the maximum value of the image plane transfer coefficient K. In general, the maximum image plane transfer coefficient $K_{max}$ varies depending on the current position of the zoom lens 32. When the current position of the zoom lens 32 is not changed, the maximum image plane transfer coefficient $K_{max}$ is a constant value (fixed value) even if the current position of the focus lens 33 is changed. For example, "K19", "K29", "K39", "K49", "K59", "K69", "K79", "K89", and "K99" which are hatched in FIG. 47 are the maximum image plane transfer coefficient $K_{max}$ indicating the maximum value among the image plane transfer coefficients K at each position (focal length) of the zoom lens 32.

As such, as illustrated in FIG. 47, the lens memory 38 stores the image plane transfer coefficients K corresponding to the position (focal length) of the zoom lens 32 and the position (object distance) of the focus lens 33, the minimum image plane transfer coefficient $K_{min}$ indicating the minimum value among the image plane transfer coefficients K for each position (focal length) of the zoom lens 32, and the maximum image plane transfer coefficient $K_{max}$ indicating the maximum value among the image plane transfer coefficients K for each position (focal length) of the zoom lens 32.

In addition, the lens memory 38 may store a minimum image plane transfer coefficient $K_{min}'$ which is a value in the vicinity of the minimum image plane transfer coefficient $K_{min}$, instead of the minimum image plane transfer coefficient $K_{min}$ indicating the minimum value among the image plane transfer coefficients K. For example, when the value of the minimum image plane transfer coefficient $K_{min}$ is 102.345 having a large number of digits, 100 which is a value in the vicinity of 102.345 may be stored as the minimum image plane transfer coefficient $K_{min}'$. When the lens memory 38 stores a value of 100 (minimum image plane transfer coefficient $K_{min}'$), it is possible to save the memory size and to reduce the size of transmission data when transmitting the data to the camera body 2, as compared to the case in which the lens memory 38 stores a value of 102.345 (minimum image plane transfer coefficient $K_{min}$).

For example, when the minimum image plane transfer coefficient $K_{min}$ is a value of 100, 98 which is a value in the vicinity of 100 can be stored as the minimum image plane transfer coefficient $K_{min}'$, considering the stability of control such as backlash reduction control, silent control (clip operation), and lens speed control, which will be described below. For example, when the stability of control is considered, it is preferable to set the minimum image plane transfer coefficient $K_{min}'$ in the range of 80% to 120% of the actual value (minimum image plane transfer coefficient $K_{min}$).

The camera body 2 has a mirror system 220 for guiding beams from an object to the imaging element 22, a finder 235, a photometric sensor 237, and a focus detection module 261. The mirror system 220 has a quick return mirror 221 which is rotated about a rotating shaft 223 by a predetermined angle between the observation position and the imaging position of the object and a sub-mirror 222 which is supported by the quick return mirror 221 and is rotated with the rotation of the quick return mirror 221. In FIG. 46, a state in which the mirror system 220 is at the observation position of the object is represented by a solid line and a state in which the mirror system 220 is at the imaging position of the object is represented by a two-dot chain line.

The mirror system 220 is rotated such that it is inserted into the optical path of the optical axis L1 at the observation position of the object and is evacuated from the optical path of the optical axis L1 at the imaging position of the object.

The quick return mirror 221 is composed of a half mirror. At the observation position of the object, the quick return mirror 221 reflects parts (optical axes L2 and L3) of the beams (optical axis L1) from the object to the finder 235 and the photometric sensor 237 and transmits parts of beams (optical axis L4) so as to be guided to the sub-mirror 222. In contrast, the sub-mirror 222 is composed of a total reflection mirror and guides the beam (optical axis L4) passing through the quick return mirror 221 to the focus detection module 261.

Therefore, when the mirror system 220 is at the observation position, the beams (optical axis L1) from the object are guided to the finder 235, the photometric sensor 237, and the focus detection module 261 such that the photographer observes the object and an exposure operation or the detection of the focusing state of the focus lens 33 is performed. Then, when the photographer presses a release button fully, the mirror system 220 is rotated to the imaging position and all of the beams (optical axis L1) from the object are guided to the imaging element 22. Captured image data is stored in a memory 24.

The beams (optical axis L2) from the object, which have been reflected by the quick return mirror 221, are focused on a focusing plate 231 which is provided on the plane that is optically equivalent to the imaging element 22 and can be observed through a pentaprism 233 and an eyepiece 234. In this case, a transmissive liquid crystal display 232 displays, for example, a focus detection area mark so as to be superimposed on the object image on the focusing plate 231 and displays imaging-related information, such as a shutter speed, an aperture value, and the number of captured images, on an area other than the object image. In this way, the photographer can observe, for example, the object, the background thereof, and the imaging-related information through the finder 235 in the preparatory stage of imaging.

The photometric sensor 237 is, for example, composed of a two-dimensional color CCD image sensor. The photometric sensor 237 divides a captured screen into a plurality of areas and outputs a photometric signal corresponding to brightness in each area, in order to calculate an exposure value during imaging. The signal detected by the photometric sensor 237 is output to the camera controller 21 and is used for automatic exposure control.

The imaging element 22 is provided on a scheduled focal plane of the imaging optical system including the lenses 31, 32, 33, and 35 on the optical axis L1 of the beams from the object in the camera body 2. A shutter 23 is provided in front of the imaging element 22. The imaging element 22 is composed of a plurality of photoelectric conversion elements which are two-dimensionally arranged and can be a device such as a two-dimensional CCD image sensor, a MOS sensor, or a CID. The camera controller 21 performs image processing for the image signal photoelectrically converted by the imaging element 22 and the image signal is recorded on the camera memory 24 which is a recording medium. The camera memory 24 can be a detachable card-type memory or an embedded memory.

The camera controller 21 detects the focusing state of the imaging optical system using a contrast detection method (hereinafter, simply referred to as "contrast AF"), on the basis of pixel data read from the imaging element 22. For example, the camera controller 21 reads the output of the imaging element 22 and calculates a focus evaluation value on the basis of the read output. The focus evaluation value can be calculated by, for example, extracting a high frequency component from the output of the imaging element 22 using a high frequency pass filter. In addition, the focus evaluation value can be calculated by extracting the high frequency component using two high frequency pass filters with different cutoff frequencies.

Then, the camera controller 21 detects the focus using a contrast detection method which transmits a driving signal to the lens controller 37 to drive the focus lens 33 at a predetermined sampling interval (distance), calculates the focus evaluation value at each position, and calculates the position of the focus lens 33 where the focus evaluation value is the maximum as an in-focus position. For example, in the case in which the focus evaluation value is calculated while the focus lens 33 is being driven, when the focus evaluation value increases two times and then decreases two times, the in-focus position can be calculated by an interpolation method, using the focus evaluation values.

In the detection of the focus by the contrast detection method, the sampling interval of the focus evaluation value increases as the driving speed of the focus lens 33 increases.

When the driving speed of the focus lens 33 is greater than a predetermined value, the sampling interval of the focus evaluation value is too long to appropriately detect the in-focus position. The reason is that, as the sampling interval of the focus evaluation value increases, a variation in the in-focus position increases and the accuracy of focusing is likely to be reduced. For this reason, the camera controller 21 drives the focus lens 33 such that the moving speed of the image plane when the focus lens 33 is driven has a value capable of appropriately detecting the in-focus position. For example, the camera controller 21 drives the focus lens 33 such that the maximum image plane driving speed among the image plane moving speeds at the sampling interval capable of appropriately detecting the in-focus position is obtained in search control for driving the focus lens 33 in order to detect the focus evaluation value. The search control includes, for example, wobbling, neighborhood search (neighborhood scanning) which searches for only a portion in the vicinity of a predetermined position, and full search (full scanning) which searches the entire driving range of the focus lens 33.

The camera controller 21 may drive the focus lens 33 at a high speed when the search control starts, using the half-press of a release switch as a trigger, and may drive the focus lens 33 at a low speed when the search control starts, using conditions other than the half-press of the release switch as a trigger. This control process makes it possible to perform contrast AF at a high speed when the release switch is pressed halfway and to perform contrast AF which is suitable for making a through image look good when the release switch is not pressed halfway.

The camera controller 21 may perform control such that the focus lens 33 is driven at a high speed in search control in a still image mode and the focus lens 33 is driven at a low speed in search control in a movie mode. This control process makes it possible to perform contrast AF at a high speed in the still image mode and to perform contrast AF which is suitable for making a moving image look good in the movie mode.

In at least one of the still image mode and the movie mode, contrast AF may be performed at a high speed in a sports mode and may be performed at a low speed in a landscape mode. In addition, the driving speed of the focus lens 33 in the search control may be changed depending on, for example, the focal length, the object distance, and the aperture value.

In this embodiment, focus detection may be performed by a phase difference detection method. Specifically, the camera body 2 includes the focus detection module 261. The focus detection module 261 includes a pair of line sensors (not illustrated) which include a plurality of pixels each having a microlens that is arranged in the vicinity of the scheduled focal plane of the imaging optical system and a photoelectric conversion element that is provided so as to face the microlens. Each of the pixels in the pair of line sensors receives a pair of beams which pass through a pair of areas with different exit pupils in the focus lens 33 to acquire a pair of image signals. Then, the phase shift between the pair of image signals acquired by the pair of line sensors is calculated by a known correlation calculation method to detect a focusing state. In this way, it is possible to perform focus detection using the phase difference detection method.

The operation module 28 is an input switch, such as a shutter release button or a moving image capture start switch which is used by the photographer to set various operation modes of the camera 1, and is used to switch the modes between the still image mode and the movie mode, between an automatic focus mode and a manual focus mode, and an AF-S mode and an AF-F mode in the automatic focus mode. Various modes set by the operation module 28 are transmitted to the camera controller 21 and the camera controller 21 controls the overall operation of the camera 1. In addition, the shutter release button includes a first switch SW1 which is turned on when the button is pressed halfway and a second switch SW2 which is turned on when the button is fully pressed.

In the AF-S mode, when the shutter release button is pressed halfway, the focus lens 33 is driven on the basis of the detection result of the focus, the position of the focus lens 33 is adjusted and fixed, and imaging is performed at the position of the focus lens. The AF-S mode is suitable for capturing still images and is generally selected to capture still images. In the AF-F mode, the following process is performed: the focus lens 33 is driven on the basis of the detection result of the focus, regardless of whether the shutter release button is operated; the focusing state is repeatedly detected; and when the focusing state is changed, the scan drive of the focus lens 33 is performed. The AF-F mode is suitable for capture moving images and is generally selected to capture moving images.

In this embodiment, a switch for switching between a one-shot mode and a continuous mode may be provided as a switch for switching the automatic focus mode. In this case, when the photographer selects the one-shot mode, the AF-S mode can be set. When the photographer selects the continuous mode, the AF-F mode can be set.

Next, a data communication method between the camera body 2 and the lens barrel 3 will be described.

The camera body 2 is provided with a body-side mount portion 201 on which the lens barrel 3 is detachably mounted. As illustrated in FIG. 45, a connector 202 is provided in the vicinity of the body-side mount portion 201 (on the inner surface side of the body-side mount portion 201) so as to protrude toward the inside of the body-side mount portion 201. The connector 202 is provided with a plurality of electric contacts.

The lens barrel 3 is an interchangeable lens which can be attached to and detached from the camera body 2. The lens barrel 3 is provided with a lens-side mount portion 301 which is removably attached to the camera body 2. As illustrated in FIG. 45, a connector 302 is provided in the vicinity of the lens-side mount portion 301 (on the inner surface side of the lens-side mount portion 301) so as to protrude toward the inside of the lens-side mount portion 301. The connector 302 is provided with a plurality of electric contacts.

When the lens barrel 3 is mounted on the camera body 2, the electric contacts of the connector 202 provided in the body-side mount portion 201 and the electric contacts of the connector 302 provided in the lens-side mount portion 301 are electrically and physically connected to each other. Therefore, power can be supplied from the camera body 2 to the lens barrel 3 through the connectors 202 and 302 or data communication between the camera body 2 and the lens barrel 3 can be performed through the connectors 202 and 302.

Figure 48:
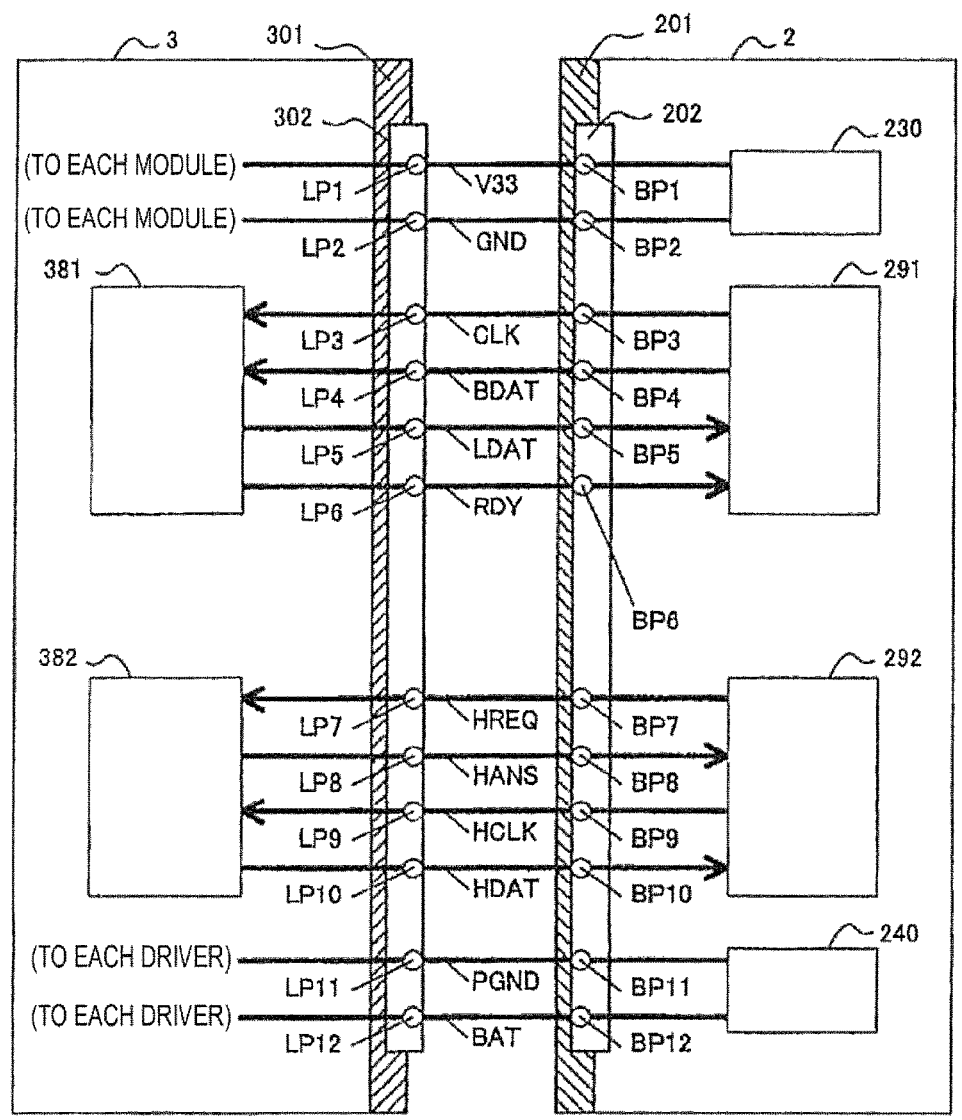
FIG. 48 is a diagram illustrating the details of connectors 202 and 302.

FIG. 48 is a schematic diagram illustrating the details of the connectors 202 and 302. In FIG. 48, the connector 202 is arranged on the right side of the body-side mount portion 201 on the basis of the actual mount structure. That is, in this embodiment, the connector 202 is provided at the position that is deeper than a mount surface of the body-side mount portion 201 (on the right side of the body-side mount portion 201 in FIG. 48). Similarly, the arrangement of the connector 302 on the right side of the lens-side mount portion 301 means that the connector 302 according to this embodiment is arranged at the position that protrudes from a mount surface of the lens-side mount portion 301. According to the above-mentioned arrangement of the connector 202 and the connector 302, when the lens barrel 3 is mounted on the camera body 2 such that the mount surface of the body-side mount portion 201 and the mount surface of the lens-side mount portion 301 come into contact with each other, the connector 202 and the connector 302 are connected to each other. Therefore, the electric contacts of the connectors 202 and 302 are connected to each other.

As illustrated in FIG. 48, the connector 202 includes 12 electric contacts BP1 to BP12. In addition, the connector 302 of the lens 3 includes 12 electric contacts LP1 to LP12 corresponding to 12 electric contacts in the camera body 2.

The electric contact BP1 and the electric contact BP2 are connected to a first power circuit 230 in the camera body 2. The first power circuit 230 supplies an operating voltage to each module in the lens barrel 3 (however, except for circuits having relatively large power consumption such as the lens driving motors 321 and 331) through the electric contact BP1 and the electric contact LP1. The voltage value which is supplied by the first power circuit 230 through the electric contact BP1 and the electric contact LP1 is not particularly limited and can be a voltage value of 3 V to 4 V (normally, a voltage value in the vicinity of 3.5 V which is an intermediate value of the voltage range). In this case, a current value which is supplied from the camera body 2 to the lens barrel 3 is in the range of about several tens of milliamperes to several hundreds of milliamperes when power is turned on. The electric contact BP2 and the electric contact LP2 are ground terminals corresponding to the operating voltage which is supplied through the electric contact BP1 and the electric contact LP1.

The electric contacts BP3 to BP6 are connected to a first camera-side communication module 291. The electric contacts LP3 to LP6 are connected to a first lens-side communication module 381 so as to correspond to the electric contacts BP3 to BP6. The first camera-side communication module 291 and the first lens-side communication module 381 transmit and receive signals therebetween using these electric contacts. The content of the communication between the first camera-side communication module 291 and the first lens-side communication module 381 will be described in detail below.

The electric contacts BP7 to BP10 are connected to a second camera-side communication module 292. The electric contacts LP7 to LP10 are connected to a second lens-side communication module 382 so as to correspond to the electric contacts BP7 to BP10. The second camera-side communication module 292 and the second lens-side communication module 382 transmit and receive signals therebetween using these electric contacts. The content of the communication between the second camera-side communication module 292 and the second lens-side communication module 382 will be described in detail below.

The electric contact BP11 and the electric contact BP12 are connected to a second power circuit 240 in the camera body 2. The second power circuit 240 supplies an operating voltage to circuits with relatively large power consumption, such as the lens driving motors 321 and 331, through the electric contact BP11 and the electric contact LP11. The voltage value supplied by the second power circuit 240 is not particularly limited. The maximum value of the voltage value supplied by the second power circuit 240 can be several times greater than the maximum value of the voltage value supplied by the first power circuit 230. In this case, a current value which is supplied from second power circuit 240 to the lens barrel 3 is in the range of about several tens of milliamperes to several amperes when power is turned on. The electric contact BP12 and the electric contact LP12 are ground terminals corresponding to the operating voltage which is supplied through the electric contact BP11 and the electric contact LP11.

The first communication module 291 and the second communication module 292 in the camera body 2 illustrated in FIG. 48 form a camera transceiver 29 illustrated in FIG. 46 and the first communication module 381 and the second communication module 382 in the lens barrel 3 illustrated in FIG. 48 form a lens transceiver 39 illustrated in FIG. 46.

Next, the communication (hereinafter, referred to as command data communication) between the first camera-side communication module 291 and the first lens-side communication module 381 will be described. The lens controller 37 performs the command data communication which performs the transmission of control data from the first camera-side communication module 291 to the first lens-side communication module 381 and the transmission of response data from the first lens-side communication module 381 to the first camera-side communication module 291 in parallel in a predetermined cycle (for example, an interval of 16 milliseconds) through a signal line CLK formed by the electric contacts BP3 and LP3, a signal line BDAT formed by the electric contacts BP4 and LP4, a signal line LDAT formed by the electric contacts BP5 and LP5, and a signal line RDY formed by the electric contacts BP6 and LP6.

Figure 49:
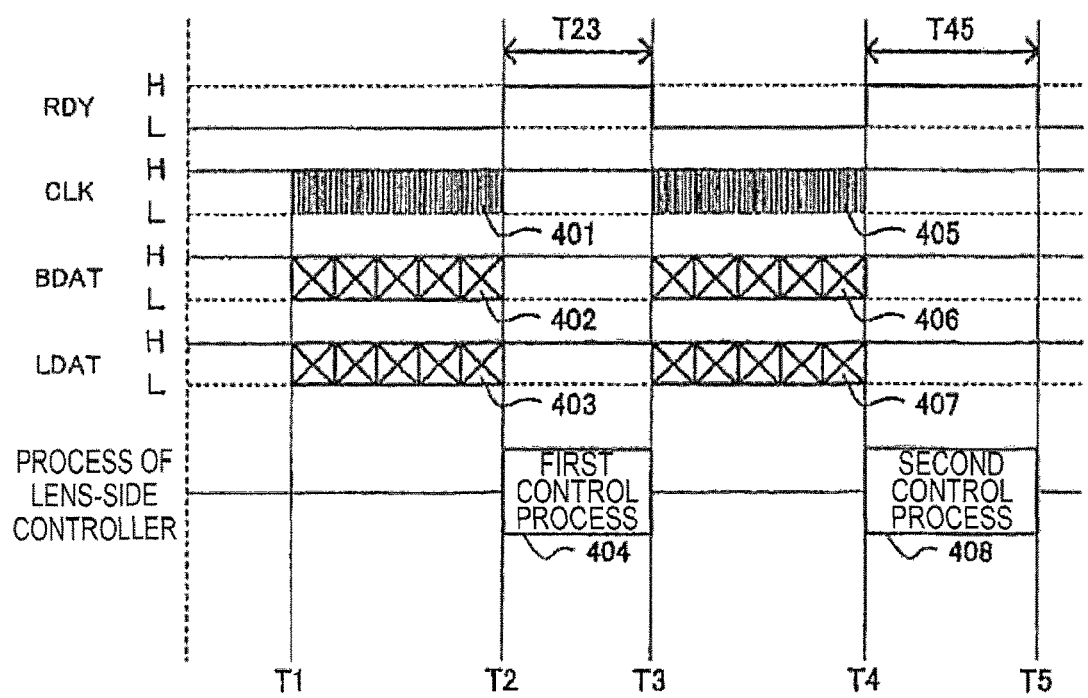
FIG. 49 is a diagram illustrating an example of command data communication.

FIG. 49 is a timing chart illustrating an example of the command data communication. First, the camera controller 21 and the first camera-side communication module 291 check the signal level of the signal line RDY when the command data communication starts (T1). The signal level of the signal line RDY indicates whether the communication of the first lens-side communication module 381 is available. When the communication is not available, the lens controller 37 and the first lens-side communication module 381 output an H (High) level signal. When the signal line RDY is at an H level, the first camera-side communication module 291 does not perform communication with the lens barrel 3 or does not perform the next process even during communication.

On the other hand, when the signal line RDY is at an L (LOW) level, the camera controller 21 and the first camera-side communication module 291 transmit a clock signal 401 to the first lens-side communication module 381 using the signal line CLK. In addition, the camera controller 21 and the first camera-side communication module 291 transmit a camera-side command packet signal 402, which is control data, to the first lens-side communication module 381 in synchronization with the clock signal 401, using the signal line BDAT. When the clock signal 401 is output, the lens controller 37 and the first lens-side communication module 381 transmit a lens-side command packet signal 403, which is response data, in synchronization with the clock signal 401, using the signal line LDAT.

When the transmission of the lens-side command packet signal 403 is completed, the lens controller 37 and the first lens-side communication module 381 change the signal level of the signal line RDY from the L level to the H level (T2). Then, the lens controller 37 starts a first control process 404 according to the content of the camera-side command packet signal 402 received until the time T2.

For example, when the received camera-side command packet signal 402 has content requiring specific data of the lens barrel 3, the lens controller 37 performs a process of analyzing the content of the command packet signal 402 and generating the requested specific data as the first control process 404. In addition, the lens controller 37 performs, as the first control process 404, a communication error check process which easily checks whether there is an error in the communication of the command packet signal 402 from the number of data bytes, using checksum data included in the command packet signal 402. The specific data signal generated by the first control process 404 is output as a lens-side data packet signal 407 to the camera body 2 (T3). In this case, a camera-side data packet signal 406 which is output from the camera body 2 after the command packet signal 402 is dummy data (including checksum data) which is meaningless on the lens side. In this case, the lens controller 37 performs, as a second control process 408, the above-mentioned communication error check process using the checksum data included in the camera-side data packet signal 406 (T4).

For example, when the camera-side command packet signal 402 is an instruction to drive the focus lens 33 and the camera-side data packet signal 406 relates to the driving speed and amount of the focus lens 33, the lens controller 37 performs, as the first control process 404, a process of analyzing the content of the command packet signal 402 and generating an acknowledgement signal indicating that the content has been understood (T2). The acknowledgement signal generated by the first control process 404 is output as the lens-side data packet signal 407 to the camera body 2 (T3). In addition, the lens controller 37 performs, as the second control process 408, a process of analyzing the content of the camera-side data packet signal 406 and a communication error check process using the checksum data included in the camera-side data packet signal 406 (T4). Then, after the second control process 408 is completed, the lens controller 37 drives the focus lens driving motor 331 on the basis of the received camera-side data packet signal 406, that is, the driving speed and amount of the focus lens 33, to drive the focus lens 33 by the received amount of driving at the received driving speed (T5).

When the second control process 408 is completed, the lens controller 37 notifies the first lens-side communication module 381 that the second control process 408 has been completed. Then, the lens controller 37 output an L-level signal to the signal line RDY (T5).

The communication performed for the period from the time T1 to the time T5 is one command data communication process. As described above, in one command data communication process, the camera controller 21 and the first camera-side communication module 291 transmit the camera-side command packet signal 402 and the camera-side data packet signal 406 at a time, respectively. As such, in this embodiment, the control data to be transmitted from the camera body 2 to the lens barrel 3 is divided into two data items and then transmitted for the convenience of processing. The camera-side command packet signal 402 and the camera-side data packet signal 406 are combined with each other to form one control data item.

Similarly, in one command data communication process, the lens controller 37 and the first lens-side communication module 381 transmit the lens-side command packet signal 403 and the lens-side data packet signal 407 at a time, respectively. As such, the response data to be transmitted from the lens barrel 3 to the camera body 2 is divided into two data items and then transmitted. The lens-side command packet signal 403 and the lens-side data packet signal 407 are combined with each other to form one response data item.

Next, the communication (hereinafter, referred to as hot-line communication) between the second camera-side communication module 292 and the second lens-side communication module 382 will be described. Returning to FIG. 48, the lens controller 37 performs hot-line communication having a cycle (for example, 1 milliseconds interval) shorter than the command data communication through a signal line HREQ formed by the electric contacts BP7 and LP7, a signal line HANS formed by the electric contacts BP8 and LP8, a signal line HCLK formed by the electric contacts BP9 and LP9, and a signal line HDAT formed by the electric contacts BP10 and LP10.

For example, in this embodiment, the lens information of the lens barrel 3 is transmitted from the lens barrel 3 to the camera body 2 by the hot-line communication. The lens information transmitted by the hot-line communication includes the position of the focus lens 33, the position of the zoom lens 32, a current position image plane transfer coefficient $K_{cur}$, the minimum image plane transfer coefficient $K_{min}$, and the maximum image plane transfer coefficient $K_{max}$. Here, the current position image plane transfer coefficient $K_{cur}$ is the image plane transfer coefficient K corresponding to the current position (focal length) of the zoom lens 32 and the current position (object distance) of the focus lens 33. In this embodiment, the lens controller 37 can calculate the current position image plane transfer coefficient $K_{cur}$ corresponding to the current position of the zoom lens 32 and the current position of the focus lens 33, with reference to the table indicating the relationship between the positions of the lens (the position of the zoom lens and the position of the focus lens) and the image plane transfer coefficient K which is stored in the lens memory 38. For example, in the example illustrated in FIG. 47, when the position (focal length) of the zoom lens 32 is in the area "f1" and the position (object distance) of the focus lens 33 is in the area "D4", the lens controller 37 transmits "K14", "K11", and "K19" as the current position image plane transfer coefficient $K_{cur}$, the minimum image plane transfer coefficient $K_{min}$, and the maximum image plane transfer coefficient $K_{max}$ to the camera controller 21, respectively, using the hot-line communication.

Figure 50A:
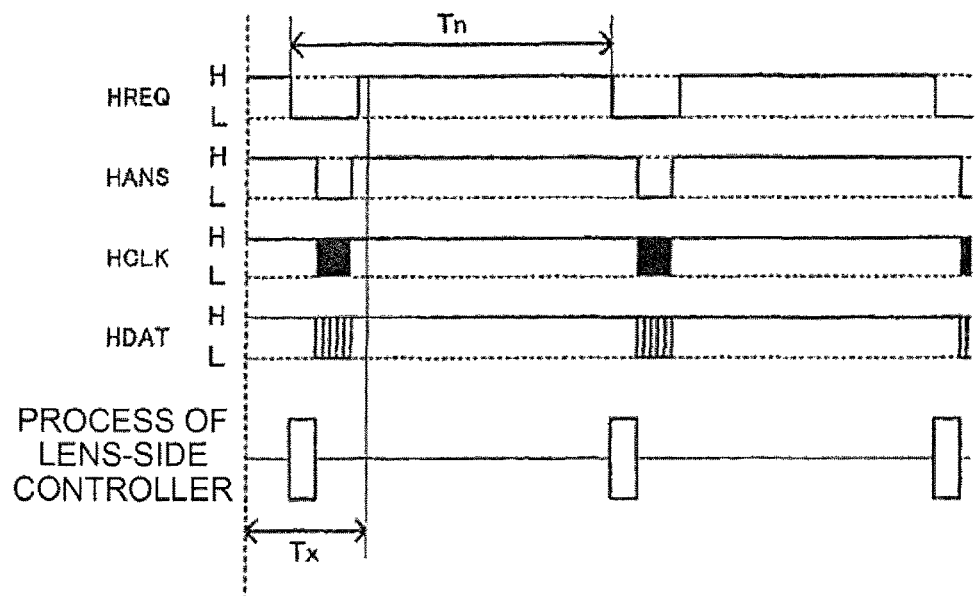
FIGS. 50A and 50B are diagrams illustrating an example of hot-line communication.
Figure 50B:
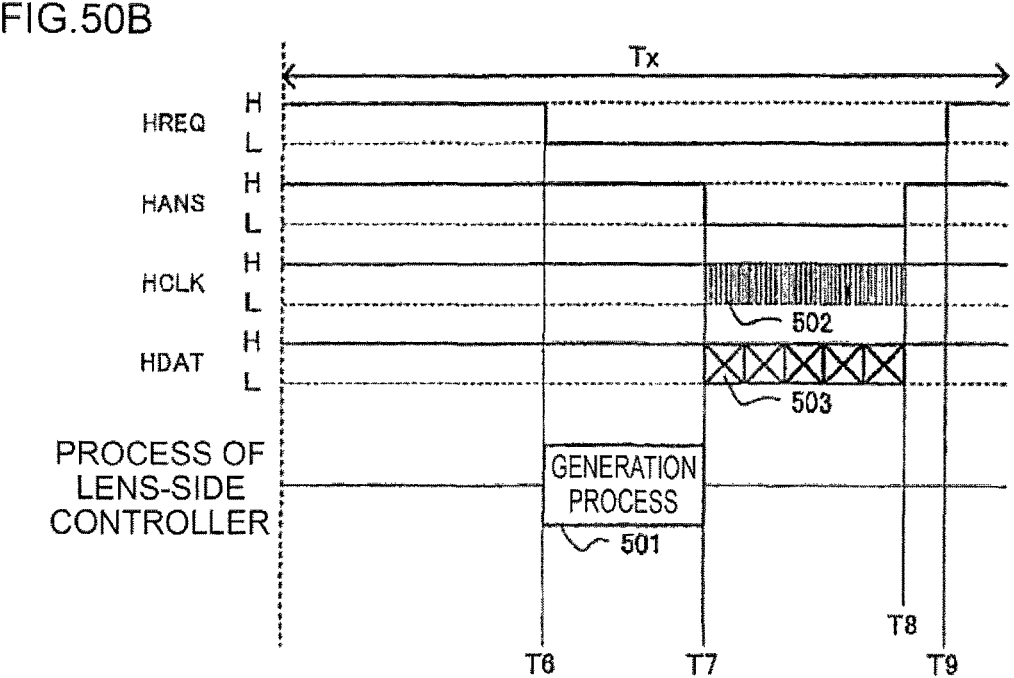

FIGS. 50A and 50B are timing charts illustrating an example of the hot-line communication. FIG. 50A is a diagram illustrating an aspect in which the hot-line communication is repeatedly performed with a predetermined period Tn. FIG. 50B shows an aspect in which the period Tx of one communication process among the hot-line communication processes which are repeatedly performed is enlarged. Next, an aspect in which the position of the focus lens 33 is transmitted by the hot-line communication will be described with reference to the timing chart illustrated in FIG. 50B.

First, the camera controller 21 and the second camera-side communication module 292 output an L-level signal to the signal line HREQ in order to perform the hot-line communication (T6). Then, the second lens-side communication module 382 notifies the lens controller 37 that the signal has been input to the electric contact LP7. The lens controller 37 starts the execution of a generation process 501 for generating lens position data in response to the notice. In the generation process 501, the lens controller 37 directs the focus lens encoder 332 to detect the position of the focus lens 33 and to generate lens position data indicating the detection result.

When the lens controller 37 completes the generation process 501, the lens controller 37 and the second lens-side communication module 382 output an L-level signal to the signal line HANS (T7). When the signal is input to the electric contact BP8, the camera controller 21 and the second camera-side communication module 292 output a clock signal 502 from the electric contact BP9 to the signal line HCLK.

The lens controller 37 and the second lens-side communication module 382 output a lens position data signal 503 indicating lens position data from the electric contact LP10 to the signal line HDAT in synchronization with the clock signal 502. Then, when the transmission of the lens position data signal 503 is completed, the lens controller 37 and the second lens-side communication module 382 output an H-level signal from the electric contact LP8 to the signal line HANS (T8). Then, when the signal is input to the electric contact BP8, the second camera-side communication module 292 outputs an H-level signal from the electric contact LP7 to the signal line HREQ (T9).

The command data communication and the hot-line communication can be performed at the same time or in parallel.

Figure 51:
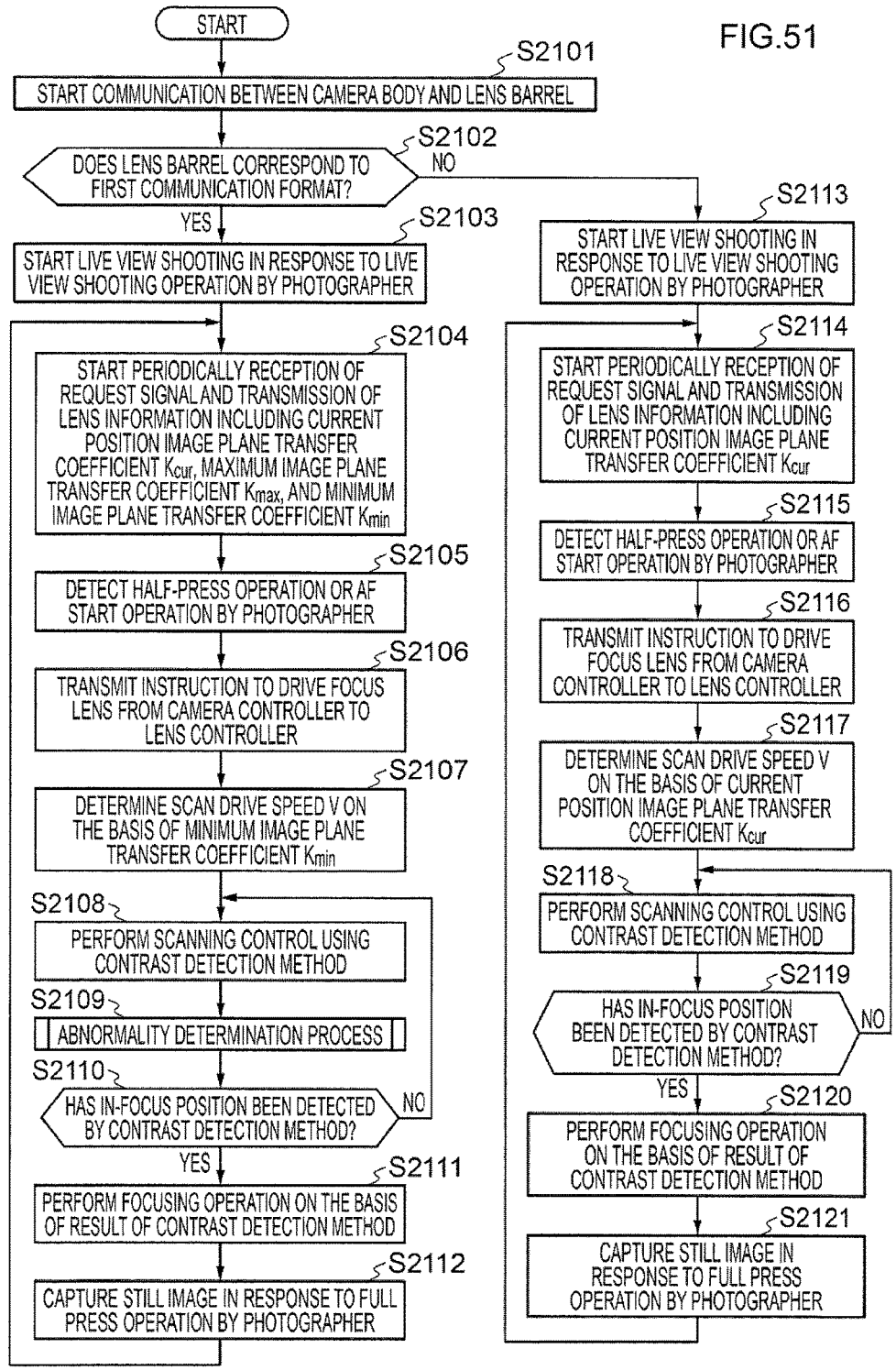
FIG. 51 is a flowchart illustrating an example of an operation according to the eighteenth embodiment.

Next, an example of the operation of the camera 1 according to this embodiment will be described with reference to FIG. 51. FIG. 51 is a flowchart illustrating the operation of the camera 1 according to this embodiment. The following operation starts when the camera 1 is turned on.

First, in Step S2101, the camera body 2 performs communication for identifying the lens barrel 3. The available communication format varies depending on the type of lens barrel. Then, the process proceeds to Step S2102. In Step S2102, the camera controller 21 determines whether the lens barrel 3 is a lens corresponding to a predetermined first communication format. When it is determined that the lens barrel 3 is a lens corresponding to the first communication format, the process proceeds to Step S2103. On the other hand, when the camera controller 21 determines that the lens barrel 3 is not a lens corresponding to the predetermined first communication format, the proceeds to Step S2113. When the camera controller 21 determines that the lens barrel 3 is a lens corresponding to a second communication format different from the first communication format, the process may proceed to Step S2113. When the camera controller 21 determines that the lens barrel 3 is a lens corresponding to the first and second communication formats, the process may proceed to Step S2103.

Then, in Step S2103, it is determined whether the photographer has turned on a live view shooting switch provided in the operation module 28. When the live view shooting switch is turned on, the mirror system 220 is moved to an object image capture position and beams from the object are guided to the imaging element 22.

In Step S2104, the hot-line communication between the camera body 2 and the lens barrel 3 starts. In the hot-line communication, as described above, when the lens controller 37 receives the L-level signal (request signal) which has been output to the signal line HREQ by the camera controller 21 and the second camera-side communication module 292, the lens information is transmitted to the camera controller 21. The transmission of the lens information is repeatedly performed. The lens information includes, for example, information about the position of the focus lens 33, the position of the zoom lens 32, the current position image plane transfer coefficient $K_{cur}$, the minimum image plane transfer coefficient $K_{min}$, and the maximum image plane transfer coefficient $K_{max}$. The hot-line communication is repeatedly performed after Step S2104. The hot-line communication is repeatedly performed, for example, until the power switch is turned off. At that time, for the current position image plane transfer coefficient $K_{cur}$, the minimum image plane transfer coefficient $K_{min}$, and the maximum image plane transfer coefficient $K_{max}$, it is preferable to transmit the current position image plane transfer coefficient $K_{cur}$, the minimum image plane transfer coefficient $K_{min}$, and the maximum image plane transfer coefficient $K_{max}$ in this order.

When transmitting the lens information to the camera controller 21, the lens controller 37 acquires the current position image plane transfer coefficient $K_{cur}$ corresponding to the current position of the zoom lens 32 and the current position of the focus lens 33, and the minimum image plane transfer coefficient $K_{min}$ and the maximum image plane transfer coefficient $K_{max}$ corresponding to the current position of the zoom lens 32, with reference to the table (see FIG. 47) indicating the relationship between the position of each lens and the image plane transfer coefficient K which is stored in the lens memory 38, and transmits the acquired current position image plane transfer coefficient $K_{cur}$, the acquired minimum image plane transfer coefficient $K_{min}$, and the acquired maximum image plane transfer coefficient $K_{max}$ to the camera controller 21.

In Step S2105, it is determined whether the photographer performs, for example, an operation of pressing a release button provided in the operation module 28 halfway (an operation of turning on the first switch SW1) or an AF start operation. When such operation is performed, the process proceeds to Step S2106 (the case in which the operation of pressing the release button halfway is performed will be described in detail in the following embodiment).

Then, in Step S2106, the camera controller 21 transmits a scan drive command (a scan drive start instruction) to the lens controller 37 in order to perform focus detection using the contrast detection method. The scan drive command (a driving speed instruction during scan drive or a driving position instruction) issued to the lens controller 37 may be, for example, the driving speed of the focus lens 33, the moving speed of the image plane, or a target driving position.

In Step S2107, the camera controller 21 performs a process of determining a scan drive speed V which is the driving speed of the focus lens 33 in the scanning operation, on the basis of the minimum image plane transfer coefficient $K_{min}$ acquired in Step S2104. The scanning operation is an operation which simultaneously performs the driving of the focus lens 33 by the focus lens driving motor 331 at the scan drive speed V determined in this Step S2107 and the calculation of the focus evaluation value by the camera controller 21 using the contrast detection method at a predetermined interval to perform the detection of the in-focus position using the contrast detection method at a predetermined interval.

In the scanning operation, when the in-focus position is detected by the contrast detection method, the camera controller 21 calculates the focus evaluation value at a predetermined sampling interval while driving the focus lens 33 to perform scan drive and detects the lens position where the calculated focus evaluation value is a peak value as the in-focus position. Specifically, the camera controller 21 scan-drives the focus lens 33 to move the image plane formed by the optical system in the direction of the optical axis, calculates the focus evaluation values in different image planes, and detects the lens position where the focus evaluation value is a peak value as the in-focus position. However, in some cases, when the moving speed of the image plane is too high, the gap between the image planes for calculating the focus evaluation value is too large to appropriately detect the in-focus position. In particular, the image plane transfer coefficient K indicating the ratio of the amount of movement of the image plane to the amount of driving of the focus lens 33 varies depending on the position of the focus lens 33 in the direction of the optical axis. Therefore, even when the focus lens 33 is driven at a constant speed, the moving speed of the image plane is too high, depending on the position of the focus lens 33. As a result, in some cases, the gap between the image planes for calculating the focus evaluation value is too large to appropriately detect the in-focus position.

For this reason, in this embodiment, the camera controller 21 calculates the scan drive speed V of the focus lens 33 during the scan-driving operation, on the basis of the minimum image plane transfer coefficient $K_{min}$ acquired in Step S2104. The camera controller 21 calculates the scan drive speed V, which is a driving speed capable of appropriately detecting the in-focus position using the contrast detection method and is the maximum driving speed, on the basis of the minimum image plane transfer coefficient $K_{min}$.

In Step S2108, the scanning operation starts at the scan drive speed V determined in Step S2107. Specifically, the camera controller 21 transmits a scan drive start command to the lens controller 37, and the lens controller 37 drives the focus lens driving motor 331 to drive the focus lens 33 at the scan drive speed V determined in Step S2107, in response to the command from the camera controller 21. Then, the camera controller 21 reads a pixel output from the imaging pixel of the imaging element 22 at a predetermined interval while driving the focus lens 33 at the scan drive speed V, calculates the focus evaluation value on the basis of the pixel output, acquires the focus evaluation values at different positions of the focus lens, to detect the in-focus position using the contrast detection method.

Then, in Step S2109, the camera controller 21 performs a failure determination process, which will be described below. Then, in Step S2110, the camera controller 21 determines whether the peak value of the focus evaluation value has been detected (whether the in-focus position has been detected). When the peak value of the focus evaluation value has not been detected, the process returns to Step S2108 and the operation from Steps S2108 to S2110 is repeatedly performed until the peak value of the focus evaluation value is detected or until the focus lens 33 is driven to a predetermined driving end. On the other hand, when the peak value of the focus evaluation value has been detected, the process proceeds to Step S2111.

When the peak value of the focus evaluation value has been detected, the process proceeds to Step S2111. In Step S2111, the camera controller 21 transmits a command to move the focus to the position corresponding to the peak value of the focus evaluation value to the lens controller 37. The lens controller 37 controls the driving of the focus lens 33 in response to the received command.

Then, the process proceeds to Step S2112. In Step S2112, the camera controller 21 determines that the focus lens 33 reaches the position corresponding to the peak value of the focus evaluation value and controls a still image capture process when the photographer fully presses the shutter release button (turns on the second switch SW2). After the imaging control ends, the process returns to Step S2104 again.

Figure 52:
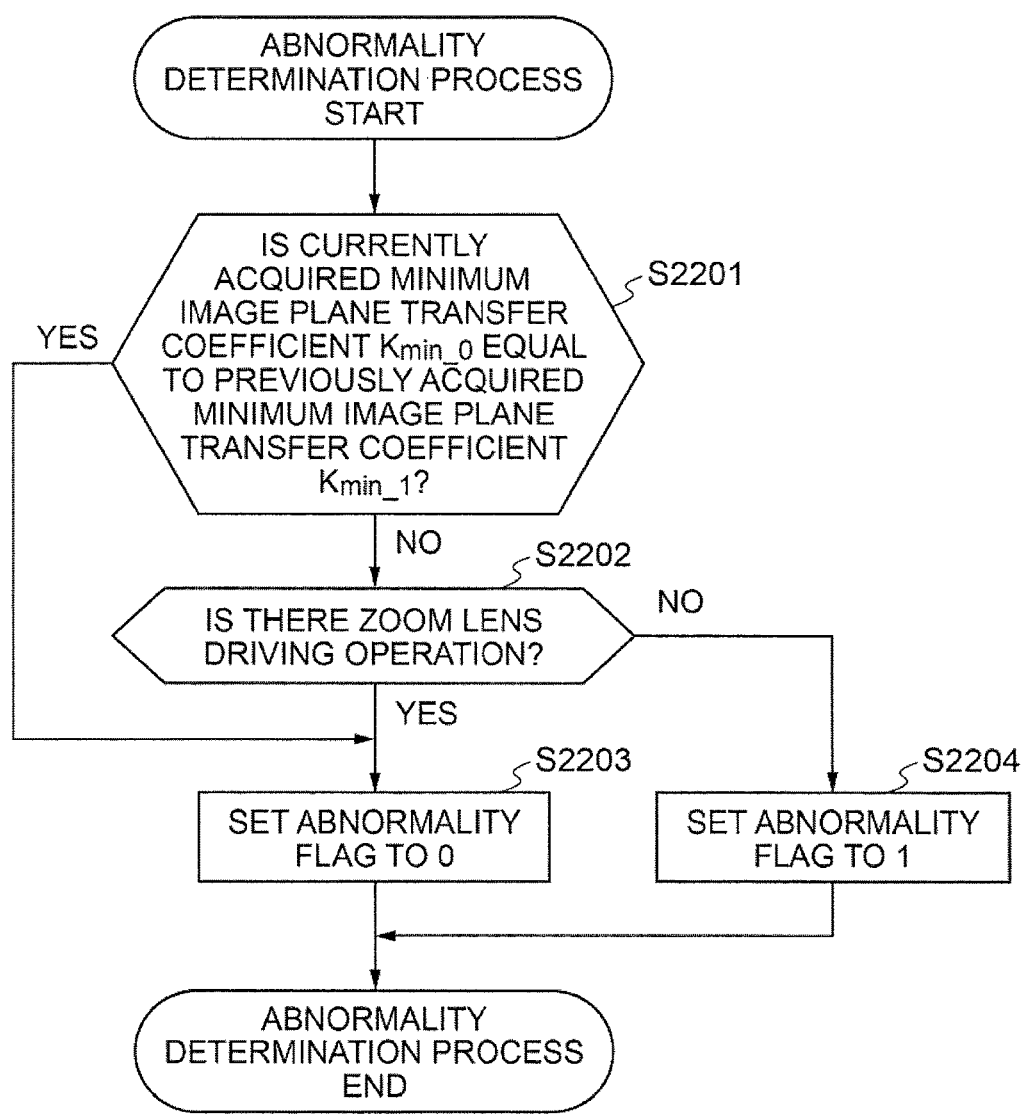
FIG. 52 is a flowchart illustrating a failure determination process in the eighteenth embodiment.

Next, a failure determination process (the process in Step S2109 of FIG. 51) will be described in detail with reference to FIGS. 52, 53A and 53B.

First, the process will be described with reference to FIG. 52. FIG. 52 is a flowchart illustrating the failure determination process according to this embodiment. In Step S2201 illustrated in FIG. 52, the camera controller 21 compares a currently acquired minimum image plane transfer coefficient $K_{min\_0}$ which is the minimum image plane transfer coefficient $K_{min}$ acquired in the current process with a previously acquired minimum image plane transfer coefficient $K_{min\_1}$ which is the minimum image plane transfer coefficient $K_{min}$ acquired in the previous process and determines whether the coefficients have the same value or different values. That is, in Step S2201, it is determined whether there is a change in the minimum image plane transfer coefficient $K_{min}$ which are repeatedly acquired. When the currently acquired minimum image plane transfer coefficient $K_{min\_0}$ and the previously acquired minimum image plane transfer coefficient $K_{min\_1}$ have the same value, that is, it is determined that there is no change in the minimum image plane transfer coefficient $K_{min}$ which are repeatedly acquired, it is determined that no failure occurs and the process proceeds to Step S2203. Then, a failure flag is set to 0 (no failure) and the failure determination process ends. Then, the process proceeds to Step S2110 illustrated in FIG. 51. On the other hand, when the currently acquired minimum image plane transfer coefficient $K_{min\_0}$ and the previously acquired minimum image plane transfer coefficient $K_{min\_1}$ have different values, that is, it is determined that there is a change in the minimum image plane transfer coefficient $K_{min}$ which are repeatedly acquired, the process proceeds to Step S2202.

In Step S2202, the camera controller 21 determines whether an operation of driving the zoom lens 32 has been performed. For example, a method which detects the driving operation of the zoom lens 32 by the operation module 28 may be used to determine whether the operation of driving the zoom lens 32 has been performed or a method which determines whether the operation of driving the zoom lens 32 has been performed, on the basis of the positional information of the zoom lens 32 which is included in the lens information transmitted from the lens barrel 3.

When it is determined that the operation of driving the zoom lens 32 has been performed, it is determined that the minimum image plane transfer coefficient $K_{min}$ has been changed by the driving of the zoom lens 32. Therefore, it is determined that no failure occurs. Then, the process proceeds to Step S2203 and the failure flag is set to 0 (no failure). The failure determination process ends and the process proceeds to Step S2110 illustrated in FIG. 51. For example, in the example illustrated in FIG. 47, when the position (focal length) of the zoom lens 32 is in the area "f1", the minimum image plane transfer coefficient $K_{min}$ is "K11". In contrast, when the zoom lens 32 is driven and the position (focal length) of the zoom lens 32 is in the area "f2", the minimum image plane transfer coefficient $K_{min}$ changes from "K11" to "K12". Therefore, in this embodiment, when the minimum image plane transfer coefficient $K_{min}$ changes and the driving of the zoom lens 32 is detected, it is determined that the minimum image plane transfer coefficient $K_{min}$ has been changed due to the driving of the zoom lens 32. Therefore, it is determined that no failure occurs.

On the other hand, when it is determined in Step S2202 that the operation of driving the zoom lens 32 has not been detected, it is determined that the minimum image plane transfer coefficient $K_{min}$ has changed, regardless of the driving of the zoom lens 32. Therefore, it is determined that any of a communication failure, a circuit failure, a memory failure, a power failure and so on has occurred. Then, the process proceeds to Step S2204 and the failure flag is set to 1 (a failure occurs). The failure determination process ends and the process proceeds to Step S2110 illustrated in FIG. 51. As described above, in general, the minimum image plane transfer coefficient $K_{min}$ varies depending on the current position of the zoom lens 32. In general, when the position of the zoom lens 32 is not changed, the minimum image plane transfer coefficient $K_{min}$ has a constant value (fixed value) even if the current position of the focus lens 33 is changed. In contrast, when the minimum image plane transfer coefficient $K_{min}$ has been changed even though there is no change in the position of the zoom lens 32, it can be determined that any of a communication failure, a circuit failure, a memory failure, a power failure and so on has occurred. Therefore, in this embodiment, in this case, it is determined that a failure has occurred and the failure flag is set to 1 (a failure occurs).

Figure 53:
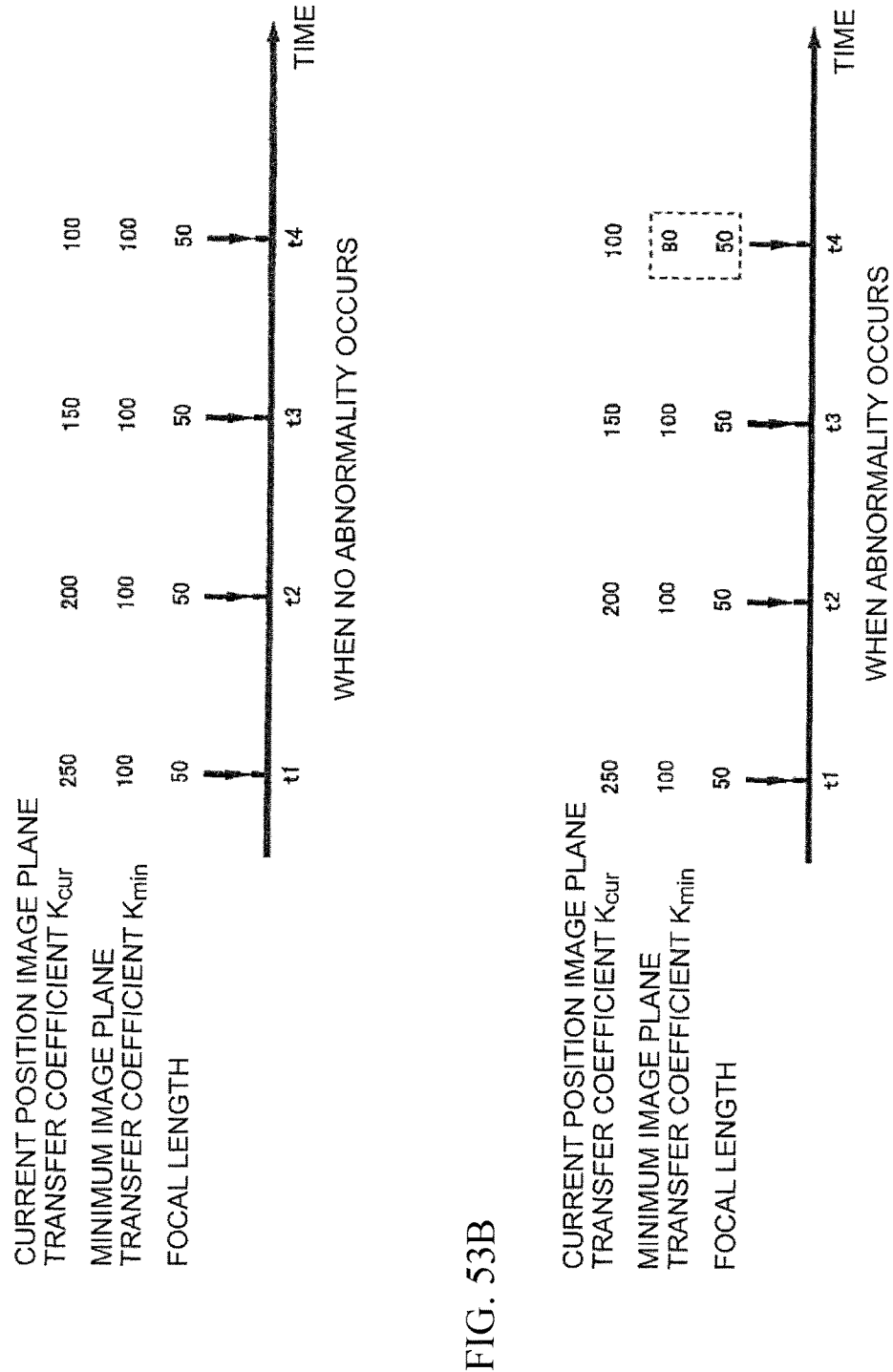
FIGS. 53A and 53B are diagrams illustrating an aspect for describing an example of the failure determination process in the eighteenth embodiment.

That is, with reference to an aspect illustrated in FIGS. 53A and 53B, for example, in the case of "no failure occurs" illustrated in FIG. 53A, the focus lens 33 is driven on the basis of a scan drive command. When the focal length does not change (that is, there is no change in the position of the zoom lens 32) even though times t1, t2, t3, and t4 and the current position image plane transfer coefficient $K_{cur}$ are changed by the driving of the focus lens 33, the minimum image plane transfer coefficient $K_{min}$ shows a constant value of 100 and the minimum image plane transfer coefficient $K_{min}$ does not generally change. That is, since the minimum image plane transfer coefficient $K_{min}$ is the minimum value among the image plane transfer coefficients K indicating the correspondence relationship between the amount of driving of the focus lens 33 and the amount of movement of the image plane, it generally depends on the focal length. Therefore, when the focal length does not change (that is, there is no change in the position of the zoom lens 32), the minimum image plane transfer coefficient $K_{min}$ has a constant value as illustrated in FIG. 53A.

In contrast, as an example illustrated in FIG. 53B in which a "failure occurs", for example, at the times t1, t2, and t3, the minimum image plane transfer coefficient $K_{min}$ has a constant value of 100. However, when the minimum image plane transfer coefficient $K_{min}$ changes from 100 to 80 at the time t4 even though there is no change in the focal length (even though the focal length does not change and is maintained at 50), it is determined that any of a communication failure, a circuit failure, a memory failure, a power failure and so on has occurred in this embodiment. Therefore, the failure flag is set to 1 (a failure occurs).

In this embodiment, when it is determined that a failure has occurred and the failure flag is set to 1, the camera controller 21 performs a failure process. An example of the failure process is a process of prohibiting in-focus display on the electronic viewfinder 26. In particular, when the failure flag is set to 1, a communication failure, a circuit failure, a memory failure, or a power failure and so on is likely to occur. In many cases, the reliability of focus detection cannot be guaranteed. Therefore, it is preferable to perform the failure process, such as a process of prohibiting in-focus display, in order to prevent "in-focus display" with low reliability. In this case, in Step S2203, when the failure flag is set 1 and the in-focus display is prohibited, the in-focus display is not performed even though the focus lens 33 reaches the in-focus position in Step S2111.

When the failure flag is set to 1, for example, it is preferable to drive the focus lens 33 from the near end to the infinity end and to perform full search, instead of or in addition to the process of prohibiting the in-focus display. The reason is that, in some cases, by performing the full search, it may be confirmed that the cause of the failure has been solved. In particular, in this case, it is more preferable to perform full search in which the focus lens 33 is driven from the near end to the infinity end at a second driving speed that is sufficiently lower than a first driving speed which is a general driving speed. In this case, by performing with the second driving speed which is sufficiently low, it is possible to achieve stable full search.

When the failure flag is set to 1, a process of prohibiting focus detection using the contrast detection method may be performed, instead of or in addition to the process of prohibiting the in-focus display or the process of performing the full search at the second driving speed that is sufficiently low. In addition, in this case, a process of prohibiting focus detection using a phase difference detection method may be performed, in addition to the process of prohibiting focus detection using the contrast detection method. In particular, when the failure flag is set to 1 where it is considered that a failure, such as a communication failure, occurs, there is the possibility that good focus detection results will not be obtained by the contrast detection method and the phase difference detection method. Therefore, in this case, it is preferable to perform a process of prohibiting focus detection using the contrast detection method and focus detection using the phase difference detection method.

Alternatively, when the failure flag is set to 1, a process may be performed such that the focus lens 33 is moved to the driving end, for example, the near end. This process makes it possible to increase the amount of blurring of an obtained through image. Therefore, it is possible to notify the photographer that a failure has occurred. When the failure flag is set to 1, a process may be performed such that the focus lens 33 is not driven to the near end, but is driven to the infinity end.

In this embodiment, once the failure flag is set to 1, it is considered that a failure, such as a communication failure, occurs. Therefore, until power is turned off or until the lens barrel 3 is interchanged, it is preferable to maintain the "failure flag at 1", without resetting the failure flag. In particular, in Step S2203 illustrated in FIG. 52, when the failure flag is set to 1, the reliability of focus detection is not guaranteed. Therefore, the camera controller 21 may perform a process of prohibiting the driving of the focus lens 33, regardless of whether the peak value has been detected in Step S2110, in order to avoid the unnecessary driving of the focus lens 33. In this case, it is preferable to prohibit the driving of the focus lens 33 until power is turned off or until the lens barrel 3 is interchanged.

For example, in Step S2109 illustrated in FIG. 51, when the failure flag is set to 1, the camera controller 21 may perform, for example, a process of performing full search at the second driving speed that is sufficiently low, a process of prohibiting at least one of focus detection using the phase difference detection method and focus detection using the contrast detection method, a process of turning off the camera, and a process of displaying a warning indicating that a failure has occurred, regardless of whether the peak value has been detected in Step S2110. For example, in Step S2203 illustrated in FIG. 52, when the failure flag is set to 1, the reliability of focus detection is not guaranteed. Therefore, the camera controller 21 may perform a process which does not perform the focusing operation in Step S2111 even when the peak value has been detected in Step S2110.

On the other hand, when it is determined in Step S2102 that the lens barrel 3 is a lens which does not correspond to the predetermined first communication format, the process proceeds to Step S2113 and Steps S2113 to S2121 are performed. In Steps S2113 to S2121, when the lens information is repeatedly transmitted by the hot-line communication between the camera body 2 and the lens barrel 3, the same process as that from Step S2103 to Step S2112 is performed except that information which does not include information about the minimum image plane transfer coefficient $K_{min}$ and the maximum image plane transfer coefficient $K_{max}$ is transmitted as the lens information (Step S2114), the current position image plane transfer coefficient $K_{cur}$ included in the lens information is used instead of the minimum image plane transfer coefficient $K_{min}$ or the corrected minimum image plane transfer coefficient $K_{min\_x}$ when the scan drive speed V, which is the driving speed of the focus lens 33 in the scanning operation, is determined (Step S2117), and the failure determination process is not performed.

«Nineteenth Embodiment»

Next, a nineteenth embodiment of the invention will be described. The nineteenth embodiment has the same structure as the eighteenth embodiment except that the camera 1 illustrated in FIG. 45 operates as follows.

That is, the nineteenth embodiment is characterized in that, in the flowchart illustrated in FIG. 51 in the eighteenth embodiment, when the in-focus position is detected by the contrast detection method in Step S2110 and the focusing operation is performed on the basis of the result of the contrast detection method in Step S2111, it is determined whether to perform a backlash reduction operation and the driving method of the focus lens 33 during the focusing operation is changed on the basis of the determination result and differs from the eighteenth embodiment in these points.

Figure 54:
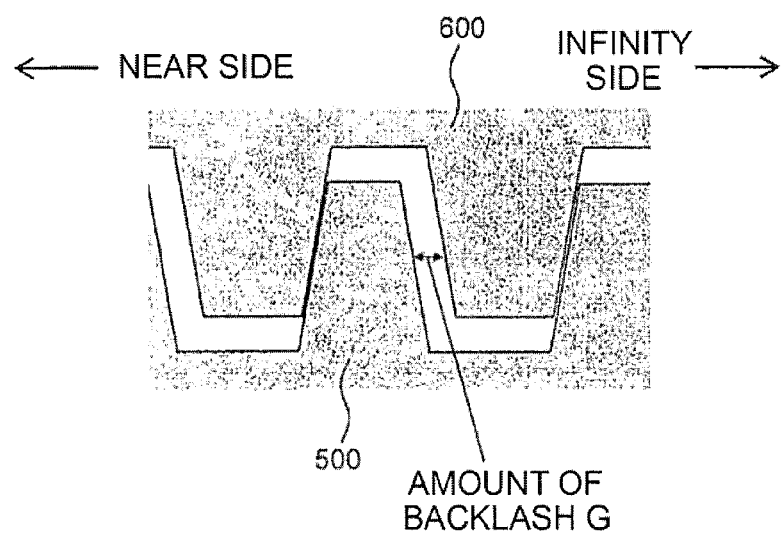
FIG. 54 is a diagram illustrating the amount of backlash G of a driving transfer mechanism of a focus lens 33.
Figure 55:
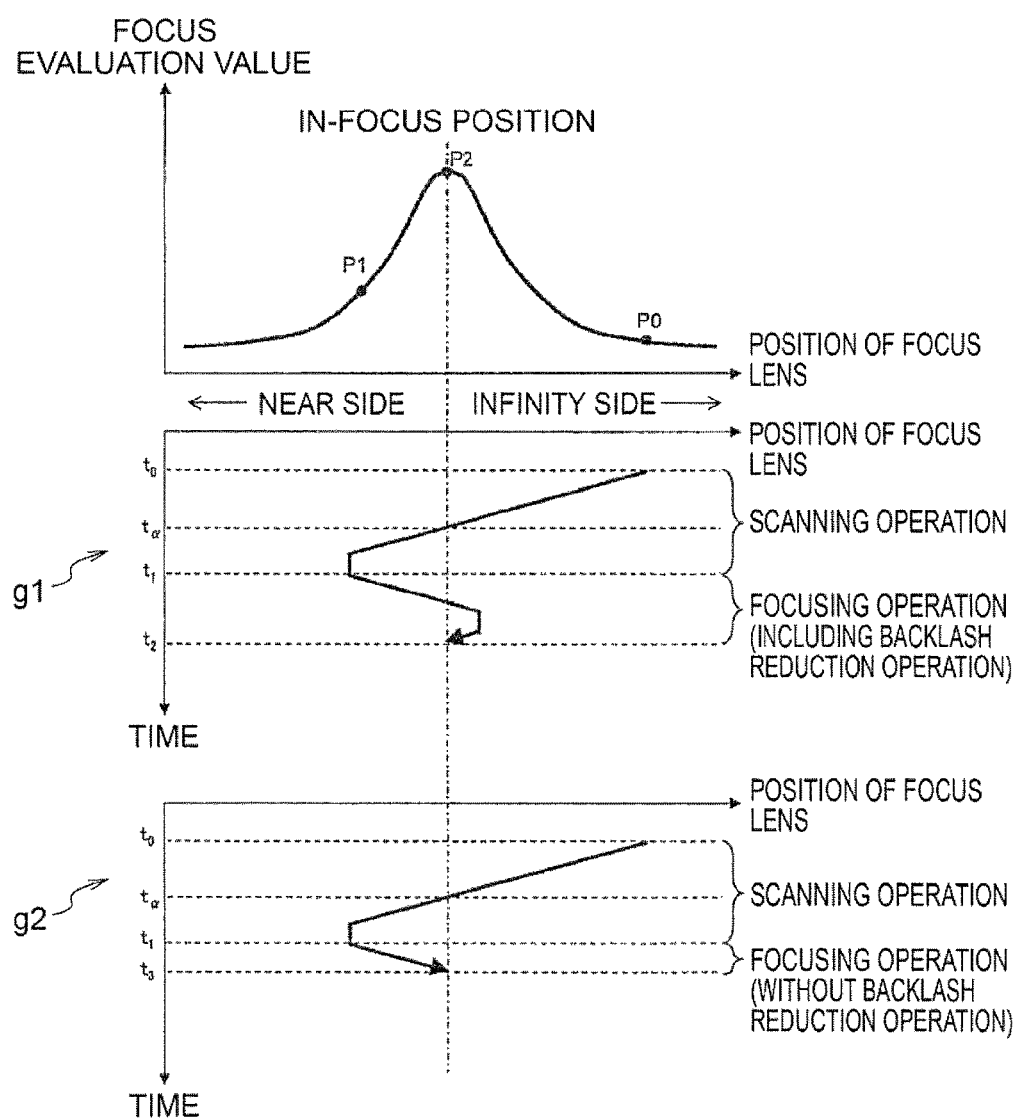
FIG. 55 is a diagram illustrating the relationship between the position of the focus lens and a focus evaluation value and the relationship between the position of the focus lens and time when a scanning operation and a focusing operation based on a contrast detection method according to the eighteenth embodiment are performed.

That is, the focus lens driving motor 331 for driving the focus lens 33 illustrated in FIG. 46 is generally a mechanical driving transfer mechanism. The driving transfer mechanism includes, for example, a first driving mechanism 500 and a second driving mechanism 600, as illustrated in FIG. 54. When the first driving mechanism 500 is driven, the second driving mechanism 600 of a side of the focus lens 33 is driven to move the focus lens 33 to the near side or to the infinity side. In the driving mechanism, the amount of backlash G is generally provided in order to smoothly operate an engaged portion of a gear. In the contrast detection method, in the mechanism, as illustrated in FIG. 55, after the focus lens 33 passes through the in-focus position once, the driving direction of the focus lens 33 needs to be reversed and the focus lens 33 needs to be driven to the in-focus position by the scanning operation. In this case, when the backlash reduction operation is not performed as illustrated in graph g2 of FIG. 55, the position of the focus lens 33 deviates from the in-focus position by the amount of backlash G. Therefore, during the driving of the focus lens 33 to the in-focus position, after the focus lens 33 passes through the in-focus position once, it is necessary to perform the backlash reduction operation which reverses the driving direction again and drives the focus lens 33 to the in-focus position, in order to remove the influence of the amount of backlash G, as illustrated in graph g1 in FIG. 55.

FIG. 55 is a diagram illustrating the relationship between the position of the focus lens and a focus evaluation value and the relationship between the position of the focus lens and time when the scanning operation and the focusing operation based on the contrast detection method according to this embodiment are performed. The graph g1 in FIG. 55 shows an aspect in which the scanning operation of the focus lens 33 starts from a lens position P0 in a direction from the infinity side to the near side at a time t0; when the peak position (in-focus position) P2 of the focus evaluation value is detected while the focus lens 33 is moved to a lens position P1, the scanning operation is stopped and the focusing operation involving the backlash reduction operation is performed at a time t1; and the focus lens 33 is driven to the in-focus position at a time t2. Similarly, the graph g2 in FIG. 55 shows an aspect in which the scanning operation starts at the time t0; the scanning operation is stopped and the focusing operation without involving the backlash reduction operation is performed at the time t1; and the focus lens 33 is driven to the in-focus position at a time t3.

Next, an example of the operation according to the nineteenth embodiment will be described with reference to the flowchart illustrated in FIG. 56. The following operation is performed when the in-focus position is detected by the contrast detection method in Step S2110 in the flowchart illustrated in FIG. 51. That is, as illustrated in FIG. 55, the scanning operation starts at the time t0. Then, when the peak position (in-focus position) P2 of the focus evaluation value is detected at the time of when the focus lens 33 is moved to the lens position P1 at the time t1, the operation is performed at the time t1.

That is, when the in-focus position is detected by the contrast detection method, first, the camera controller 21 acquires the minimum image plane transfer coefficient $K_{min}$ at the current position of the zoom lens 32 in Step S2301. The minimum image plane transfer coefficient $K_{min}$ can be acquired from the lens controller 37 through the lens transceiver 39 and the camera transceiver 29 by the hot-line communication between the camera controller 21 and the lens controller 37.

In Step S2302, the camera controller 21 acquires information about the amount of backlash G (see FIG. 54) of the driving transfer mechanism of the focus lens 33. The amount of backlash G of the driving transfer mechanism of the focus lens 33 can be stored in, for example, the lens memory 38 of the lens barrel 3 in advance and the information about the amount of backlash G can be acquired with reference to the lens memory 38. That is, specifically, the camera controller 21 transmits a request to transmit the amount of backlash G of the driving transfer mechanism of the focus lens 33 to the lens controller 37 through the camera transceiver 29 and the lens transceiver 39 to request the lens controller 37 to transmit information about the amount of backlash G of the driving transfer mechanism of the focus lens 33 stored in the lens memory 38, and acquires the information about the amount of backlash G. Alternatively, the information about the amount of backlash G of the driving transfer mechanism of the focus lens 33 stored in the lens memory 38 may be inserted into the lens information which is transmitted and received by the hot-line communication between the camera controller 21 and the lens controller 37.

Then, in Step S2303, the camera controller 21 calculates the amount of movement IG of the image plane corresponding to the amount of backlash G, on the basis of the minimum image plane transfer coefficient $K_{min}$ acquired in Step S2301 and the information about the amount of backlash G of the driving transfer mechanism of the focus lens 33 acquired in Step S2302. The amount of movement IG of the image plane corresponding to the amount of backlash G is the amount of movement of the image plane when the focus lens is driven by a distance that is equal to the amount of backlash G. In this embodiment, the amount of movement IG of the image plane is calculated by the following expression:

Amount of movement IG of image plane corresponding to amount of backlash G=Amount of backlash G×Minimum image plane transfer coefficient $K_{min}$.

Then, in Step S2304, the camera controller 21 performs a process of comparing the amount of movement IG of the image plane corresponding to the amount of backlash G calculated in Step S2303 with a predetermined amount of movement IP of the image plane and determines whether the amount of movement IG of the image plane corresponding to the amount of backlash G is equal to or less than the predetermined amount of movement IP of the image plane, that is, whether "the amount of movement IG of the image plane corresponding to the amount of backlash G"≤"the predetermined amount of movement IP of the image plane" is established, on the basis of the comparison result. The predetermined amount of movement IP of the image plane is set corresponding to the focus depth of the optical system. In general, the amount of movement of the image plane corresponds to the focus depth. In addition, since the predetermined amount of movement IP of the image plane is set to the focus depth of the optical system, the predetermined amount of movement IP of the image plane may be appropriately set according to the F-number, the cell size of the imaging element 22, or the format of the image to be captured. That is, as the F-number increases, the predetermined amount of movement IP of the image plane is set to a large value. Alternatively, as the cell size of the imaging element 22 increases or as the image format becomes smaller, the predetermined amount of movement IP of the image plane is set to a large value. When the amount of movement IG of the image plane corresponding to the amount of backlash G is equal to or less than the predetermined amount of movement IP of the image plane, the process proceeds to Step S2305. On the other hand, when the amount of movement IG of the image plane corresponding to the amount of backlash G is more than the predetermined amount of movement IP of the image plane, the process proceeds to Step S2306.

Since it has been determined in Step S2304 that the amount of movement IG of the image plane corresponding to the amount of backlash G is equal to or less than the predetermined amount of movement IP of the image plane, it is determined that the position of the focus lens 33 after driving can fall within the focus depth of the optical system, even though the backlash reduction operation is not performed. Therefore, in Step S2305, it is determined that the backlash reduction operation is not performed during the focusing operation and the focusing operation without involving the backlash reduction operation is performed, on the basis of the determination result. That is, when the focusing operation is performed, it is determined that the focus lens 33 is directly driven to the in-focus position and the focusing operation without involving the backlash reduction operation is performed on the basis of the determination result, as illustrated in the graph g2 in FIG. 55.

On the other hand, since it has been determined in Step S2304 that the amount of movement IG of the image plane corresponding to the amount of backlash G is more than the predetermined amount of movement IP of the image plane, it is determined that the backlash reduction operation needs to be performed in order to fall the position of the focus lens 33 after driving within the focus depth of the optical system. Therefore, in Step S2306, it is determined that the backlash reduction operation is performed during the focusing operation and the focusing operation involving the backlash reduction operation is performed, on the basis of the determination result. That is, when the focus lens 33 is driven to perform the focusing operation, it is determined to perform a process which drives the focus lens 33 to pass through the in-focus position, reverses the driving direction, and drives the focus lens 33 to the in-focus position and the focusing operation involving the backlash reduction operation is performed on the basis of the determination result, as illustrated in the graph g1 in FIG. 55.

In the nineteenth embodiment, as described above, the amount of movement IG of the image plane corresponding to the amount of backlash G is calculated on the basis of the minimum image plane transfer coefficient $K_{min}$ and the information about the amount of backlash G of the driving transfer mechanism of the focus lens 33 and it is determined whether the calculated amount of movement IG of the image plane corresponding to the amount of backlash G is equal to or less than the predetermined amount of movement IP of the image plane corresponding to the focus depth of the optical system. In this way, backlash reduction control which determines whether to perform the backlash reduction operation during the focusing operation is performed. The backlash reduction operation is not performed when it is determined that the amount of movement IG of the image plane corresponding to the amount of backlash G is equal to or less than the predetermined amount of movement IP of the image plane corresponding to the focus depth of the optical system and the position of the focus lens 33 after driving can fall within the focus depth of the optical system. In contrast, the backlash reduction operation is performed when it is determined that the amount of movement IG of the image plane corresponding to the amount of backlash G is more than the predetermined amount of movement IP of the image plane corresponding to the focus depth of the optical system and the backlash reduction operation needs to be performed in order to fall the position of the focus lens 33 after driving within the focus depth of the optical system. Therefore, according to this embodiment, when the backlash reduction operation is not required, the backlash reduction operation is not performed, thereby reducing the time required to drive the focus lens to the in-focus position. As a result, it is possible to reduce the time required for the focusing operation. On the other hand, when the backlash reduction operation is required, the backlash reduction operation is performed. Therefore, it is possible to improve the accuracy of focusing.

In particular, in the nineteenth embodiment, the amount of movement IG of the image plane corresponding to the amount of backlash G of the driving transfer mechanism of the focus lens 33 is calculated using the minimum image plane transfer coefficient $K_{min}$ and is compared with the predetermined amount of movement IP of the image plane corresponding to the focus depth of the optical system. Therefore, it is possible to appropriately determine whether the backlash reduction operation is required during the focusing operation.

In the backlash reduction control according to the nineteenth embodiment, the camera controller 21 may determine whether backlash reduction is required, according to the focal length, the diaphragm, and the object distance. In addition, the camera controller 21 may change the amount of backlash reduction, depending on the focal length, the diaphragm, and the object distance. For example, when the aperture value of the diaphragm is less than a predetermined value (the F-number is large), it may be determined that backlash reduction is not required or control may be performed such that the amount of backlash reduction is reduced, as compared to a case in which the aperture value of the diaphragm is not less than the predetermined value (the F-number is small). In addition, for example, on the wide side, it may be determined that backlash reduction is not required or control may be performed such that the amount of backlash reduction is reduced, as compared to the telephoto side.

«Twentieth Embodiment»

Next, a twentieth embodiment of the present invention will be described. The twentieth embodiment has the same structure as the eighteenth embodiment except that the camera 1 illustrated in FIG. 45 operates as follows.

That is, in the twentieth embodiment, the following clip operation (silent control) is performed. In the twentieth embodiment, in search control using a contrast detection method, control is performed such that the moving speed of the image plane of the focus lens 33 is constant. In the search control using the contrast detection method, the clip operation is performed in order to suppress the driving sound of the focus lens 33. The clip operation according to the twentieth embodiment clips the speed of the focus lens 33 such that the speed of the focus lens 33 is not less than a silent lens moving speed lower limit when the speed of the focus lens 33 is low and hinders silent movement.

In the twentieth embodiment, the camera controller 21 of the camera body 2 compares a predetermined silent lens moving speed lower limit V0b with a driving speed V1a of the focus lens, using a predetermined coefficient (Kc), to determine whether to perform the clip operation, which will be described below.

Figure 57:
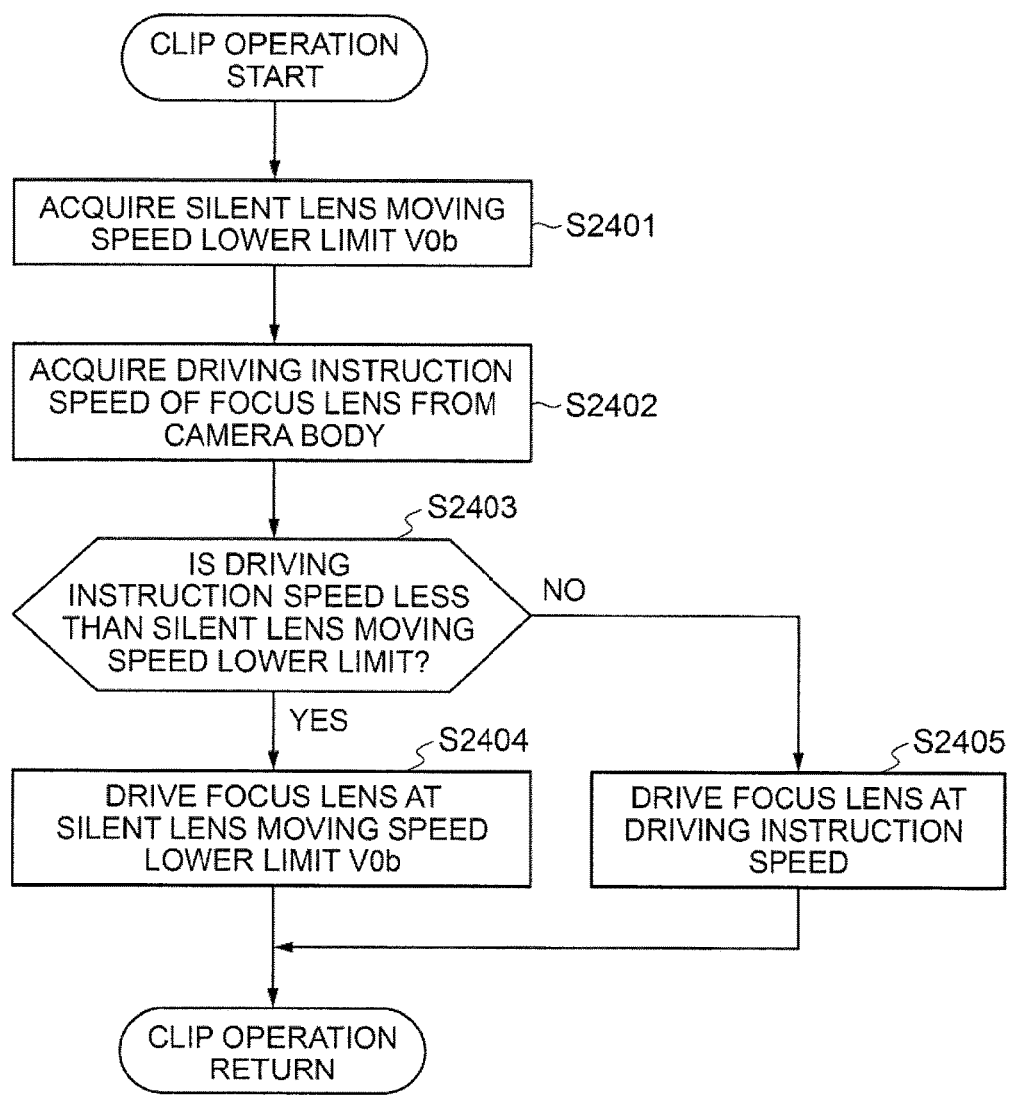
FIG. 57 is a flowchart illustrating a clip operation according to a twentieth embodiment.

When the clip operation is permitted by the camera controller 21, the lens controller 37 limits the driving speed of the focus lens 33 to the silent lens moving speed lower limit V0b such that the driving speed V1a of the focus lens 33, which will be described below, is not less than the silent lens moving speed lower limit V0b. Next, the clip operation will be described in detail with reference to the flowchart illustrated in FIG. 57. Here, FIG. 57 is a flowchart illustrating the clip operation (silent control) according to the twentieth embodiment.

In Step S2401, the lens controller 37 acquires the silent lens moving speed lower limit V0b. The silent lens moving speed lower limit V0b is stored in the lens memory 38 and the lens controller 37 can acquire the silent lens moving speed lower limit V0b from the lens memory 38.

In Step S2402, the lens controller 37 acquires the driving instruction speed of the focus lens 33. In this embodiment, the driving instruction speed of the focus lens 33 is transmitted from the camera controller 21 to the lens controller 37 by command data communication. Accordingly, the lens controller 37 can acquire the driving instruction speed of the focus lens 33 from the camera controller 21.

In Step S2403, the lens controller 37 compares the silent lens moving speed lower limit V0b acquired in Step S2401 with the driving instruction speed of the focus lens 33 acquired in Step S2402. Specifically, the lens controller 37 determines whether the driving instruction speed (unit: pulse/second) of the focus lens 33 is less than the silent lens moving speed lower limit V0b (unit: pulse/second). When the driving instruction speed of the focus lens 33 is less than the silent lens moving speed lower limit, the process proceeds to Step S2404. On the other hand, when the driving instruction speed of the focus lens 33 is equal to or greater than the silent lens moving speed lower limit V0b, the process proceeds to Step S2405.

In Step S2404, it has been determined that the driving instruction speed of the focus lens 33 transmitted from the camera body 2 is less than the silent lens moving speed lower limit V0b. In this case, the lens controller 37 drives the focus lens 33 at the silent lens moving speed lower limit V0b in order to suppress the driving sound of the focus lens 33. As such, when the driving instruction speed of the focus lens 33 is less than the silent lens moving speed lower limit V0b, the lens controller 37 limits the lens driving speed V1a of the focus lens 33 to the silent lens moving speed lower limit V0b.

In Step S2405, it has been determined that the driving instruction speed of the focus lens 33 transmitted from the camera body 2 is equal to or greater than the silent lens moving speed lower limit V0b. Since a driving sound of the focus lens 33 that is equal to or greater than a predetermined value is not generated (or the driving sound is very small), the lens controller 37 drives the focus lens 33 at the driving instruction speed of the focus lens 33 transmitted from the camera body 2.

Figure 58:
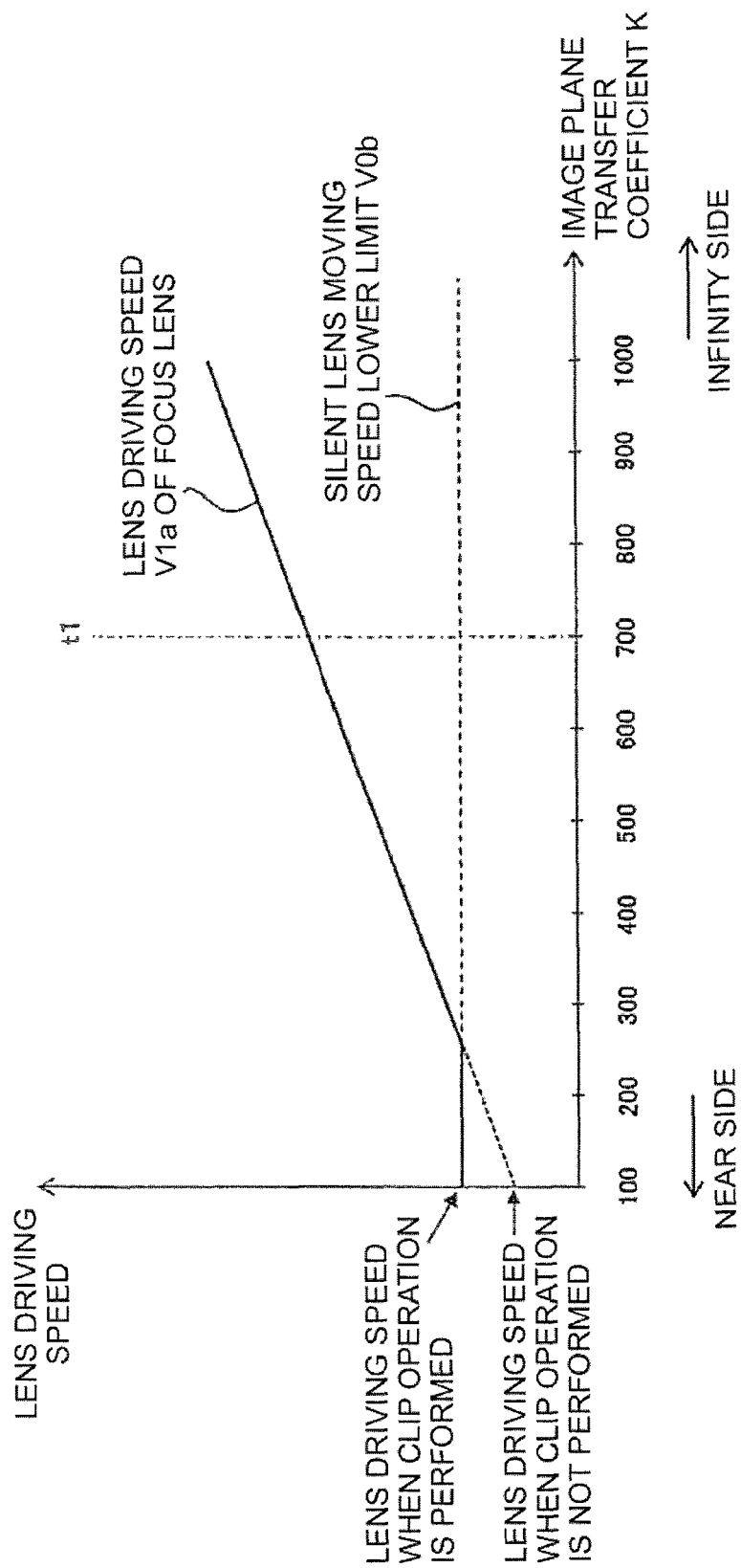
FIG. 58 is a diagram illustrating the relationship between a lens driving speed V1$a$ of the focus lens and a silent lens moving speed lower limit V0$b$.

Here, FIG. 58 is a graph illustrating the relationship between the lens driving speed V1a of the focus lens 33 and the silent lens moving speed lower limit V0b. In the graph, the vertical axis shows the lens driving speed, and the horizontal axis shows the image plane transfer coefficient K. As illustrated on the horizontal axis in FIG. 58, the image plane transfer coefficient K varies depending on the position of the focus lens 33. In the example illustrated in FIG. 58, the image plane transfer coefficient K tends to decrease toward the near side and to increase toward the infinity side. In contrast, in this embodiment, when a focus detection operation is performed, the focus lens 33 is driven at the speed at which the moving speed of the image plane is constant. Therefore, as illustrated in FIG. 58, the actual driving speed V1a of the focus lens 33 varies depending on the position of the focus lens 33. That is, in the example illustrated in FIG. 58, when the focus lens 33 is driven such that the moving speed of the image plane is constant, the lens moving speed V1a of the focus lens 33 is reduced toward the near side and increases toward the infinity side.

Figure 60:
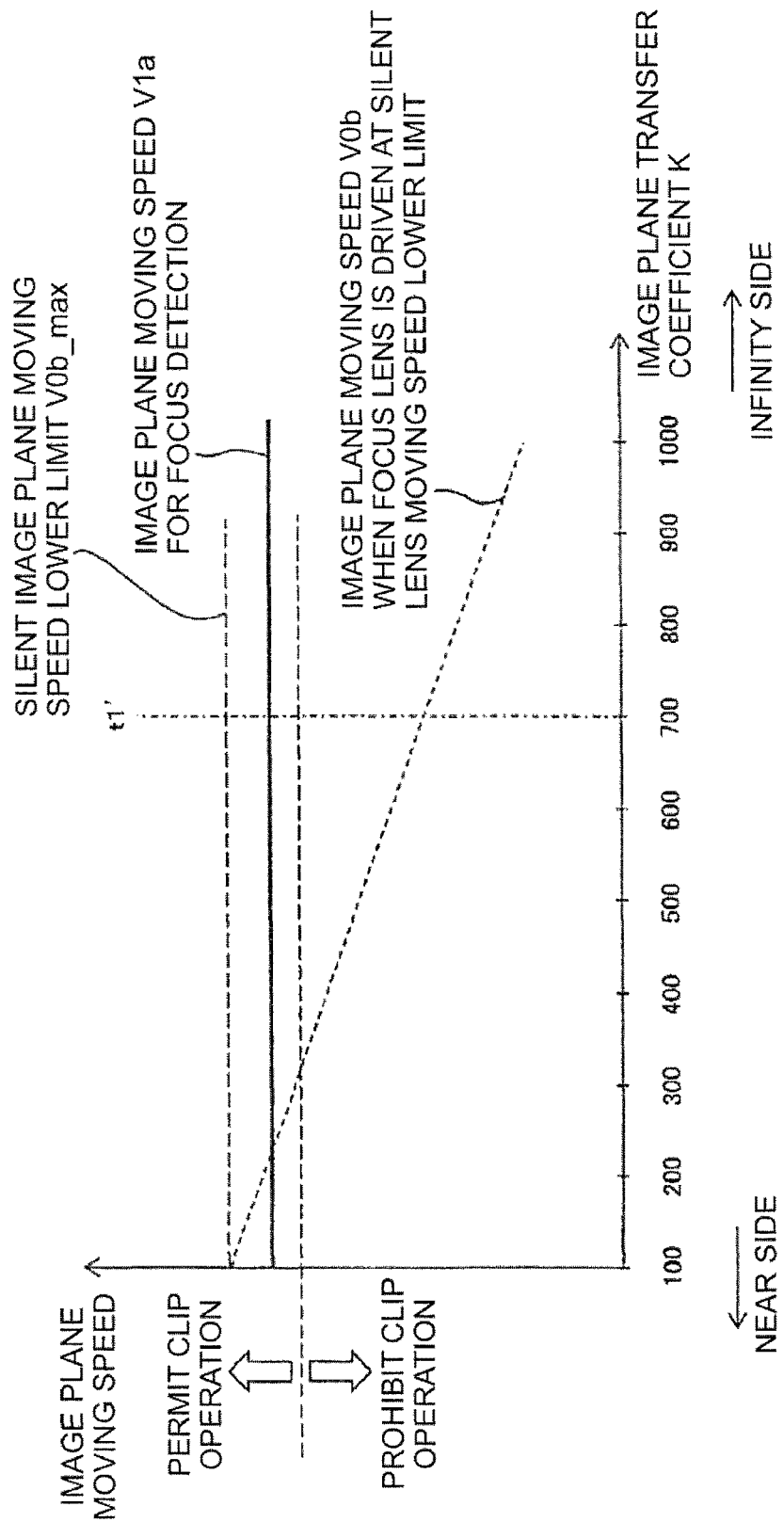
FIG. 60 is a diagram illustrating the relationship between an image plane moving speed V1$a$ of the focus lens and a silent image plane moving speed lower limit V0$b$_max.

On the other hand, when the focus lens 33 is driven as illustrated in FIG. 58, the moving speed of the image plane is constant as illustrated in FIG. 60. FIG. 60 is a graph for illustrating the relationship between the moving speed V1a of the image plane by the driving of the focus lens 33 and a silent image plane moving speed lower limit V0b_max. In the graph, the vertical axis shows the moving speed of the image plane and the horizontal axis shows the image plane transfer coefficient K. In FIGS. 58 and 60, the actual driving speed of the focus lens 33 and the moving speed of the image plane by the driving of the focus lens 33 are both represented by V1a. Therefore, V1a is variable when the vertical axis of the graph is the actual driving speed of the focus lens 33, as illustrated in FIG. 58, and is constant when the vertical axis of the graph is the moving speed of the image plane, as illustrated in FIG. 60.

In the case in which the focus lens 33 is driven such that the moving speed of the image plane is constant, when the clip operation is not performed, in some cases, the lens driving speed V1a of the focus lens 33 can be less than the silent lens moving speed lower limit V0b as in the example illustrated in FIG. 58. For example, the lens moving speed V1a is less than the silent lens moving speed lower limit V0b at the position of the focus lens 33 where the minimum image plane transfer coefficient $K_{min}$ is obtained (in FIG. 58, the minimum image plane transfer coefficient $K_{min}$ is 100).

In particular, when the focal length of the lens barrel 3 is long or in a bright light environment, the lens moving speed V1a of the focus lens 33 is likely to be less than the silent lens moving speed lower limit V0b. In this case, the lens controller 37 performs the clip operation to limit the driving speed V1a of the focus lens 33 to the silent lens moving speed lower limit V0b (performs control such that the driving speed V1a is not less than the silent lens moving speed lower limit V0b), as illustrated in FIG. 58 (Step S2404). Therefore, it is possible to suppress the driving sound of the focus lens 33.

Figure 59:
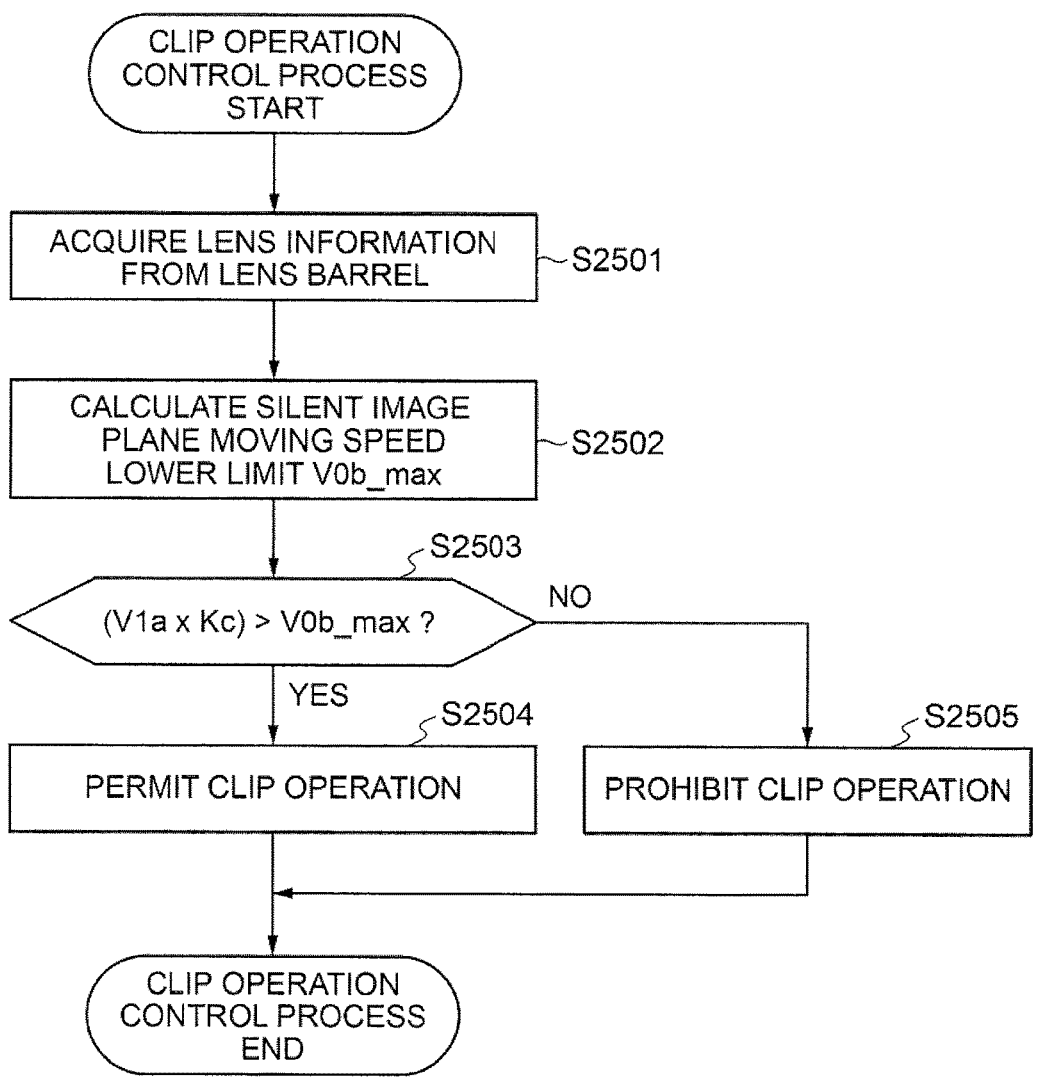
FIG. 59 is a flowchart illustrating a clip operation control process according to the twentieth embodiment.

Next, a clip operation control process for determining whether to permit or prohibit the clip operation illustrated in FIG. 57 will be described with reference to FIG. 59. FIG. 59 is a flowchart illustrating the clip operation control process according to this embodiment. The clip operation control process which will be described below is performed by the camera body 2, for example, when the AF-F mode or the movie mode is set.

First, in Step S2501, the camera controller 21 acquires the lens information. Specifically, the camera controller 21 acquires the current image plane transfer coefficient $K_{cur}$, the minimum image plane transfer coefficient $K_{min}$, the maximum image plane transfer coefficient $K_{max}$, and the silent lens moving speed lower limit V0b from the lens barrel 3 using hot-line communication.

Then, in Step S2502, the camera controller 21 calculates the silent image plane moving speed lower limit V0b_max. The silent image plane moving speed lower limit V0b_max is the moving speed of the image plane when the focus lens 33 is driven at the silent lens moving speed lower limit V0b at the position of the focus lens 33 where the minimum image plane transfer coefficient $K_{min}$ is obtained. The silent image plane moving speed lower limit V0b_max will be described in detail below.

First, as illustrated in FIG. 58, whether a driving sound is generated by the driving of the focus lens 33 is determined by the actual driving speed of the focus lens 33. Therefore, as illustrated in FIG. 58, when the silent lens moving speed lower limit V0b is represented by the lens driving speed, it is constant. On the other hand, when the silent lens moving speed lower limit V0b is represented by the moving speed of the image plane, it is variable as illustrated in FIG. 60 since the image plane transfer coefficient K varies depending on the position of the focus lens 33, as described above. In FIGS. 58 and 60, the silent lens moving speed lower limit (the lower limit of the actual driving speed of the focus lens 33) and the moving speed of the image plane when the focus lens 33 is driven at the silent lens moving speed lower limit are both represented by V0b. Therefore, V0b is constant (is parallel to the horizontal axis) when the vertical axis of the graph is the actual driving speed of the focus lens 33, as illustrated in FIG. 58, and is variable (is not parallel to the horizontal axis) when the vertical axis of the graph is the moving speed of the image plane, as illustrated in FIG. 60.

In this embodiment, the silent image plane moving speed lower limit V0b_max is set as the moving speed of the image plane at which the moving speed of the focus lens 33 is the silent lens moving speed lower limit V0b at the position of the focus lens 33 (in the example illustrated in FIG. 60, the image plane transfer coefficient K is 100) where the minimum image plane transfer coefficient $K_{min}$ is obtained when the focus lens 33 is driven such that the moving speed of the image plane is constant. That is, in this embodiment, when the focus lens 33 is driven at the silent lens moving speed lower limit, the maximum moving speed of the image plane (in the example illustrated in FIG. 60, the moving speed of the image plane at an image plane transfer coefficient K of 100) is set as the silent image plane moving speed lower limit V0b_max.

As such, in this embodiment, the maximum moving speed of the image plane (the moving speed of the image plane at the lens position where the image plane transfer coefficient is the minimum) among the moving speeds of the image plane corresponding to the silent lens moving speed lower limit V0b which varies depending on the position of the focus lens 33 is calculated as the silent image plane moving speed lower limit V0b_max. For example, in the example illustrated in FIG. 60, since the minimum image plane transfer coefficient $K_{min}$ is "100", the moving speed of the image plane at the position of the focus lens 33 where the image plane transfer coefficient is "100" is calculated as the silent image plane moving speed lower limit V0b_max.

Specifically, the camera controller 21 calculates the silent image plane moving speed lower limit V0b_max (unit: mm/second) on the basis of the silent lens moving speed lower limit V0b (unit: pulse/second) and the minimum image plane transfer coefficient $K_{min}$ (unit: pulse/mm) as illustrated in the following expression:

Silent image plane moving speed lower limit
V0b_max=Silent lens moving speed lower limit
(the actual driving speed of the focus lens) V0b/
Minimum image plane transfer coefficient $K_{min}$.

As such, in this embodiment, the silent image plane moving speed lower limit V0b_max is calculated using the minimum image plane transfer coefficient $K_{min}$. Therefore, it is possible to calculate the silent image plane moving speed lower limit V0b_max at the time when the detection of the focus by AF-F or a moving image capture operation starts. For example, in the example illustrated in FIG. 60, when the detection of the focus by AF-F or the moving image capture operation starts at a time t1', the moving speed of the image plane at the position of the focus lens 33 where the image plane transfer coefficient K is "100" can be calculated as the silent image plane moving speed lower limit V0b_max at the time t1'.

Then, in Step S2503, the camera controller 21 compares the image plane moving speed V1a for focus detection which is acquired in Step S2501 with the silent image plane moving speed lower limit V0b_max calculated in Step S2502. Specifically, the camera controller 21 determines whether the image plane moving speed V1a for focus detection (unit: mm/second) and the silent image plane moving speed lower limit V0b_max (unit: mm/second) satisfy the following expression:

(Image plane moving speed V1a for focus detection×
Kc)>Silent image plane moving speed lower
limit V0b_max.

In the above-mentioned expression, a coefficient Kc is a value equal to or greater than 1 (Kc≥1), which will be described in detail below.

When the above-mentioned expression is satisfied, the process proceeds to Step S2504 and the camera controller 21 permits the clip operation illustrated in FIG. 57. That is, the driving speed V1a of the focus lens 33 is limited to the silent lens moving speed lower limit V0b in order to suppress the driving sound of the focus lens 33, as illustrated in FIG. 58 (search control is performed such that the driving speed V1a of the focus lens 33 is not less than the silent lens moving speed lower limit V0b).

On the other hand, when the above-mentioned expression is not satisfied, the process proceeds to Step S2505 and the clip operation illustrated in FIG. 57 is prohibited. That is, the focus lens 33 is driven such that the image plane moving speed V1a capable of appropriately detecting the in-focus position is obtained, without limiting the driving speed V a of the focus lens 33 to the silent lens moving speed lower limit V0b (the driving speed V1a of the focus lens 33 is permitted to be less than the silent lens moving speed lower limit V0b).

As illustrated in FIG. 58, when the clip operation is permitted and the driving speed of the focus lens 33 is limited to the silent lens moving speed lower limit V0b, the moving speed of the image plane increases at the lens position where the image plane transfer coefficient K is small. As a result, in some cases, the moving speed of the image plane is greater than a value capable of appropriately detecting the in-focus position and appropriate focusing accuracy may not be obtained. On the other hand, when the clip operation is prohibited and the focus lens 33 is driven such that the moving speed of the image plane reaches a value capable of appropriately detecting the in-focus position, in some cases, the driving speed V1a of the focus lens 33 is less than the silent lens moving speed lower limit V0b and a driving sound that is equal to or greater than a predetermined value may be generated, as illustrated in FIG. 58.

As such, when the image plane moving speed V1a for focus detection becomes less than the silent image plane moving speed lower limit V0b_max, there is the problem of whether to drive the focus lens 33 at a lens driving speed less than the silent lens moving speed lower limit V0b such that the image plane moving speed V1a capable of appropriately detecting the in-focus position is obtained or to drive the focus lens 33 at a lens driving speed equal to or greater than the silent lens moving speed lower limit V0b in order to suppress the driving sound of the focus lens 33.

In contrast, in this embodiment, when the above-mentioned expression is satisfied even though the focus lens 33 is driven at the silent lens moving speed lower limit V0b, the coefficient Kc of the above-mentioned expression is stored as one or more values capable of ensuring a certain degree of focus detection accuracy. Therefore, as illustrated in FIG. 60, when the above-mentioned expression is satisfied even though the image plane moving speed V1a for focus detection is less than the silent image plane moving speed lower limit V0b_max, the camera controller 21 determines that a certain degree of focus detection accuracy can be ensured, gives priority to the suppression of the driving sound of the focus lens 33, and permits the clip operation which drives the focus lens 33 at a lens driving speed less than the silent lens moving speed lower limit V0b.

In some cases, the clip operation is permitted when the value of the image plane moving speed V1a for focus detection×Kc (where Kc≥1) is equal to or less than the silent image plane moving speed lower limit V0b_max, and the image plane moving speed for focus detection is too high to ensure focus detection accuracy if the driving speed of the focus lens 33 is limited to the silent lens moving speed lower limit V0b. Therefore, when the above-mentioned expression is not satisfied, the camera controller 21 gives priority to focus detection accuracy and prohibits the clip operation illustrated in FIG. 57. Accordingly, when the focus is detected, the moving speed of the image plane can be set as the image plane moving speed V1a capable of appropriately detecting the in-focus position and it is possible to detect the focus with high accuracy.

When the aperture value is large (the diaphragm aperture is small), the depth of field becomes deep. Therefore, the sampling interval capable of appropriately detecting the in-focus position is large. As a result, it is possible to increase the image plane moving speed V1a capable of appropriately detecting the in-focus position. Therefore, when the image plane moving speed V1a capable of appropriately detecting the in-focus position is a fixed value, the camera controller 21 can set the coefficient Kc of the above-mentioned expression larger as the aperture value increases.

Similarly, when the size of an image, such as a live view image, is small (when the compression ratio of the image is high or when the thinning-out ratio of pixel data is high), high focus detection accuracy is not required. Therefore, it is possible to increase the coefficient Kc of the above-mentioned expression. In addition, when the pitch between the pixels of the imaging element 22 is large and so on, it is possible to increase the coefficient Kc of the above-mentioned expression.

Figure 61:
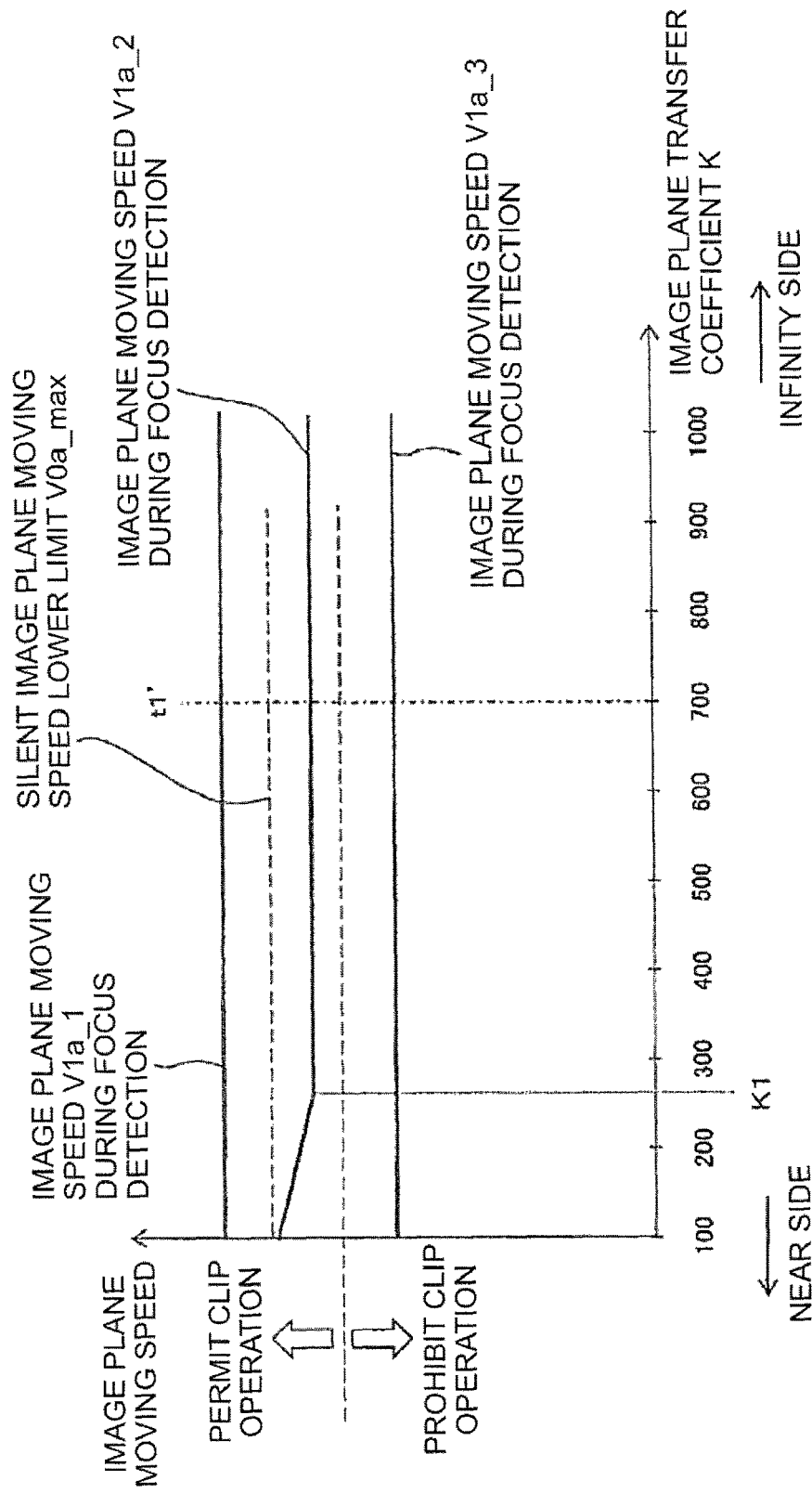
FIG. 61 is a diagram illustrating the relationship between the image plane moving speed V1$a$ during focus detection and the clip operation.
Figure 62:
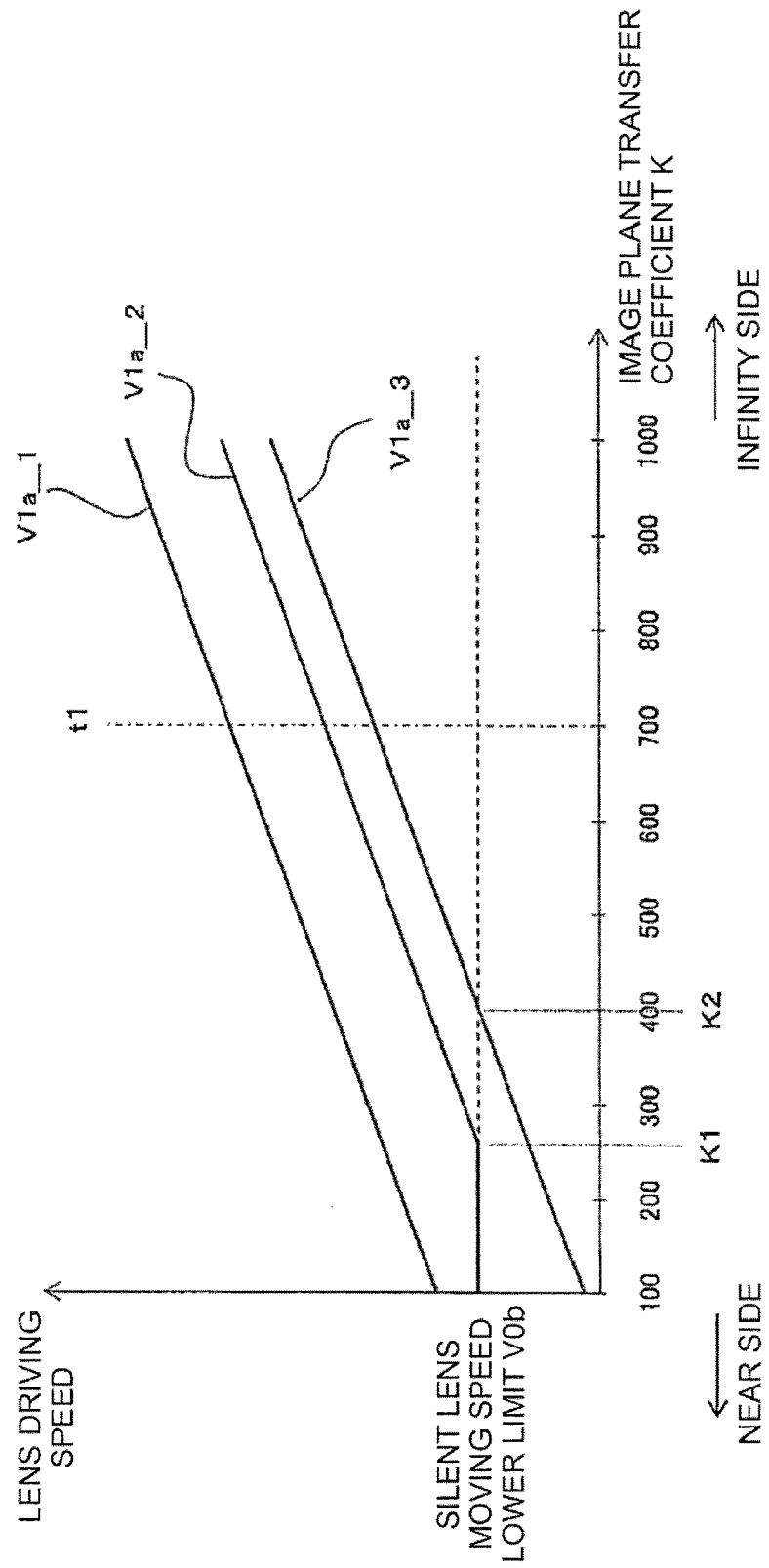
FIG. 62 is a diagram illustrating the relationship between the lens driving speed V1$a$ of the focus lens and the clip operation.

Next, the control of the clip operation will be described in detail with reference to FIGS. 61 and 62. FIG. 61 is a diagram illustrating the relationship between the image plane moving speed V1a during focus detection and the clip operation, and FIG. 62 is a diagram illustrating the relationship between the actual lens driving speed V1a of the focus lens 33 and the clip operation.

For example, as described above, in this embodiment, in some cases, when search control starts using the half-press of the release switch as a trigger and when search control starts using a condition other than the half-press of the release switch as a trigger, the moving speed of the image plane in the search control varies depending on, for example, the still image mode, the movie mode, the sports mode, the landscape mode, the focal length, the object distance, and the aperture value. FIG. 61 illustrates three different image plane moving speeds V1a_1, V1a_2, and V1a_3.

Specifically, the image plane moving speed V1a_1 during focus detection illustrated in FIG. 61 is the maximum moving speed among the moving speeds of the image plane capable of appropriately detecting a focus state and is the moving speed of the image plane satisfying the above-mentioned expression. In addition, the image plane moving speed V1a_2 during focus detection is less than the image plane moving speed V1a_1 and is the moving speed of the image plane satisfying the above-mentioned expression at a time t1'. The image plane moving speed V1a_3 during focus detection is the moving speed of the image plane which does not satisfy the above-mentioned expression.

As such, in the example illustrated in FIG. 61, when the moving speed of the image plane during focus detection is V1a_and V1a_2, the clip operation illustrated in FIG. 61 is permitted because the moving speed of the image plane satisfies the above-mentioned expression at a time t1. On the other hand, when the moving speed of the image plane during focus detection is V1a_3, the clip operation illustrated in FIG. 57 is prohibited because the moving speed of the image plane does not satisfy the above-mentioned expression.

This point will be described in detail with reference to FIG. 62. FIG. 62 is a diagram in which the vertical axis of the graph illustrated in FIG. 61 is changed from the moving speed of the image plane to the lens driving speed. As described above, since the lens driving speed V1a_1 of the focus lens 33 satisfies the above-mentioned expression (3), the clip operation is permitted. However, as illustrated in FIG. 62, the lens driving speed V1a_1 is not less than the silent lens moving speed lower limit V0b even at the lens position where the minimum image plane transfer coefficient (K=100) is obtained. Therefore, actually, the clip operation is not performed.

Since the lens driving speed V1a_2 of the focus lens 33 satisfies the above-mentioned expression at the time t1' which is a focus detection start time, the clip operation is permitted. In the example illustrated in FIG. 62, when the focus lens 33 is driven at the lens driving speed V1a_2, the lens driving speed V1a_2 is less than the silent lens moving speed lower limit V0b at the lens position where the image plane transfer coefficient K is K1. Therefore, the lens driving speed V1a_2 of the focus lens 33 is limited to the silent lens moving speed lower limit V0b at the lens position where the image plane transfer coefficient K is less than K1.

That is, the clip operation is performed at the lens position where the lens driving speed V1a_2 of the focus lens 33 is less than the silent lens moving speed lower limit V0b. Then, the image plane moving speed V1a_2 during focus detection is different from the previous moving speed (search speed) of the image plane and search control for the focus evaluation value is performed at the moving speed of the image plane. That is, as illustrated in FIG. 61, the image plane moving speed V1a_2 during focus detection is different from the previous constant speed at the lens position where the image plane transfer coefficient is less than K1.

Since the lens driving speed V1a_3 of the focus lens 33 does not satisfy the above-mentioned expression, the clip operation is prohibited. Therefore, in the example illustrated in FIG. 62, when the focus lens 33 is driven at the lens driving speed V1a_3, the lens driving speed V1a_3 is less than the silent lens moving speed lower limit V0b at the lens position where the image plane transfer coefficient K is K2. The clip operation is not performed at the lens position where the image plane transfer coefficient K is less than K2. Even when the driving speed V1a_3 of the focus lens 33 is less than the silent lens moving speed lower limit V0b, the clip operation is not performed in order to appropriately detect the focus state.

As described above, in the twentieth embodiment, among the moving speeds of the image plane when the focus lens 33 is driven at the silent lens moving speed lower limit V0b, the maximum moving speed of the image plane is calculated as the silent image plane moving speed lower limit V0b_max and the calculated silent image plane moving speed lower limit V0b_max is compared with the image plane moving speed V1a during focus detection. Then, in the case in which the value of the image plane moving speed V1a during focus detection×Kc (where Kc≥1) is greater than the silent image plane moving speed lower limit V0b_max, it is determined that focus detection accuracy that is equal to or greater than a predetermined value is obtained even though the focus lens 33 is driven at the silent lens moving speed lower limit V0b and the clip operation illustrated in FIG. 57 is permitted. Accordingly, in this embodiment, it is possible to suppress the driving sound of the focus lens 33 while ensuring focus detection accuracy.

In the case in which the value of the image plane moving speed V1a during focus detection×Kc (where Kc≥1) is equal to or less than the silent image plane moving speed lower limit V0b_max, when the driving speed V1a of the focus lens 33 is limited to the silent lens moving speed lower limit V0b, in some cases, appropriate focus detection accuracy may not be obtained. Therefore, in this embodiment, in this case, the clip operation illustrated in FIG. 57 is prohibited such that the moving speed of the image plane suitable for focus detection is obtained. As a result, in this embodiment, it is possible to appropriately detect the in-focus position when the focus is detected.

In this embodiment, the minimum image plane transfer coefficient $K_{min}$ is stored in the lens memory 38 of the lens barrel 3 in advance and the silent image plane moving speed lower limit V0b_max is calculated using the minimum image plane transfer coefficient $K_{min}$. Therefore, in this embodiment, for example, as illustrated in FIG. 54, it is possible to determine whether the value of the image plane moving speed V1a during focus detection×Kc (where Kc≥1) is greater than the silent image plane moving speed lower limit V0b_max at the time t1 when the capture of a moving image or the detection of the focus by the AF-F mode starts and thus to determine whether to perform the clip operation. As such, in this embodiment, it is not repeatedly determined whether to perform the clip operation, using the current position image plane transfer coefficient $K_{cur}$, but it is possible to determine whether to perform the clip operation at the initial time when the capture of a moving image or the detection of the focus by the AF-F mode starts, using the minimum image plane transfer coefficient $K_{min}$. Therefore, it is possible to reduce the processing load of the camera body 2.

In the above-described embodiment, the camera body 2 performs the clip operation control process illustrated in FIG. 57. However, the invention is not limited thereto. For example, the lens barrel 3 may perform the clip operation control process illustrated in FIG. 57.

In the above-described embodiment, as illustrated in the above-mentioned expression, the image plane transfer coefficient K is calculated as follows: Image plane transfer coefficient K=(Amount of driving of focus lens 33/Amount of movement of image plane). However, the invention is not limited thereto. For example, the image plane transfer coefficient K may be calculated as illustrated in the following expression:

Image plane transfer coefficient $K$=(Amount of movement of image plane/Amount of driving of focus lens 33).

In this case, the camera controller 21 can calculate the silent image plane moving speed lower limit V0b_max. That is, the camera controller 21 can calculate the silent image plane moving speed lower limit V0b_max (unit: mm/second) on the basis of the silent lens moving speed lower limit V0b (unit: pulse/second) and the maximum image plane transfer coefficient $K_{max}$ (unit: pulse/mm) indicating the maximum value among the image plane transfer coefficients K at each position (focal length) of the zoom lens 32, as illustrated in the following expression:

Silent image plane moving speed lower limit V0b_max=Silent lens moving speed lower limit V0b/Maximum image plane transfer coefficient $K_{max}$.

For example, when a value which is calculated by "the amount of movement of the image plane/the amount of driving of the focus lens 33" is used as the image plane transfer coefficient K, as the value (absolute value) increases, the amount of movement of the image plane when the focus lens is driven by a predetermined value (for example, 1 mm) increases. When a value which is calculated by "the amount of driving of the focus lens 33/the amount of movement of the image plane" is used as the image plane transfer coefficient K, as the value (absolute value) increases, the amount of movement of the image plane when the focus lens is driven by a predetermined value (for example, 1 mm) decreases.

In addition to the above-described embodiment, the following structure may be used: when a silent mode in which the driving sound of the focus lens 33 is suppressed is set, the clip operation and the clip operation control process mentioned above are performed; and when the silent mode is not set, the clip operation and the clip operation control process mentioned above are not performed. In addition, the following structure may be used: when the silent mode is set, priority is given to the suppression of the driving sound of the focus lens 33, the clip operation control process illustrated in FIG. 59 is not performed, and the clip operation illustrated in FIG. 57 is always performed.

In the above-described embodiment, the image plane transfer coefficient K=(the amount of driving of the focus lens 33/the amount of movement of the image plane) is established. However, the invention is not limited thereto. For example, when the image plane transfer coefficient K is defined as the image plane transfer coefficient K=(the amount of movement of the image plane/the amount of driving of the focus lens 33), it is possible to control, for example, the clip operation, using the maximum image plane transfer coefficient $K_{max}$, similarly to the above-described embodiment.

«Twenty-First Embodiment»

Next, a twenty-first embodiment of the invention will be described. The twenty-first embodiment has the same structure as the eighteenth embodiment except for the following points. FIG. 63 shows a table indicating the relationship among the position (focal length) of the zoom lens 32, the position (object distance) of the focus lens 33, and the image plane transfer coefficient K in the twenty-first embodiment.

That is, in the twenty-first embodiment, areas "D0", "X1", and "X2" which are closer to the near side than the area "D1" that is closest to the near side in FIG. 47 are provided. Similarly, areas "D10", "X3", and "X4" which are closer to the infinity side than the area "D9" that is closest to the infinity side in FIG. 47 are provided. Next, first, the areas "D0", "X1", and "X2" close to the near side and the areas "D10", "X3", and "X4" close to the infinity side will be described.

Figure 64:
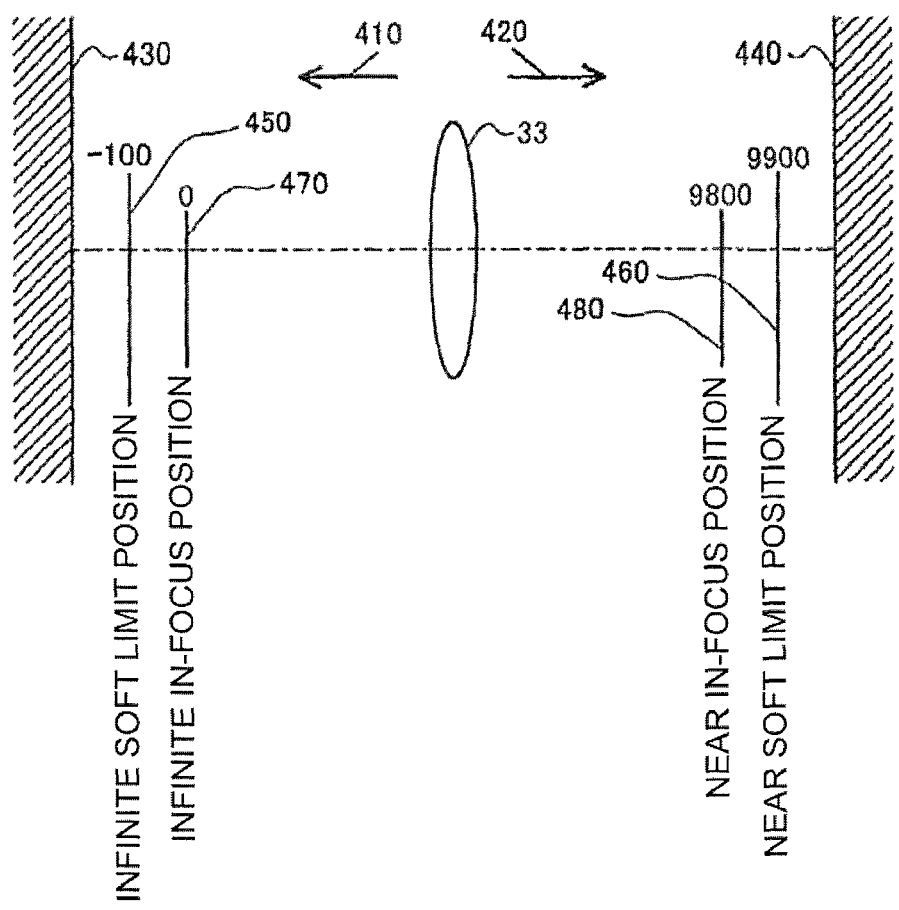
FIG. 64 is a diagram illustrating a driving range of the focus lens 33.

As illustrated in FIG. 64, in this embodiment, the focus lens 33 is configured so as to be movable in an infinity direction 410 and a near direction 420 on an optical axis L1 which is represented by a one-dot chain line in FIG. 64. Stoppers (not illustrated) are provided at a mechanical end point 430 in the infinity direction 410 and a mechanical end point 440 in the near direction 420 and restrict the movement of the focus lens 33. That is, the focus lens 33 is configured so as to be movable from the mechanical end point 430 in the infinity direction 410 to the mechanical end point 440 in the near direction 420.

However, the range in which the lens controller 37 actually drives the focus lens 33 is narrower than the range from the mechanical end point 430 to the mechanical end point 440. The movement range will be described in detail. The lens controller 37 drives the focus lens 33 in the range from an infinite soft limit position 450 which is provided inside the mechanical end point 430 in the infinity direction 410 to a near soft limit position 460 which is provided inside the mechanical end point 440 in the near direction 420. That is, a lens driver 212 drives the focus lens 33 between the near soft limit position 460 corresponding to a near-side driving limit position and the infinite soft limit position 450 corresponding to an infinity-side driving limit position.

The infinite soft limit position 450 is provided outside an infinite in-focus position 470. The infinite in-focus position 470 is the position of the focus lens 33 corresponding to a position which is closest to the infinity side and where the imaging optical system including the lenses 31, 32, 33, and 35 and the diaphragm 36 can be focused. The reason why the infinite soft limit position 450 is provided at that position is that, when the focus is detected by a contrast detection method, the peak of the focus evaluation value may be present at the infinite in-focus position 470. That is, when the infinite in-focus position 470 is aligned with the infinite soft limit position 450, it is difficult to recognize the peak of the focus evaluation value which is present at the infinite in-focus position 470. In order to solve the problem, the infinite soft limit position 450 is provided outside the infinite in-focus position 470. Similarly, the near soft limit position 460 is provided outside a near in-focus position 480. The near in-focus position 480 is the position of the focus lens 33 corresponding to a position which is closest to the near side and where the imaging optical system including the lenses 31, 32, 33, and 35 and the diaphragm 36 can be focused.

In FIG. 63, the area "D0" is a position corresponding to the near soft limit position 460, and the areas "X1" and "X2" are areas which are closer to the near side than the near soft limit position, for example, a position corresponding to the mechanical end point 440 in the near direction 420 and a position between the near soft limit position and the end point 440. In FIG. 63, the area "D10" is a position corresponding to the infinite soft limit position 450 and the areas "X3" and "X4" are areas which are closer to the infinity side than the infinite soft limit position, for example, a position corresponding to the mechanical end point 430 of the infinity direction 410 and a position between the infinite soft limit position and the end point 430.

In this embodiment, image plane transfer coefficients "K10", "K20", ..., "K90" in the area "D0" corresponding to the near soft limit position 460 among these areas can be set as the minimum image plane transfer coefficient $K_{min}$. Similarly, image plane transfer coefficients "K110", "K210", ..., "K910" in the area "D10" corresponding to the infinite soft limit position 450 can be set as the maximum image plane transfer coefficient $K_{max}$.

In this embodiment, the values of image plane transfer coefficients "α11", "α21", ..., "α91" in the area "X1" are less than the values of the image plane transfer coefficients "K10", "K20", ..., "K90" in the area "D0". Similarly, the values of image plane transfer coefficients "α12", "α22", ..., "α92" in the area "X2" are less than the values of the image plane transfer coefficients "K10", "K20", ..., "K90" in the area "D0". The values of image plane transfer coefficients "α13", "α23", ..., "α93" in the area "X3" are greater than the values of the image plane transfer coefficients "K110", "K210", ..., "K910" in the area "D10". The values of image plane transfer coefficients "α14", "α24", ..., "α94" in the area "X4" are greater than the values of the image plane transfer coefficients "K110", "K210", ..., "K910" in the area "D10".

In this embodiment, the image plane transfer coefficient K ("K10", "K20", ..., "K90") in the area "D0" is set as the minimum image plane transfer coefficient $K_{min}$ and the image plane transfer coefficient K ("K110", "K210", ..., "K910") in the area "D10" is set as the maximum image plane transfer coefficient $K_{max}$. In particular, the areas "X1", "X2", "X3", and "X4" are areas where the focus lens 33 is not driven or there is little necessity to drive the focus lens 33 due to, for example, aberration or a mechanical mechanism. Therefore, even if the image plane transfer coefficients "α11", "α21", ..., "α94" corresponding to the areas "X1", "X2", "X3", and "X4" are set as the minimum image plane transfer coefficient $K_{min}$ or the maximum image plane transfer coefficient $K_{max}$, they do not contribute to appropriate automatic focus control (for example, the speed control, silent control, and backlash reduction control of the focus lens).

In this embodiment, the image plane transfer coefficient in the area "D0" corresponding to the near soft limit position

460 is set as the minimum image plane transfer coefficient $K_{min}$ and the image plane transfer coefficient in the area "D10" corresponding to the infinite soft limit position 450 is set as the maximum image plane transfer coefficient $K_{max}$. However, the invention is not limited thereto.

For example, even when the image plane transfer coefficients corresponding to the areas "X1" and "X2" which are closer to the near side than the near soft limit position and the image plane transfer coefficients corresponding to the areas "X3" and "X4" which are closer to the infinity side than the infinite soft limit position are stored in the lens memory 38, the minimum image plane transfer coefficient among the image plane transfer coefficients corresponding to the position of the focus lens included in a contrast AF search range (scanning range) may be set as the minimum image plane transfer coefficient $K_{min}$ and the maximum image plane transfer coefficient among the image plane transfer coefficients corresponding to the position of the focus lens included in the contrast AF search range (scanning range) may be set as the maximum image plane transfer coefficient $K_{max}$. In addition, the image plane transfer coefficient corresponding to the near in-focus position 480 may be set as the minimum image plane transfer coefficient Km and the image plane transfer coefficient corresponding to the infinite in-focus position 470 may be set as the maximum image plane transfer coefficient $K_{max}$.

Alternatively, in this embodiment, the image plane transfer coefficient K may be set such that the image plane transfer coefficient K is the minimum when the focus lens 33 is driven to the vicinity of the near soft limit position 460. That is, the image plane transfer coefficient K may be set such that the image plane transfer coefficient K is the minimum when the focus lens 33 is driven to the vicinity of the near soft limit position 460 rather than when the focus lens 33 is moved to any position in the range from the near soft limit position 460 to the infinite soft limit position 450.

Similarly, the image plane transfer coefficient K may be set such that the image plane transfer coefficient K is the maximum when the focus lens 33 is driven to the vicinity of the infinite soft limit position 450. That is, the image plane transfer coefficient K may be set such that the image plane transfer coefficient K is the maximum when the focus lens 33 is driven to the vicinity of the near infinite soft limit position 450 rather than when the focus lens 33 is moved to any position in the range from the near soft limit position 460 to the infinite soft limit position 450.

«Twenty-Second Embodiment»

Next, a twenty-second embodiment of the invention will be described. The twenty-second embodiment has the same structure as the eighteenth embodiment except for the following points. That is, in the eighteenth embodiment, only the image plane transfer coefficients K corresponding to the focusing range of the focus lens 33 are stored in the lens memory 38. However, the twenty-second embodiment differs from the eighteenth embodiment in that correction coefficients K0 and K1 are further stored in the lens memory 38 of the lens barrel 3 and the lens controller 37 corrects the minimum image plane transfer coefficient $K_{min}$ and the maximum image plane transfer coefficient $K_{max}$, using the correction coefficients K0 and K1 stored in the lens memory 38 and transmits the corrected coefficients to the camera body 2.

Figure 65:
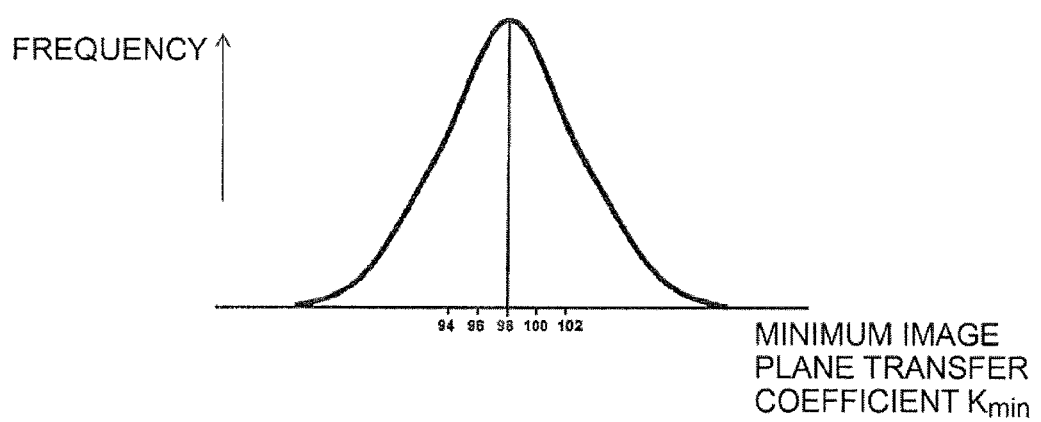
FIG. 65 is a diagram illustrating an example of the manufacturing variation of a lens barrel 3.

FIG. 65 is a diagram illustrating an example of the manufacture variation of the lens barrel 3. For example, in this embodiment, in the lens barrel 3, in the design stage of the optical system and the mechanical mechanism, the minimum image plane transfer coefficient $K_{min}$ is set to "100" and a minimum image plane transfer coefficient $K_{min}$ of "100" is stored in the lens memory 38. However, in the mass production process of the lens barrel 3, a manufacture variation occurs due to, for example, manufacturing errors during mass production and the minimum image plane transfer coefficient $K_{min}$ has the normal distribution illustrated in FIG. 65.

Therefore, in this embodiment, a correction coefficient K0 of "−1" is calculated from the normal distribution of the minimum image plane transfer coefficient $K_{min}$ in the mass production process of the lens barrel 3 and "−1" is stored as the correction coefficient K0 in the lens memory 38 of the lens barrel 3. Then, the lens controller 37 corrects the minimum image plane transfer coefficient $K_{min}$(100−1=99), using the minimum image plane transfer coefficient $K_{min}$ ("100") and the correction coefficient K0 ("−1") stored in the lens memory 38, and transmits the corrected minimum image plane transfer coefficient $K_{min}$ ("99") to the camera body 2.

For example, in the design stage of the optical system and the mechanical mechanism, the maximum image plane transfer coefficient $K_{max}$ is set to "1000" and a maximum image plane transfer coefficient $K_{max}$ of "1000" is stored in the lens memory 38. The maximum image plane transfer coefficient $K_{max}$ in the mass production process is distributed according to the normal distribution. When the mean of the maximum image plane transfer coefficient $K_{max}$ which is distributed according to the normal distribution is "1010", "+10" is stored as the correction coefficient K1 in the lens memory 38 of the lens barrel 3. The lens controller 37 corrects the maximum image plane transfer coefficient $K_{max}$ (1000+10=1010), using the maximum image plane transfer coefficient $K_{max}$ ("1000") and the correction coefficient K1 ("+10") stored in the lens memory 38, and transmits the corrected maximum image plane transfer coefficient $K_{max}$ ("1010") to the camera body 2.

A minimum image plane transfer coefficient $K_{min}$ of "100", a maximum image plane transfer coefficient $K_{max}$ of "1000", a correction coefficient K0 of "−1", a correction coefficient K1 of "+10" are illustrative and may be set to arbitrary values. Furthermore, the correction of the minimum image plane transfer coefficient $K_{min}$ and the maximum image plane transfer coefficient $K_{max}$ are not limited to addition and subtraction, and a combination of various operations such as multiplication and division can be applied for the correction.

«Twenty-Third Embodiment»

Next, a twenty-third embodiment of the invention will be described. The twenty-third embodiment has the same structure as the nineteenth embodiment except for the following points. That is, the twenty-third embodiment has the same structure as the nineteenth embodiment except that a correction coefficient K2 is stored in the lens memory 38 of the lens barrel 3, the lens controller 37 corrects the minimum image plane transfer coefficient $K_{min}$ using the correction coefficient K2 stored in the lens memory 38 and transmits the corrected minimum image plane transfer coefficient $K_{min}$ to the camera body 2, and the lens controller 37 and the camera controller 21 perform backlash reduction control using the corrected minimum image plane transfer coefficient $K_{min}$.

Figure 56:
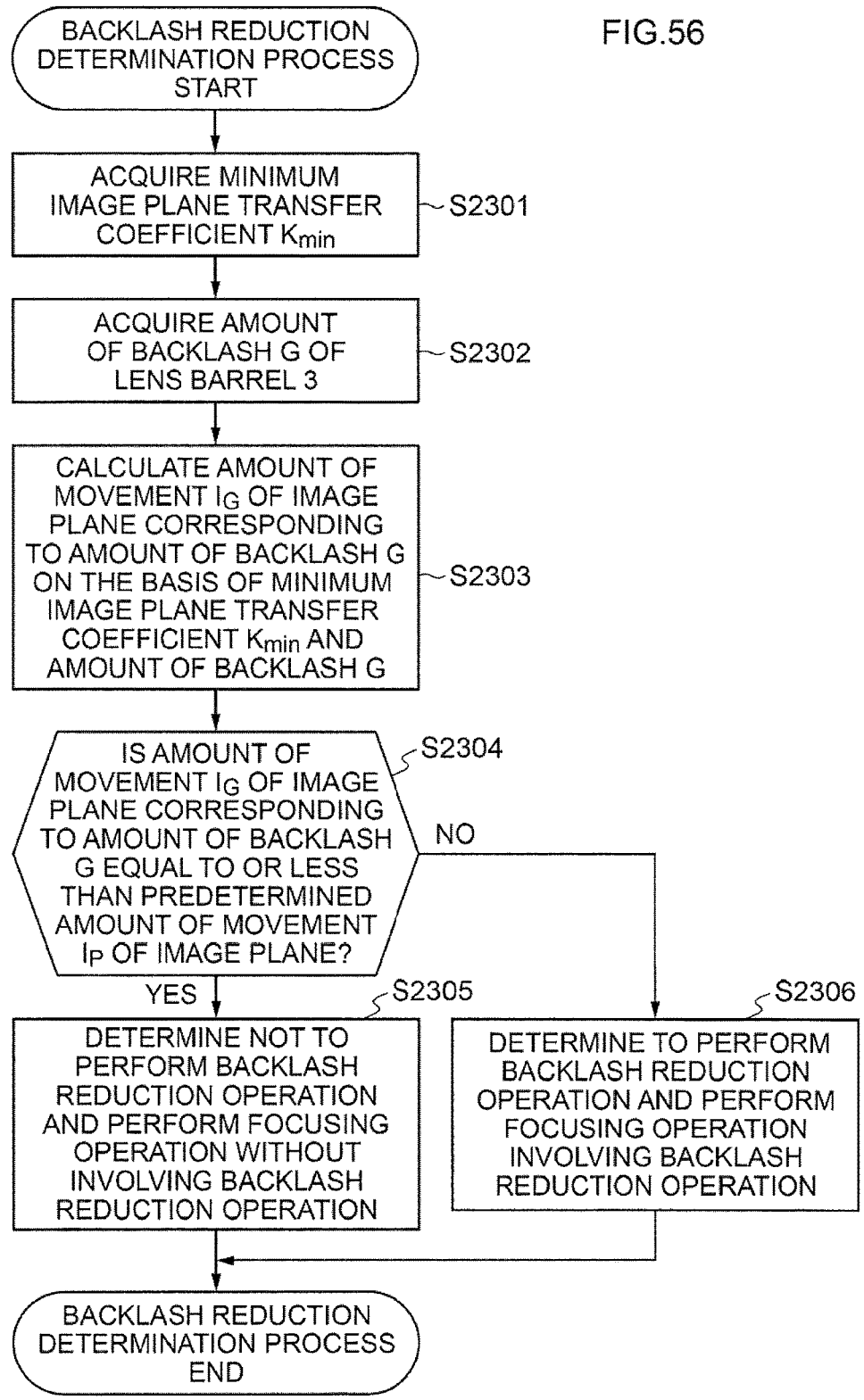
FIG. 56 is a flowchart illustrating an operation according to a nineteenth embodiment.

That is, as described above, in the nineteenth embodiment, the lens controller 37 transmits the minimum image plane transfer coefficient $K_{min}$ and the amount of backlash G to the camera controller 21 (see Steps S2301 and S2302 in FIG. 56). The camera controller 21 calculates the amount of movement IG of the image plane, using the minimum image plane transfer coefficient $K_{min}$ and the amount of backlash G. When "the amount of movement IG of the image plane"≤"a predetermined amount of movement IP of the image plane" is established, the camera controller 21 determines that backlash reduction is "not required" and performs control such that backlash reduction is not performed during the focusing operation. When "the amount of movement IG of the image plane">"a predetermined amount of movement IP of the image plane" is established, the camera controller 21 determines that backlash reduction is "required" and performs control such that backlash reduction is performed during the focusing operation.

However, when a variation in the minimum image plane transfer coefficient $K_{min}$ occurs due to, for example, manufacturing errors during the mass production of the lens barrel 3 (see FIG. 65) or when the minimum image plane transfer coefficient $K_{min}$ varies due to a change in the mechanical mechanism of the lens barrel 3 over time (for example, the aberration of a gear for driving the lens or the aberration of a member for holding the lens), there is a concern that an appropriate backlash reduction operation will not be performed. Therefore, in this embodiment, the correction coefficient K2 which is set considering a variation or change in the minimum image plane transfer coefficient $K_{min}$ is stored in the lens memory 38 and the lens controller 37 corrects the minimum image plane transfer coefficient $K_{min}$ using the correction coefficient K2 such that the minimum image plane transfer coefficient $K_{min}$ is greater than that before correction and transmits the corrected minimum image plane transfer coefficient $K_{min}$ to the camera body 2.

For example, in this embodiment, when a minimum image plane transfer coefficient $K_{min}$ of "100" and a correction coefficient K2 of "0.9" are stored in the lens memory 38, the lens controller 37 corrects the minimum image plane transfer coefficient $K_{min}$ (100×0.9=90), using the minimum image plane transfer coefficient $K_{min}$ ("100") and the correction coefficient K2 ("0.9") stored in the lens memory 38, and transmits the corrected minimum image plane transfer coefficient $K_{min}$ ("90") to the camera body 2. Then, the camera controller 21 calculates the amount of movement IG of the image plane, using the corrected minimum image plane transfer coefficient $K_{min}$ ("90") and the amount of backlash G. When "the amount of movement IG of the image plane"≤"a predetermined amount of movement IP of the image plane" is established, the camera controller 21 determines that backlash reduction is "not required" and performs control such that backlash reduction is not performed during the focusing operation. When "the amount of movement IG of the image plane">"a predetermined amount of movement IP of the image plane" is satisfied, the camera controller 21 determines that backlash reduction is "required" and performs control such that backlash reduction is performed during the focusing operation.

As such, in this embodiment, it is determined whether backlash reduction is required, on the basis of the correction coefficient K2 and the minimum image plane transfer coefficient $K_{min}$ ("90") that is less than the minimum image plane transfer coefficient $K_{min}$ ("100") before correction. Therefore, when the minimum image plane transfer coefficient $K_{min}$ ("90") is used, it is easier to determine that backlash reduction is "required" than that when the minimum image plane transfer coefficient $K_{min}$ ("100") before the correction. Even when the minimum image plane transfer coefficient $K_{min}$ changes due to, for example, manufacturing errors or variation with time, it is possible to obtain effects to reliably perform a backlash reduction operation and to reliably adjust the focus.

For example, it is preferable to set the correction coefficient K2 so as to satisfy the following conditional expression, considering, for example, manufacturing errors or variation with time:

Minimum image plane transfer coefficient $K_{min}$ before correction×0.8≤Corrected minimum image plane transfer coefficient $K_{min}$<Minimum image plane transfer coefficient $K_{min}$ before correction.

In addition, the correction coefficient K2 can be set so as to satisfy, for example, the following conditional expression:

$0.8 \leq K2 < 1$.

In this embodiment, similarly to the correction coefficient K2 for correcting the minimum image plane transfer coefficient $K_{min}$, a correction coefficient K3 for correcting the maximum image plane transfer coefficient $K_{max}$ is stored in the lens memory 38 and the lens controller 37 corrects the maximum image plane transfer coefficient $K_{max}$, using the correction coefficient K3, and transmits the corrected maximum image plane transfer coefficient $K_{max}$ to the camera body 2. The detailed description thereof will not be repeated.

«Twenty-Fourth Embodiment»

Next, a twenty-fourth embodiment of the invention will be described. The twenty-fourth embodiment has the same structure as the twentieth embodiment except for the following points. That is, in the twentieth embodiment, the silent control (clip operation) is performed using the minimum image plane transfer coefficient $K_{min}$ stored in the lens memory 38. In contrast, the twenty-fourth embodiment differs from the twentieth embodiment in that a correction coefficient K4 is stored in the lens memory 38 of the lens barrel 3, the lens controller 37 corrects the minimum image plane transfer coefficient $K_{min}$, using the correction coefficient K4 stored in the lens memory 38, and transmits the corrected minimum image plane transfer coefficient $K_{min}$ to the camera body 2, and the lens controller 37 and the camera controller 21 perform the silent control using the corrected minimum image plane transfer coefficient $K_{min}$.

As described above, in the twentieth embodiment, the lens controller 37 transmits the current image plane transfer coefficient $K_{cur}$, the minimum image plane transfer coefficient $K_{min}$, the maximum image plane transfer coefficient $K_{max}$, and the silent lens moving speed lower limit V0b to the camera controller 21 (see Step S2501 in FIG. 59) and the camera controller 21 calculates the silent image plane moving speed lower limit V0b_max (see Step S2502 in FIG. 59). Then, when the image plane moving speed V1a for focus detection×Kc>the silent image plane moving speed lower limit V0b_max is satisfied, the camera controller 21 determines that the clip operation is "permitted". When the image plane moving speed V1a for focus detection×Kc<the silent image plane moving speed lower limit V0b_max is established, the camera controller 21 determines that the clip operation is "prohibited".

However, when a variation in the minimum image plane transfer coefficient $K_{min}$ occurs due to, for example, manufacturing errors during the mass production of the lens barrel 3 (see FIG. 65) or when the minimum image plane transfer coefficient $K_{min}$ varies due to a change in the mechanical mechanism of the lens barrel 3 over time (for example, the aberration of a gear for driving the lens or the aberration of a member for holding the lens), there is a concern that appropriate silent control (clip operation) will not be performed. Therefore, in this embodiment, the correction coefficient K4 which is set considering a variation or change in the minimum image plane transfer coefficient $K_{min}$ is stored in the lens memory 38 and the lens controller 37 corrects the minimum image plane transfer coefficient $K_{min}$ using the correction coefficient K4 such that the minimum image plane transfer coefficient $K_{min}$ is less than that before correction and transmits the corrected minimum image plane transfer coefficient $K_{min}$ to the camera body 2.

For example, in this embodiment, when a minimum image plane transfer coefficient $K_{min}$ of "100" and a correction coefficient K4 of "0.9" are stored in the lens memory 38, the lens controller 37 corrects the minimum image plane transfer coefficient $K_{min}$ (100×0.9=90), using the minimum image plane transfer coefficient $K_{min}$ ("100") and the correction coefficient K4 ("0.9") stored in the lens memory 38, and transmits the corrected minimum image plane transfer coefficient $K_{min}$ ("90") to the camera body 2. Then, the camera controller 21 determines whether the image plane moving speed V1a for focus detection×Kc<the silent image plane moving speed lower limit V0b_max is established, using the corrected minimum image plane transfer coefficient $K_{min}$ ("90").

In this embodiment, it is determined whether the image plane moving speed V1a for focus detection×Kc<the silent image plane moving speed lower limit V0b_max is established, by using the correction coefficient K4 and by using the minimum image plane transfer coefficient $K_{min}$ ("90") less than the minimum image plane transfer coefficient $K_{min}$ ("100") before correction. Therefore, when the corrected minimum image plane transfer coefficient $K_{min}$ ("90") is used, it is easier to determine that the clip operation is "prohibited" than that when the minimum image plane transfer coefficient $K_{min}$ ("100") before correction is used. Accordingly, even if the minimum image plane transfer coefficient $K_{min}$ changes due to, for example, manufacturing errors or a change in the mechanical mechanism of the lens barrel over time, it is possible to prevent an excessive clip operation and to reliably adjust the focus.

For example, it is preferable to set the correction coefficient K4 so as to satisfy the following conditional expression, considering, for example, manufacturing errors or a change in the mechanical mechanism of the lens barrel:

Minimum image plane transfer coefficient $K_{min}$ before correction×0.8≤Corrected minimum image plane transfer coefficient $K_{min}$<Minimum image plane transfer coefficient $K_{min}$ before correction.

In addition, the correction coefficient K4 can be set so as to satisfy, for example, the following conditional expression:

0.8≤K4<1.

In this embodiment, similarly to the correction coefficient K4 for correcting the minimum image plane transfer coefficient $K_{min}$, a correction coefficient K5 for correcting the maximum image plane transfer coefficient $K_{max}$ is stored in the lens memory 38 and the lens controller 37 corrects the maximum image plane transfer coefficient $K_{max}$, using the correction coefficient K5, and transmits the corrected maximum image plane transfer coefficient $K_{max}$ to the camera body 2. However, the detailed description thereof will not be repeated.

The above-described embodiments have been described for ease of understanding of the invention and are not intended to limit the invention. Therefore, each component disclosed in the above-described embodiments includes all design changes and equivalents included in the technical range of the invention. In addition, the above-described embodiments may be appropriately combined with each other.

For example, in the eighteenth to twenty-fourth embodiments, when the focal length does not change (that is, the zoom lens 32 is not driven) and the minimum image plane transfer coefficient $K_{min}$ changes, it is determined that any of a communication failure, a circuit failure, a memory failure, a power failure and so on, has occurred. However, when the focal length does not change and the maximum image plane transfer coefficient $K_{max}$ changes, it may be determined that a failure has occurred. Alternatively, when the focal length does not change and at least one of the minimum image plane transfer coefficient $K_{min}$ and the maximum image plane transfer coefficient $K_{max}$ changes, it may be determined that a failure has occurred. In particular, according to this embodiment, a failure, such as a communication failure, can be detected by a simple process using the minimum image plane transfer coefficient $K_{min}$ or the maximum image plane transfer coefficient $K_{max}$. Therefore, it is possible to obtain the remarkable effect of providing a focusing control device with high reliability.

In the eighteenth to twenty-fourth embodiments, the table indicating the relationship between each lens position and the image plane transfer coefficient K illustrated in FIG. 47 is stored in the lens memory 38. However, the table may not be stored in the lens memory 38, but may be stored in the lens controller 37. In addition, in the above-described embodiments, the table indicating the relationship among the position of the zoom lens 32, the position of the focus lens 33, and the image plane transfer coefficient K is stored. However, a table including an environment temperature and the posture of the camera 1 may be further provided.

Figure 66:
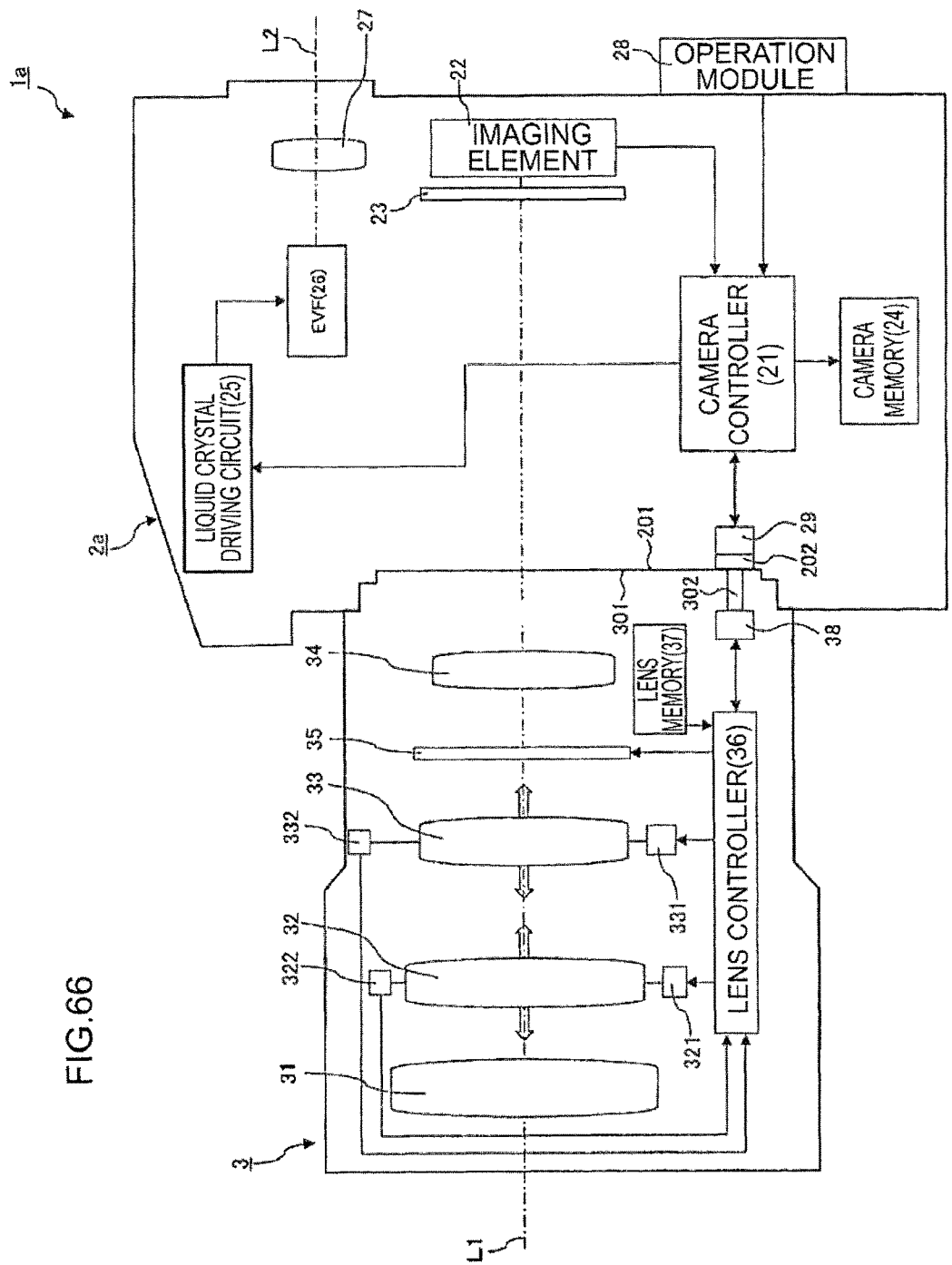
FIG. 66 is a diagram illustrating the main structure illustrating a camera according to another embodiment.

The cameras 1 according to the eighteenth to the twenty-fourth embodiments are not particularly limited. For example, as illustrated in FIG. 66, the invention may be applied to a lens interchangeable mirrorless camera 1a. In the example illustrated in FIG. 66, a camera body 2a sequentially transmits images captured by the imaging element 22 to the camera controller 21 and displays the image on an electronic viewfinder (EVF) 26 of an observation optical system through a liquid crystal driving circuit 25. In this case, the camera controller 21 reads, for example, an output from the imaging element 22 and calculates a focus evaluation value on the basis of the read output to detect the focusing state of the imaging optical system using a contrast detection method. In addition, the invention may be applied to other optical devices, such as a digital video camera, a digital camera with built-in lenses, and a mobile phone camera.

REFERENCE SIGNS LIST 1 digital camera
2 camera body
21 camera controller
22 imaging element
29 camera transceiver
291 first camera-side communication module
292 second camera-side communication module
3 lens barrel
32 zoom lens
321 zoom lens driving motor
33 focus lens
331 focus lens driving motor
37 lens controller
38 lens memory
39 lens transceiver
381 first lens-side communication module
382 second lens-side communication module

The invention claimed is:

1. An exchangeable lens comprising:
an imaging optical system including a focus adjustment lens;
a driver that drives the focus adjustment lens in a direction of an optical axis;
a transceiver that transmits and receives a signal to and from a camera body; and
a controller that controls the transceiver to repeatedly transmit a first image plane transfer coefficient which is determined in correspondence with a position of the focus adjustment lens included in the imaging optical system and a second image plane transfer coefficient which does not depend on the position of the focus adjustment lens to the camera body at a predetermined interval,
wherein, when the controller repeatedly transmits the second image plane transfer coefficient to the camera body, the controller varies the second image plane transfer coefficient over time.

2. The exchangeable lens according to claim 1,
wherein the second image plane transfer coefficient is at least one of a maximum value and a minimum value of the first image plane transfer coefficient.

3. An exchangeable lens comprising:
an imaging optical system including a focus adjustment lens;
a driver that drives the focus adjustment lens in a direction of an optical axis;
a transceiver that transmits and receives a signal to and from a camera body; and
a controller that controls the transceiver to repeatedly transmit a first image plane transfer coefficient which is determined in correspondence with a position of the focus adjustment lens included in the imaging optical system and a second image plane transfer coefficient which is at least one of a maximum value and a minimum value of the first image plane transfer coefficient to the camera body at a predetermined interval,
wherein, when the controller repeatedly transmits the second image plane transfer coefficient to the camera body, the controller varies the second image plane transfer coefficient depending on a change in a position of the focus adjustment lens.

4. A camera system comprising:
the exchangeable lens according to claim 1; and
the camera body,
wherein the camera body includes:
an acquisition module that acquires the first image plane transfer coefficient and the second image plane transfer coefficient from the exchangeable lens;
a focus detector that calculates an evaluation value related to a contrast of an image by the imaging optical system to detect a focus adjustment state of the imaging optical system; and
a driving speed determination module that determines a driving speed of the focus adjustment lens when the focus detector detects the focus adjustment state, using the second image plane transfer coefficient.

5. A camera system comprising:
the exchangeable lens according to claim 3; and
the camera body,
wherein the camera body includes:
an acquisition module that acquires the first image plane transfer coefficient and the second image plane transfer coefficient from the exchangeable lens;
a focus detector that calculates an evaluation value related to a contrast of an image by the imaging optical system to detect a focus adjustment state of the imaging optical system; and
a driving speed determination module that determines a driving speed of the focus adjustment lens when the focus detector detects the focus adjustment state, using the second image plane transfer coefficient.

6. An exchangeable lens comprising:
an imaging optical system including a focus adjustment lens;
a driver that drives the focus adjustment lens;
a transceiver that transmits and receives a signal to and from a camera body; and
a controller configured to control the transceiver to transmit a first image plane transfer coefficient which corresponds to a value of TL/TI and is determined in correspondence with a position of the focus adjustment lens and a second image plane transfer coefficient which is greater than a minimum value of the first image plane transfer coefficient to the camera body, TL being an amount of movement of the focus adjustment lens and TI being an amount of movement of an image plane.

7. An exchangeable lens comprising:
an imaging optical system including a focus adjustment lens;
a driver that drives the focus adjustment lens;
a transceiver that transmits and receives a signal to and from a camera body; and
a controller configured to control the transceiver to transmit a first image plane transfer coefficient which corresponds to a value of TI/TL and is determined in correspondence with a position of the focus adjustment lens and a second image plane transfer coefficient which is less than a minimum value of the first image plane transfer coefficient to the camera body, TL being an amount of movement of the focus adjustment lens and TI being an amount of movement of an image plane.

8. The exchangeable lens according to claim 6,
wherein the controller controls the transceiver to transmit the first image plane transfer coefficient and the second image plane transfer coefficient to the camera body when the camera body determines that the exchangeable lens is a first type of lens as a result of transmission and reception of the signal between the exchangeable lens and the camera body using the transceiver, and
the controller controls the transceiver to transmit the first image plane transfer coefficient to the camera body and not to transmit the second image plane transfer coefficient to the camera body when the camera body determines that the exchangeable lens is a second type of lens different from the first type of lens as a result of transmission and reception of the signal between the exchangeable lens and the camera body using the transceiver.

9. The exchangeable lens according to claim 7,
wherein the controller controls the transceiver to transmit the first image plane transfer coefficient and the second image plane transfer coefficient to the camera body when the camera body determines that the exchangeable lens is a first type of lens as a result of the transmission and reception of the signal between the exchangeable lens and the camera body using the transceiver, and the controller controls the transceiver to transmit the first image plane transfer coefficient to the camera body and not to transmit the second image plane transfer coefficient to the camera body when the camera body determines that the exchangeable lens is a second type of lens different from the first type of lens as a result of the transmission and reception of the signal between the exchangeable lens and the camera body using the transceiver.

10. An exchangeable lens comprising:

an imaging optical system including a focus adjustment lens;

a driver that drives the focus adjustment lens;

a transceiver that transmits and receives a signal to and from a camera body; and a controller that can control the transceiver to transmit a first image plane transfer coefficient which is determined in correspondence with a position of the focus adjustment lens and a second image plane transfer coefficient which is different from the first image plane transfer coefficient and varies depending on the position of the focus adjustment lens to the camera body.

* * * * *